INVENTORS
Frederick P. Netznik,
Joseph Gardberg,
BY Brown, Jackson,
Boettcher & Dienner
Attys.

INVENTORS.
Frederick P. Netznik,
BY Joseph Gardberg,
Brown, Jackson,
Boettcher & Dienner
Attys INVENTORS.
Frederick P. Netznik,
Joseph Gardberg,
BY Brown, Jackson,
Boettcher & Dienner
Attys.

INVENTORS
Frederick P. Netznik,
BY Joseph Gardberg,
Brown, Jackson,
Boettcher & Dienner
Attys INVENTORS.
Frederick P. Netznik,
BY Joseph Gardberg,
Brown, Jackson,
Boettcher & Dienner
Attys.

Dec. 13, 1966 F. P. NETZNIK ET AL 3,291,292

TAPE CONTROLLED SAW POSITIONING MEANS FOR LINECASTING MACHINES

Filed Oct. 28, 1964 35 Sheets-Sheet 6

INVENTORS.
Frederick P. Netznik,
BY Joseph Gardberg,
Brown, Jackson,
Boettcher & Dienner
attys.

INVENTORS
Frederick P. Netznik,
Joseph Gardberg,
BY Brown, Jackson,
Boettcher & Dienner attys INVENTORS
Frederick P. Netznik
BY Joseph Gardberg,
Brown, Jackson,
Boettcher & Dienner
Attys Dec. 13, 1966 F. P. NETZNIK ET AL 3,291,292

TAPE CONTROLLED SAW POSITIONING MEANS FOR LINECASTING MACHINES

Filed Oct. 28, 1964 35 Sheets-Sheet 9

INVENTORS
Frederick P. Netznik,
BY Joseph Gardberg,
Brown, Jackson,
Boettcher & Dienner
attys INVENTORS.
Frederick P. Netznik,
Joseph Gardberg,
BY Brown, Jackson,
Boettcher & Dienner
Attys INVENTORS.
Frederick P. Netznik,
BY Joseph Gardberg,
Brown, Jackson,
Boettcher & Dienner
Att'ys INVENTORS
Frederick P. Netznik
BY Joseph Gardberg,
Brown, Jackson,
Boettcher & Dienner
Attys INVENTORS.
Frederick P. Netznik,
BY Joseph Gardberg,
Brown, Jackson,
Boettcher & Dienner
Attys.

INVENTORS.
Frederick P. Netznik,
BY Joseph Gardberg,
Brown, Jackson,
Boettcher & Dienner
Att'ys Dec. 13, 1966 F. P. NETZNIK ET AL 3,291,292

TAPE CONTROLLED SAW POSITIONING MEANS FOR LINECASTING MACHINES

Filed Oct. 28, 1964 35 Sheets-Sheet 15

INVENTORS.
Frederick P. Netznik
BY Joseph Gardberg,
Brown, Jackson,
Boettcher & Dienner
attys.

INVENTORS.
Frederick P. Netznik,
BY Joseph Gardberg,
Brown, Jackson,
Boettcher & Dienner
Attys.

INVENTORS.
Frederick P. Netznik,
BY Joseph Gardberg,
Brown, Jackson, Boettcher & Dienner
Att'ys.

Dec. 13, 1966 F. P. NETZNIK ET AL 3,291,292

TAPE CONTROLLED SAW POSITIONING MEANS FOR LINECASTING MACHINES

Filed Oct. 28, 1964 35 Sheets-Sheet 18

INVENTORS.
Frederick P. Netznik,
Joseph Gardberg,
By Brown, Jackson, Boettcher & Dienner
Attys.

INVENTORS.
Frederick P. Netznik,
BY Joseph Gardberg.
Brown, Jackson,
Boettcher & Dienner
attys.

INVENTORS.
Frederick P Netznik,
BY Joseph Gardberg,
Brown, Jackson
Boettcher & Dienner
Attys.

INVENTORS
Frederick P. Netznik.
BY Joseph Gardberg,
Brown, Jackson,
Boettcher & Dienner
Att'ys.

INVENTORS
Frederick P. Netznik,
BY Joseph Gardberg,
Brown, Jackson, Boettcher & Dienner
Attys.

Inventors:
Frederick P. Netznik
Joseph Gardberg
By Brown, Jackson, Boettcher + Dienner
attys.

-LOGIC DIAGRAM

Inventors
Frederick P. Netznik,
Joseph Gardberg,
By Brown, Jackson, Boettcher & Dienner
attys INVENTORS.
FREDERICK P. NETZNIK
JOSEPH GARDBERG
BY Brown, Jackson, Boettcher & Dienner
ATTYS.

INVENTORS.
FREDERICK P. NETZNIK
JOSEPH GARDBERG
BY Brown, Jackson, Boettcher & Dienner
ATTYS.

INVENTORS.
FREDERICK P. NETZNIK
JOSEPH GARDBERG
BY Brown, Jackson, Boettcher & Dienner
ATTYS.

INVENTORS.
FREDERICK P. NETZNIK
JOSEPH GARDBERG
BY Brown, Jackson, Boettcher & Dienner
ATTYS.

Dec. 13, 1966 F. P. NETZNIK ET AL 3,291,292

TAPE CONTROLLED SAW POSITIONING MEANS FOR LINECASTING MACHINES

Filed Oct. 28, 1964 35 Sheets-Sheet 29

INVENTORS
FREDERICK P. NETZNIK
JOSEPH GARDBERG
BY Brown, Jackson, Boettcher & Dienner
ATTYS.

INVENTORS.
FREDERICK P. NETZNIK
JOSEPH GARDBERG
BY Brown, Jackson, Boettcher & Dienner
ATTYS INVENTORS.
FREDERICK P. NETZNIK
JOSEPH GARDBERG
BY Brown, Jackson, Boettcher & Dienner
ATTYS.

INVENTORS.
FREDERICK P. NETZNIK
JOSEPH GARDBERG
BY Brown, Jackson, Boettcher & Dienner
ATTYS.

INVENTORS.
FREDERICK P. NETZNIK
JOSEPH GARDBERG
BY Brown, Jackson,
Boettcher & Dienner
ATTYS.

INVENTORS.
FREDERICK P. NETZNIK
JOSEPH GARDBERG
BY Brown, Jackson,
Boettcher & Dienner
ATTYS INVENTORS.
FREDERICK P. NETZNIK
JOSEPH GARDBERG
BY Brown, Jackson,
Boettcher & Dienner
ATTYS

United States Patent Office 3,291,292
Patented Dec. 13, 1966

3,291,292
TAPE CONTROLLED SAW POSITIONING MEANS FOR LINECASTING MACHINES

Frederick P. Netznik, Skokie, and Joseph Gardberg, Chicago, Ill., assignors to Mohr Lino-Saw Company, Skokie, Ill., a corporation of Illinois Filed Oct. 28, 1964, Ser. No. 407,200
48 Claims. (Cl. 199—59)

The present invention relates to improved automatic control mechanism for linecasting machines and the like, and particularly to those which utilize coded tape for obtaining the desired automatic operation.

The general object of the invention is to substantially increase the number of controls or operations which can be obtained from coded tape, considerably beyond the limited number which have heretofore been obtainable therefrom.

In the early use of coded tape in printing telegraph systems, teletype systems, etc., the Baudot or five unit system was extensively used, but the five levels of code perforations in such system gave only thirty-two binary code signals, i.e. only slightly more than the twenty-six letters of the alphabet.

Following this, the coded tape was expanded to six units or levels, and this is now extensively used in the well-known "Teletypesetter" system for automatically operating linecasting machines, such as the Linotype and the Intertype. In such tape the six levels of binary code perforations or signals afford sixty-four signals combinations.

This was deemed adequate for many years, with the result that the six level tape is now in extensive use in Teletypesetter operating units installed on thousands of linecasting machines distributed over the United States and the entire world. Correspondingly, all of such six level tape must be punched out by perforators designed specifically for six level work, and there are thousands of these in use. It is thus clear that the use of six level tape is quite solidly entrenched, particularly with regard to improvements intended to be used on existing equipment.

However, it has been recognized for some time that the limitation to sixty-four combinations inherent in six level tape, as heretofore used, imposes definite and objectionable limitations on the number of functions or operations which the linecasting machine can perform completely automatically—without requiring the intervention of manual or monitored assistance. This is particularly true of those secondary functions which are separate and apart from the primary functions of setting up the line of type matrices, preparatory to casting the type slug. Such secondary functions are typically performed by the following: (a) apparatus which sizes or determines the dimensions of the finished type slug, such as the length of the slug, as controlled by an adjustable rotary saw which saws off the blank end of the slug; or such as the width of the slug, as controlled by the adjustable mold disk and adjustable knife block for producing slugs of different widths; (b) also apparatus which makes one or more selections between different styles or fonts of type faces by effecting an operative transposition from one magazine to another.

More particularly with regard to the above described secondary functions, it is one of the specific objects of our invention to provide an improved tape control mechanism wherein the tape, in addition to performing the primary function of selecting and assembling the line of matrices, also automatically performs the secondary function of setting the slug cutting saw in the proper position for cutting off a blank end of the slug projecting beyond the type bearing portion thereof. However, it will be understood that the invention is not limited to the performance of this particular secondary function, but can be utilized to perform other secondary functions as well.

Another object of the invention is to provide improved selector mechanism which is adapted to respond to the transmission of unique transposing signal data from the tape, for determining when the responsiveness to the tape signals is to be transposed from the primary signal responsive mechanism to the secondary signal responsive mechanism.

Still another object of the invention is to provide such a selecting or transposing apparatus which will respond to unique transposing signal data transmitted from the code tape. This unique transposing signal data preferably resides in an "abnormal" transmission of a standard or conventional code signal. Taking the code signal UR ("upper rail") as an example, this code signal is never transmitted twice in succession, in any normal usage of the linecasting machine. Hence, the double transmission of this signal twice in succession (viz. UR, UR) constitutes an "abnormal" transmission of such code signal. Our improved selecting or transposing apparatus is so constructed as to respond to such abnormal transmission, whereby the aforesaid primary signal responsive mechanism (which normally stands responsive to the tape code signals) now becomes non-responsive to such signals; and whereby the above secondary signal responsive mechanism (which normally stands non-responsive to the tape code signals) now becomes responsive to such signals. This transposed condition between the primary and secondary signal responsive mechanisms can be allowed to remain for any desired period of time for the continued performance of any one or more of the secondary functions, this transposed condition being only nullified when the LR ("lower rail") counterpart of the UR signal is transmitted from the tape to the selecting mechanism. While the primary and secondary mechanisms are in this transposed condition, the tape can transmit approximately sixty-two of its available sixty-four code signals, singly or in repetition, while going through the process of causing the secondary signal responsive mechanism or mechanisms to perform their secondary functions.

Thus, our invention enables the number of code signals from any coded tape to be almost doubled, i.e., the thirty-two code signals from a five level tape can be increased to approximately sixty-two signals, the sixty-four signals from a six level tape can be increased to approximately one hundred and twenty six, and so on.

Another object of the invention is to provide an ultrasenstive optical or photo-electric type of saw position sensing apparatus and system which will afford an accurate and continuous sensing of the position of the slug cutting saw at all times in the operation of the slug casting machine. Whenever the next succeeding code signals on the tape are going to call for a new length of type line having a different pica and/or point length than the preceding type line, the tape first transmits the aforesaid abnormal signal (such as UR, UR) for transposing from the primary signal responsive mechanism to a secondary signal responsive mechanism. Since the slug cutting saw mechanism is the desired secondary mechanism to be operated at this time, the tape makes this election by then transmitting the latter "s" or other predetermined signal for designating the saw mechanism. Thereafter, the tape transmits in picas and points the new length of type line, so as to establish the position that the saw should occupy for cutting this new length, and this new measure is then compared with the old measure or position which the saw now occupies. The saw positioner then drives the saw upwardly or downwardly from the old measure to the new measure, following which the cast slug is ejected past the saw to have the blank upper end thereof cut off and discarded.

The saw position indicator or encoder is made ultra-sensitive by its utilization of two rotating light interrupting elements, both revolving concurrently with changes in the saw position, but one rotating at one speed in response to pica changes and the other rotating at a different speed in response to point changes. These light interrupting elements are preferably in the form of transparent dials having opaque light interrupting segments thereon operative in the differential speed rotation of the two dials to intermittently interrupt the transmission of light rays to two banks of photo-electric cells, one individual to the pica dial and the other individual to the point dial. A distinctive feature is the improved marking and operating relation of the two dials, devised to insure that no ambiguity can result from mistiming of the two dials.

Another object of the invention is to safeguard the operation of the machine against possible jamming or malfunctioning, this being accomplished by providing improved additional controls, and by providing an improved interrelationship between several of these controls. For example, the well known "floating" lever control of the "elevate" operation has, in our new construction, been made subject to additional control conditions, the absence or failure of which can critically affect the operation of the machine. That is to say, the final movement of such floating lever into its tripping position where it trips the clutch of the elevator shaft, is made dependent upon the concurrent triggering of several conditions, such as: (1) the closing of an elevate switch with the initial operation of the elevate push bar; (2) the energization of an elevate solenoid to close the two halves of a split fork connecting the inner end of the floating lever with the delivery rod; (3) the movement of the delivery rod and split fork toward right hand positions; (4) the control of such right hand movement by a delivery regulator; (5) the control of such delivery regulator by the passage of the preceding slug through a slug detecting zone, etc.

Another object of the invention is to provide an improved apparatus and method which will have a unique sequence of the operating steps or controls. More specifically, when a different length of slug is to be called for, the first operating step in our improved method is to first position the saw for cuttting the slug to the required length; and the second operating step is to then drop the matrices for assembling the line of type which is to be cast into that particular slug. In this improved method, by giving the saw positioning step precedence over the type assembling step, the time required for the performance of each cycle is generally shortened. In order to obtain this method sequence, it is of course necessary that the saw positioning perforations in the tape should precede the type assembling perforations therein.

Another object of the invention is to so construct and arrange our above described automatic control apparatus that it can be quickly and easily installed in any previously existing assembly of linecasting unit and Teletypesetter unit. Our improved apparatus has been specially designed to permit such installation to be made with a minimum amount of change or addition in the linecaster unit and in the Teletypesetter unit, and in a minimum amount of time.

Numerous other objects, features and advantages of the invention will appear from the following detailed description of one preferred embodiment of the invention. In the accompanying drawings illustrating such embodiment:

Figure 46:
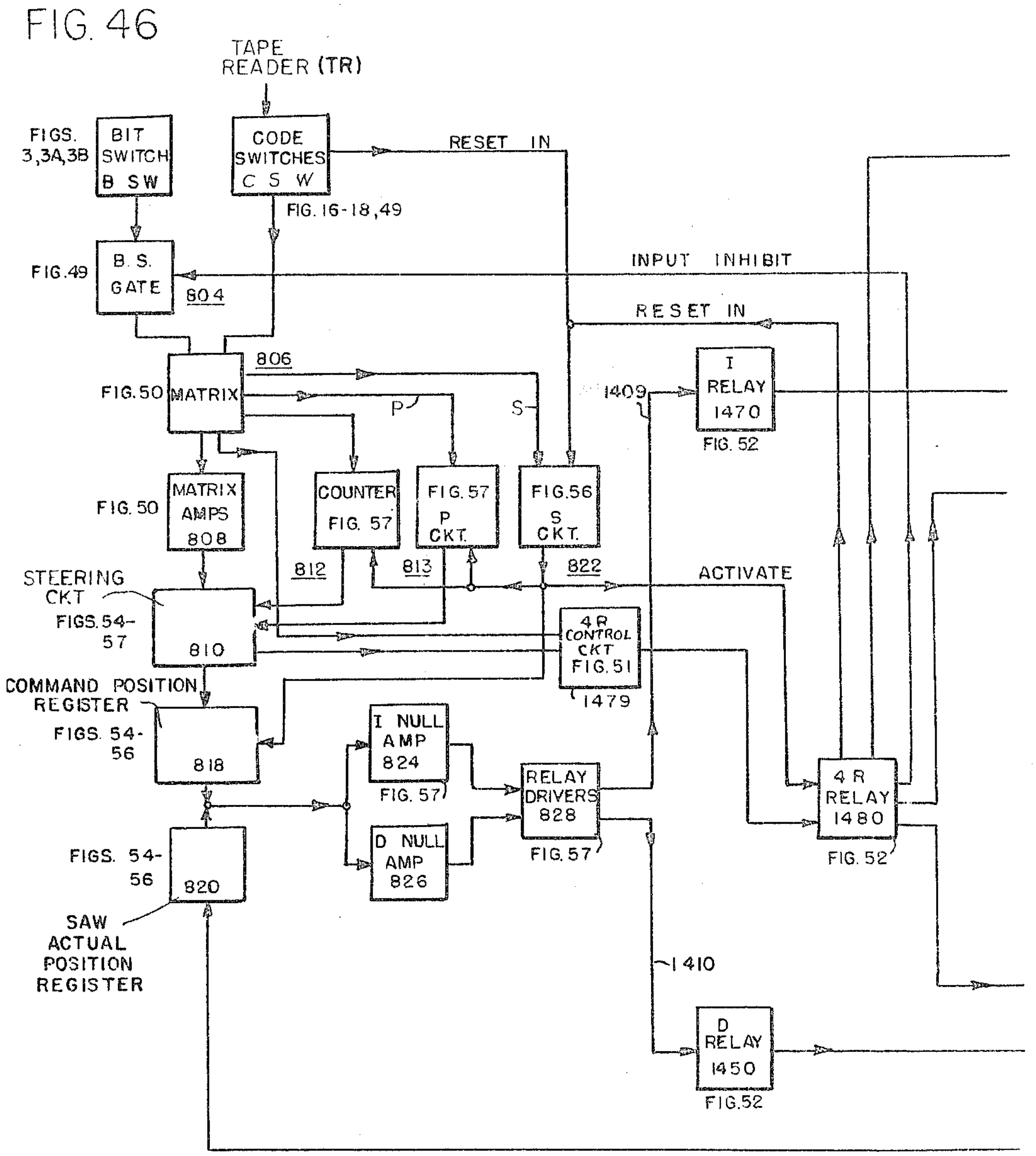
Figure 47:
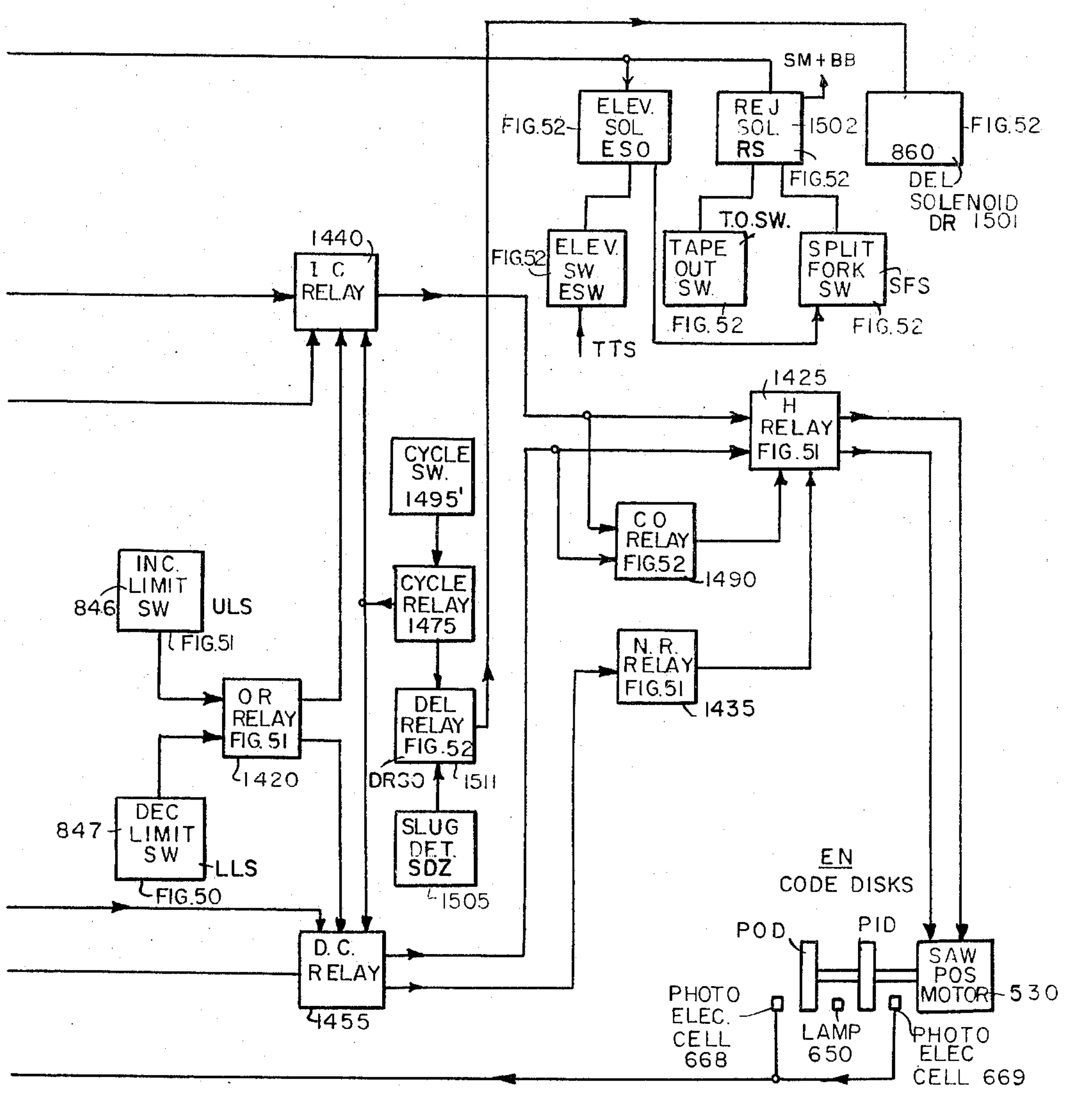
Figures 48, 50:
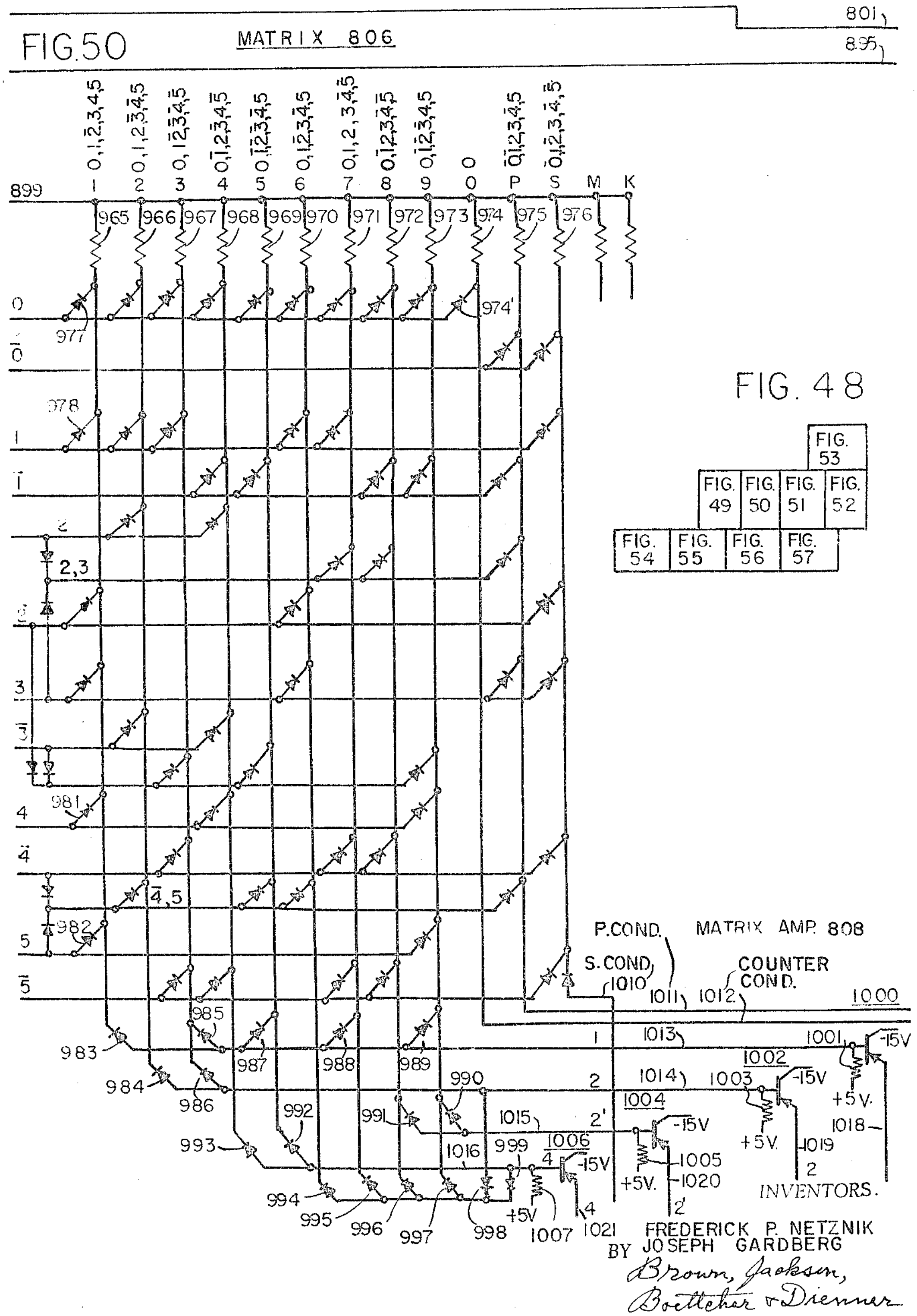

FIGURES 46 and 47 comprise a blocking diagram of the electrical portion of the saw positioning system;

FIGURE 48 sets forth a chart illustrating the manner in which FIGURES 49–57 are arranged to interconnect the novel electrical circuits contained in the saw positioning device; and FIGURES 49–57 are schematic diagrams of the electrical circuits for the novel control system.

MECHANICAL PORTION OF SAW POSITIONER

The above-described drawings show the adaptation of our invention to the aforementioned perforated tape controlled linecasting machine, commonly consisting of a standard linecasting machine, such as a "Linotype" or "Intertype," to which has been adapted an automatic operating unit: whereby the ordinary typecasting operations are made to occur automatically by causing the type forming matrices to be selected and assembled automatically in response to coded perforations in the perforated paper tape or the like. In the exemplary embodiment of the invention herein shown, we have illustrated the invention as being associated with a "Teletypesetter" operating unit, but it will be understood that the invention is not limited thereto.

Figure 1:
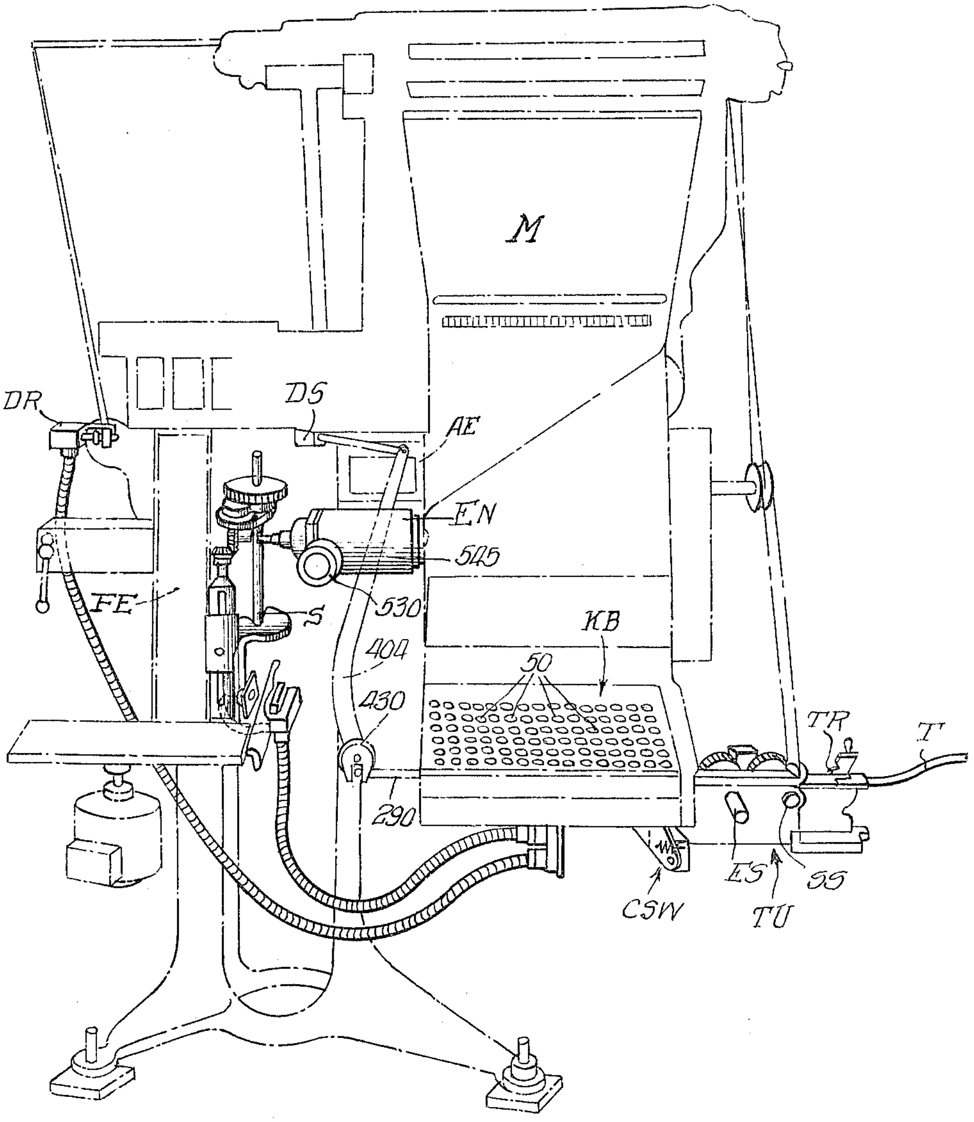
FIGURE 1 is a schematic perspective view of a linecasting machine with our invention mounted thereon.
Figure 2:
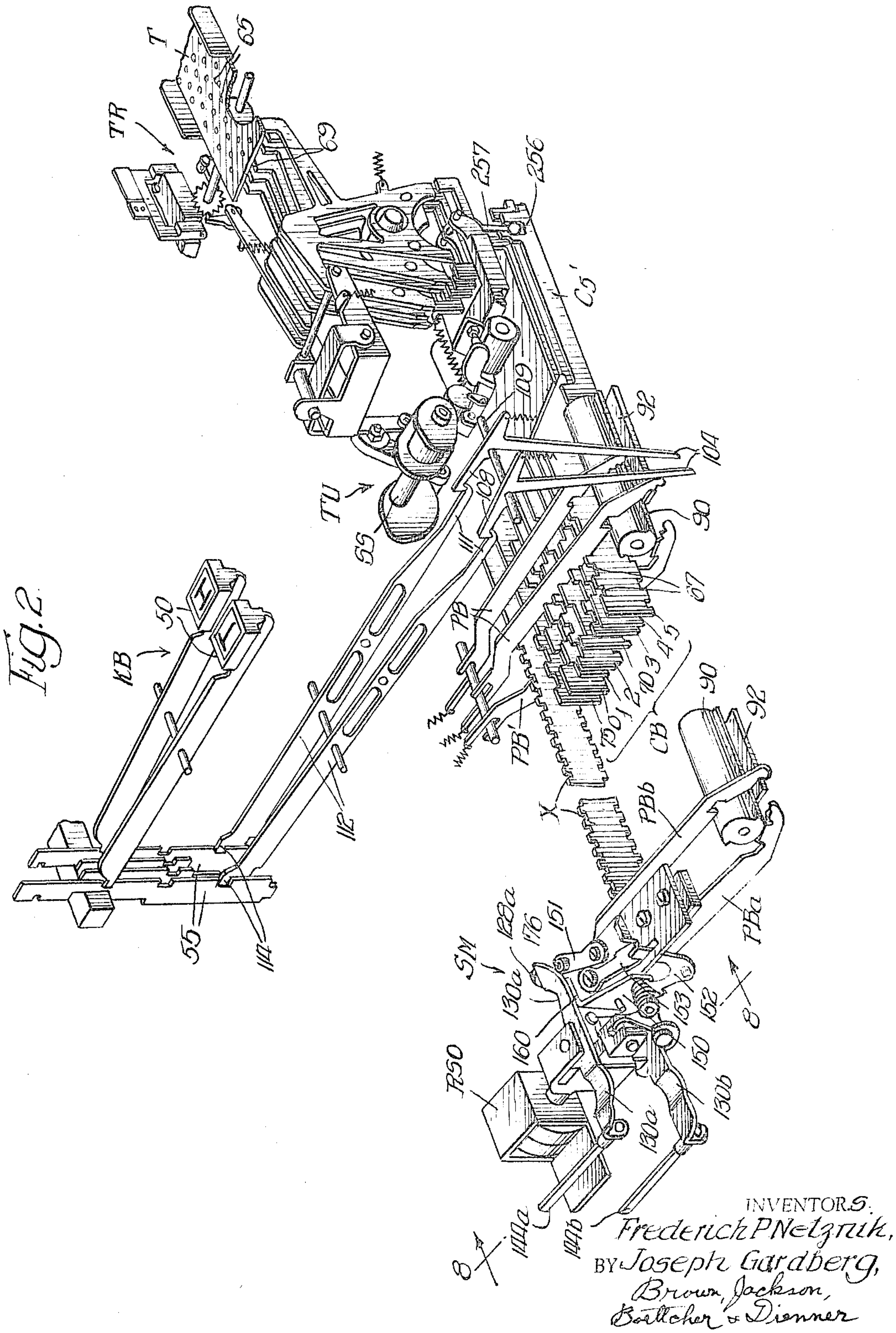
FIGURE 2 is a diagrammatic perspective view of portions of the Teletypesetter operating unit used in the linecasting machine, showing our invention combined therewith.

FIGURES 1 and 2 schematically illustrate at TU a conventional Teletypesetter operating unit, and at KB they schematically illustrate the keyboard, which generally comprises about ninety or more manually operable keys, collectively designated 50, generally made up of a right hand bank of keys which call for capital letters, a left hand bank of keys which call for lower case letters, and an intermediate bank which call for commas, colons, control functions, etc., generally comparable to the standard keyboard on the conventional linecasting machine. Such keyboard KB of manually operable keys is employed as an adjunct to the automatic operating unit TU for several reasons: such as to provide for the manual insertion of fill-in material which it is difficult to code into the perforated tape; also to provide for ordinary manual operation in the case of break-downs in the perforated tape reader, or a failure to have the perforated tape material prepared in time; and still further to provide operative connections between the code bars and push bars and the matrix selecting devices of the standard linecasting machines. All of the above keys which are intended solely to release type-forming matrices from an overhead arrangement of one or more matrix magazines, operate to effect such dropping or releasing of the matrices through upwardly extending release rods or other well known releasing instrumentalities fragmentarily shown at 55. Embodied in or associated with the above banks of manually operable keys are certain additional keys which are adapted to perform additional functions other than the dropping of matrices, such additional control functions being represented by the well-known "upper rail," "lower rail," "elevate" operations, etc., described more in detail later.

The adaptation of the Teletypesetter to standard linecasting machines is effected by the attachment thereto of this Teletypesetter operating unit, TU, which embodies three main mechanisms or elements, comprising: firstly, a perforated tape reader TR generally located at the right hand end of the keyboard 50 for reading the perforations 65 (FIGURE 2) in the tape T (FIGURE 7); secondly, a bank of six or more tape controlled shiftable code bars having coded notches in their top and bottom edges, collectively indicated at CB (which have come to be designated in the industry as code bars 0, 1, 2, 3, 4 and 5), and which notched code bars extend in parallelism longitudinally of the machine and are caused to shift endwise to different shifted code positions in response to different coded combinations of the perforations 65 in the perforated tape T; and thirdly, banks of closely spaced alternating upper and lower parallel push bars PB and PB′ extending transversely of the machine at right angles to the longitudinally extending bank of code bars 0, 1, 2, 3, 4 and 5, and operative to respond to the notches in the upper and lower edges of the code bars for automatically controlling the depressing of the appropriate key bars 50 through the instrumentalities 55, all of which is old and well known.

Referring briefly to the tape reader TR and perforated tape T, these are preferably but not necessarily of the six-level type wherein the tape has six longitudinal rows or levels herein designated 0′, 1′, 2′, 3′, 4′, and 5′ (see FIGURE 7) to correspond to the six code bars 0, 1, 2, 3, 4, and 5, and wherein there are three of such rows to each side of a centrally disposed line of sprocket holes 66 through which the tape is fed by a toothed sprocket wheel. The code perforations 65 are punched singly or in different bit combinations up to six, disposed transversely in the six levels of the tape T. The tape is advanced intermittently step-by-step through the tape reader TR, and as each transverse area or line of single perforations 65 enters the sensing zone of the reader, sensing fingers or plungers determine the presence of the perforations 65 and the tape level in which they occur.

Figure 3:
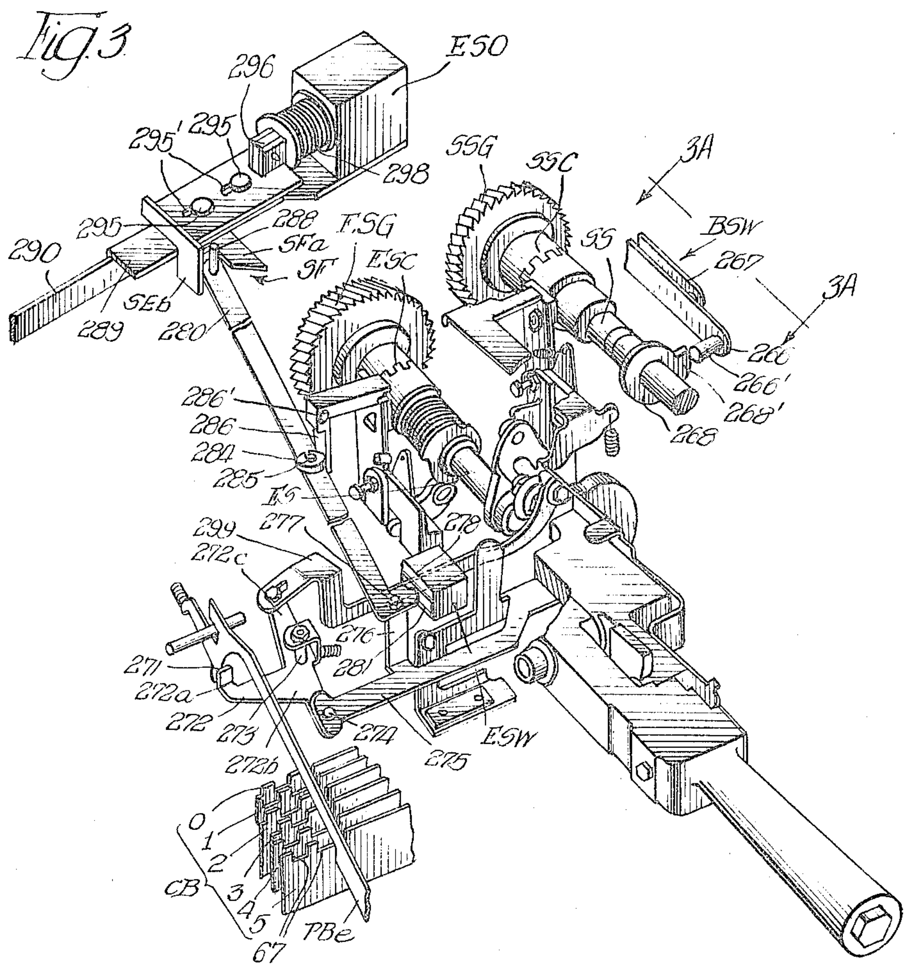
FIGURE 3 is a fragmentary perspective view showing the controls which govern the elevate shaft clutch and the selector shaft clutch, and also showing the bit switch which responds to the rotation of the selector shaft.

As best shown in FIGURE 2, there are six sensing fingers or plungers 69, one for each of the six signalling levels of the tape, and each sensing element is operatively connected with an individual one of said code bars 0, 1, 2, 3, 4, and 5; the operative connection being such that whenever a perforation 65 comes into registration with its aligned sensing finger in the step-by-step movement of the tape, this causes a predetermined lengthwise shifting movement of its individual code bar in a right to left direction to a projected signalling or coding position, unless the code bar already occupies such position. The automatic operation is such that any or all of the six sensing fingers which have entered their respective perforations are simultaneously retracted at the end of each reading interval, before the tape is next advanced. The power for performing the above and other related operations, in the proper sequence, is derived from a selector shaft SS and an elevator shaft ES located between the tape reader TR and the code bars 0–5. As shown in FIGURE 3, these two shafts are driven from the well known power driven pulley shaft through gears ESG and SSG under the control of jaw clutches ESC and SSC, which clutches are made subject to the elevator control mechanism and other controls to be later described. The elevate shaft ES operates to elevate the assembly elevator AE (FIG. 1) in accordance with standard Teletypesetter practice.

The foregoing functions, operations and structure of the perforated tape T, tape reader TR, code bars CB, push bars PB, PB′, elevator and selector shaft ES and SS and assembly elevator AE, etc., are fully disclosed in, and can be in conformity with any one of several prior disclosures, such as "Teletypesetter Bulletins" 60B, 4B, 10B, etc., issued by Fairchild Graphic Equipment Co., "Linotype Machine Principles," issued by Merganthaler Linotype Co.; and also the following United States patents: Kleinschmidt, 2,000,029; Goetz, 2,006,860; Walden, 2,090,654; Krum et al., 2,091,286; Walden, 2,106,113; Goetz, 2,152,641, etc.

Figures 4, 4A, 5:
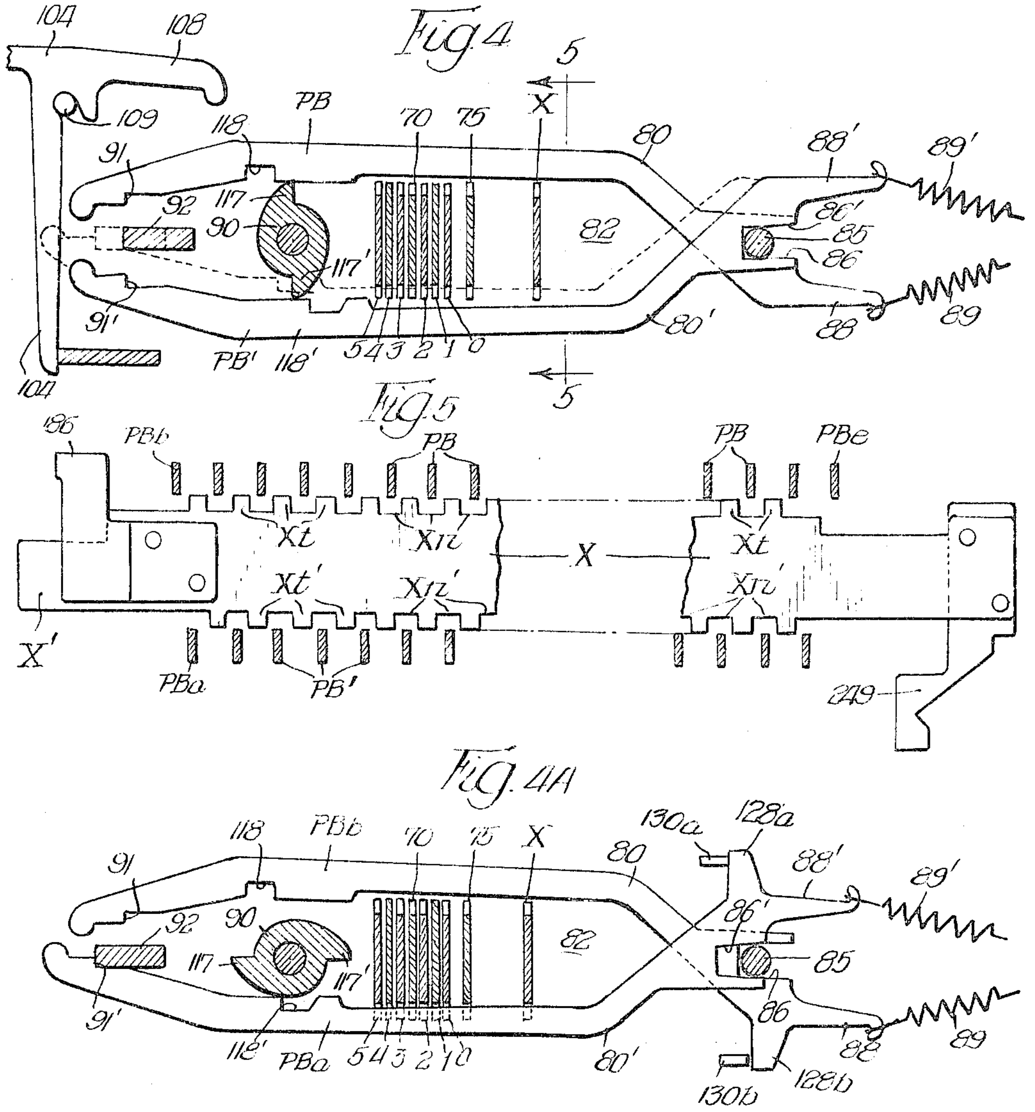
FIGURE 4 is a transverse sectional view through the bank of code bars and the blocking bar, showing a pair of upper and lower conventional push-bars, such as type selecting push bars, adapted to respond thereto.
FIGURE 5 is a fragmentary sectional view taken approximately on the plane of the line 5—5 of FIGURE 4 but on a slightly larger scale, showing the blocking bar in side elevation; in its non-blocking position.
FIGURE 4A is a view similar to FIGURE 4, but instead of showing conventional type selecting push bars, this figure illustrates the upper rail push bar PB*a* and the lower rail push bar PB*b*; and shows the upper rail push bar PB*a* in its actuated position.
Figure 6:
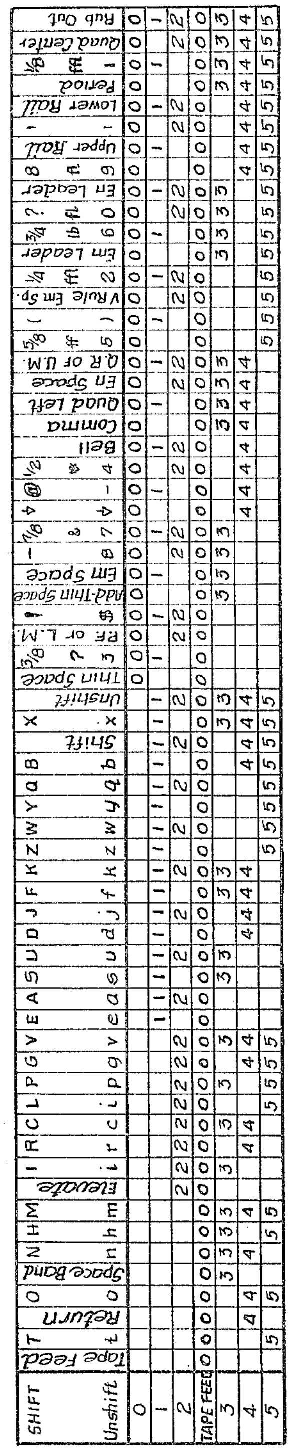
FIGURE 6 is a chart of a six level code, illustrating one conventional array of letters, numerals, and symbols making up the sixty-four code signals.

The six code bars 0, 1, 2, 3, 4, and 5 extend from end to end of the assembly below the manually operated keys 50, and consist of relatively thin, closely spaced bars, set edgewise. The top and bottom edges of these code bars have coded combinations of notches 67 for cooperating with the plurality of push bars PB and PB′, as shown in FIGURES 2, 3, 4, etc.

In most instances, the six code bars are separated into two sets of three, one set corresponding to the top three levels 0′, 1′, and 2′ of the perforated tape T, and the other set corresponding to the lower three levels 3′, 4′, and 5′ of the tape, with the conventional delay code bar 70 interposed between these two sets. This delay code bar 70 is adapted to interpose well known time delays, particularly in conjunction with the lateral duplex rail operation, mixer control operation, thin space operation, or any other conventional function of the linecasting machine, requiring a time interval prior to the operation of such a function. The manner in which this is done is old and well known.

Spaced slightly rearwardly from the above bank of seven code bars and extending parallel thereto is the conventional shift code bar 75. This eighth code bar 75 is automatically responsive to tape operation and determines with respect to the two banks of push bars PB and PB′, whether an upper case character or a lower case character is to be selected. Such shift bar operation is also old and well known.

Figure 15:
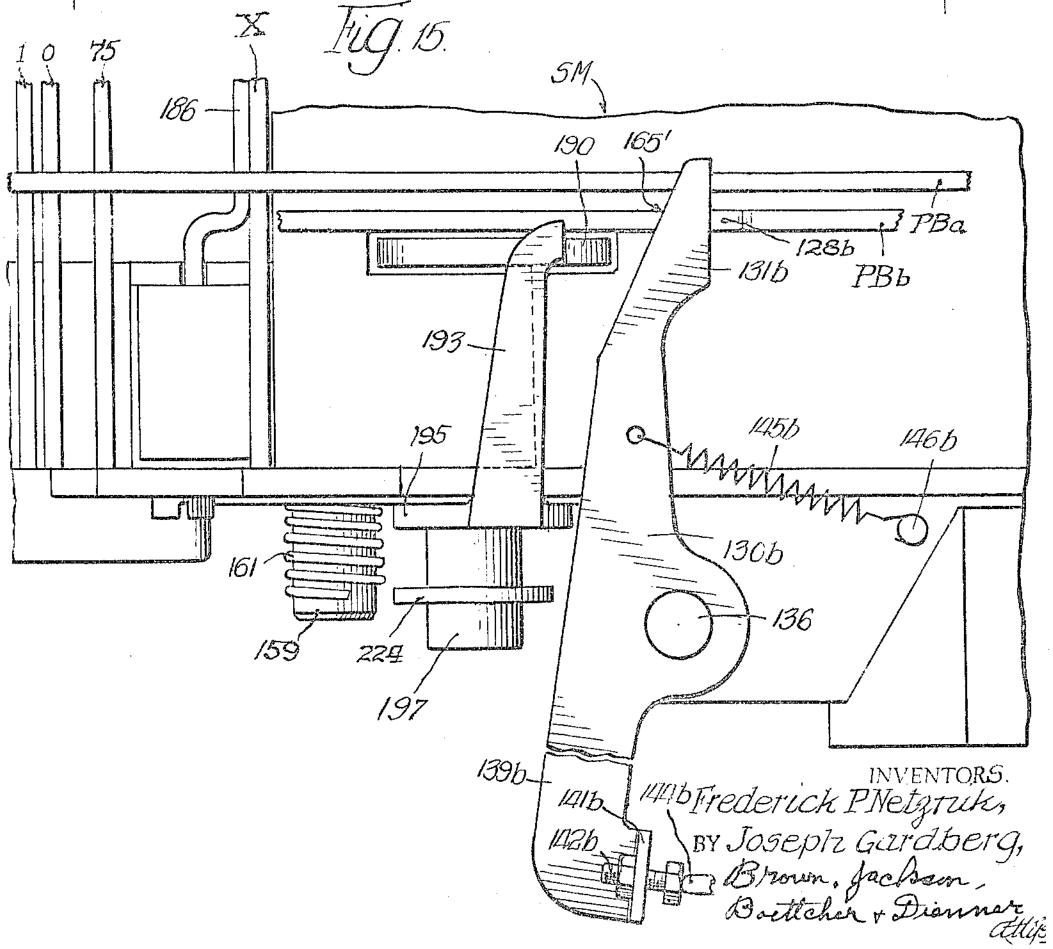
FIGURE 15 is a bottom elevational view thereof, as viewed from the plane 15—15 of FIGURE 14.
Figures 16, 17, 17A, 17B, 17C, 18:
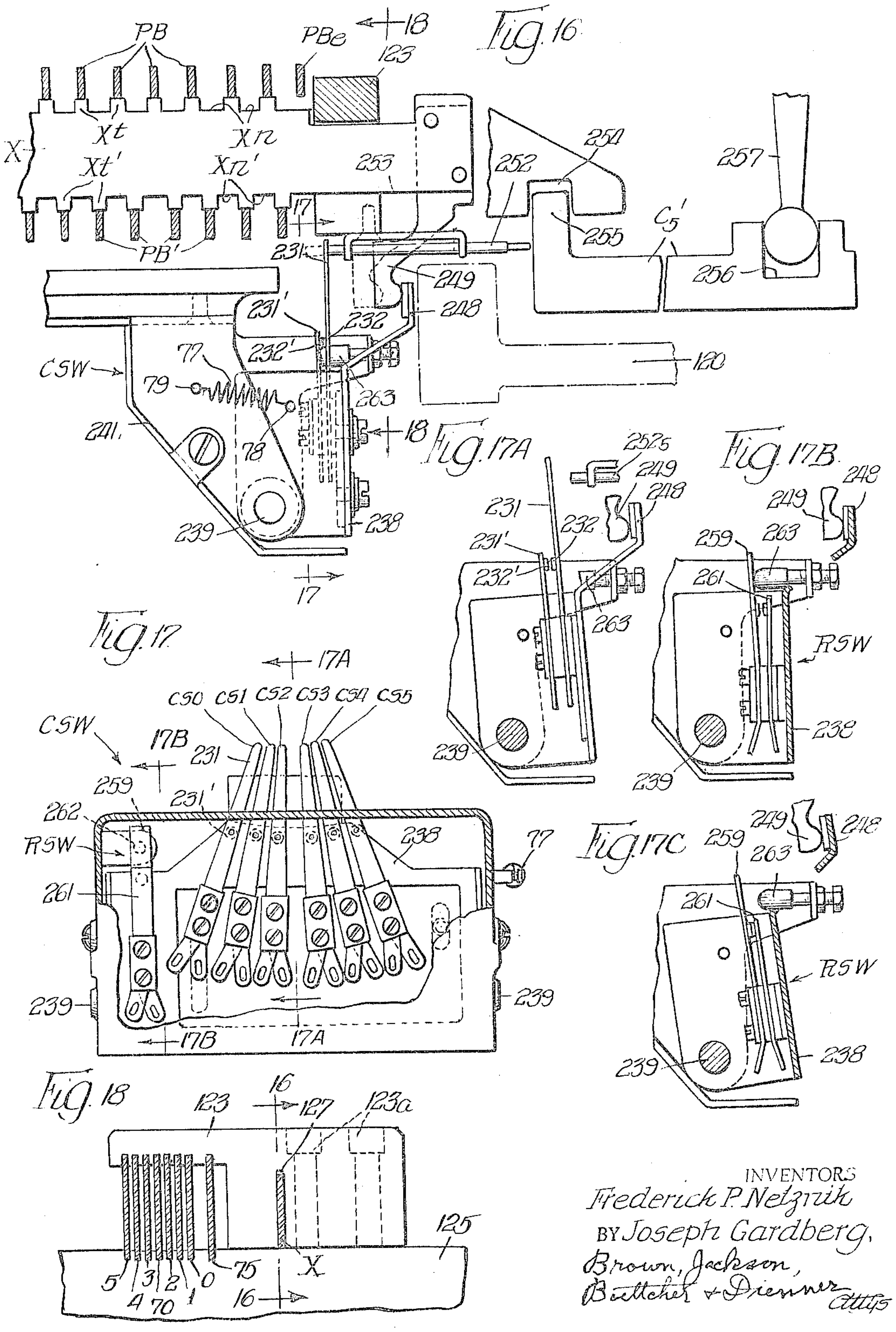
FIGURE 16 is an edgewise view of the code switch, showing its interconnection with the blocking bar, and the manner in which the switch contacts are made responsive to the code bars, this view showing the code switch tilted forwardly into its upright operative position, in response to shifting of the blocking bar into its blocking position.
FIGURE 17 is an inner sectional view taken approximately on the plane of the line 17—17 of FIGURE 16.
FIGURE 17A is a fragmentary view taken on the plane of the line 17A—17A of FIGURE 17, showing the code switch tilted backwardly into its non-operating position, in response to the shifting of the blocking bar into its non-blocking position.
FIGURE 17B is a section taken on the plane 17B—17B of FIGURE 17, showing the reset switch in the open position that it assumes when the code switch is tilted forwardly into its operative position.
FIGURE 17C is a similar view illustrating the closed position that this reset switch assumes when the code switch is tilted backwardly into its non-operating position.
FIGURE 18 is a section on the plane of the line 18—18 of FIGURE 16, showing our newly provided guide block for guiding the right hand ends of the code bars and control blocking bar.

While discussing the above code bars 0–5, and 70 and 75, it is appropriate to point out that a very important feature of our invention resides in adding to this assembly of bars a new and distinctive shiftable bar, which we have termed the "control blocking bar X," such being a ninth bar in the series. The shifting of this control blocking bar X effects the transposing or conversion of the entire operating unit from one class or type of operations into another class or type of operations, as we will later point out in detail. This shiftable control blocking bar X is also in the form of a relatively thin long bar, set vertically edgewise similarly to the above described code bars, and is disposed slightly to the rear of and in parallelism with the last described or eighth code bar (i.e. the so-called "shift" code bar 75). Referring to FIGURES 5 and 16, such blocking bar X has its top and bottom edges provided with alternating blocking tongues X*t*, X*t*′, and clearance notches, X*n*, X*n*′. These upper and lower tongues and notches have the same offset or staggered relationship and the same spacing as the upper and lower banks of push bars PB and PB′. Thus, as shown in FIGURE 5, in the normal position of the blocking bar, all of the notches Xn in the upper edge of the bar are in alignment with the edges of the upper push bars PB, and all of the notches Xn′ in the lower edge of the bar are in alignment with the edges of the lower push bars PB′, so that the blocking bar interposes no blocking or interfering action against the operation of any of the push bars at this time. However, as shown in FIGURE 16, when the bar is shifted into its blocking position, which is slightly to the right, as shown in FIGURE 16, all of the blocking tongues Xt and Xt′ projecting from both the upper and lower edges are presented into positions where they are effective to block operative or converging movement of most of the upper and lower push bars PB and PB′. That is to say, all of the push bars are thereby blocked against operative movement, with the exception of three such push bars, i.e. the "upper rail" push bar PBa and "lower rail" push bar PBb, both located at the left hand end of the assembly, (FIGURES 2, 4A and 15) and the "elevator" push bar PBe (FIGURE 3) located adjacent the right hand end of the assembly. Referring to FIGURES 16–17, a tension spring 77 which is connected between two pins 78 and 79 projecting from the two relatively movable frame sections of the mode switch CS, later to be described, normally tends to hold the blocking bar in its non-blocking or normal position shifted to the left, as viewed in FIGURE 5. The manner of operation and the functions performed by this blocking bar X will be later described in greater detail.

Referring now more particularly to the details of the upper and lower push bars, as best shown in FIGURE 4, there are approximately 40 to 50 bars in the upper bank PB, and substantially a like number in the lower bank PB′, all lying beneath the keyboard 50, and corresponding in number substantially to the number of keys in the keyboard. The upper and lower push bars occur in alternating sequence, and they both conform more or less to the standard Teletypesetter construction. Each of the upper push bars PB has an upwardly bowed or offset intermediate portion 80, and each of the lower push bars PB′ has a downwardly bowed or offset intermediate portion 80′. These upwardly and downwardly offset portions 80 and 80′ in the alternate push bars result in the formation of a through-space or tunnel area 82, which extends from end to end through the entire series of push bars between the upper and lower bars. It is through this through-space or tunnel area 82 that all of the above described code bars 0, 1, 2, 3, 4, 5 and companion bars 70, 75 and blocking bar X extend, whereby the upper and lower edges of all of the through bars are operative to engage the upper edges 80 and the lower edges 80′ of the push bars in the performance of their respective functions, see FIGURE 4.

All of the push bars, both upper and lower, have common axis pivotal mounting for vertical swinging movement around a horizontally extending stationary pivot rod 85 which extends from end to end of the operating unit. The pivotal mounting of all upper push bars PB on this rod is by way of a horizontally extending slot 86, and the pivotal mounting of all lower push bars PB′ on this rod is likewise by way of a horizontally extending slot 86′, whereby both upper and lower push bars are free to have forward shifting movement in addition to the vertical pivotal movement. Both upper and lower push bars have vertically displaced spring arms 88, 88′ which cross each other in scissors-like formation at the pivot rod 85 and which have connection at their rear ends with rearwardly extending tension springs 89, 89′ that act to normally retain both upper and lower push bars retracted rearwardly, and with their upper and lower sensing edges pressed inwardly into extremely close or proximate contact with the lines of travel of the top edges and of the bottom edges of the tongues or lugs projecting from the top and bottom of each of the code bars. Normally, these edges are spaced just slightly out of engagement with these tongues or lugs by the rotative position of a spreader cam 90, to be later described, so that the code bars are free to slide in response to the code perforations in the tape, until the sensing operation is to be made. Upon the occurrence of the actual sensing operation, the releasing rotation of the spreader cam releases the push bars PB and PB′; which first results in the necessary slight inward movement of these push bars to place all of their sensing edges in the paths of the code bar tongues and notches; and which then determines which of the push bars PB or PB′ is free to have a full range of inward movement into six aligned notches Xn or Xn′ then standing in transverse alignment in either the top edges or the bottom edges of all six code bars 0, 1, 2, 3, 4, and 5. The resulting inward movement of the push bar thus selected, places the forward end thereof within the operating range of a horizontally reciprocating bail bar which will now be described, see FIG. 4.

The converging front ends of the upper and lower push bars have inwardly facing notches 91, 91′, each one of which is operative to have selective engagement with the front edge of a horizontally reciprocated operating bail 92 which has a guided to-and-fro intermittent motion between these notches. When the code bars permit either the upper or lower push bar to move inwardly toward the plane of the operating bail 92, the corresponding notch 91 or 91′ is moved into the path of the bail, which thereupon transmits forward pushing motion to that particular push bar, in opposition to the rear tension spring. The resulting forward thrusting motion of the selected push bar causes the rounded front end thereof to transmit a tilting motion to a spring biased bell-crank lever 104. All of the upper and lower push bars PB and PB′ are each provided with an individual bell-crank lever 104 to be actuated thereby, with the exception of the "upper rail" and "lower rail" push bars PBa and PBb, shown in FIGURE 4A, and the "elevate" push bar PBe shown in FIGURE 3. These three push bars perform their intended functions through other instrumentalities than the bell-crank levers 104, as will be later described. Referring again to the bell-crank levers 104, and particularly as shown in FIGURE 2, it will be seen that each of these bell-crank levers has a rearwardly extending arm 108 swinging around fulcrum pin 109, the downward movement of arm 108 pressing downwardly on the forwardly extending arm 111 of an auxiliary lever 112 lying below its corresponding manually operated key 50. The rear of such lever has operative connection at 114 with the previously described vertical release rod or release instrumentality 55 responding to that particular manually operated key. Thus, the code bar controlled forward thrusting motion of any one of the push bars PB or PB′ is operative to perform the same matrix selecting operation, etc. as is performed by its respective manually operative key 50. The machine is usually provided with a conventional control for enabling an operator to throw the machine from tape controlled operation into manual operation, and vice versa, such being well known.

For effecting the automatic release and restoration of each actuated push bar, the aforesaid spreader cam 90 is oscillated at the end of each type selecting operation. This spreader cam has cam lobes 117, 117′ which are adapted to cooperate with quick drop-off notches 118, 118′ formed in the inner opposing edges of the upper and lower push bars, the operation of this spreader cam restoring any selected upper push bar PB into its normal upper position, or restoring any lower selected push bar PB′ into its normal lower position, freeing it from the bail bar 92, whereupon the selected push bar can be retracted rearwardly, by its tension spring 89 or 89′.

Figure 8:
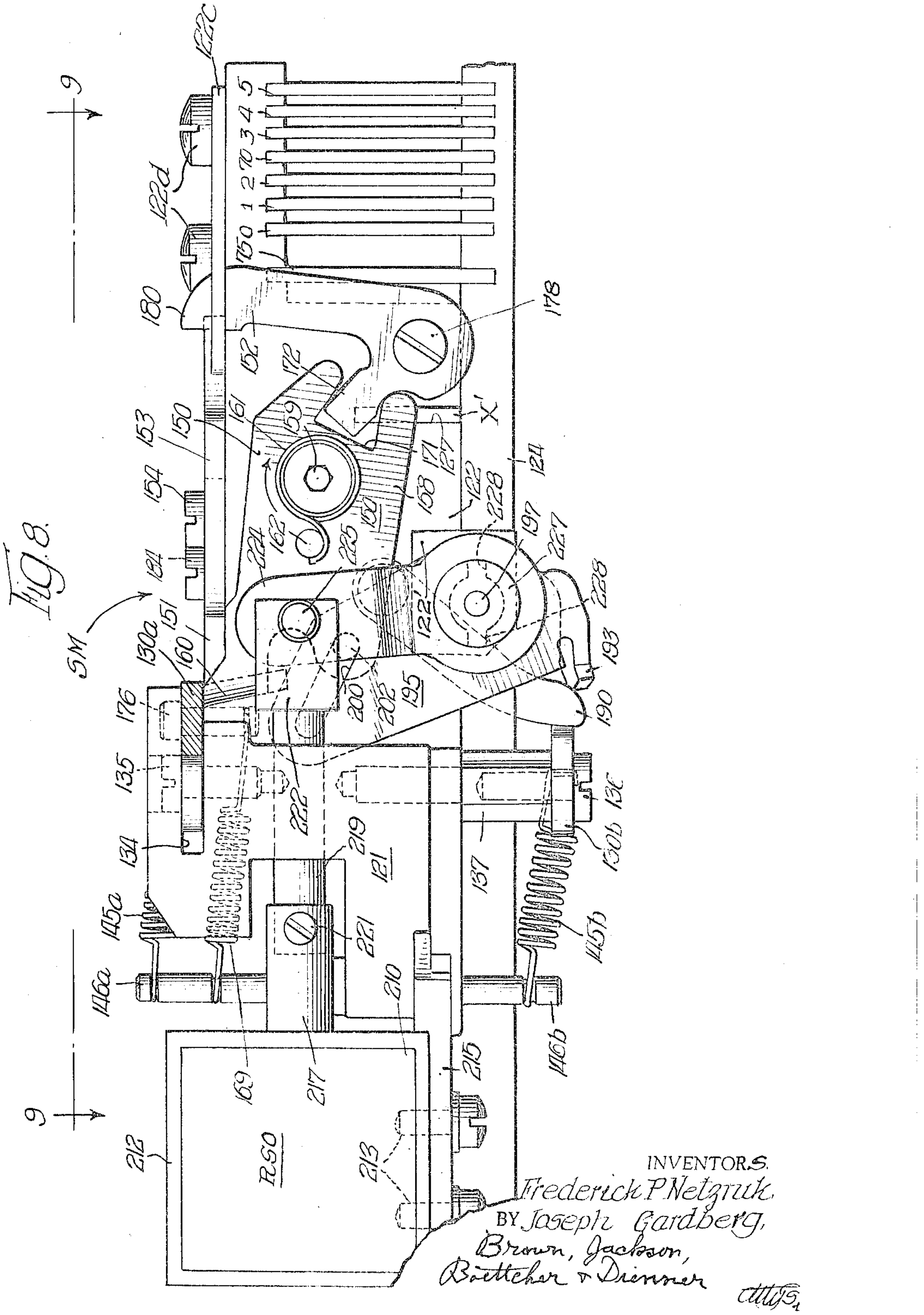
FIGURE 8 is an outer side elevational view of the selector mechanism, corresponding to a left hand end view of the operating unit taken approximately on the plane of the line 8—8 of FIGURE 2.
Figure 8A:
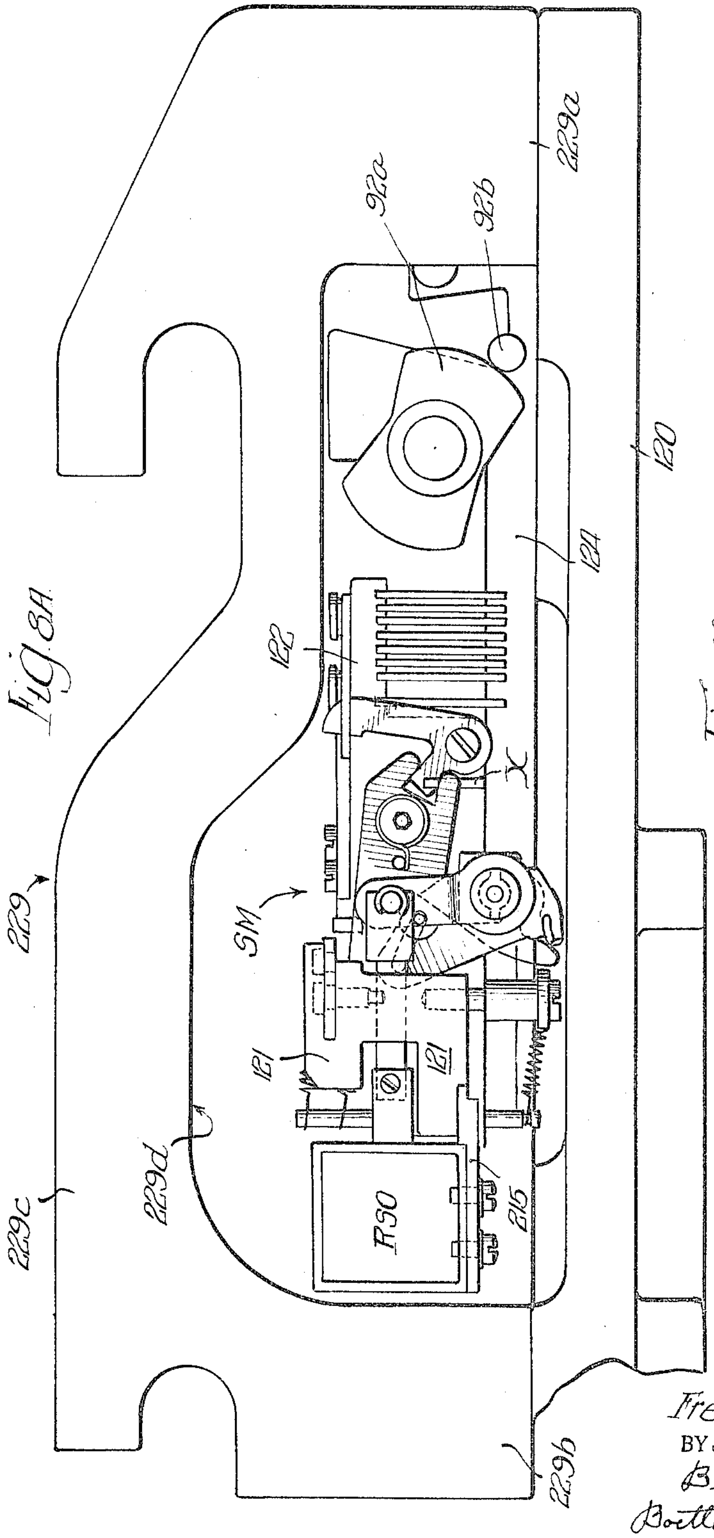
FIGURE 8A is a similar view of the selector mechanism on a smaller scale, for the purpose of showing how it is made to fit within the conventional opening or space of the standard left hand Teletypesetter frame hanger.
Figure 8D:
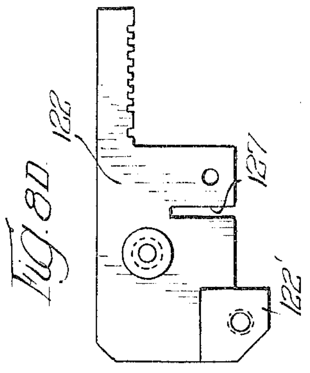
FIGURES 8B, 8C and 8D are side elevational views of the solenoid mounting plate, upper rail push bar lever guide block, and left hand code bar guide block, respectively, associated with this selector mechanism.
Figure 8C:
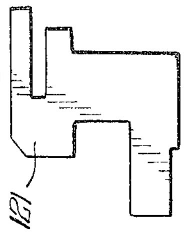
Figure 8B:
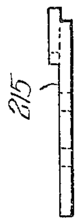

FIGURES 8A–8D and 18 illustrate certain features of our invention which enable it to be quickly and easily adapted to mounting in the conventional Teletypesetter operating unit TU. Such conventional operating unit comprises a pan shaped bed frame 120 (FIGURES 8A, 16, etc.). Extending transversely across the left hand end thereof is a left hand mounting frame bar 124 (FIGURE 8A), and extending across the right hand portion thereof is a right hand mounting frame bar 125 (FIGURE 18). In the conventional construction there are provided a standard left hand slotted guide block mounted on the left hand frame bar 124, and a standard right hand slotted guide block mounted on the right hand frame bar 125, each of these two standard guide blocks being provided with the standard eight guide slots for guiding the eight conventional code bars 0, 1, 2, 3, 4, 5, 70 and 75. In mounting our improved apparatus on the operating unit TU, we substitute for these standard guide blocks our new left hand guide block 122 (FIGURES 8, 8D, etc.) and our new right hand guide block 123 (FIGURES 16, 18), both of these guide blocks being provided with an additional or ninth guide slot 127 for guiding the end portions of the blocking bar X. Practically the same screws **122*a* (FIG. 9) and 123*a* (FIG. 18), that secured the original guide blocks, screw into the same threaded holes in the mounting bars 124 and 125 for securing our substituted guide blocks 122 and 123. The special mounting block 122 also has holes for receiving the pivot screws 159, 178 and 197. The other left hand mounting block 121 also secured to mounting bar 124, serves to pivotally support the upper rail and lower rail push bar levers 130*a*, 130*b*, etc.; and the shelf bracket 215 is secured to this mounting block 121 for supporting the reject solenoid RSO. The surrounding hanger frame member 229** will be later described.

As described heretofore, a double operation (i.e., two immediately successive operations) of the upper rail (UR) push bar PB*a* is operative to effect the transition of the entire mechanism from the normal typesetting condition to the aforementioned "Command" condition; and the later single operation of the lower rail (LR) push bar PB*b* is operative to restore the mechanism from the command condition back to the normal typesetting condition. These conventional upper rail and lower rail push bars are generally located at the extreme left hand end of the banks of push bars, the end-most left hand push bar in the upper bank constituting the "lower rail" push bar PB*b*, and the end-most left hand lower push bar in the lower bank constituting the "upper rail" push bar PB*a* (see FIGURES 4A, 5 and 14). We shall first briefly describe the usual operation of these two push bars in the conventional lateral duplex rail control, before starting to describe the manner in which the double operation of the upper rail push bar effects the transition from typesetting condition to command condition.

Figures 9, 9A, 9B:
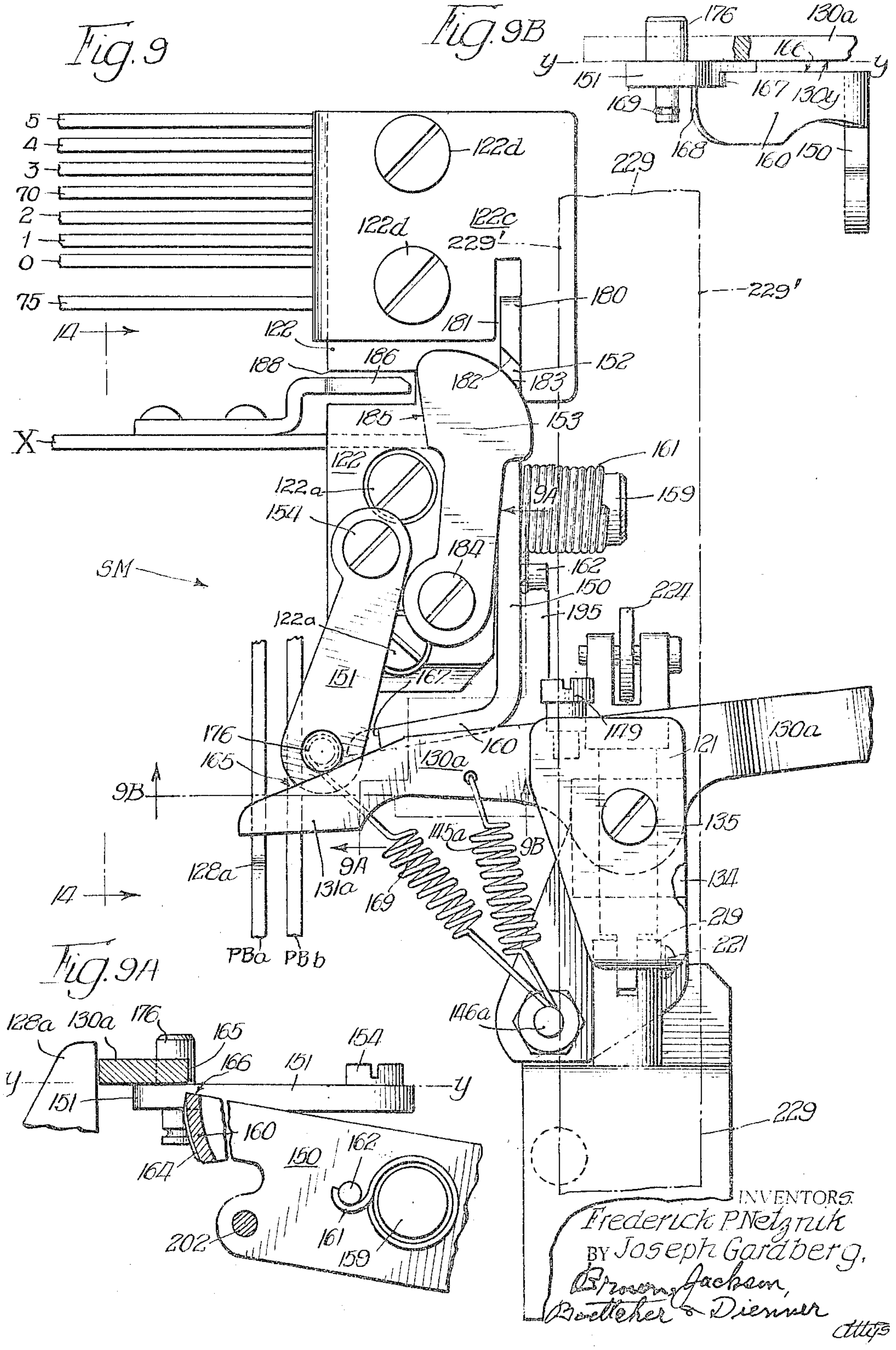
FIGURE 9 is a plan view of this selector mechanism, taken approximately on the plane of the line 9—9 of FIGURE 8, and illustrating this selector mechanism in its normal or non-blocking position.
FIGURES 9A and 9B are fragmentary sectional views taken on the planes of the lines 9A—9A and 9B—9B of FIGURE 9.
Figures 10, 10A, 10B, 11, 11A, 11B:
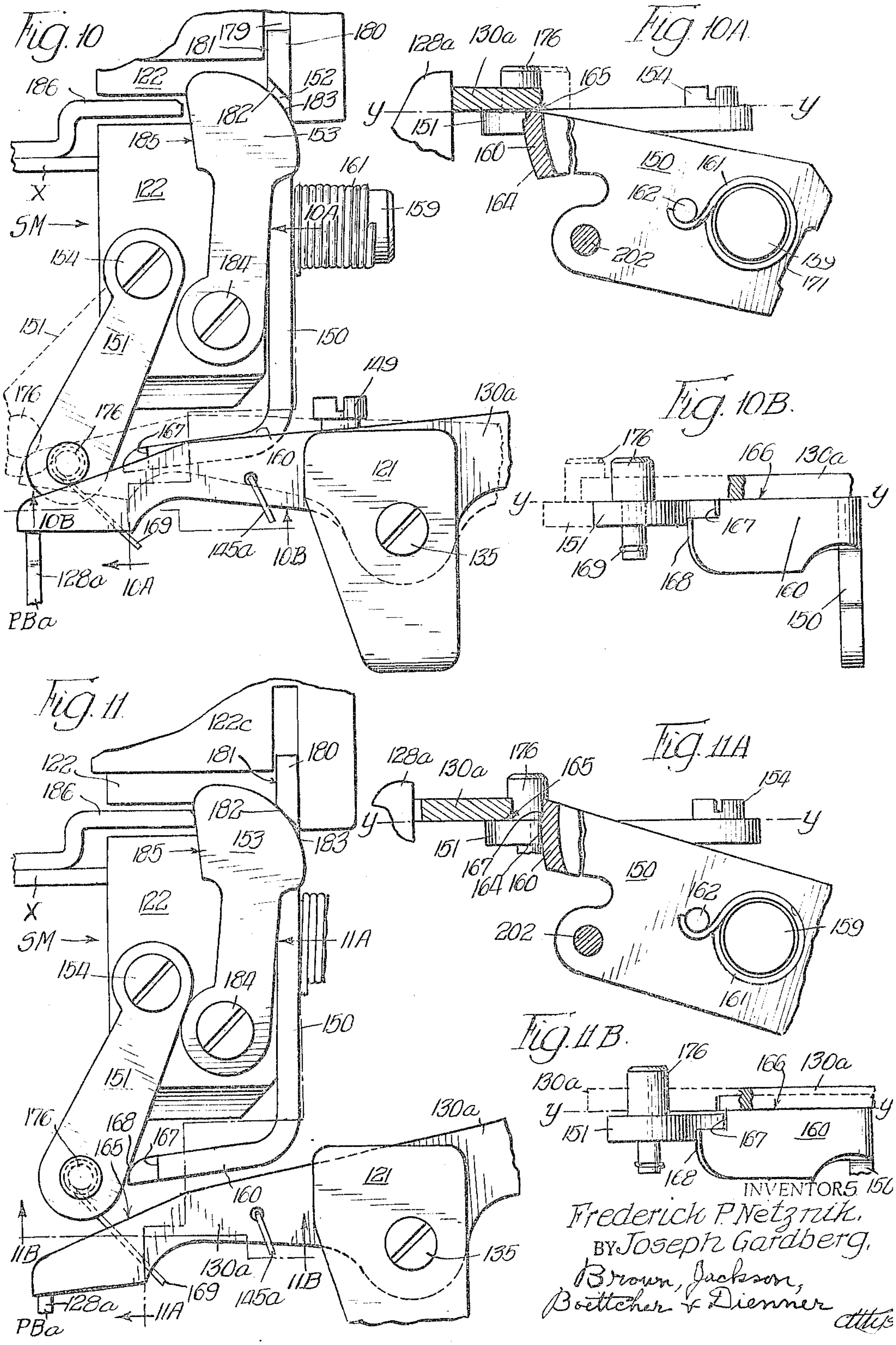
FIGURE 10 is a fragmentary plan view similar to FIGURE 9 showing the selector mechanism ready to go into its escape position, with the upper rail lever having been swung clockwise by the first upper rail (UR) signal to swing the latching arm out of latching engagement with the selector lever.
FIGURES 10A and 10B are fragmentary sectional views taken on the planes of the lines 10A—10A and 10B—10 of FIGURE 10.
FIGURE 11 is a plan view similar to FIGURES 9 and 10, showing the selector mechanism moved into its escape position with the upper rail lever restored to its normal position and the selector lever spring-biased to swing its right angle arm upwardly into the path of the next forward oscillation of said upper rail lever.
FIGURES 11A and 11B are fragmentary sectional views taken on the planes of the lines 11A—11A and 11B—11B of FIGURE 11.
Figure 14:
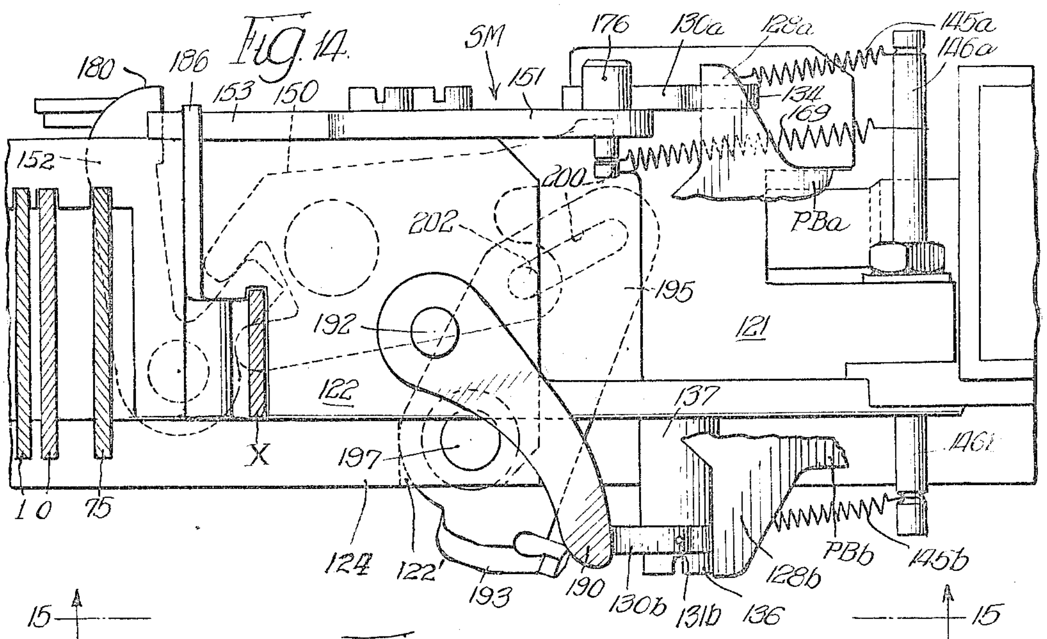
FIGURE 14 is a fragmentary sectional view of the selector mechanism as viewed from the inner side, on the plane of the line 14—14 of FIGURE 9, this view showing the parts which restore the selector mechanism to its normal type-setting position in response to the transmission of a lower rail (LR) signal from the tape reader.

As best shown in FIGURES 4A, 9A, 10A, etc. and 14, there is conventionally provided on the "upper rail" push bar PB*a* an upwardly projecting, forwardly facing pusher lug **128*a* which, upon the forward motion of such "upper rail" push bar, imparts swinging motion to the inwardly extending arm 131*a* of an upper rail push bar lever 130*a***. Correspondingly, as best shown in FIGURE 4A and 14, the "lower rail" push bar PB*b* has a downwardly projecting, forwardly facing pusher lug **128*b* which, upon the forward motion of this lower rail push bar, imparts similar swinging motion to the inwardly extending arm 131*b* of a similar lower rail push bar lever 130*b*. These upper and lower rail levers 130*a* and 130*b* normally extend substantialy crosswise of the special mounting block 121, the upper lever 130*a* having swinging movement in a slot 134 in the top portion of the mounting block around a pivot stud 135, and the lower lever 130*b* having swinging movement on a pivot stud 136 mounted in a post 137 extending downwardly from the mounting block. Both of these upper and lower rail levers are of substantially identical formation, being formed with outwardly extending arms 139*a*, 139*b* (FIGURES 12 and 15) having downwardly bent lugs 141*a*, 141*b*, provided with threaded apertures therein for receiving adjustable pusher screws 142*a*, 142*b*, which are fixedly held in adjusted positions by a suitable lock nut. The upper pusher screw 142*a* is adapted to impart rearward thrusting motion against the front end of an upper rail operating link 144*a*, and the lower pusher screw 142*b* is adapted to impart rearward thrusting motion against the front end of a lower rail operating link 144*b* (FIGURE 15). Both levers have tension springs 145*a*, 145*b*, connected between the levers and posts 146*a* and 146*b* extending from the mounting block 121, these springs normally tending to hold both levers swung back into their retracted positions. Referring to FIGURES 9 and 10, the maximum extent to which the upper rail lever 130*a* can swing forwardly is limited by its engagement against the underside of the head of a stop screw 149 threading into the mounting block 121. The upper rail lever 130*a* does not contact this screw head 149 in the normal operation of the apparatus, i.e., the screw head only serves to limit this direction of motion in the event that the spring 145*a* should become broken, or released for adjustment purposes, etc. The rearward thrusting motions transmitted from the upper and lower rail levers 130*a* and 130*b* to the upper and lower rail links 144*a* and 144*b*** are operative to effect shifts of the conventional duplex rail mechanism through additional upwardly extending motion translating links, all of which are fully disclosed in Bulletin 4B of the Teletypesetter Standard Operating Unit.

SELECTOR MECHANISM—SM

Figures 12, 12A, 13:
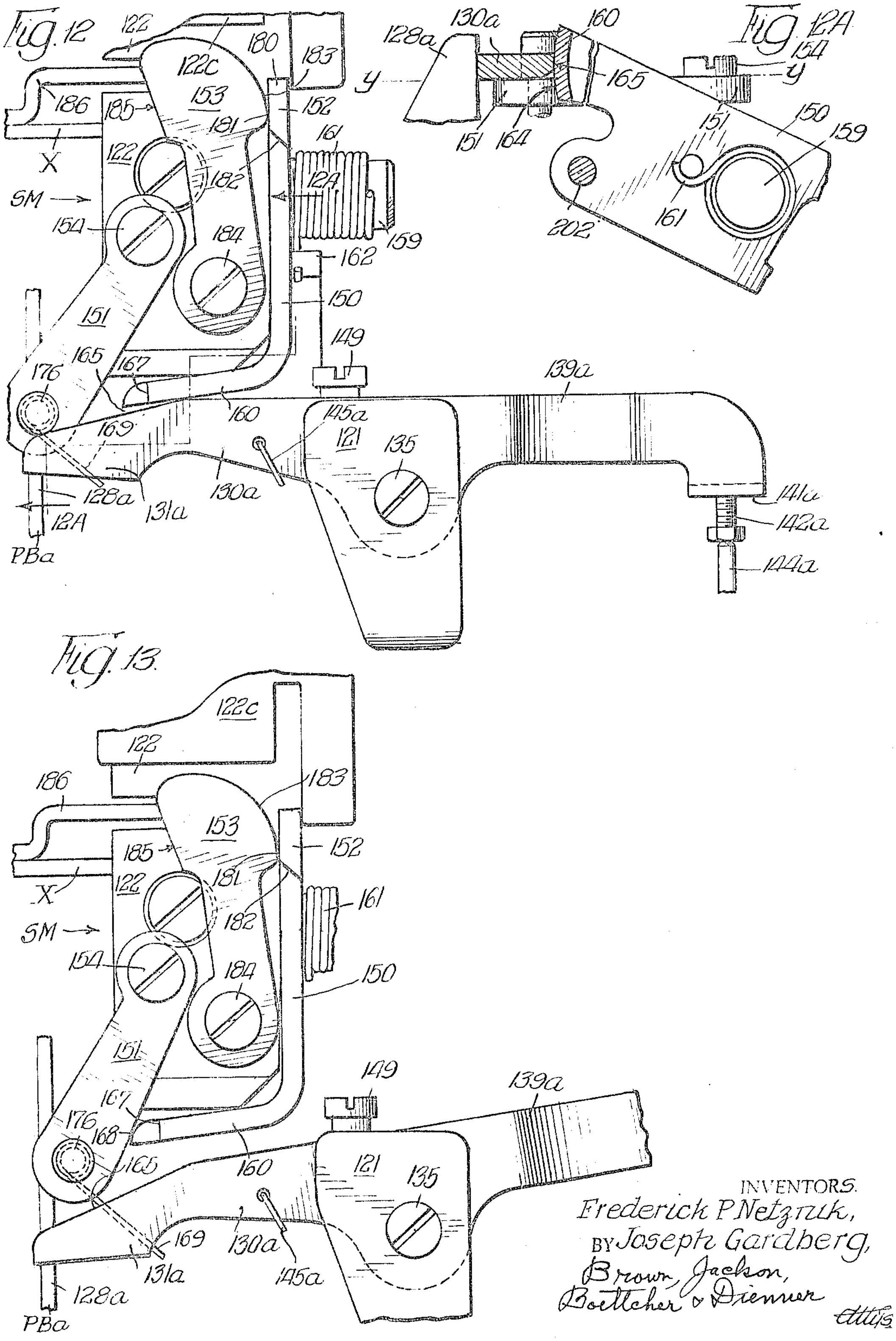
FIGURE 12 is a further plan view showing the selector mechanism moved into its final command or blocking position, with the blocking bar shifted to the left into its blocking position, pursuant to the upper rail lever having been swung again in a clockwise direction by the second upper rail (UR) signal.
FIGURE 12A is a fragmentary sectional view taken on the plane of the line 12A—12A of FIGURE 12.
FIGURE 13 is a view similar to FIGURE 12 showing how the selector mechanism remains cam-locked in its blocking position after the upper rail lever has returned to its normal position, the selector mechanism remaining in the cam-locked position until released by the releasing mechanism responding to a lower rail (LR) signal.

Referring now to the unique selector mechanism which automatically effects the transition from the primary function of setting type to the secondary function of setting the slug cutting saw (or some other desired secondary function), this selector mechanism, designated SM, is illustrated in FIGURES 8 to 15. In these figures:

FIGURE 8 is a side elevational view;

FIGURES 9–9B show the mechanism in normal position;

FIGURES 10–10B show the mechanism in the initial unlatching or tripping stage of the escape movement;

FIGURES 11–11B show the end of the escape movement, resulting from the transmission of the first upper rail (UR) signal from the tape reader;

FIGURES 12–12A show the movement of the selector mechanism into blocking or transfer position, resulting from the transmission of the second upper rail (UR) signal;

FIGURE 13 illustrates the maintenance of the blocking position; and

FIGURES 14 and 15 are inner and bottom views showing the parts which restore the selector mechanism in response to the transmission of a lower rail (LR) signal from the tape reader.

This unique selector mechanism comprises the following principal elements: a main selector lever 150 adapted to respond to the aforesaid second-step operation of the upper rail lever **130*a*; a pivoted latching arm 151 which normally holds the main selector lever 150 latched down in a non-operating position; an intermediate bell-crank lever 152 which is gear driven from the main selector lever 150 and which has a driving cam arm extending therefrom; and a pivoted pusher arm 153 provided with a driven cam which is adapted to be driven by the driving cam arm on said bell-crank lever, thereby to impart endwise motion to the blocking bar X for shifting it from its normal typesetting position into its type blocking command position. The main selector lever 150 is of L-shaped outline, comprising a main body portion 158 pivoted to swing in a substantially vertical plane around a pivot stud 159, and having its upper end bent laterally inwardly in the form of a substantially horizontal L-shaped lever arm 160. The pivot stud 159 screws into the fixture bracket 122, and has its outer end surrounded by a spiral torsion spring 161, having one end secured to the pivot stud 159 and the other end secured to a stud 162 projecting from the selector lever 150** for normally biasing the selector lever in a clockwise direction (FIG. 8).

The inwardly bent arm 160 of the selector lever 150 presents a rearwardly facing cam surface 164 which is operative to receive camming pressure from a forwardly facing cam surface 165 formed along the front edge of the upper rail lever arm 130*a*. The top edge 166 of the bent lever arm 160 extends inwardly substantially horizontally until it comes to a latching notch 167 which drops downwardly therefrom, and beyond this latching notch 167 the bent lever arm 160 terminates with a substantially straight vertical end edge 168. In the normal typesetting position of the parts (FIGURES 8 and 9), the latching arm 151, which is biased by tension spring 169 to swing in a counterclockwise direction, normally has its leading edge engaging in latching notch 167 to hold the lateral arm 160 of selector lever 150 pressed downwardly; and thereafter in the subsequent escape and command positions of the parts (FIGS. 11 and 13) this latching arm has its leading edge bearing against the vertical end edge 168 of the lever arm 160. Referring now to the other end of the selector lever 150 (see FIG. 8), this other or inner end of the lever body portion 158 is formed with a gear tooth space 171, which embraces a gear tooth arm 172 projecting from the bell crank lever 152, whereby clockwise rotation of the selector lever 150 transmits counterclockwise rotation to the bell crank lever 152 in effecting the shift of the blocking bar X, as will be later described in detail.

Referring back to the pivoted latching arm 151 for a more detailed description thereof, it will be seen from FIGURE 9 that this latching arm is mounted for horizontal swinging movement around a pivot stud 154 extending down through the forward end thereof and having fixed mounting in the bracket attachment 122. A round pusher stud 176 extends upwardly from the swinging rear end of this latching arm in position to be engaged by the cam surface 165 extending along the front edge of the upper rail lever arm 131*a*. The tension spring 169 extends between a downward extension of this pusher stud and the previously described spring post 146*a*, such tension spring 169 tending to swing the latching arm 151 counterclockwise (FIG. 9) for normally holding it in the latching notch 167 of the selector lever 150. In this latched down position of the selector lever 150, held against the bias of its torsion spring 161, the top edge 166 of the lateral arm 160 lies just a slight distance below the horizontal plane of swinging movement of the under surface 130*y* of the upper rail push-bar lever 130*a*, this plane of movement of the under surface of lever 130*a* being designated *y—y* in FIGS. 9A, 9B, etc. In the first pivoting operation of upper rail lever 130*a*, the inwardly projecting cam surface 165 of such lever starts pushing against the round stud 176 for swinging the latching arm 151 rearwardly to carry the leading edge of such latching arm 151 out of the notch 167. This pivoting of the upper rail lever 130*a* carries the under surface 130*y* thereof still further over the top edge 166 of the lateral arm 160, so that when the latching arm 151 has swung far enough to permit the notch 167 to escape from the latching arm 151 the selector lever arm 160 swings upwardly under the bias of spring 161 through a relatively short distance to bring the top edge 166 thereof up against the under surface 130*y* of the upper rail lever 130*a*. This slight clockwise swinging movement of selector lever 150 represents the initial or tripping portion of the "escape" movement of the selector mechanism. This "escape" movement is shown in its entirety in FIGURES 10 and 11, wherein FIGURE 10 shows the initial portion of the "escape" movement and FIGURE 11 shows the end portion thereof. As a result of the escape movement, the selector lever 150 has escaped from the restraint of the latching arm 151 and is now being urged in a clockwise direction by its torsion spring 161. This clockwise escape travel of the selector lever 150 (FIGURE 8) swings the bell-crank lever 152 counterclockwise around its mounting pivot 178 to urge the upper driving cam arm 180 of bell-crank lever 152 rearwardly against the pivoted pusher arm 153. This upper cam arm 180 travels in a guide slot 179 formed in a top plate 122*c* fastened by screws 122*d* to the top of the guide block 122 so as to sustain the camming pressures when the driving cam arm 180 starts exerting lateral cam pressure against the pivoted pusher arm 153. The leading edge of thte cam arm 180 has a beveled driving cam surface 182 (FIGURES 9–11) which is adapted to bear against a curved driven cam surface 183 formed on the outer end of pusher arm 153. Outwardly of the beveled cam surface 182, the flat inner face of the cam arm 180 constitutes a stop or locking surface 181 adapted to have blocking engagement against the curved cam surface 183 when the blocking bar X has been shifted into blocking position. The pusher arm 153 is pivoted on a vertical pivot stud 184 which screws into the top of the mounting guide block 122. Formed along the front edge of this cam arm, opposite to the curved driven cam surface 183, is a pusher face or edge 185 that is adapted to exert a sliding or pushing force against the upper portion of a push bracket 186 (FIGURE 5) which is riveted to the end of the blocking bar X. This bracket extends upwardly from the blocking bar in a laterally offset relation, projecting up through a clearance slot 188 formed in the guide block 122 (FIGURE 9), in position to be engaged by the pusher edge 185 on the pusher arm 153. The blocking bar X has a guiding end portion X′ of reduced height (FIG. 5) which has a guided fit in the additional guide slot 127 (FIG. 8).

In the escape movement of the selector lever 150 which results from the first operation of the upper rail lever 130*a*, the torsion spring 161 drives the selector lever 150 and bell-crank 152 to bring the driving cam surface 182 up against the driven cam surfaces 183, as shown in FIGURE 11. However, the strength of the torsion spring 161 is not enough to transmit any shifting movement to the blocking bar X through the cam surfaces 182, 183, against the action of the tension spring 77 (FIG. 16), which tension spring normally holds the blocking bar in the normal typesetting position (FIGURES 5, 9). Accordingly, the selector lever 150, bell-crank lever 152, and pivoted pusher arm 153 remain in this escape condition, moved relatively slightly from the normal condition, while the upper rail lever 130*a* completes its oscillatory movement in a clockwise direction under the continued shift of the upper rail push bar PB*a* for completing the actuation of the line caster upper rail mechanism, as shown in dotted lines in FIGURE 10. In such completion of the clockwise swinging movement of the upper rail lever 130, the top edge 166 of selector arm 160 remains pressed up against the under surface 130*y* of upper rail lever 130*a* under the reaction torsion of torsion spring 161.

Referring now to FIGURES 11, 11A, and 11B, it will be seen that in the return reciprocation of the upper rail push bar PB*a*, the upper rail lever 130*a* swings backwardly therewith in a counterclockwise rotation under the action of its tension spring 145*a*, which exerts sufficient tension to overcome the frictional pressure of the upper edge 166 of selector arm 160 spring urged upwardly against the under side 130*y* of upper rail lever 130*a* by the torsion spring 161. Concurrently therewith, the leading edge of the latching arm 151 swings back into engagement with the end edge 168 of lever arm 106. When the leading edge 165 of the upper rail lever 130*a* retracts beyond the upper edge 166 of lever arm 160, the selector lever 150 oscillates slightly further in a clockwise direction under the pressure of torsion spring 161 to carry the cam or pusher surface 164 on the lever arm 160 up into position to receive pressure from the companion cam or pusher surface 165 on the upper rail lever arm 130*a*—when the upper rail lever 130*a* is given its second successive operation. However, until such second successive operation of the upper rail apparatus is initiated, the parts remain in the above described escape position. Hence, it will be seen that no effective blocking movement is transmitted to the blocking bar X by the movement of the selector mechanism into such escape position—resulting from the first operation of the upper rail lever 130*a*.

Referring now to the second operation of the upper rail lever 130*a* which initiates the second stage of operation resulting in the reciprocation of the blocking bar X into its so-called "command" position, this second operation of the upper rail lever 130*a* results from the second reciprocation of the upper rail push bar PB*a* caused by the transmission of a second "upper rail" signal from the perforated tape T. This second reciprocation of the push bar PB*a* operates through its upwardly projecting pusher lug 128*a* to start swinging the upper rail lever 130*a* through another clockwise oscillation (FIG. 12) in repetition of the oscillation just described. The resulting second rearward thrust of the pusher screw 142*a* transmits another motion to the upper rail mechanism which, however, merely results in another idle operation of that mechanism because it is later negated or rendered of no avail by the later operation of the lower rail push bar PB*b* which will be later described. This second clockwise swinging motion of the upper rail lever 130*a* causes its pushing or camming edge 165 to exert a horizontal thrusting force against the cam sloped pressure surface 164 of the selector lever arm 160. Inasmuch as the horizontal plane of movement *y*—*y* of the upper rail lever 130*a* lies substantially above the horizontal plane of the selector lever pivot 159, this pushing or camming edge 165 exerts a lever arm action as well as a camming action against the cam slope 164 of the selector lever arm 160. The result is a further step of clockwise rotation of the selector lever 150, under power drive, beyond the position to which it has just previously been advanced in the movement of the parts into the escape position. This second step of clockwise rotation of the selector lever 150 is powered by the motor driven operation of the pushing bail 92 exerting a motor driven pushing force on the selected upper rail push bar PB*a*, and hence this motor driven oscillation of the selector lever 150 operates to forcibly oscillate the bellcrank lever 152 for driving its beveled cam surface 182 against the rounded cam surface 183 of the pivoted pusher arm 153. Such power operation transmits the requisite shifting force to the blocking bar X through push bracket 186 for shifting the blocking bar X into its blocking position, in opposition to the tension of its restoring spring 77. The shifting of the blocking bar X into its ultimate blocking position is illustrated in FIGURE 12, and it will be seen therefrom that the bellcrank lever 180 has swung far enough to bring its flat inner blocking face 181 crosswise of the curved cam face 183, so that the parts will remain locked in this blocking position; notwithstanding the relaxation of the pressure force transmitted from upper rail lever 130*a* to the selector lever 150 when upper rail push bar PB*a* restores to its normal position, and notwithstanding the continuous restoring pressure exerted by tension spring 77 on blocking bar X. Thus, tht blocking bar X remains locked in this shifted position of "command," until a reverse acting torque is positively exerted on selector lever 150 for causing this selector lever to rotate backwardly in a reverse or counterclockwise direction so as to withdraw the blocking cam arm 180 from its blocking position against the curved back side of the pivoted pusher arm 153, thereby permitting the return of the blocking bar X to its normal position under the action of its return spring. The blocking bar X will remain in this shifted position of command throughout the transmission of any and all signals from the perforated tape T with the exception of the "lower rail" signal and of the "elevate" signal. Thus, in this command position, the code bars 0, 1, 2, 3, 4 and 5 are free to be shifted into any and all other possible coded positions responsive to any and all other different code signals transmitted from the perforated tape. As previously described, the six unit code of the tape T affords a total of approximately sixty-four combinations (aside from the further range made possible by the shift and unshift signals). When the three signals denoting (1) "upper rail," (2) "lower rail," and (3) "elevate," are subtracted from this total of sixty-four combinations we have sixty-one code combinations available for the performance of what we have termed "supplementary" operations or functions in the linecasting machine, i.e. supplementary to the main typesetting and casting operations. Accordingly, as soon as the apparatus is in this command condition of operation, control signals originating from perforations in the tape can thereupon be transmitted through appropriate code shifting of the code bars 0–5, whereby to perform any of these supplementary functions, such as to operate either the automatic slug cutting saw, a magazine shifting or selecting mechanism, an automatic mold disk control to determine slug thickness; an automatic knife block control to trim slug thickness, or other related supplementary functions. Immediately upon the transition or shift of the Teletypsetter operating unit into this command condition, one or more of the above supplementary functions can be selected singly or sequentially and started and completed, all automatically by the operation of electrical controls or other supplementary controls which are rendered responsive to the code shifting of the six code bars 0, 1, 2, 3, 4 and 5, as soon as the transition into command condition occurs. These supplementary controls may be of any desired operating principle, such as electrical, mechanical, pneumatic, hydraulic, etc. However, before describing the operation of these supplementary controls or command functions, we shall first describe how our invention operates to restore the Teletypesetter operating unit from this command condition back to its normal operating condition.

This restoration of the operating unit back to normal operating condition is brought about by a single operation of the "lower rail" push bar PB*b*, in response to the entry of the "lower rail" code signal into the tape reader TR. The resulting reciprocation of the lower rail push bar PB*b* operates through its pusher lug 128*b* to swing the lower rail lever 130*b* in a counterclockwise direction as viewed from the underside of the selector mechanism SM (see FIG. 15). The resulting rearward swinging movement of the lower adjusting screw 142*b* operates through the conventional lower rail actuating apparatus 144*b* to restore the lateral duplex rail control back into its normal position, out of the upper rail control position into which it has been advanced by the above described earlier operation of the upper rail push bar PB*a*. As previously stated, this lower rail lever 130*b* is substantially a duplicate of the upper rail lever 130*a*. Such oscillation of the lower rail lever 130*b* also causes its forward leading edge 165′ to immediately impart swinging movement through a horizontal plane against the rear edge of a downwardly depending motion transferring arm 190 which is pivoted on the inner vertical face of the guide block 122 on a pivot stud 192 which screws into a tapped hole in said guide block. The front edge of the motion transfer arm 190 transfers the above induced motion to the rear edge of an arm 193 extending horizontally under the supporting frame rail 124 extending across the left hand end of the bed frame upon which the operating unit is assembled. This horizontally extending arm 193 is a laterally bent bottom extension of a tripping or resetting lever 195 which extends vertically upwardly along the outer side of mounting block 122, where it is pivoted on a pivot stud 197 for vertical swinging movement in a plane spaced slightly outwardly from the plane of the selector lever 150. The pivot stud 197 screws into a tapped hole provided in an outwardly projecting portion 122′ of the mounting block 122. Referring particularly to FIGURES 8 and 14, the upper portion of this tripping or resetting lever 195 is formed with a long diagonal slot 200 which is adapted to exert a sliding cam action over a cam pin 202 projecting outwardly from the lower corner of the selector lever 150.

When the upper rail lever 130$a$ and the lower rail lever 130$b$ are in the normal typesetting positions shown in FIGURE 8, the cam pin 202 occupies a position adjacent to the lower end of the diagonal cam slot 200, substantially as illustrated in these figures. When the selector lever 150 has been advanced to the escape position shown in FIGURE 11, the resulting clockwise rotation of the pin 202 causes a slight corresponding rotation of the restoring lever 195 in the same direction around the pivot 197. This transmits a slight rearward movement through the bottom arm 193 to the motion transfer arm 190.

In the final advancement of the selector lever 150 into the command position shown in FIGURE 12, the pin 202 causes the restoring lever 195 to swing clockwise, substantially correspondingly with the motion of the selector lever 150, whereby in the final command position the pin 202 occupies a position at approximately the upper end of the slot 200. This clockwise rotation of the restoring lever 195 carries its laterally bent bottom arm 193 in a rearward direction (FIGURE 8) to swing the pivoted transfer arm 190 into a rearward position with its rear face in contact, or proximate contact, with the sloping front edge 165' of the lower rail lever 130$b$. This places the parts in readiness for receiving the restoring impulse from the lower rail push bar PB$b$ (in response to the transmission of a "lower rail" pulse from the perforated tape T), which thereby restores the parts from command condition back into normal typesetting condition, as soon as the desired supplementary function or functions have been completed. Such restoring impulse operates through the transfer arm 190, horizontally extending arm 193 and restoring lever 195, thereby forceably swinging the slot 200 in a counterclockwise direction and operating through the pin 202 to swing the selector lever 150 back into normal position, to release the blocking bar X so that it can be retracted under spring tension back to its normal position. Thus, a normal cycle has now been completed of the mechanically operating selector mechanism SM, which responds to a second successive operation of the upper rail push bar PB$a$ for shifting the blocking bar X into blocking position, and which thereafter responds to an operation of the lower rail push bar PB$b$ for restoring the parts and moving the blocking bar X back into its normal typesetting position.

As will be later described in connection with the electrical circuitry of the invention, there are times in the normal cyclical operation when there must be definite assurance that the operating unit has been normally shifted from its command condition back into its typesetting condition; or it is possible that abnormal conditions may arise which may make it desirable or imperative to instantaneously shift the operating unit out of its command condition back into its normal type-setting condition. This shifting is accomplished by solenoid RSO which is mounted in rear of the selector mechanism SM for operative connection with the restoring lever 195. Such solenoid is enclosed within a frame 212 which is secured by screws 213 to a shelf or bracket 215 (FIG. 8B) extending from the mounting block 121. The solenoid core 217 has a bifurcated end in which is pivoted one end of a link 219 on transverse pivot screw 221. The other end of the link 219 is provided with a bifurcated yoke 222 which embraces the sides of a trip lever 224, to which the yoke is pivoted by a transverse pivot pin 225. The trip lever 224 has a hub 227 which has rotatable mounting upon the same pivot pin 197 that pivotally mounts the restoring or resetting lever 195, the tripping lever 224 being mounted on the outside of the restoring lever 195. The hub 227 has diametrically opposite key slots 228 therein which engage over diametrically opposite keys projecting from an outer hub portion extending outwardly from the restoring lever 195.

It will be seen from the foregoing that when the selector mechanism SM is in its command position with the selector lever 150 revolved down to shift the blocking bar X into blocking position, the solenoid core 217 has been drawn substantially to the outer limits of its travel with respect to the solenoid winding 210. If the solenoid should be energized while the selector mechanism SM is in its command condition, the core 217 thereof will be retracted inwardly and the tripping lever 224 and restoring lever 195 will be revolved counterclockwise to swing the selector lever 150 to its normal typesetting position, withdrawing the blocking bar X from its blocking position. As will be later described in detail, the development of different abnormal conditions will cause energization of this reject or tripping solenoid RSO, represented, for example, by the closing of a tape-out door which energizes the solenoid when the tape-out door is opened for changing tapes; or by the perforator operator erroneously punching UR twice when not intended and when not immediately followed by the punching of LR.

This completes the description of the construction and operation of the selector mechanism SM, which is best illustrated in FIGURE 8. FIGURE 8A illustrates how the selector mechanism unit SM of FIGURE 8 fits in its entirety within the standard left hand Teletypesetter frame hanger 229 which is fastened by screws to the left hand end of the standard Teletypesetter bed frame 120. There is also a substantially duplicate frame hanger (not shown) secured to the right hand end of the bed frame 120. This standard left hand hanger 229 is formed with front and rear pedestal portions 229$a$ and 229$b$ respectively, bridged by the upper arch portion 229$c$, leaving the lower clear space 229$d$, below the arch. The standard Teletypesetter set of code bars 0–5, 70 and 75, have their conventional mounting in his space 229$d$. The selector mechanism SM herein disclosed has been so constructed, with its operating parts so arranged, that the selector mechanism assembly, including the additional blocking bar X together with the bar shifting and restoring mechanisms, and the mounting fixtures 121, 122, 123 and 215 can be easily inserted into place within the cramped quarters of this hanger space 229$d$. The top edge of this hanger 229 is shown in plan in FIGURE 9 by the two parallel dash-dot lines 229'—229' denoting the side surfaces of the hanger. It will be seen therefrom that a majority of the elements of the selector mechanism SM have a substantial proportion of their dimensions lying directly in or slightly to one side of the vertical plane of the hanger 229. Located to the right beyond the mounting block 122 and the series of code bars (FIGURE 8A) is the conventional bail cam 92$a$ and the bail operating cam roller 92$b$.

The foregoing features of the mounting blocks 121–123 and the mounting of the entire selector mechanism SM within the cramped space 229$d$ of the hanger 229, thus avoids the necessity of displacing or substituting any of the code bars, or of displacing or substituting either of the end frame hangers 229, or other major parts of the original assembly. These constitute unique and important features of the present invention, that make it possible to effect very quick and easy installation in the thousands of Teletypesetter operating units now in widespread use all over the world.

ELECTRICAL CODE SWITCH CSW ACTUATED BY THE CODE BARS IN CONTROL CONDITION

Referring now to the electrical switching operations which the code bars 0, 1, 2, 3, 4 and 5 are adapted to perform when the operating unit is in is control or command condition—with the blocking bar X in blocking position—it will be seen from FIGURES 16–18 that an electronic pick-up code switch CSW is mounted on the underside of the bed frame adjacent to the tape reader end of the assembly. This code switch CSW comprises six pairs of upwardly extending contact springs $CS_0$, $CS_1$, $CS_2$, $CS_3$, $CS_4$, and $CS_5$, there being one of these pairs of contact springs for each of the six code bars 0–5. The pairs of contact springs normally stand in open circuit position, each pair comprising a flexing long front contact spring 231 adapted to be flexed rearwardly into engagement with a relatively shorter stationary rear contact spring 231', for closing the contacts 232, 232' carried thereby. These six sets of contact springs are mounted on a vertically extending swinging panel 238 which is pivotally mounted on pivot pins 239 within a U-shaped frame or bracket 241 secured to the underside of the bed frame of the operating unit. The aforementioned tension spring 77, which normally holds the blocking bar X shifted into its normal, non-blocking position (towards the left in FIGURES 5 and 16), is connected between pins 78–79, which project laterally from the swinging panel 238 and the U-shaped bracket 241. This spring tends normally to hold the swinging panel 238 and its assembly of contact springs swung to a non-operative position toward the left, indicated by the tilted line position of the contact spring 231 in FIGURE 17A, where the contacts cannot respond to any shifting movements of the code bars 0–5, this condition being maintained so long as the operating unit is in its normal operating condition for typesetting operations. The tension of the spring 77 is transmitted to hold the blocking bar X shifted into its non-blocking position toward the left, through a pusher arm 248 extending upwardly from the swinging panel 238 engaging a pusher arm 249 extending downwardly from the blocking bar. However, when the blocking bar X is shifted into its command position, such being the position shown in FIGURE 16, this causes the depending pusher arm 249 on the blocking bar X to thrust against the arm 248 on the swinging panel 238, whereby to swing the pairs of code contacts into operative position, as will now be described.

The six pairs of code switches $CS_0$–$CS_5$ are mounted at such converging angles as to have the upper ends of their long contact springs 231 disposed in individual alignment with the left hand ends of six push pins $\mathbf{252_0}$–$\mathbf{252_5}$ mounted for sliding movement in apertured flanges of a fixed mounting bracket 253. The right hand ends of these push pins are located to receive thrusting motion from the left hand ends of code bar extensions $C_0'$–$C_5'$. These ends of such code bar extensions have upwardly extending hook portions 255 which enter notches 254 in the bottom edges of projections of the respective code bars 0–5, whereby the horizontal shifting movement of each code bar extension is transmitted respectively to its individual code bar. Each code bar extension has an operating notch 256 in its right hand end which embraces the lower circular end of a transfer lever 257 constituting part of the conventional sensing mechanism responsive to the perforations in the perforated tape, all of which is old and well known. When the blocking bar X is moved into its normal non-blocking position shifted to the left (which position is shown in FIGURE 5), under the tension of the spring 77 transmitted through the coacting pusher arms 248–249, this results in the contact carrying panel 238 pivoting in a counterclockwise direction for carrying the long contact springs 231 out of the range of operating movement of the six shiftable push pins $\mathbf{252_0}$–$\mathbf{252_5}$, at which time these pins can shift idly. On the other hand, when the blocking bar X is shifted toward the right into its blocking position, under the action of the selector mechanism SM, the pusher arm 249 pushes against the arm 248 and swings the panel 238 of electrical code contacts in a clockwise direction to bring the upper ends of their movable contact springs up against or into the thrusting range of the push pins, whereupon all shifting movements of each of the six code bar extensions toward the left are transmitted through these push pins to the respective electrical code switches $CS_0$–$CS_5$, simultaneously with the shifting of the code bars $C_0$–$C_5$ toward the left.

RESET SWITCH RSW

It will also be been from FIGURES 17B–17C that the swinging panel 238 carries, adjacent to one side edge, an additional switch RSW which functions as a normally closed reset switch that is responsive to the swinging movement of the switch panel 238 for opening a control circuit when the panel is swung toward the right for rendering the code switches responsive to the shifting of the code bars. This reset switch RSW comprises a long rear spring 259 normally in contact with a short front spring 261. When the switch panel 238 swings toward the right, pursuant to the right hand shifting of the blocking bar X into its blocking position, the long rear spring 259 strikes a stop screw 262 and separates the switch contacts. The stop screw 262 has a threaded adjustable mounting in a lug of the mounting bracket 241, and has an insulating tip 263 to prevent grounding through the contact spring 259. As will be later described in detail, when this reset switch RSW is closed and there is a null condition, it resets the command register in the control box, and when it is opened it permits information to be stored in the command register.

CODE SEPARATOR BIT SWITCH BSW

Figures 3A, 3B:
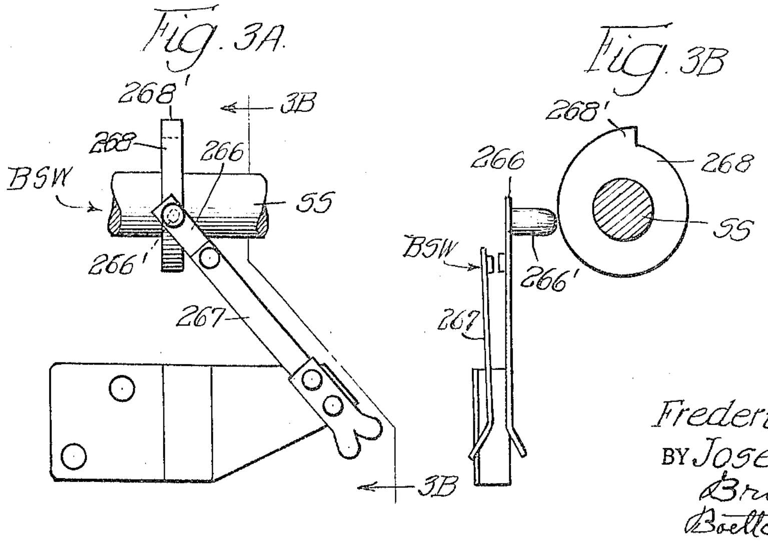
FIGURE 3A is a sectional view of the bit switch taken approximately on the plane of the line 3A—3A of FIGURE 3.
FIGURE 3B is another sectional view of the bit switch taken on the plane of the line 3B—3B of FIGURE 3A.

Referring now to FIGURES 3, 3A, 3B, in order to avoid garbling signals while the code bar links $C_0'$–$C_5'$ are in motion as they shift from one configuration to the next, there is provided a code separator bit switch BSW, which halts reading between signals; that is to say, it permits reading only during the time the code bar links $C_0'$–$C_5'$ are at rest. This switch comprises front and back contact springs 266 and 267 mounted in an insulating block along side the selector shaft SS. The front contact spring 266 carries a cam actuated insulating button 266' which is adapted to respond to the up slope of a cam rise or high point 268' of cam 268 mounted on the selector shaft SS. The timed relation is such that when the push bars PB and PB' drop off the high points of the spreader cam 90, the high point 268' of cam 268 is approximately 45° from the cam follower button 266', with the bit switch contacts 266–267 engaging, or just about to engage. Thereafter these bit switch contacts remain closed for about 40° rotation of the selector shaft SS. This bit switch opens before the sensing fingers of the tape reader TR retract.

SEQUENCE CONTROLS

Sequence controls coordinate the operation of the saw positioner and the linecaster to avoid interference that would otherwise arise from two conditions:

(1) The mechanical function of casting the line and ejecting the slug through the saw must be halted until the saw positioner comes to rest; and (2) The saw positioner must remain at rest until the last line or lines for which the saw was positioned have been cast and ejected.

These requirements are satisfied in the following manner:

ELEVATE CONTROL MECHANISM—ECM

The command to re-position the saw is received and interpreted by the electronic control unit from the Teletypesetter reader TR, and the saw positioner is set in motion.

Immediately upon completion of supplying the command, the operating unit is automatically restored to "typesetting" or normal position and the new line is assembled in the assembling elevator by the operating unit.

As is regularly the case in linecaster operation, when the line is filled an elevate signal is supplied by the tape to the tape reader TR. Normally, the line would be delivered immediately to the assembling elevator, thence to the delivery slide and directly through the full cycle of casting, trimming and sawing the slug to proper length.

It is possible that in the case of first having set a long line, and then immediately setting a short line, the saw positioner might still be in motion while the long line slug is being cast, trimmed and sawed to length, if the short line were elevated immedately after being set and an elevate signal received. To meet these and other conditions, arising particularly in the perforated tape control of slug sawing operations and other supplementary control operations, we have supplemented the conventional system (represented by the Teletypesetter or TTS system) with additional control apparatus, such as an electric control switch ESW which is responsive to the initial elevate actuation of the well-known TTS "floating" lever; also an automatically operated "split" form of fork SF connecting the inner end of such floating lever with the delivery push rod; and still further, an automatic delivery regulator DR, and slug detector SDZ, which controls the operating motion of the delivery push rod connecting with the "split" fork SF.

Our improved elevate control mechanism is initially actuated by the conventional Teletypesetter elevator push bar PB*e* which is generally located at the right hand end of the bank of push bars PB, as shown in FIGURE 3. This push bar PB*e* upon being shifted forwardly by the bail bar 92, operates through the pusher lug 271 to transmit counterclockwise swinging motion to one arm 272*a* of a three-armed or T-shaped lever 272 centrally mounted on a fixed pivot 273. One of the other arms 272*b* of this lever is pivotally connected at 274 to a laterally extending clutch control link 275, from which projects an upwardly extending arm 276. The upper end of this arm 276 carries a pivot bolt 277 which establishes pivotal connection with the toe-shaped forward end 278 of a multiple-function floating lever 280. When this toe-shaped end of the lever is shifted toward the right, pursuant to the forward actuation of the elevate push-bar PB*e*, this toe-shaped end 278 pushes the switch actuating arm 281 of a fixedly mounted Micro-switch or like type of switch ESW into switch closing position. This switch ESW functions as an "elevate" control switch, which is closed each time that the tape reader TR senses an "elevate" signal in the perforated tape T, thereby affording an additional control function not present in the conventional TTS system. This switch ESW, in cooperation with other control apparatus, provides the necessary signal to energize the elevate solenoid ESO of the split-fork mechanism SF about to be described, such serving to elevate the line which has been assembled.

The multiple function floating lever 280 extends rearwardly from its pivotally mounted forward end 278, and has the conventional pusher eccentric 284 adjustably secured by a bolt 285 to an intermediate portion thereof. This pusher eccentric 284 is operative during a predetermined swinging movement of the intermediate portion of said floating lever 280 toward the right to push the adjacent arm of a clutch throw-out lever latch 286, which is pivotally mounted at 286'. The resulting swinging movement of this clutch throw-out lever latch 286 causes the immediate engagement of the clutch ESC which controls the drive through the elevate shaft ES to elevate the assembly elevator AE (FIGURE 1), such tripping control of the elevate shaft clutch ESC from latch 286 being old and well known (FIGURE 3).

Figure 19:
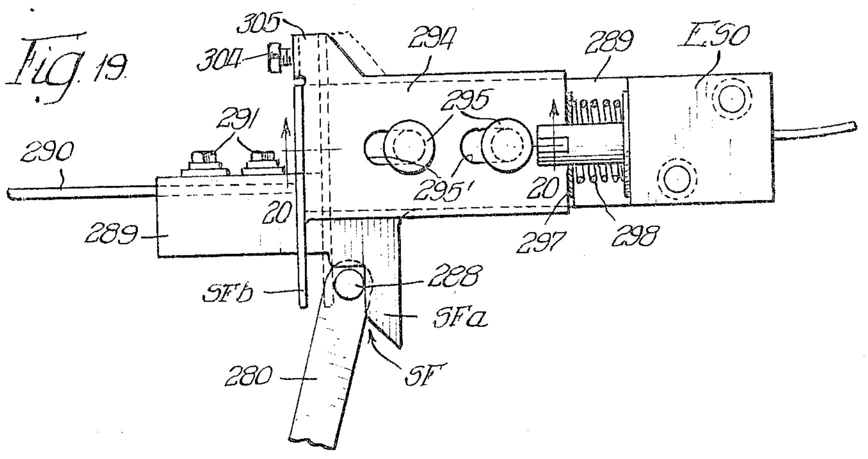
FIGURE 19 is a plan view of the split-fork mechanism constituting part of the elevate control mechanism, showing the solenoid de-energized and the split fork open.
Figure 20:
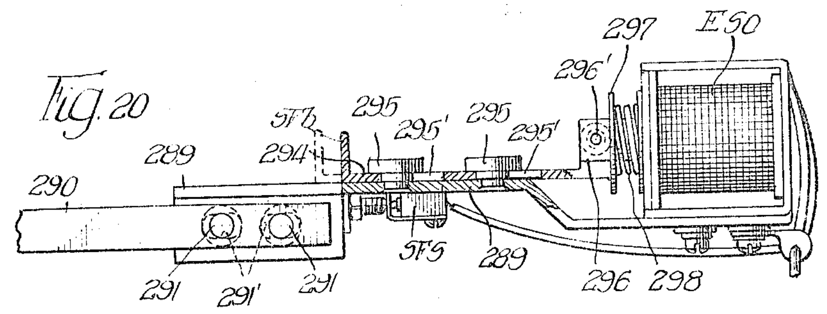
FIGURE 20 is a side view thereof, partly in section, showing the solenoid energized.
Figure 21:
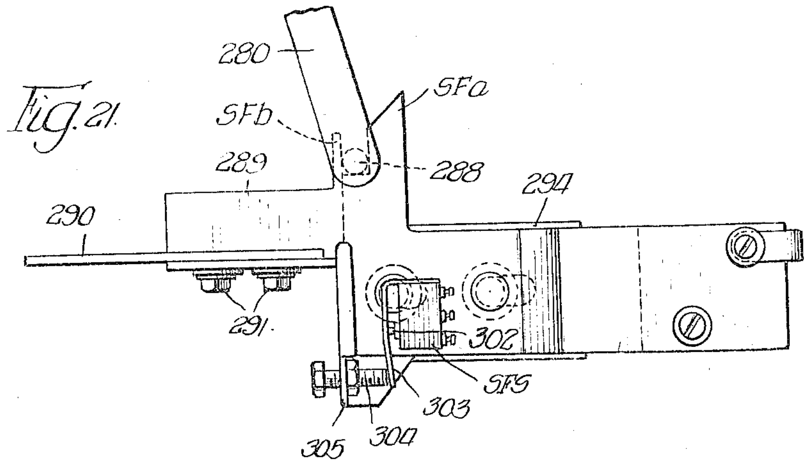
FIGURE 21 is a bottom or inverted plan view of this split-fork mechanism.

Referring now to the rear or inner end of the multiple function floating lever 280, this inner end carries an upwardly extending pin 288 which operates in a fork connected with the delivery push rod 290. Instead of the conventional rigid fork having two rigidly related fork jaws, we employ an improved "split" fork, designated SF, which comprises two relatively movable fork jaws SF*a* and SF*b*. The right hand jaw or arm SF*a* of the split fork is rigidly attached to the delivery slide bar or rod 290, this fork jaw or arm being an integral part of a carrier fixture 289 which is attached to the slide bar by the cap screws 291, the latter passing through slots 291' which permit shifting adjustments between the delivery push rod or bar 290 and the split fork, see particularly FIGURES 19–21.

Referring now to slidable left hand fork arm SF*b*, this constitutes an extension of a slide plate 294 which has longitudinally slidable mounting on the top surface of the carrier fixture 289. Two guide pins 295 are anchored in the carrier bracket 289 and have shanks engaging in guide slots 295' in the slide plate 294 with upper heads overlying the guide slots to retain the slide plate in freely slidable mounting on the carrier mounting. A pivot lug 296 extends up from the end of the slide plate and enters the bifurcated end of a solenoid core where it has pivotal attachment at 296', this solenoid core entering the winding of the elevate solenoid ESO, which is fixedly mounted on a depressed part of the carrier bracket. Confined on the solenoid core between the winding and a washer 297 is a compression spring 298 which normally tends to thrust the slide plate 294 and left hand fork arm SF*b* toward the left into the position shown in full lines in FIGURE 19. The energization of the elevate solenoid ESO overcomes the compression spring 298 and pulls the slide plate 294 and left hand fork arm SF*b* toward the right, into the dotted line position shown in FIGURE 19, and full line position shown in FIGURES 20–21. This elevate solenoid ESO is energized through a series control circuit which includes in series the above elevate control switch ESW together with a switch responsive to a so-called 4R relay in the saw positioner unit, to be later described.

It will be noted from FIGURE 3 that the third arm 272*c* of the three-arm lever 272 operatively connects with the reset lever link 299 of the selector shaft clutch SS*c*. Normally, the elevate solenoid ESO stands de-energized, with the left hand fork arm SF*b* in its separated position to the left. When the elevate operation is signalled, the actuation of the elevator push bar PB*e* swings lever 272 to operate through the above lever link 299 to stop the Teletypesetter selector shaft SS from rotating, thereby halting the sending of further code information.

As is well known, the lever 280 is referred to as a "floating" lever because it has no permanently stationary fulcrum axis. The forward pivot end 277 has the conventional right hand shifting movement in response to the elevate signal which actuates elevate push bar PB*e*. However, in our improved arrangement, the rear pin end 288 has cumulative right hand movements resulting from the unique closing of the split fork SF by the energization of elevate solenoid ESO, and also resulting from a unique control shifting of the delivery push bar 290, pursuant to a control effected by delivery regulator DR, to be presently described. Thus, our "floating" lever 280 is subject to three different control conditions. Accordingly, the intended function of the floating lever to effect engagement of the elevate shaft clutch ESC, is made subject to these three different controls, and to their all being in predetermined individual control positions simultaneously. This will be later described in more detail in connection with FIGURES 31A to 31D.

SPLIT FORK SWITCH—SFS

The shifting movement of the left hand fork arm SF*b* toward the right, resulting from the energization of the elevate solenoid ESO, also actuates a split fork responsive switch SFS mounted on the under side of the carrier fixture 289 of this split fork mechanism SF. This switch SFS comprises a contact actuating plunger 302 responsive to the swinging or flexing of a switch actuating arm 303. An adjustable actuating screw 304, carried by a bracket 305 projecting from the slide plate 294, serves to swing or flex the spring arm 303 and actuate the switch into closed position when the energization of the solenoid ESO pulls the slide plate 294 and left-hand fork arm SF*b* toward the right, into the fork constricting position. This small Micro-switch SFS controls a circuit connecting with the reject solenoid RSO, constituting part of the selector mechanism SM.

DELIVERY REGULATOR AND SLUG DETECTOR—DR

Referring to FIGURES 22–25, a delivery regulator DR is aligned with the left hand end of the delivery slide DS and includes a normally de-energized solenoid DRSO which stops every line of matrices from entering the vise jaws of the linecaster for casting, unless the solenoid DRSO has been energized. As will be later described in detail, the energization of this solenoid DRSO is controlled by a slug detector relay which is operated by a photocell and exciter lamp across the path taken by slugs being delivered to the galley. The delivery regulator DR comprises a mounting bracket 316 apertured for receiving mounting screws 318 which establish stationary attachment to the linecasting machine frame, and is formed at its left hand end with a shank 320 and a housing portion 321 provided on one side with a U-shaped cavity 322 therein. A sheet metal cover 324 having depending side walls embraces the sides of the shank and the housing portion, and encloses the solenoid DRSO located above the shank portion 320. The circuit conductors for the solenoid pass into the housing through a conduit or BX cable entering through passages and connectors 325 in the housing wall. The solenoid core 328 is normally thrust in an outward direction by a compression spring 330, and has its outer end pivotally connected at 332 with the inner end of a horizontal link 334. The outer end of this link is provided with a lost-motion slot 335, which is pivotally connected at 336 with the upwardly extending arm 338 of a bell crank lever 340 that is pivotally mounted on a pivot screw 341 threading into the housing portion. The horizontally extending arm 342 of the bell crank lever has a sloping forward edge 343 and a horizontal top edge 344 which terminate in a rounded pressure head 345. Attention is directed to the fact that when the solenoid DRSO is de-energized, this rounded pressure head 345 lies on a horizontal line of thrust T—T passing through the pivot axis 341. A tension spring 346 connected between a pin 347 projecting from the lower lever arm 342 and a pin 348 in the housing normally tends to hold the bell crank lever 340 in this non-energized blocking position shown.

Extending outwardly through the adjacent housing wall is a freely slidable plunger 350, which also shifts along this horizontal line of thrust T—T. The inner end of said plunger has a conical tip 352 which is operative to transmit horizontal thrusting pressure against the rounded pressure head 345, so long as the bell crank lever 340 stands in the blocking position shown. The outer right hand end of the slide plunger 350 carries a flange 356, and confined between this flange and the housing 321 is a compression spring 358 which normally tends to shift the slide plunger 350 toward the right. Screwing into a threaded bore 359 in the plunger 350 is the threaded left hand end of a delivery delay pin **350*a*, which is held in different adjusted positions in the slide plunger 350 by a lock nut 354. The right hand end of delivery delay pin or stem 350 has free sliding guided mounting along the horizontal thrust line T—T within a guide sleeve 357 which has threaded mounting through a downward extension 320′ of the shank 320. The outer end of delivery delay stem 350*a* is provided with a pressure abutment head or inhibitor stop 360 which is adapted to stop every line of matrices before the latter can enter the vise jaws of the linecaster for casting, unless the solenoid DRSO has been energized. It will be noted that when the solenoid DRSO is de-energized, the pressure head 345, conical tip 352 and inhibitor stop 360 stand in an aligned dead-center relationship with respect to the lever pivot 341 along the thrust axis T—T, whereby the relatively large thrusting pressures which the lines of matrices frequently set up against the inhibitor stop 360 can be borne without injury, and whereby the solenoid DRSO merely has to exert enough energy to trip the dead-center relationship in order to release any line of matrices which this delivery regulator DR may be holding up. In the tripping of the inhibitor stop 360 by the energization of the solenoid, the lost-motion slot 335 in the link 334 permits continued tilting of the bell crank 340 under the thrust of the plunger 350, even after the solenoid core 328 has bottomed in the solenoid. After this tripping of the delivery regulator and the release of the matrices, the parts automatically return to their normal blocking positions, assuming that the solenoid DRSO remains de-energized, such return causing the rounded pressure head 345 to slide up the lower inclined surface of the conical tip 352 in aiding the outward shifting of the plunger 350**.

Figure 22:
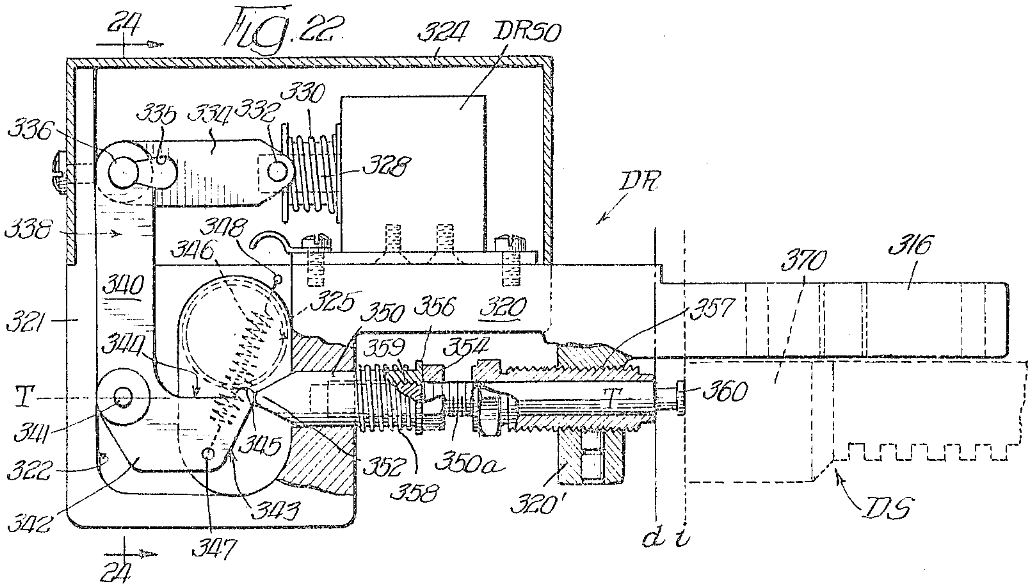
FIGURE 22 is a front view, partly in section, of the automatic delivery regulator.
Figures 23, 24, 25:
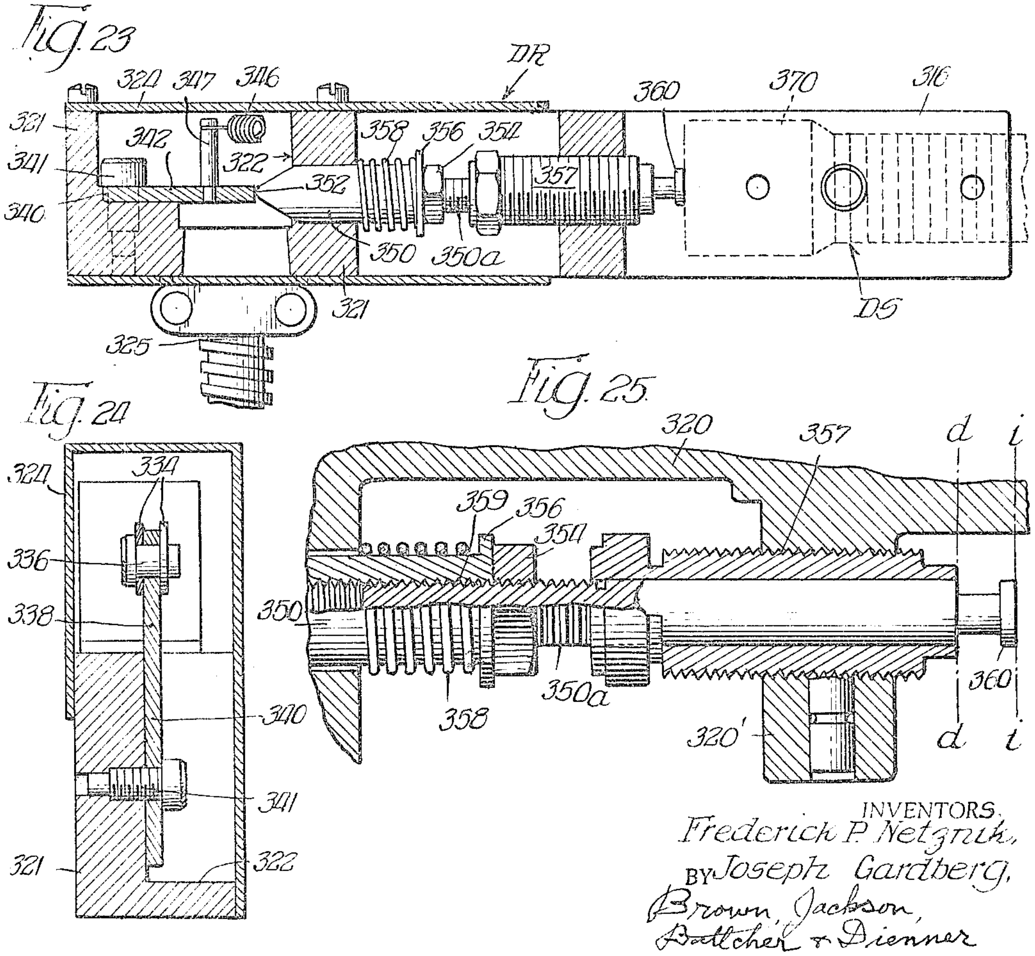
FIGURE 23 is a horizontal sectional view through this delivery regulator.
FIGURE 24 is a vertical sectional view taken on the plane of the line 24—24 of FIGURE 22.
FIGURE 25 is an enlarged detail view showing the adjustable mounting of the delivery delay pin.

The projected or outward position of the stop head 360 with the solenoid DRSO de-energized, constitutes that may be regarded as the "inhibit" position with respect to the assembly of matrices along the delivery line, this inhibit position being denoted by the dotted line *i* in FIGURE 22, and being made readily adjustable by screwing the delivery delay stem **350*a* inwardly or outwardly within the threaded bore 359 of the slide plunger 350. The retracted or forced-back position of the abutment stop head 360**, made possible by the energization of the solenoid DRSO, constitutes the "delivery" position with respect to the line of matrices, denoted by the dash-dot line *d*, defined by the end of the threaded guide sleeve 357, which delivery position can be adjusted by screwing such guide sleeve in either direction. The delivery slide DS carrying such line of matrices M comprises a left hand end block 370 which is adapted to be brought to bear against the inhibitor stop 360 as the delivery slide nears the end of its left hand movement toward the jaws of the first elevator. If the inhibitor stop 360 is free to yield or move back to delivery line *d* (FIGURE 22) by reason of the energization of the solenoid DRSO, the delivery slide can complete its intended delivery of the assembly of matrices into the jaws of the first elevator, following which it can then return to receive its next line of matrices from the assembly elevator. On the other hand, if the inhibitor stop 360 is held blocked at the inhibitor position *i* because of the non-energization of the solenoid DRSO, the delivery slide DS cannot complete its normal or intended movement, but must remain at inhibit position *i*, with its line of matrices undelivered or suspended in tarnsit, until the solenoid DRSO is energized by the passage of the preceding slug S through the slug detector zone SDZ, where this preceding slug momentarily interrupts the light beam passing to its responsive photocell as such slug is sliding down the delivery chute into the galley. As is old and well known, the aforementioned "first elevator" carries the line of matrices downwardly to the casting position in front of the mold wheel, and thence upwardly to the mechanism which effects the distribution of the matrices back into their proper places in the magazines.

The blocking of the delivery slides DS at inhibit position *i* prevents re-engagement of the main driving clutch which drives the main cam shaft, etc. This stopping of the main driving clutch and main cam shaft also prevents right hand reciprocatory movement being transmitted to the delivery slide bar 290 extending to the split fork mechanism SF. Such main driving clutch, designated 380, and its tripping mechanism, designated 381, are shown in FIGURES 26–30. The following description of this clutch and its tripping mechanism will be rather brief because such are of conventional Linotype construction, which are illustrated and described in considerable detail on pages 102, 103 and 277–279 of "Linotype Machine Principles" (1940 edition, published by Mergenthaler Linotype Company). In present FIGURES 26–30 we have also illustrated our improved arrangement which causes the cyclical rotation of the clutch 380 to transmit a pushing force through delivery push bar 290 to the split fork SF for swinging the floating lever 280 into position for tripping the elevate clutch ESC, whereby to drive the elevate shaft ES to elevate the next line of matrices. The clutch 380 is mounted upon and is operative to drive a cam shaft 382 which extends transversely of the machine at the rear thereof, this cam shaft having approximately ten cams thereon for performing a like number of functions. The clutch 380 is of the conventional expanding shoe type wherein clutch shoes 383 are pushed outwardly into frictional engagement with the inner face of the clutch flange 384 through spreading links 385 which respond to the axial thrusting movement of a thrust rod 386, a surrounding compression spring 387 normally tending to thrust said rod in an inward direction for engaging the clutch. The inner end of the thrust rod is connected to a clutch collar 388 against which acts a shifter yoke 389. The yoke 389 is one arm of a bell crank lever, and adapted to bear laterally against the other arm of said lever is the lower arm 391 of the lower stopping lever 392. The upper arm of this lever 392 receives the thrust of an adjustable screw 393 carried in the lower arm of an upper stopping lever 395. The upper face of a latching nose 396 on this upper stop lever is adapted to engage the lower surface of a starting and stopping pawl 397 pivotally mounted on the large cam wheel 399. This starting and stopping pawl 397 is pivotally mounted in the delivery transfer cam wheel 399 to swing forwardly and rearwardly in a radial plane of this cam wheel, being normally spring pressed forwardly into position to strike the abutment shoulder 396. The cam wheel 399 is mounted upon the cam shaft 382 to be driven by the clutch 380 in the counterclockwise direction of rotation shown by the arrow, and the striking of the pawl 397 against the stop shoulder 396 automatically releases the clutch 380 and stops the rotation of the cam wheel 399 substantially in the position illustrated. To effect the tripping engagement of the clutch 380, the pawl 397 is adapted to be pushed rearwardly off of the clutch tripping shoulder 396 by a lateral pushing force transmitted through a roller 400 which is pivoted in the bifurcated end of a swinging arm 402. The arm 402 has adjustable clamp mounting on the rear end of a forwardly extending tripping shaft 403 which mounts a delivery lever 404 at its front end. The swinging upper end of this delivery lever has pivotal connection at 406 with one end of a delivery link 407, the opposite end of which is pivotally connected at 408 to the delivery slide DS. The tripping shaft 403 has a projecting arm 411 connected with an upwardly extending tension spring 412, which normally biases the shaft 403 in a clockwise clutch tripping direction, tending to move the roller 400 toward the cam wheel 399. Thus, the tension spring 412 acts through the tripping shaft 403 to normally tend to swing the roller 400 toward the cam wheel 399 and to push the delivery slide DS toward the delivery regulator DR. As previously described, when the inhibiter stop 360 of the delivery regulator is held in its right hand inhibiting position *i* by the non-energized condition of the delivery regulator solenoid DRSO, the delivery slide DS is stopped at a point which does not permit the roller 400 to transmit clutch tripping movement to the tripping latch 397. However, when the solenoid DRSO is energized by the passage of the previous slug through the path of the light beam of the photocell trip apparatus, the delivery slide is free to move further toward the left into the delivery position "*d*." This further movement of the tripping shaft 403 results in the roller 400 pushing the latch 397 off of the latch shoulder 396, which the result that the clutch 380 is engaged and the cam wheel 399 starts rotating in the counterclockwise direction indicated. Thereupon, the roller 400 rides off of the tripping pawl 397 on to the cam track 415 formed on the adjacent face of the cam wheel 399. This cam track is formed with a rising slope 416 leading up to an elevated cam dwell 417 which results in a counterclockwise direction of rotation being transmitted through tripping shaft 403 and arm 404 for causing the delivery slide DS to move with a quick motion back toward the right hand end of its travel, where it is latched in position to receive the next assembly of matrices and space bands from the assembling elevator AE (FIGURE 1). Inasmuch as it is only the tension of the spring 412 that tends to slide the delivery slide DS back to the left toward the delivery regulator DR, the delivery slide can stop in this latched position until the assembling elevator comes up and trips it free, the cam wheel 399 meanwhile continuing to rotate back to normal position, at which position the tripping pawl 297 strikes the nose 396 on the upper stop lever 395 for disengaging the clutch 380 and stopping the cam wheel 399 in such normal position. The spring impelled movement of the slide DS in this left hand direction toward the delivery regulator DR is retarded by the conventional pneumatic dash pot 420, which is connected with the shaft 403 through arm 421. At the end of the drop-off slope 418, the cam track 415 continues at an intermediate level 423, and then drops down into a depressed level 424, which places the tripping pawl 397 in position to be tripped upon the next succeeding inward movement of the tripping roller 400.

Referring back to the delivery push rod 290 which is connected to the split fork SF, it will be recalled that when this delivery push rod was given a pushing motion toward the right (FIGURES 19–21), this pushing motion operated through the split fork SF to impart one of the three controlling motions to the floating lever 280 which effects the tripping of the elevation shaft clutch ESC. The left hand end of this delivery push rod 290 (i.e. the right hand end as viewed in FIGURE 26) is operatively connected to be responsive to the rocking motion of the tripping shaft 403. The operative connection between the push rod and the tripping shaft is shown in a schematic form, designated 430, comprising an arm 431 extending upwardly from the outer end of the tripping shaft 403 and having a slotted or bifurcated upper end 432 in which engages a pin 433 projecting rearwardly from the end of the delivery push rod 290. Alternatively, this operative connection 430 may be of the form illustrated on page 64 of TTS Bulletin No. 60B. It will be seen from the foregoing that when the delivery regulator DR permits the engagement of the clutch 380 and the cam wheel 399 starts to revolve, the backward motion of the roller 400 in traveling up the cam track onto the high dwell 417 will rock the tripping shaft 403 in a counterclockwise direction (FIGURE 26), thereby functioning through the operative connection 430 to impart the above described pushing motion to the delivery push rod 290.

Figures 31A, 31B, 31C, 31D:
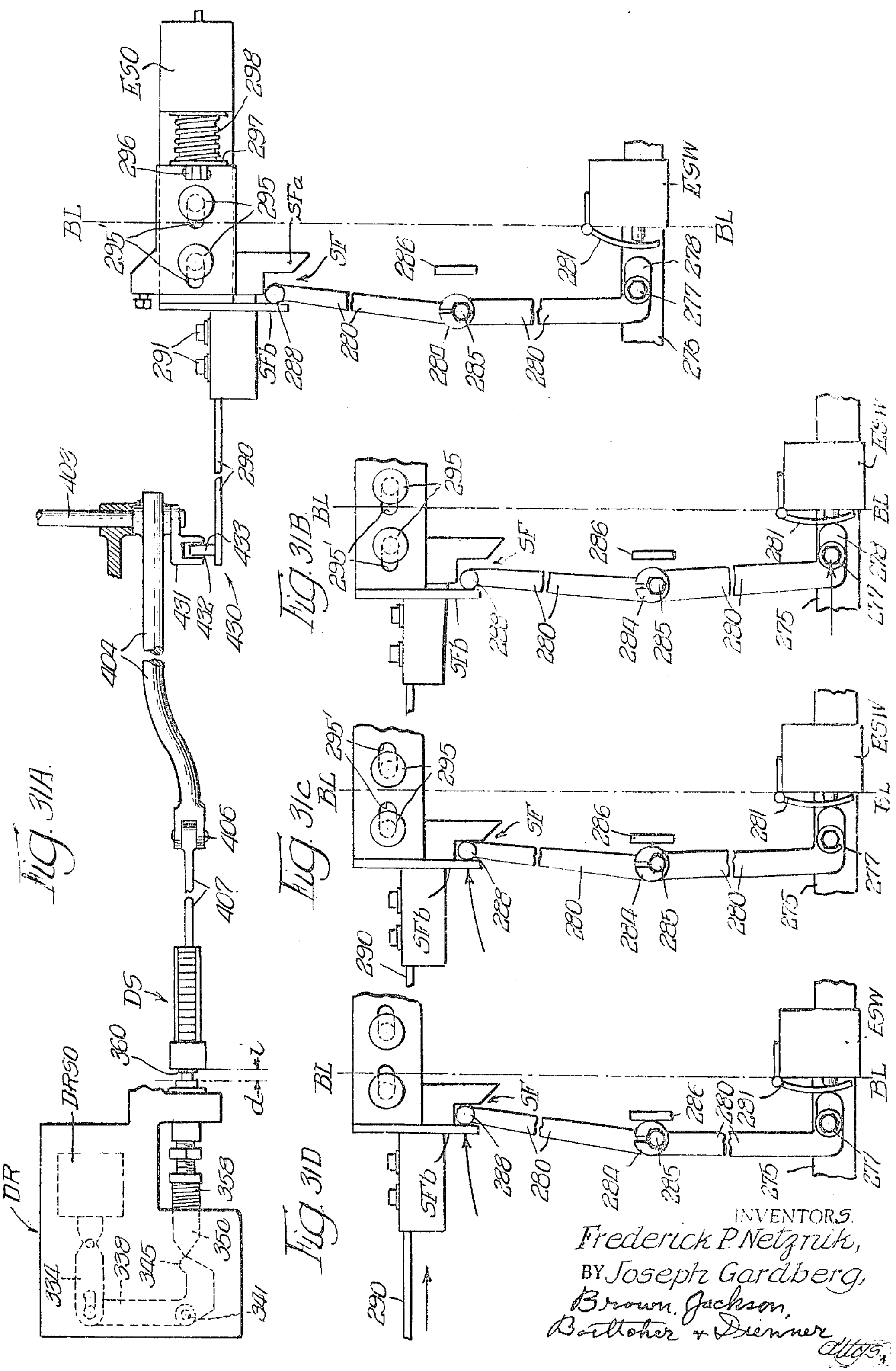
FIGURES 31A, 31B, 31C and 31D are diagrammatic views which illustrate in succession the normal position (FIGURE 31A), and thereafter the three different control positions of the elevate control mechanism.

Having thus described the three control conditions or devices which govern the operation of the floating lever 280, we now direct attention to FIGURES 31A–31D which are schematic diagrams, wherein FIGURE 31A illustrates the floating lever in its normal position, and wherein FIGURES 31B–31D illustrate the other successive positions of the floating lever, in response to the operating relationship between the floating lever and each of its three control devices.

In order to visually illustrate the sequence and the degree of the successive movements of the front and rear ends of the floating lever 280 toward the right, in response to these three conditions, and the consequent movement of the eccentric 284, we have inserted in FIGURES 31A–D a theoretical, fixed, base line BL, with respect to which these different right hand movements can be visually measured. This schematic base line BL can conveniently be considered as a fore and aft line extending rearwardly from the left hand edge of the stationarily mounted elevate switch ESW. In the normal left hand position shown in FIGURE 31A, the eccentric 284 and lever latch 286 are both at their maximum spacings from the base line BL. At this time the clutch control link 275 and its lever mounting pivot 277 are in their normal left hand positions, whereby to hold the forward end of the floating lever in its extreme left hand position. Also, at this time the split fork SF is wide open and the delivery slide bar 290, which carries the split fork, are in their extreme left hand positions, whereby to permit the inner end 288 of the floating lever 280 to remain in its extreme left hand position. Thus, the floating lever 280, in its entirely, now occupies its extreme left hand position, with the intermediately located eccentric 284 shaped its maximum distance from the lever latch 286. Concurrently therewith, the toe-shaped forward end 278 of the lever is spaced from the switch closing arm 281 of the elevate switch ESW so that this switch is in open position.

The first control operation or condition occurs when the elevate signal from the tape reader TR shifts clutch control link 275 and lever pivot 277 toward the right, as shown in FIGURE 31B. This causes eccentric 284 to be moved closer to the lever latch 286, and also causes the switch closing arm 281 to be swung to the right for closing the elevate switch ESW. FIGURE 31B thus illustrates the response of the floating lever 280 to the first of the three control operations.

FIGURE 31C shows the response of the floating lever to the second of the three control operations or conditions. In this figure, the forward end 277 of the floating lever 280 is shown as remaining in the same position it had in FIGURE 31B, but the rearward pin end 288 is shown as having been moved slightly toward the right. This has resulted from the energization of the elevate solenoid ESO, which closes the split fork SF, thereby shifting the pin 288 toward the right. Thus, this second control operation moves the eccentric 284 still closer to the lever latch 286. The energization of the elevate solenoid ESO occurs when the elevate switch ESW and the associated contacts of the "4R" relay (to be later described) are both closed.

Figures 26, 29, 30:
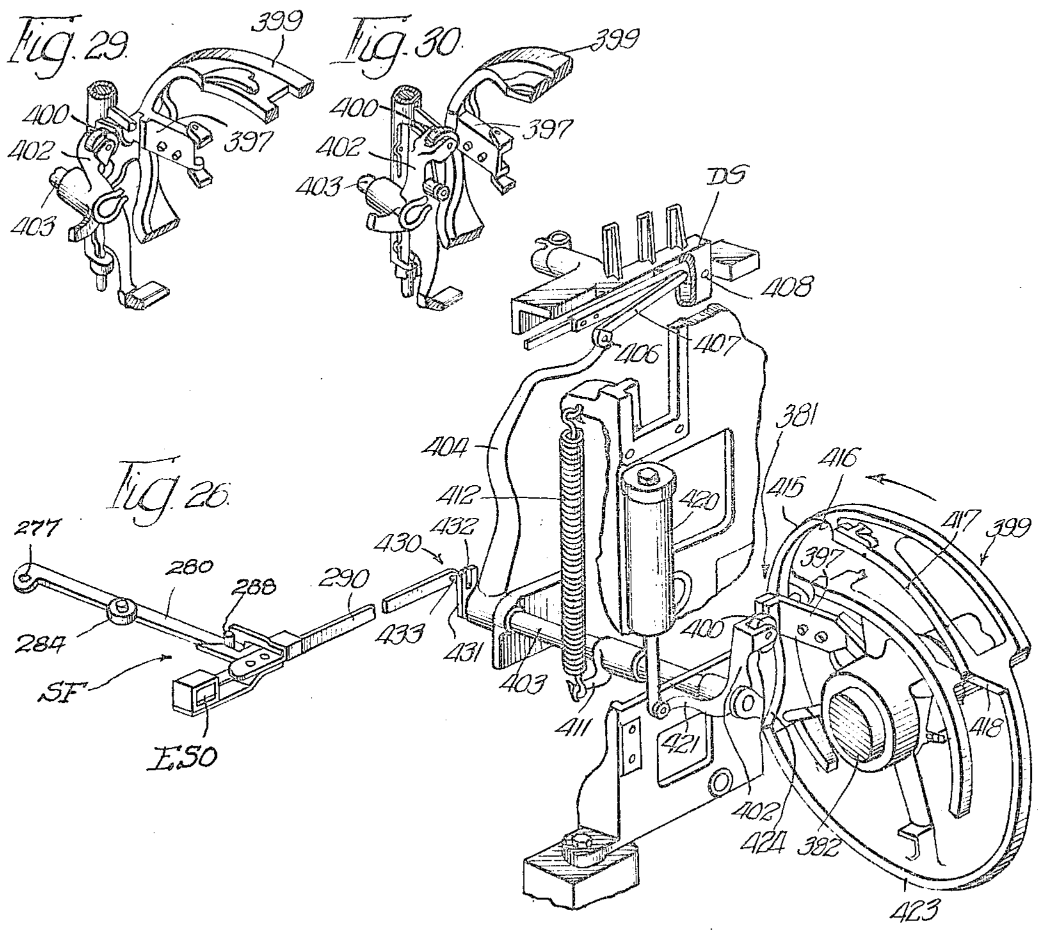
FIGURE 26 is a fragmentary perspective view of the automatic starting and stopping mechanism which effects each single rotation of the cam shaft in a conventional embodiment of line casting machine, this figure illustrating the adaptation of the present invention thereto.
FIGURES 28, 29 and 30 are detail perspective views showing latching parts, tripping parts and the like of the starting and stopping mechanism in their different cyclical positions.
Figure 27:
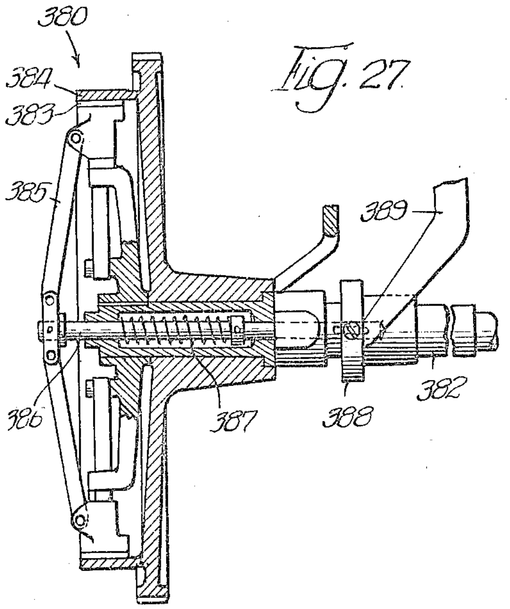
FIGURE 27 is a sectional view of a conventional form of clutch responsive to this starting and stopping mechanism.
Figure 28:
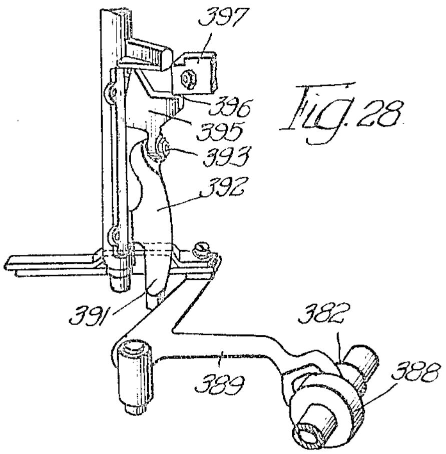

FIGURE 31D shows the response of the floating lever to the third of the three control operations. In this figure, the delivery push rod 290 and closed split fork assembly SF have been pushed toward the right, resulting from the above described operation of the main clutch 380 and cam wheel 399 (FIGS. 26–27). The shifting of the closed split fork assembly SF carries the pin 288 further toward the right. This results in the eccentric 284 transmitting right hand tripping movement against the lever latch 286, so as to trip the latter. In consequence, the elevate shaft clutch ESC is engaged and the elevate shaft ES starts rotating for elevating the next succeeding line of matrices up to the delivery mechanism. The timed relation of the above three controlling operations, and of the clutch tripping operation performed by the floating lever 280, each with regard to its respective position in the complete cycle of the machine, will be explained later in connection with the electrical control circuits of the system. We now direct attention to FIGURE 32 which schematically shows the relation of the slug detecting zone SDZ with respect to the slug cutting saw S.

The location and operation of the slug cutting saw S with respect to the point of ejection of the type slugs from the mold wheel, are old and well-established, having been originally shown in Charles L. Mohr Patent 1,264,541, and later in H. O. Mohr Patent 2,929,492, and Woodliff Patent 2,563,147, etc., and also in literature, such as "Mohr Saw Machinist's Manual," issued by Mohr Lino-Saw Company, of 8015 N. Ridgeway Avenue, Skokie, Illinois. However, in the new construction herein disclosed, the travel of each sawed type slug down the delivery chute 435 toward the galley tray or stick 440, causes the clug to pass through a unique slug detecting zone SDZ, where it momentarily interrupts a light beam passing through said zone, thereby causing energization of the delivery regulator solenoid DRSO. In this slug detecting zone SDZ a source of light 445 projects light through apertures to pass transversely across the width of the chute to act on a photocell 455 on the other side of the chute, this beam of light being interrupted by the passage of each slug. The failure to interrupt such light beam insures immediate stopping of the machine, if any abnormal condition should arise which would prevent a slug from being delivered down through the delivery chute.

The setting of the slug saw S also operates to set the vise-jaw apparatus 460 and the assembler mechanism 470, both of which are conventional and well known in line-casting machines. The vise-jaw apparatus 460 comprises mainly the normally non-shiftable right hand vise jaw 462, and the shiftable left hand vise-jaw 464, the latter being shifted concurrently with the slug cutting adjustaments given to the saw S. The assembler mechanism 470 comprises the conventional assembler bar 472, assembler stop 474, etc., which likewise assume settings coresponding to the settings concurrently given to the vise-jaw apparatus 460 from the saw S.

ENCODER MECHANISM—EN

In FIGURES 13–41, we have illustrated the encoder or converter mechanism EN which functions as a collaborating unit in controlling the cutting position of the saw. The position of the saw is determined by the measure data in picas and points transmitted from the perforated tape, and the adjusting movement of the saw, if any, is responsive to the differential between the new measure data and the old measure data in picas and points previously transmitted from the perforated tape, the latter representing the existing or present position of the saw at the time that the tape starts transmitting the new measure data. The basic function of this encoder mechanism EN is to transmit continuous information regarding the position of the saw to our new automatic saw positioning system, now referred to as the Autopositor system of control. Since setting the saw automatically sets the vise-jaw apparatus 460 as well as the assembler mechanism 470, the positional information with respect to the saw is also applicable to these two other functions as well.

Figure 34:
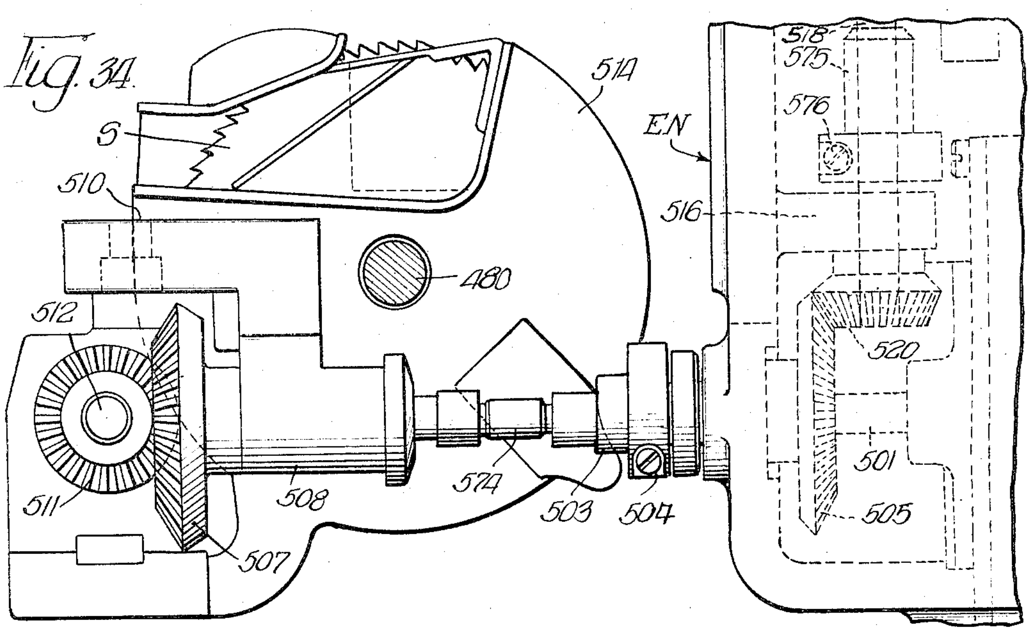
FIGURES 34 and 35 are fragmentary plan and front elevational views, the latter partly in section, showing the driving connection between the encoder and the lead screw shaft which adjusts the cutting position of the saw.
Figure 35:
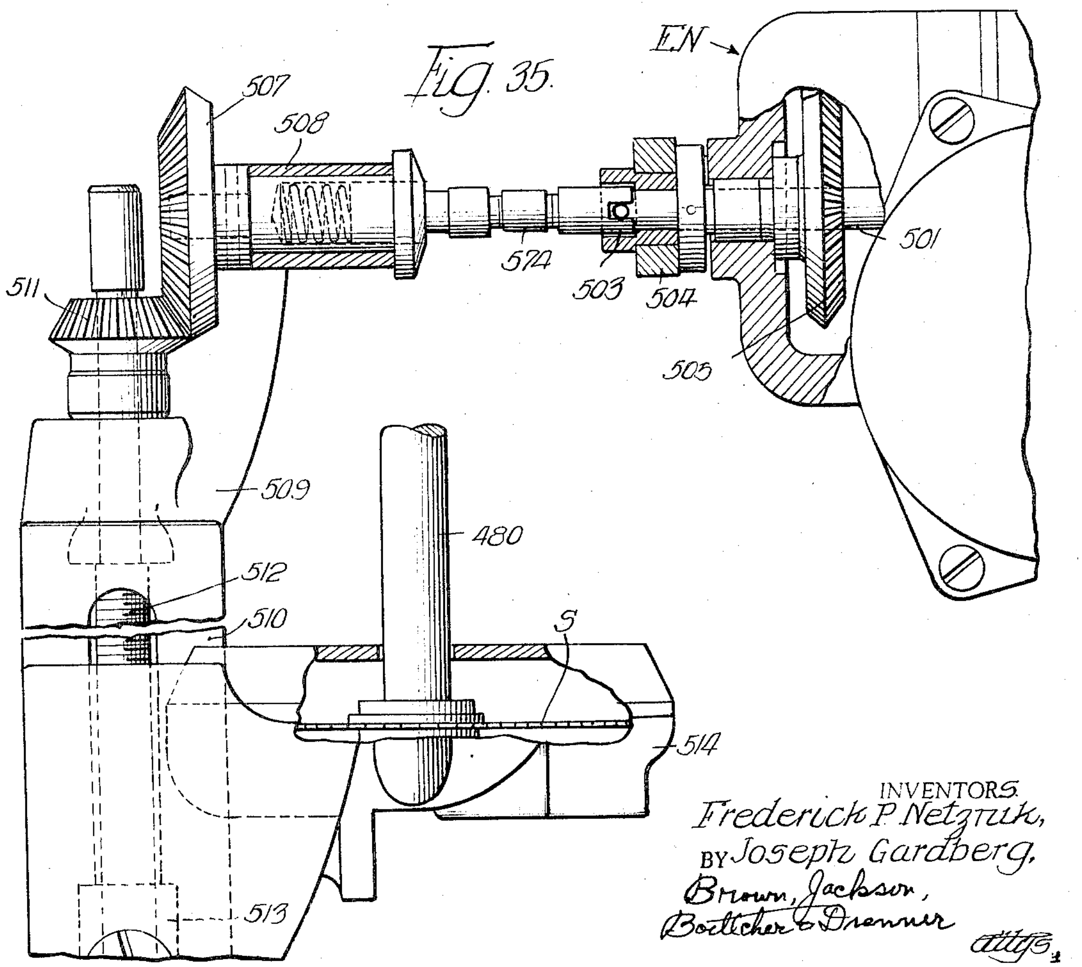

The saw installation comprising the rotating saw blade S, its motor driven driving shaft 480, and the lead screw 512 which determines its height, can be identical with the manually actuated installation heretofore known as the Mohr Lino-Saw. Prior to our development of the present Autopositor system of control, the power for positioning the Mohr saw S, the vise-jaw apparatus 460 and the assembler mechanism 470, has been of manual origin transmitted through a horizontally extending shaft 501 provided with a manually cranked dial at its right hand end. Referring to FIGURES 34–35, the opposite end of this dial shaft 501 has affixed thereto a coupling 503 and bevel gear 505. The coupling 503 is split and is clamped on the end of the dial shaft 501 by a split clamping collar 504; and the bevel gear 505 is attached to the dial shaft at a point between the coupling end and the right hand dial end thereof. The coupling 503 provides means for transmitting the rotation of the dial shaft 501 to a bevel gear 507 journaled for rotation in a bearing 508 carried by the saw mounting frame 510. This bevel gear 507 meshes with a matching bevel gear 511 which is affixed to an accurate lead screw 512. A nut 513 attached to the saw housing proper 514 is threaded to traverse the vertically mounted lead screw. Thus, rotation of the lead screw, and the vertical traverse of the nut and of the saw follows, as a direct result of the turning of the dial shaft 501.

The dial shaft is suitably supported in a mounting bracket 516 which provides bearing support for a shaft 518 extending substantially at right angles to the dial shaft 501 in a rearward direction toward the linecasting machine proper. Attached to the front end of this rearwardly extending shaft 518 is a bevel gear 520 which meshes with the bevel gear 505 affixed to the dial shaft. The opposite or rear end of this rearwardly extending shaft 518 carries a bevel gear 524 which meshes with a mating bevel gear 526 which is affixed to a screw shaft 528 running parallel with the dial shaft 501. This screw shaft 528 provides rotational drive for both the vise-jaw positioning apparatus 460 and the assembler mechanism 470, previously referred to.

The present encoder assembly embodies substantially all of the above structure except that the motive power to the equivalent dial shaft 501 is transmitted from a special form of electric motor 530 through a worm 532 and worm wheel 534. The worm wheel 534 is attached to a worm gear drive collar 536 by screws 538, and the worm gear drive collar 536 is pinned to shaft 501 by cross pin 539. Motive power to worm 532 is transmitted through flexible coupling 540, which allows for shaft misalignment, and also through motor coupling 542 which is attached to motor shaft 531 of the encoder drive motor 530. This special drive motor is capable of being driven at two different speeds, both clockwise and counterclockwise, for the performance of operating functions which will be later described.

This motor is preferably mounted to extend forwardly from a cylindrical encoder housing 545 extending axially of the dial shaft 501. A novel feature of this part of the invention resides in the ability to mount this electric motor 530, cylindrical housing 545 and contained parts, on the supporting frame structure of the manually operated Mohr saw with a minimum amount of change or alteration. Hence, this mounting arrangement is described in some detail. The encoder drive motor 530 is flange mounted to motor mount 552 with screws 554, and this motor mount 552 is attached to a machined surface of the left hand gear and shaft housing 516 with screws 556. Housing 516 is attached to right hand end of linecasting machine vise cap 558 by mounting screws 562 in a manner similar to which the housing of the manually operated unit was attached to the linecasting machine vise cap. Bearing plate 564 is attached to the machined front face of bracket 516 by screws 566 on a common center with shaft 501, with the engagement shoulder 568 of bearing plate 564 entering into the bored diameter 569 of bracket 516, the bore 569 being machined concentric to the shaft bearing 570. The left end of shaft 501 terminates in a pinned female coupling 503, with which the saw drive coupling 574 engages. The drive from bevel gear 520 to bevel gear 524 occurs through timing collet 575 and clamp collar 576. Rotation of the vise-jaw positioning screw 528 rotates measure control positioning screw shaft 578, which revolves inside a stationary guide tube 579 having a guide slot 580 extending longitudinally thereof. Threading over the screw shaft 478 and movable longitudinally within the guide tube 579 is a traveling nut 581 which has a motion transmitting lug or arm 582 extending outwardly therefrom through the slot 580. This lug engages in a downwardly facing U-shaped socket 583 provided at the inner end of the marked assembler rod 472 (FIG. 32), whereby such rod will indicate the pica settings of the saw S at all times. These indicating functions can be seen to be substantially identical in concept and execution to similarly required functions in the prior manually adjusted control features of a linecasting machine.

We now come to the automatic sensing apparatus contained within the housing 545 for sensing the continuous discrete angular positions of the drive shaft 501, and translating this information into a numerical value defined as a "measure." The unit of measure that is standard in composing rooms in the United States is equal to .16608" and is called the "pica." Each pica is divided into a sub-unit equal to 1/12 of a pica, or .01386", called a "point." These are the values herein referred to as "picas" and "points" when referring to a "measure." In existing manual operated systems, these values are read on the measure control scale of the standard linecasting machine as the "pica" values, and on an externally visible dial (similar to dial 640) affixed to the outside end of a dial shaft (similar to shaft 502) as the "point" values. These visual references have been preserved in the present system as the means of reference.

However, to satisfy the requirements of the present system, an automatically operating ultra-sensitive mode of continuously sensing the saw position is required. To facilitate an understanding of how this is done in the present system, we shall now briefly describe the theory of operation of the computer-controller:

When the drive motor 530 is at rest, the encoder EN is at rest since its motive power is derived from the drive motor 530. At such a time a first voltage value is fed from a photo-cell assembly in the encoder EN to a system of circuitry herein referred to as the null detector. This first voltage value is a direct function of the exact position of the saw, vise-jaw and assembler control setting at the moment, as sensed by the encoder photo-cell units.

When the perforated tape T signals the arrival of another or different measure of positioning of the saw, a "control" sequence is initiated which results in the reading of the new measure from the perforations in the tape. These events have been previously described in connection with the selector mechanism SM, and code switch CSW. Such events result in the translating of the numerical value of the new measure through an electronic matrix system into the null detector as a second voltage value.

The above described first and second voltage values are now compared by the null detector circuitry. If this comparison results in a positive voltage error, the circuirty is thereupon made operative to cause the drive motor 530 to rotate dial shaft 501 in a direction that will cause the saw housing to be raised to a position that corresponds to the measure called for on the perforated tape. As soon as this relationship is established, with back-lash eliminated, a null is said to exist. A positive voltage error indicates that the required measure is longer than the measure sensed by the encoder. A negative voltage error indicates that the required measure is shorter than the measure sensed by the encoder.

The response of the null detector to the imbalance or differential between these first and second voltage values will be explained later in connection with the circuitry of the system. However, prior thereto we shall first describe how the encoder unit EN creates the first varying voltage value which continuously denotes the position of the saw S.

This encoder or converter unit EN has as its two main elements a pair of spaced, axially aligned dials PID and POD (FIGURES 33 and 38–41), which are caused to rotate by the dial shaft 501 within the encoder housing 545 when driven by the drive motor 530. The left hand dial POD represents the point measuring dial, and the right hand dial PID represents the pica measuring dial, and two dials being gear connected to rotate simultaneously but at different speeds. In the preferred geared relation shown, the two dials rotate in opposite directions, but this is not essential.

The point dial POD rotates directly with the dial shaft 501, and therefore revolves at a rate closely commensurate with the rotatively high speed of the saw adjusting lead screw 512. The pica dial PID is driven from the dial shaft 501 through a system of speed reducing gearing 620, which causes the pica dial PID to rotate at a lower speed proportional to the pica to point ratio.

The bodies of both dials POD and PID are composed of transparent or translucent material, and the outer portion of the point dial POD is marked with a predetermined sequence of arcuate opaque segments 585 and light transmitting segments 586 arranged in five concentric circles designated S1, S2′, S2, S4 and S10, these segments being angularly divided into twelve equal arcuate sectors 0 to 12. The pica dial PID is marked with a similar relation of arcuate opaque segments 587 and light transmitting segments 588 arranged in six concentric circles designated S1, S2′, S2, S4, S10, and S20, these segments being angularly divided into approximately thirty equal arcuate sectors 0 to 30. These opaque and clear segments of both dials alternately block and permit the passage of light to photocells, for electrically indicating the instantaneous position of the saw at all times, as will be later described.

Referring now to the mounting of these two dials and the geared interconnection therebetween, the point dial POD has screw fastening to the collar 590 of a drive stud 591, which is journaled within a bearing sleeve 592 that is mounted within a bearing pedestal 594 extending inwardly from the side wall of the housing 545. The left end of the drive stud 591 has a transverse key slot 596 that engages over a transverse driving key 598 projecting from the adjacent end of the worm gear drive collar 536, so that the point dial POD rotates directly with the dial shaft 501 at all times.

Figures 36, 37:
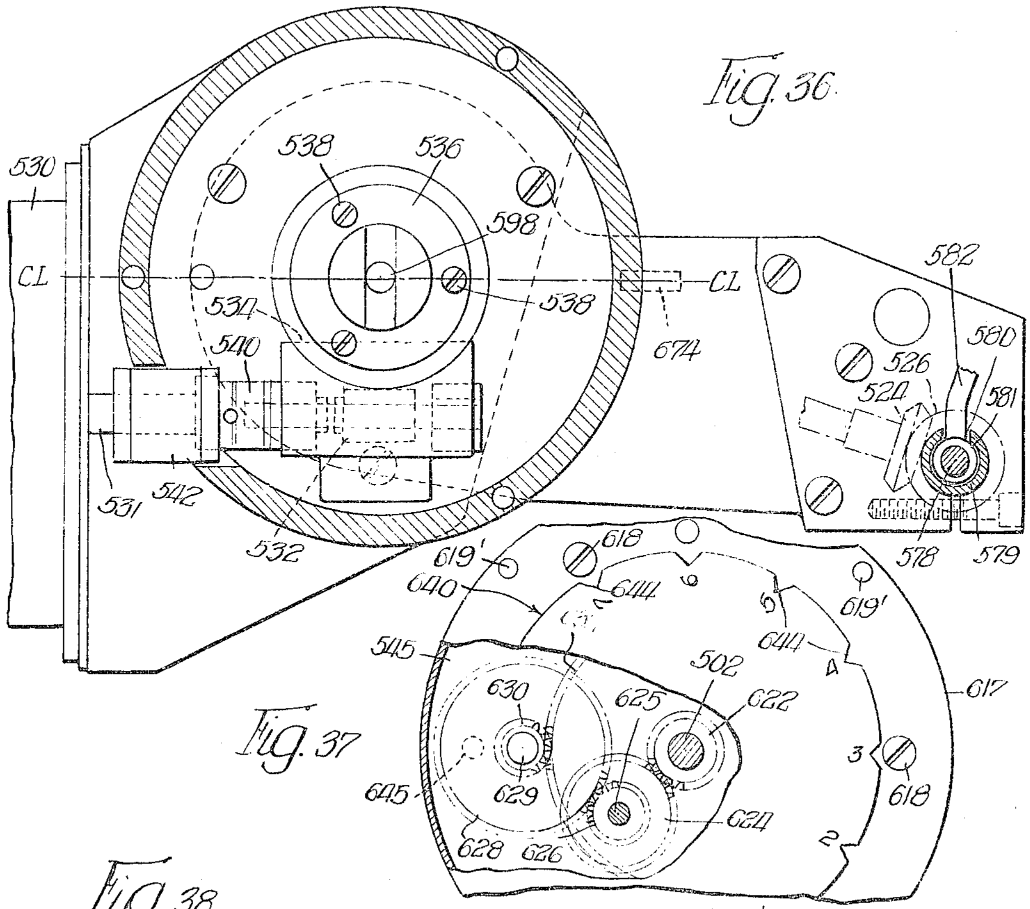
FIGURE 36 is a transverse sectional view through the encoder housing, showing the worm gear drive between the encoder axis and the reversible multi-speed motor which drives the encoder.
FIGURE 37 is a fragmentary end view of the point indicating dial at the right hand end of the encoder housing, a portion of this dial and the housing being broken away to show the speed reducing gear train which couples the point indicating dial with the pica indicating dial of the encoder.

The right hand end of the drive stud 591 has secured thereto by transverse pin 602 a clamping drive coupler 604 which has a split clamping sleeve extension 606 engaging over an extension dial shaft 502. The latter dial shaft may be considered as a synchronously rotating extension of the first dial shaft 501, except that this second dial shaft 502 may be manually adjusted angularly relatively to the first dial shaft 501. Any angular adjustments given to the second or extension dial shaft relatively to the drive coupler 604 may be firmly gripped in the split clamping sleeve 606 by the contraction of a split clamping collar 608 surrounding the split sleeve extension 606, which clamping collar is adapted to be contracted by a transverse screw 611. This second dial shaft 502 extends toward the right through a rotatable mounting hub 612, to which the pica code dial PID is secured by collar 613 and screws 614. Such mounting hub 612 has rotatable mounting in a hub 615 formed at the inner end of a gear housing 617 which is mounted within the right hand end of the cylindrical encoder housing 545. This gear housing 617 is secured by screws 618 to a disk-like end head 619 which closes off the end of the housing 545, being secured thereto by screws 619′ (FIGURE 37). The rotation of the second dial shaft 502 revolving synchronously with the first dial shaft 501, is transmitted to the right hand pica dial PID through a speed reducing gear train 620. This gear train couples the outer end of the extension dial shaft 502 with the outer end of the mounting hub 612, and is located within the gearing housing 617 on the inner side of the cylindrical end head 619. As best shown in FIGURE 37, this gear train comprises a pinion 622 secured to the shaft 502 and meshing with a larger countershaft gear 624 mounted on a countershaft 625 projecting inwardly from the end head 619. The countershaft gear 624 drives a concentric pinion 626 which in turn meshes with another large countershaft gear 628 mounted on a second countershaft 629 projecting outwardly from an extension of the hub 615. This latter countershaft gear 628 drives a concentric pinion 630 which in turn drives a large gear 632 which is secured by screws 633 to the mounting hub 612 which mounts the pica dial PID.

The first pinion 622 of the gear train is associated with a spool 635 which extends through a central opening in the gear carrying end head 619 and has a collar against which is clamped a circular sight dial 640, held in place by an end nut 642. As shown in FIGURE 37, the periphery of this sight dial has twelve numbered notches 644 adapted to be read as they come into registration with a stationary index marker 645 provided on the fixed gear carrying end head 617. These twelve markings indicate the twelve points of each revolution of the point dial POD.

At a point midway between the two dials is mounted an exciter lamp or light source 650. Between this centrally located light source and each code dial there is placed an optical lens mounting block 651 mounting a system of lenses 652, which serve to focus the rays from the central light source 650 to a point or line approximately along the outside surface of each code dial, or that surface which bears the light blocking opaque areas. The exciter lamp 650 is mounted in a lamp mounting socket 654, which seats in a recess or counterbore 655 formed in the outer surface of a rectangular mounting plate 656. This mounting plate is secured to the back side of the housing 545 in a longitudinally extending position, and carries a removable cover 658 provided with a multiple socket terminal block 659. The two lens mounting blocks 651 are each of a rectangular outside configuration, and each is attached to base plate 656 by mounting screws 661, with the outer ends of said blocks closely fitting in a gauge slot 663 extending along the under side of the mounting plate 656. Similarly mounted rectangular photo-cell blocks 665 are located in the same gauge slot 663 by screws 667 at points beyond the code disks POD and PID. These blocks 665 house photo-cells 668 for the point dial POD, and 669 for the pica dial PID, each assembly comprising an accurately aligned row of photo-cells mounted in individual compartments extending radially with respect to its individual dial (see FIGURES 40 and 41). Each optical lens mounting block 651 is provided along its outer face beyond the lens assembly 652 with a light transmitting slit 670 (FIGURES 40 and 41) for transmitting a narrow beam of light from the lens assembly to this radially extending line of photo-cells.

The foregoing will be seen to represent an assembly which, by mutual alignment along a common center line CL (FIGURE 36) of the encoder housing 545 can be readily aligned along the center line of the dial shaft 501. This is done by accurately locating two closely fitting dowel holes 673 in base plate 656, which are then used as gauge points for locating the entire assembly on the center line of encoder housing 545, by receiving identically placed dowel pins 674 in the mounting surface 676 of the encoder housing 545.

Figure 39:
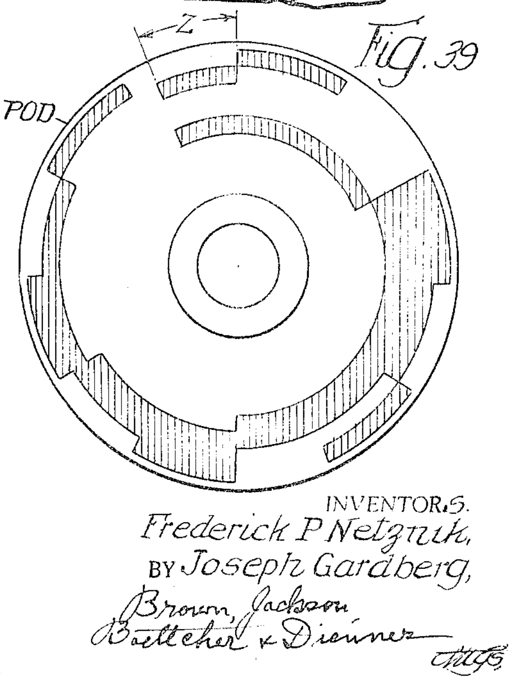
Figures 40, 41:
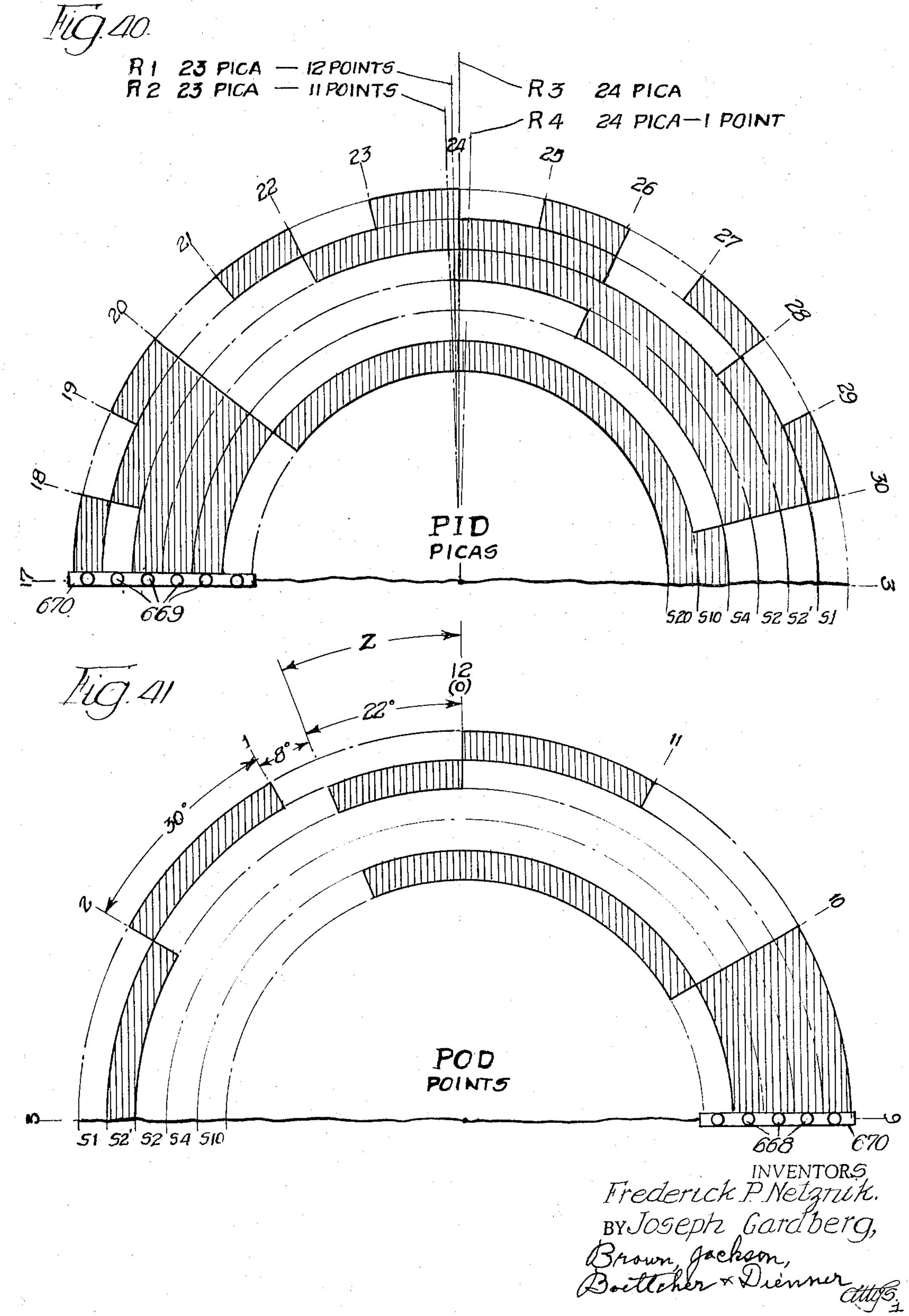
FIGURE 40 is a fragmentary front view of the pica indicating dial on a substantially larger scale, showing the operating relation between the opaque and light transmitting segments and the six photocells cooperating with this dial.
FIGURE 41 is a similar view of the point indicating dial showing the operating relation between the opaque and light transmitting segments and the five photocells cooperating with this dial.

Referring now to the dials (FIGURES 38–41), the point dial POD rotates once to represent twelve points (one pica), and therefore the pica dial PID is arranged to rotate relatively to the point dial POD at a ratio based on the arithmetic relation between the arc which defines a pica on the point dial (360°) and the arc which defines a pica on the pica dial (13°), in order to maintain reading relationship between the two dials. The pica dial PID never revolves substantially more than one revolution (360°) in either direction; i.e. it revolves in one direction through approximately one revolution while the saw is being driven down to its lowermost position, and it then reverses itself and revolves in the opposite direction through the same degree of rotation while the saw is being driven to its uppermost position. Referring particularly to FIGURES 40 and 41, the coding sequence of the dark or opaque areas on the two dials is as follows: 20–10–4–2–2′–1. The combination of these digit values is adequate to permit summation totals of 39 picas and 19 points. The capacity of the standard line casting machine is 30 picas and no points, and it will therefore be seen that the above summation total of 39 picas and 19 points is adequate for such 30 pica standard line casting machine. Since 12 is the maximum point requirement, the 20 has been deleted from the encoding sequence on the point dial POD.

Each successive darkened segment beginning from the arc nearest the center of the disk, now has the following value sequence (starting first with the pica dial PID): S20 nearest the center; S10 the next arc; S4 the next, and so on until the outermost arc on each dial becomes 1. Remembering that 20 has been deleted from the point encoder dial POD, the result is that 6 arcs are required for pica encoding on pica dial PID, and 5 arcs are required for point encoding on point dial POD. It follows then that since one photo-cell is required to sense the presence or absence of light at each arc or radial number level, six photo-cells 669 are required for the pica dial PID, and five photo-cells 668 are required for the point dial POD. Each photo-cell by its radial distance from the center line of the dials, therefore defines a coded numerical value; i.e., the photo-cell nearest the center of the pica dial PID defines 20, the next 10, then 4, 2, 2′ and 1. This will be later described in the electric circuit portion of the disclosure.

The beam of light being transmitted through each of the two lens systems slits 670 produces a substantially rectangular pattern of light in the order of .020 to .030 wide and about 11/16″ long. This rectangle of light impinges along the approximate center line of each row of photo-cells, when unimpeded by an opaque (or non-light transmitting) section of the code dial. If all photo-cells are darkened, the arithmetic sum of their individual values is indicated. If, as an example, the 10 photo-cell; 4 photo-cell and 2 photo-cell are darkened, a position of 16 (the sum of 10+4+2) is indicated. It will be seen that by ascribing unique values for each series of segments (or dark areas), exact sensing of the position of each dial provides a means of constantly determining the position of the saw and attendant functions at all times in picas and points—i.e., the measure of the length of the slug.

Figure 38:
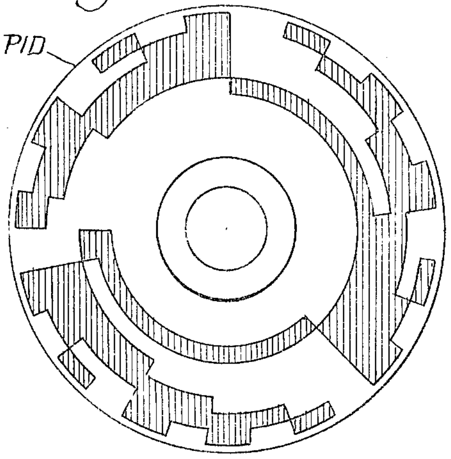
FIGURES 38 and 39 are front elevational views of the pica indicating dial and the point indicating dial respectively, showing the opaque segments on the transparent bodies of these dials for blocking the transmission of light to the photocells.

We shall now describe our improved marking and operating relation of the two dials, devised to insure that no ambiguity can result from mistiming of the two dials, whereby uniform accuracy from the dials is maintained throughout the entire operation of the mechanism. FIGURES 38 and 39 illustrate each of the pica and point dials in its entirety, and FIGURES 40 and 41 illustrate on a substantially larger scale those related portions of the two dials which cooperate to avoid the ambiguity which would otherwise arise in the sensing performed by the two dials, particularly at the transitional point where the pica sensing passes from one pica unit to the next pica unit. The apparatus provides a method of reading coded sectors on a transparent dial, through which a beam of light is passed or obstructed. The basic feature of the apparatus is the final reading of all new information on one dial, while the second dial supplies only the rough increment. With this feature, no attempt need be made to transfer the final reading from one dial to another.

An understanding of the operating relation between the two dials will be facilitated by first assuming that the dials have their perimeters divided into mathematical measurements or values instead of picas and points. For example, let us assume that the first dial PID is graduated in inches, wherein each of the 28 graduations denotes one inch. Let us also assume that the second dial POD is graduated in .100 inch increments (one hundred thousandths of the graduations on the first dial PID). Each of the graduations on the second dial POD then has a value of 1/10 of the graduation on the firts dial PID. With a conventional or ordinary system, the rotation of one inch on the first dial PID would be read to denote one full revolution of the second dial POD. This would necessitate making a transition from the second dial POD to the first dial PID to read even inch measures or dimensions.

Referring now to the pica and point graduations, FIGURE 40 shows even pica graduations applied to the first dial PID instead of inches, and FIGURE 41 shows point (1/12 pica) graduations applied to the second dial POD. In such case, the first or pica dial PID would provide the rough graduation, and the second or point dial POD the fine graduation. The same disadvantage of reading the edge of the pica graduation for even measures would apply.

Since a range in the order of 26 picas is required on the pica dial PID, and since a pica has a decimal equivalent of .16608, to achieve .001 (one thousandth) positional accuracy, the pica dial PID must provide a reading accuracy of 1/166 of the pica graduation. In the present installation, a pica graduation is 13°. Dividing 13° by 166 gives an angular tolerance of .0783° or 0°4′42″. The point dial POD has 12 graduations of 30° each. Since a point has a decimal equivalent of .01384, to achieve .001 (one thousandth) positional accuracy requires approximately 1/14 of 30°, or 2.1739°, or 2°10′ (approximately). The foregoing demonstrates that for an equivalent error the point dial POD is 2.1739/.0783 or about 26 times more accurate than the pica dial.

Obviously, the points on the second dial POD will provide greater positional accuracy than the picas on the first dial PID, provided the final reading can always be derived from the first dial PID, and the second dial POD can be used only for defining the range or area of a given reading. This has been accomplished in the following manner described in connection with FIGURES 40 and 41. It will be seen from FIGURE 41 that the 360° circumference of the point dial POD is divided into twelve even sectors of 30° each, numbered from 1 to 12, corresponding to the number of points measure that there are in each unit pica measure. It will also be seen from FIGURE 40 that the circumference of the pica dial PID is divided into pica sectors numbered somewhere between 17 and 30. Referring back to the point dial POD, it will also be observed that the 12 marking on the point dial POD is synonymous with the 0 or 00 marking, i.e. with respect to the succeeding 1, 2, etc. markings. Interposed between the 12 graduation (also the 0 or 00 graduation) and the 1 graduation is a shortened thirteenth reading sector designated Z. This thirteenth sector begins at the former 0 and 12 position and continues in the direction of the 1 graduation through an angular distance of only slightly more than one-half of the regular 30° sector, this shortened sector being preferably of approximately 22° angular span. The point dial POD will now read all points from 1 through 11 for a normal arc of 30° of angular rotation. Instead of following 11 with 00, the graduation 11 will be followed by the graduation 12 for a distance beyond 0 or 00 of less than the full 30° of angular displacement between 0 and 1. The reading system is now entirely a function of the more accurate point dial POD. The pica dial PID now provides only the "back ground" or "area" dimension or measure.

The reading method must now follow the following pattern for, let us say from 23 pica and 3 points to 24 pica and 2 points:

| No. | Measure | Reading (Tape) |
|---|---|---|
| 1 | 23 pica 3 points | 2303 |
| 2 | 23 pica 4 points | 2304 |
| 3 | 23 pica 5 points | 2305 |
| 4 | 23 pica 6 points | 2306 |
| 5 | 23 pica 7 points | 2307 |
| 6 | 23 pica 8 points | 2308 |
| 7 | 23 pica 9 points | 2309 |
| 8 | 23 pica 10 points | 2310 |
| 9 | 23 pica 11 points | 2311 |
| 10 | 24 pica 00 points | 2312 |
| 11 | 24 pica 1 point | 2401 |
| 12 | 24 pica 2 points | 2402 |

This demonstrates a typical reading method which must be followed throughout to provide maximum accuracy.

In setting the angular relationship between the two dials, no attempt need now be made to make a transition from 11 to 0 on the point dial POD at the same instance that a change from one to the next succeeding pica is made. This transition is now made by shifting the even pica position from the 12 position to a point much nearer the 1 position of the point dial. The transition from pica to pica now takes place after the 12 point (the even pica position) has been read and passed, and before the 1 position on the point dial has been attained. Since this is never a change made from one dial to the other at an exact, readable or usable measure or position, no ambiguity can result from mistiming of the two dials and uniform accuracy is attained throughout.

Referring to FIGURE 41, the code sectors for the number 12 which will denote all even pica measures are designated on the point dial POD as *s*2' and *s*10.

Referring now to the radially extending markers adjacent to the 24 pica measure in FIGURE 40, the relative position of the pica dial PID when reading an even measure at 24 pica is illustrated at R1. The relative position of the pica dial when reading 23 pica and 11 points is illustrated at R2. The 24 pica graduation shown at R3 illustrates the relative position prior to which the 12 point reading must have been terminated. Following this, and before the 1 point position of the point dial has been attained, the pica dial must have detected the succeeding pica measure.

Our encoder mechanism utilizes the improved relation of clamping collars 504, 576, etc. to simplify the setting or adjustment procedure of the three individual functions controlled by the encoder unit, which adjustment procedure is preferably as follows:

Using the manual control of the drive motor 530 as well as the fine adjustment by hand, with both collars 504 and 576 locked, position the saw at 15 picas (14 picas and 12 points). Verify this position by accurately gaging the length of a finished slug. Disconnect drive collar 503 by loosening the clamping collar 504. Re-position with manual control until the jaw position is set and verified with a 14 pica 12 point slug. Now, disconnect the clamping collar 576 on jaw drive collar 575. Place a 14 pica 12 point tape in the tape reader and cause the encoder to drive to a null at 14 picas and 12 points. All three components are now at the same setting and the machine is properly timed. Now, lock both collars 504 and 576; concurrently therewith, the externally reading point dial 640 can have its numbered notches 644 adjusted relatively to the stationary index marker 645 by loosening the nut 642 and turning the point dial relatively to its drive shaft 502, and to the index marker 645.

Figure 7:
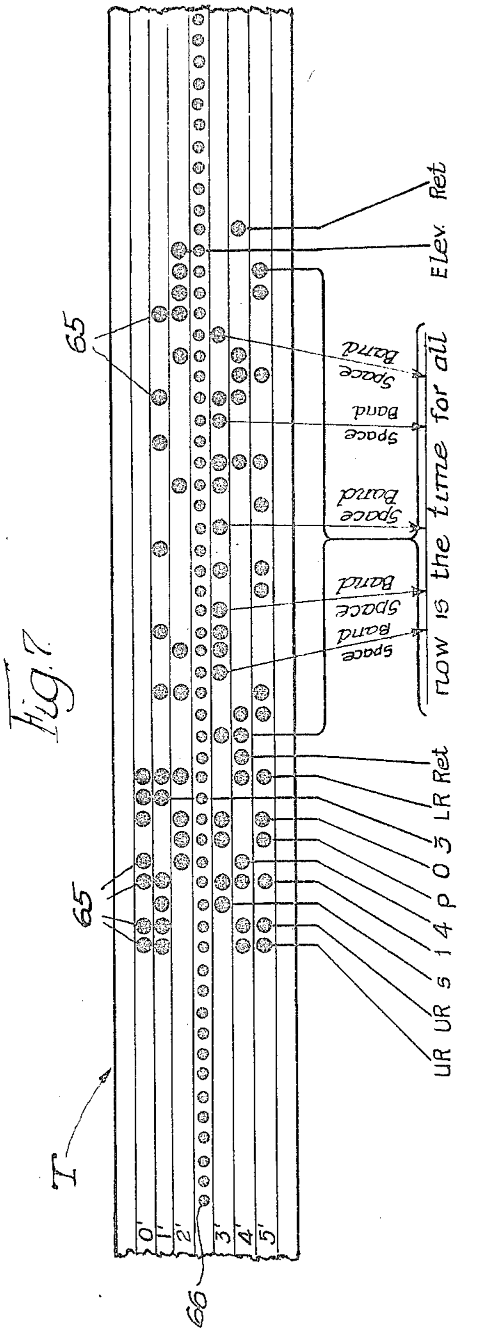
FIGURE 7 is a fragmentary elevational view of a portion of a six level tape, showing the operating significance of the UR (upper rail) and LR (lower rail) code signals with respect to the intervening measure signals indicating the length of the coded slug in picas and points.

Referring now to FIGURE 7, which illustrates typical code signals in the perforated tape T, which result in the supplementary or secondary operation of sawing the type slug to length, it will be seen that two successive upper rail signals (UR—UR) result in the selector mechanism SM moving the blocking bar X to blocking position. These two upper rail signals UR—UR are followed by the letter "*s*" for "saw," which operates through the code switch CSW to denote that the supplementary or secondary operating function next desired at this time is the sawing of the cast type slug. The next two digits designate the value of the pica measure, in this case a 1 and a 4 for a 14 pica designation, these further operating through the code switch CSW. This is followed by the letter "*p*" that serves as a separator between picas and points in the controller; and following "*p*" two more digits occur, in this case a 0 and a 3 which denote a point value of 03, the latter three signals also operating through the code switch CSW. The next code signal is "LR" for "lower rail." This restores the TTS operating unit to its normal operating condition by removing the influence of the blocking bar X from the push bar assemblies PB–PB'. The next signal on the tape is the return signal "RET," which signifies a return or restoring of the perforating machine, similar to the returning of the carriage on a typewriter, and is not to be confused with any TTS or linecasting machine or saw function.

The next operations in the sequence are the setting of the line of type characters themselves, illustrated in FIGURE 7 by "now is the time for all," etc., denoting any typical line of type which is to be sawed at a slug length of say 14 picas, 03 points. It will be understood that between successive words, space bands will be dropped in response to space band perforation in row 3' of the tape. This line will be followed by an elevate signal "Elev." The elevate signal will permit the elevating of the line, provided that the encoder drive motor 530, which begin operation immediately following the receipt of the last code digit, in this case the 3 in points, has halted its rotation. That is to say, if null has been attained and the elevate signal has been received from the tape, and the prior type slug has been release and delivered by the delivery regulator DR, pursuant to a slug sensing at the slug detector zone SDZ, we would then restore the delivery slide DS, link 407, and delivery lever 404 to the right. That is to say, having attained the null with the drive motor and having received the elevate signal from the tape, these two conditions serve to close the series circuit to the elevate solenoid ESO, and additionally, the movement of the delivery lever 404 will trip the main clutch 380 and thereby cause the delivery slide push rod 290 to shift toward the right and return the now closed split fork SF to full right hand position (FIGURE 31D). As a result, the elevate cycle is caused to occur by virtue of the fact that the eccentric 284 affixed to the floating lever 280 pushes sidewise against the elevate clutch tripping device 286.

The foregoing describes the sequence that will occur if the line of type is of a long length. In other words, the encoder motor 530 has been driven to a null before the full line length has been received, and of course the elevate signal always follows the setting of the line. But let us assume that the line length to be set in relatively short, for example, it has just the three letters "now"; and further assuming that we had previously set up a condition where 16–03 was the line length, and that the saw is now setting at 6 pica, it will be seen that we now have a fairly long drive condition for positioning the saw, but a very short typesetting condition. In this situation the elevate signal will be received prior to the time that the encoder motor 530 stops driving. In such a situation, the elevate signal will do nothing further than close the elevate switch ESW. This elevate switch will complete part of the series control circuit to the elevate solenoid ESO, but it will be recalled that the completion of this series control circuit requires as well the stopping of the encoder drive motor (i.e. the dropping out of the 4R relay subsequent to a null), in order to energize the elevate solenoid ESO. Accordingly, in this situation, we will not elevate the line because the drive motor 530 is still in operation, and hence there will be no malfunctioning in the cycle. The short line will be set, the long drive sequence will follow, the drive motor 530 will continue to drive for some time, and when it finally does come to rest we will get the next closure or completion of the series control circuit that is required to energize ESO solenoid, whereupon the elevate operation will occur. All of this is subject, however, to the requirement that the sensing of the passage of the prior slug had allowed the delivery regulator DR to release the delivery slide DS, and in following that sequence that the delivery arm 404 had returned to the right hand position, again achieving the condition shown in FIGURE 31D.

Now let us assume that the opposite condition exists, wherein we have a very short measure change, and a relatively long line to set. Let us assume that the saw is setting at a 14 pica and 11 point position, and that the new measure is 14–12. The code sequence follows, as previously described, and as soon as the two points come into the reading register, the 4R relay will pull in and the saw motor 530 will begin to drive. However, the drive cycle will now be very short, probably only two seconds or three seconds long, because only one point change is involved. Concurrently therewith, let us assume that the setting of the 14–12 line requires approximately 9 seconds. Thus it will be seen that before the setting of the line is finished, the saw will have arrived at its cutting position, and the drive of the saw motor 530 will have stopped. Thereupon, the elevate signal will occur, because the elevate signal will follow the setting of the line length regardless of how long or short it is. The energization of the elevate solenoid ESO must always await the arrival of the second signal, which in this case is the signal from the drive motor 530. Of the two signals, one from the elevate switch ESW, and the other from the motor and null detector, it makes no difference which arrives first; because it requires both electrical signals to energize the elevate solenoid ESO, without which the line can not be elevated. Furthermore, in every case the delivery regulator DR also has to be freed so that the casting cycle can occur, and so that the delivery arm 404 can return to the full right hand position to swing the floating lever 280 to the clutch engaging position, as shown in FIGURE 31D. It is very significant that the sequence in which these events occur does not make any difference in the overall operation, i.e. a short line, a long line, a short measure change, or a long measure change, does not make any difference. If any one of the above control conditions fails to occur: i.e. (1) the stopping of the electric motor 530 and the dropping out of the 4R relay indicating a null; (2) the closure of the elevate switch ESW in response to elevate signals in the tape; and (3) the release of the previous line by the delivery regulator DR, with return of the delivery arm 404 to the right—if any one of these control conditions malfunctions or fails to occur, the next succeeding type line will not be elevated.

CYCLE SWITCH—CYSW

It will be recalled from the preceding description that the so-called "elevate" cycle covers the first phase of the operation, wherein the matrices are first dropped into the assembler mechanism, with the space bands properly interposed therebetween, and wherein this line of matrices is then elevated up into the elevated position where it is picked up, or stands in readiness to be picked up, by the horizontally moving delivery slide DS—and that the so-called "casting" cycle covers the second phase of the operation wherein the delivery slide DS picks up this line of matrices and moves it over into sensing relation to the delivery regulator DR, which, if such regulator is in its proper clearing position (with the solenoid DRSO energized) will permit this line of matrices to move down into casting relation to the mold wheel, following which the cast slug is ejected by the ejector slide down the discharge chute past the photo-cell sensing apparatus SDZ, etc.

Figure 42:
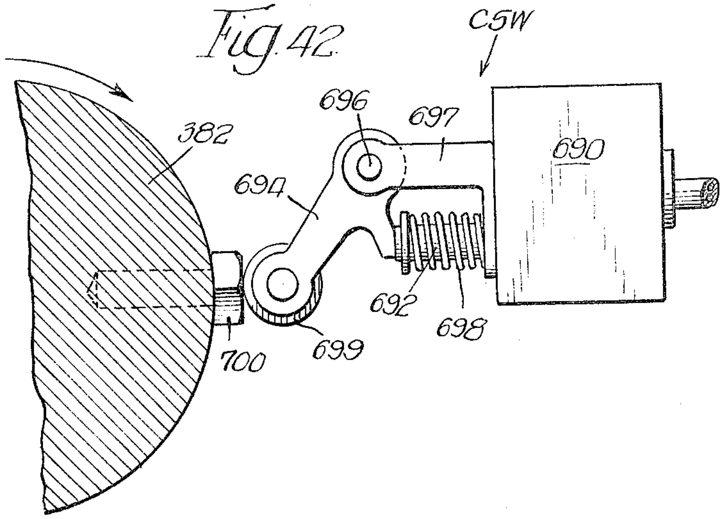
FIGURE 42 is a detail view of the cycle switch.

The above described elevated and casting cycles are made to operate in a timed or interdependent sequence through an automatically operating cycle switch CYSW illustrated in FIGURE 42 whereby to positively prevent any malfunctioning in the overall cycle. This cycling switch is of any simple construction, comprising a stationary housing 690 enclosing the switch contacts, which are moved to closed position by inward thrusting motion of plunger 692. Such inward thrusting motion is performed by a rocker arm 694 which is pivoted at 696 on a bracket 697 and which is normally urged in an outward switch-opening direction by spring 698. The swinging end of the rocker arm carries a roller 699, which responds to a cam protuberance 700 of relatively short dwell carried by the main cam shaft 382. This cam protuberance 700 may consist of a short hump fastened to the cam shaft, or may be in the form of the head of a bolt screwed into the shaft. The cam is so located around the cam shaft as to actuate the rocker arm and close the cycle switch CYSW when the cam shaft 382 is in its at-rest position. This cycle switch operates a cycle relay which has a contact set in series with the saw positioning motor 530, so that any time the line-casting machine is actually in the process of casting a line and the cam shaft 382 is revolving, with the cam hump 700 moved out from under the rocker arm roller 699, the open condition of this cycle switch will prevent the saw positioning motor 530 from running.

The elevate signal transmitted from the tape at the end of a line stops the operation of the tape reader TR; but thereafter the completion of the above elevate cycle automatically causes the selector shaft clutch SSC to engage and cause the tape reader TR to again resume reading the tape code. Since said elevate cycle starts the aforesaid casting cycle into operation, and said elevate cycle is completed before the casting cycle is completed, with the ejection of the cast type slug, and inasmuch as the next signal transmitted from the perforated tape may be a command to reposition the saw, the above saw positioning apparatus must be kept at rest until the line casting cycle is completed. This is a function of the present cycle switch CYSW. When the casting cycle begins the casting of a given line, the cam shaft 382 begins rotating, and revolves through a complete revolution. The initial rotation of the cam shaft opens the cycle switch CYSW, and immediately precludes operation of the saw positioning motor 530. Hence, the elevate cycle cannot take place until after the casting cycle has been completed with the full revolution of the cam shaft 382, thus positively avoiding the running of the saw positioner, once the slug casting cycle has begun by the movement of the cam hump 700 out from under the cam follower roller 699.

TAPE-OUT DOOR SWITCH—TOSW

Figure 43:
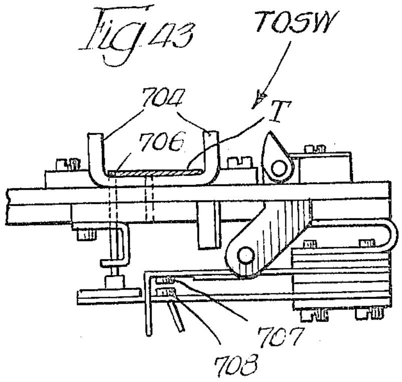
FIGURE 43 is a detail view of the tape-out door switch.

The Teletypesetter operating unit TU has its conventional tape-outdoor switch, shown in FIGURE 43, and designated TOSW. Such switch comprises the usual tape feed channel 704, the tape-out push pin 706, and the switch contacts 707–708 adapted to close when the push pin 706 is permitted to rise by the removal or lifting of the tape in the feed channel. This switch is connected through a relay with the reject solenoid RSO, whereby if there should be any operation of said tape-outswitch, occurring after a control condition has been initiated, such will energize the reject solenoid RSO and return the TTS operating unit to normal operating condition. The need for this feature may be illustrated as follows:

Assume that in signalling for a slug sawing operation, the code signals UR, UR have been transmitted twice, followed by S, and then a pica designation of let us say, 16 pica. If at this point a failure in tape feeding should occur, for any one of several commonly occurring reasons, requiring the removal of the tape from the reader, and if the operator thereafter failed to restore the tape to its exact same position in returning the tape to the reader, an incorrect measure or a failure to complete the next lines would result.

To prevent this, opening the tape door signals the energization of the reject solenoid RSO in the selector mechanism, as explained heretofore, thereby restoring the unit to normal operating condition and cancelling out the S and the 16 pica from the register.

The operator must now begin at or ahead of the UR–UR portion of the tape to continue functional operation.

SAW CONTROLLING LIMIT SWITCHES

Figures 32, 32A:
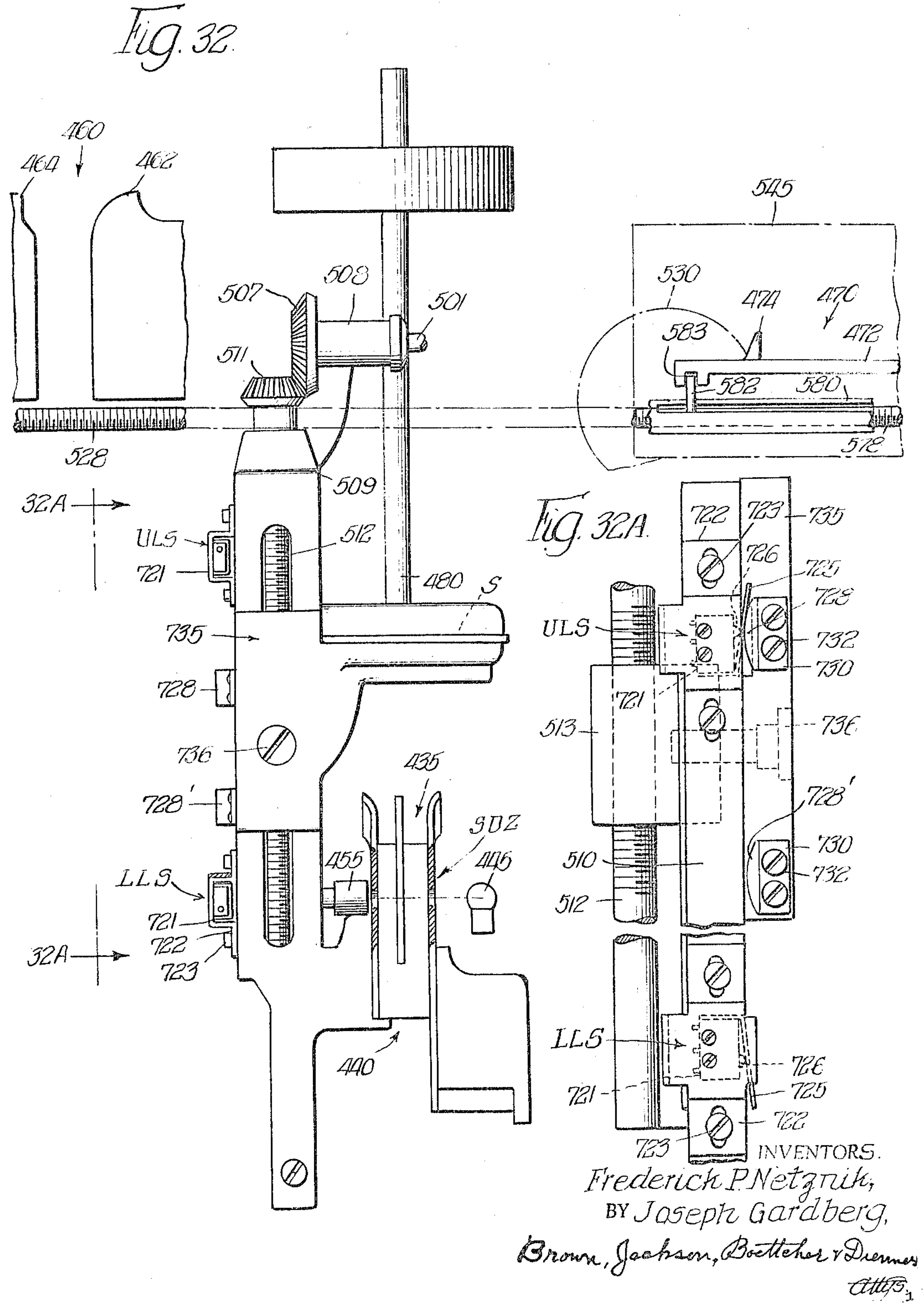
FIGURE 32 is a schematic view showing the operating relation between the slug cutting saw, the slug detecting zone, and the interconnections by which the saw, the vise-jaw apparatus, and the assembler mechanism are all adjusted simultaneously.
FIGURE 32A is an enlarged scale fragmentary detail figure, as viewed from the plane 32A—32A of FIGURE 32, showing the upper and lower limit stops for limiting the saw travel.
Figure 33:
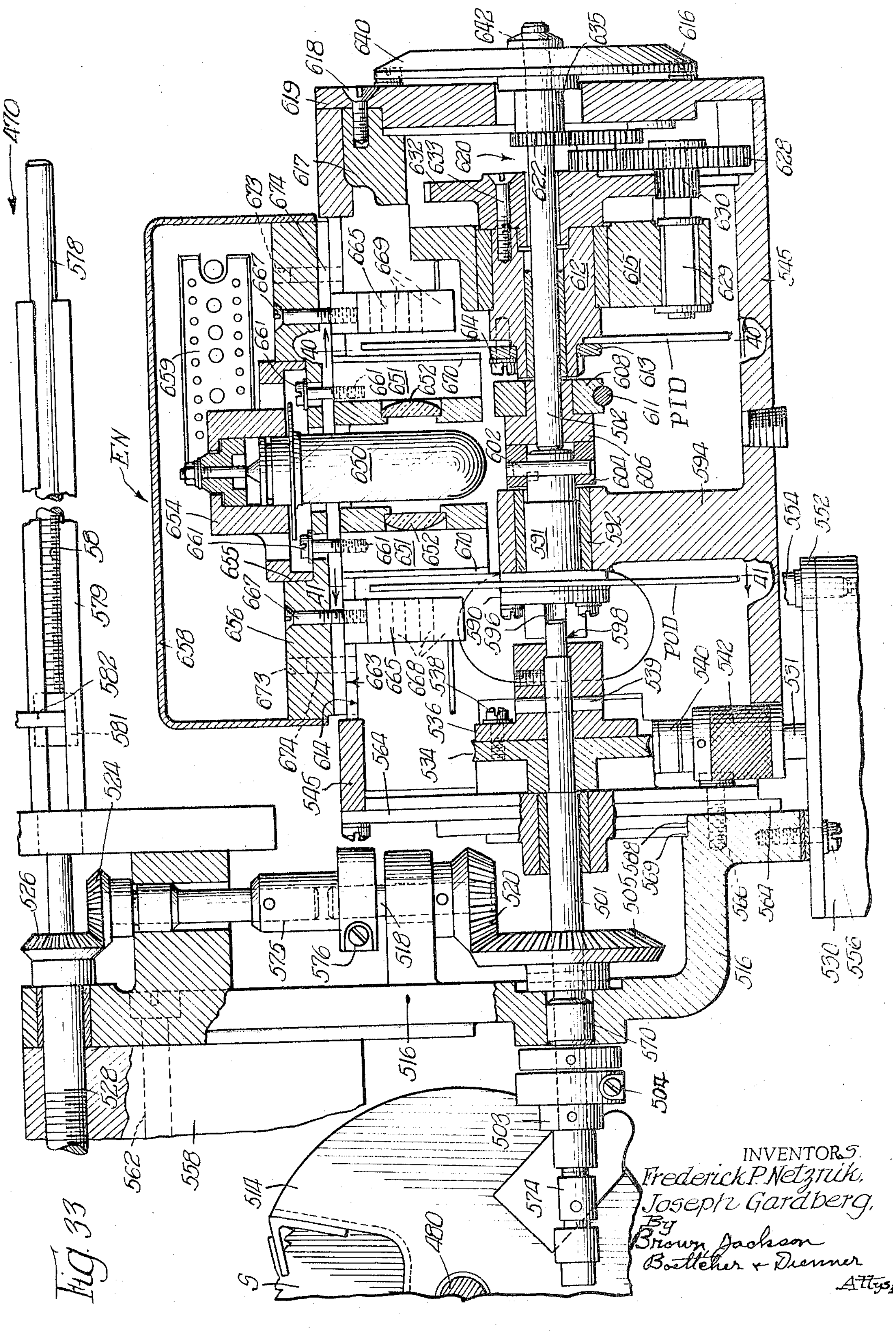
FIGURE 33 is a longitudinal sectional view through the encoder mechanism which electronically senses the position of the slug cutting saw at all times.

In FIGURES 32–32A, we have shown an arrangement of mechanically operated upper and lower limit switches which may be provided as a precautionary measure to prevent accidental over-travel of the cutting saw S in the operations of automatically raising and lowering the saw to its different slug cutting heights. The upper limit switch ULS and the lower limit switch LLS, both of the Mercoid or any other type, are secured to the left hand side surface of the saw mounting frame 510 in upper and lower U-shaped clips 721. These clips have slotted mounting lugs 722 secured by screws 723 to the frame 510, the slotted lugs 722 permitting vertical adjustment of each limit switch to permit any higher or lower limits of travel of the saw. Each of these limit switches has an angularly extending switch actuating arm or leaf 725 operative to thrust inwardly on a switch actuating plunger 726 for opening the limit switch when such arm or leaf is pressed inwardly by the associated upper or lower cam 728 and 728'.

These upper and lower limit cams 728 and 728' are in the form of arcuate lobes projecting from angularly shaped clips 730 secured by screws 732 to one side edge of a front slide plate 735 which is adapted to travel vertically along guide surfaces on the front face of the saw mounting frame 510. This front slide plate is fastened to the vertically traveling nut 513 by a front clamping screw 736 passing through the plate into the nut. Thus, the slide plate 735 and the upper and lower limit cams 728 and 728' move concurrently with the saw S through the traveling nut 513, whereby if the saw S should start to over-travel either the upper or lower limits of its intended travel, the corresponding limit cam will actuate the appropriate limit switch 728 or 728', thereby interrupting the operation of the saw adjusting and encoder drive motor 530.

Figure 44:
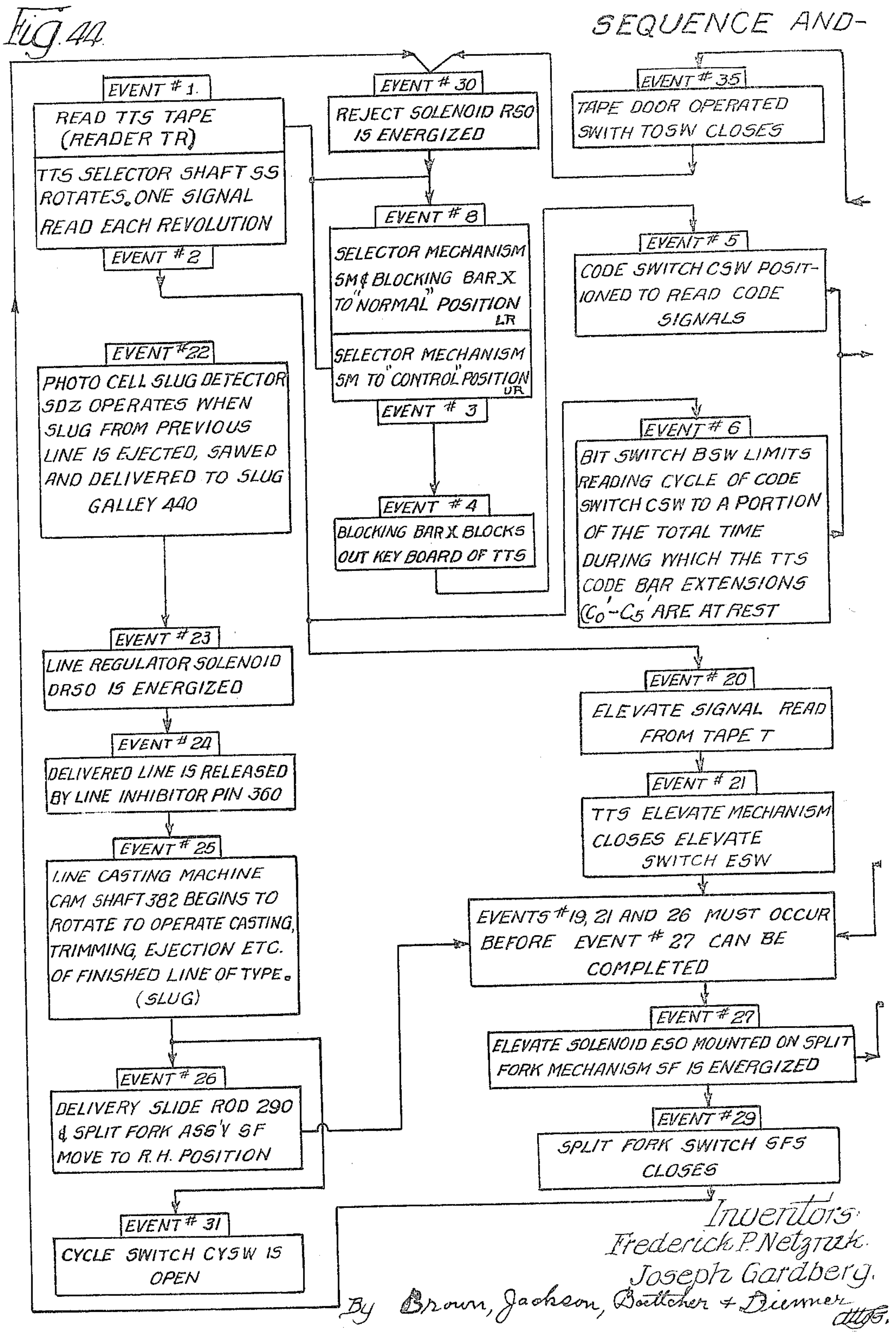
FIGURES 44 and 45 are the left and right halves of a chart entitled "Sequence of Events and Logic Diagram"; showing the sequence of events and logic for our new saw positioning system.
Figure 45:
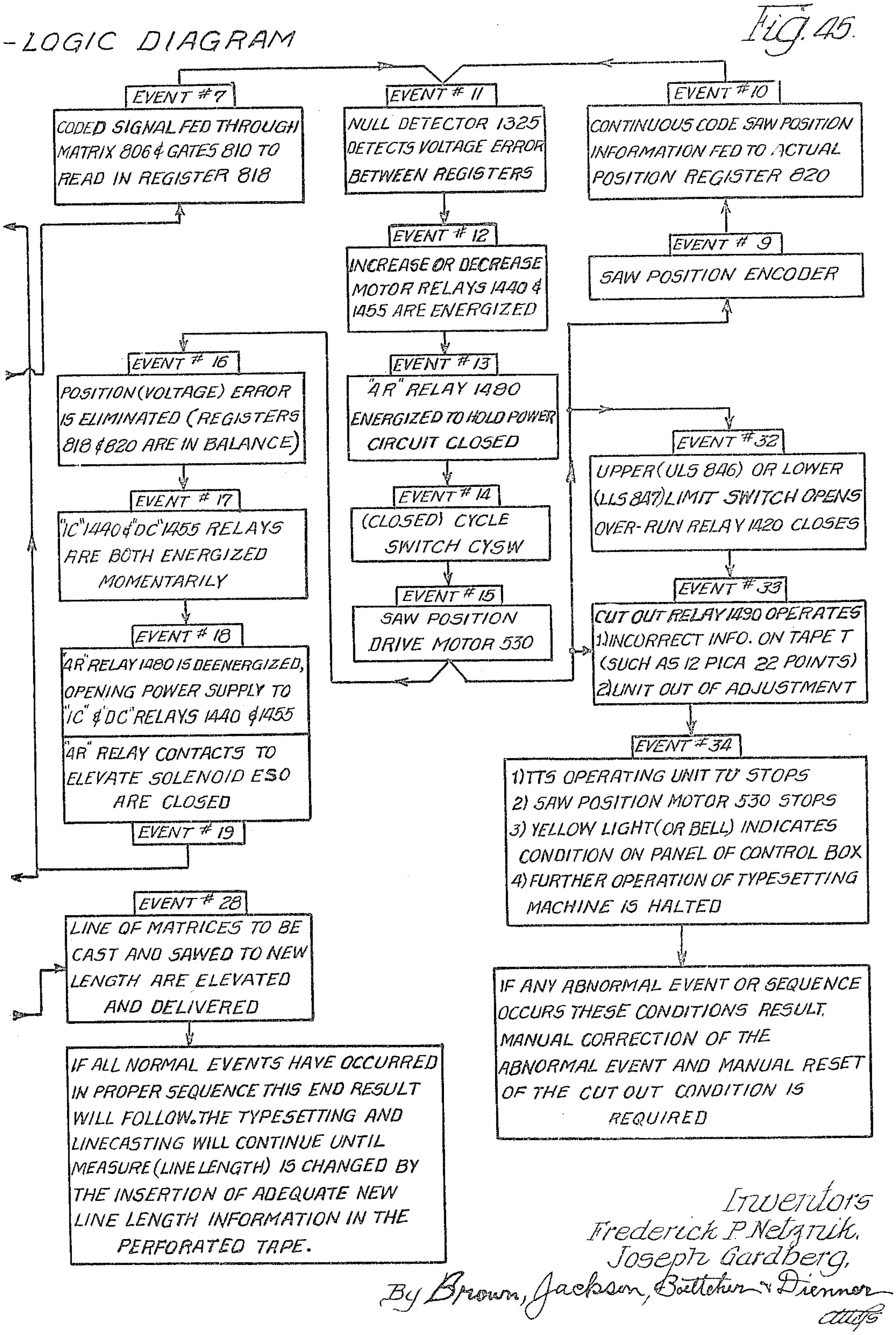

At this juncture, attention is directed to the "Sequence and Logic Diagram" shown in FIGURES 44 and 45. Such constitute a composite block diagram setting forth the sequence of events and logic for our saw positioning system. The operation of the equipment and circuitry occurs in the order indicated by the "Event" numerals associated with the individual blocks, and in accordance with the information contained in each.

ELECTRONIC CONTROL CIRCUIT FOR SAW POSITIONER

The specific circuitry for controlling the saw and saw positioner in the automatic sawing of each slug provided by the line casting machine to the desired length is now set forth in block form and FIGURES 46 and 47, and in more detail in FIGURES 49–57 when arranged according to the block pattern of FIGURE 48.

Preliminary to a consideration of the circuitry set forth in block diagrams 46, 47, it will be recalled that in normal operation of the equipment, tape member T is fed to the tape reader TR on the line casting machine and the sensing fingers 60 or plungers sense the perforations 65 on the tape T to provide a readout of the coded information on the tape. Assuming that the first code instructions received are for the purpose of effecting the production of a slug (see FIGURE 7, LR, Ret now . . . all, for example) the coded signals provided by the sensing fingers control the equipment to assemble the indicated line in the assembling elevator AE in known line casting machine operation. That is, as each code signal is sensed the six code bars 0–5 operate to select the character desired, such as *n, o, w,* and the selected code bars are thereafter triggered by a mechanical action to drop the desired character from the line casting machine magazine to the assembling elevator AE.

As the tape advances, the line is assembled in accordance with the signals provided by the tape. After the line is assembled, the elevate signal on the tape is read out and in normal operation the line would be delivered to the assembling elevator, thence to the delivery slide and the full cycle of casting, trimming and sensing to length. However, in the equipment of the present disclosure, such operation will be continued only after predetermined conditions to be described more fully hereinafter have occurred.

As indicated above, any time the saw setting is to be changed for a set of information signals on the tape T, a "command code" which indicates the position of the saw necessary to cut the resultant slug to the desired length precedes such information set on the tape. In the illustrated embodiment set forth hereinbefore, such signals comprise two successive upper rail signals UR–UR followed by the letter *s*. In the illustrated embodiment, the letter *s* denotes that the supplementary or secondary operating function next desired in the sawing of the cast type-slug. As will be shown hereinafter by the simple substitution of a different letter, such as the letter *k* in lieu of the letter *s*, the secondary equipment may be operated to produce slugs of different widths, etc. It will be readily apparent that the number of such secondary functions which may be provided is practically limitless, since in addition to the sixty odd functions which are available by reason of the sixty odd codes available in the secondary condition (UR, UR) additional selections may be made by using such codes in combinations of two or more, i.e., *ab*, *ac*, etc. Thus the provision of simple mechanisms for transferring the equipment from a first condition to a second condition by two signals UR, UR, makes possible limitless control of additional equipment without requiring modification of the existing keyboard equipment in comercial line casting machines.

As shown in FIGURE 7, after the function identifying letter, such as *s*, two digits designate the value of the pica measure of the slug length (in this case numerals 1 and 4 denote a value of 14 pica). The letter *p* follows to serve as a separator between picas and points, and thereafter two more digits occur, which in the illustrated example, comprise an 0 and a 3 to denote a value of 03 points. The next code signal is "LR" or "lower rail" which effects removal of the influence of the blocking bar from the push-bar assemblies PB, PB', to restore the operating unit to its normal operating condition. The next signal on the tape is a return signal RET which signifies the return or restoring of the perforating machine, and is not related to the operation of the line casting machine or saw function.

*Description of circuitry set forth in block form (FIGURES 46, 47)*

With reference now to FIGURES 46 and 47, the circuitry for effecting such manner of operation is set forth in block form thereat. As there shown a code switch CSW is operated by the tape reader equipment TR (FIGURES 1 and 2) as the tape T is moved therebeneath, such reader equipment being well known in the art. As previously indicated, the six unit code of the tape T affords a total of approximately sixty-four combinations aside from the further range made possible by the shift and unshift signals. As the tape advances to effect readout of the two upper rail signals UR–UR, the novel selector mechanism SM of the invention controls the blocking bar X to move from its normal type-setting position into its control or type blocking position. The blocking bar X remains in such position during the readout of any and all signals on the perforated tape T with the exception of the lower rail signal and of the elevate signal.

Further the code switch CSW is enabled to read the subsequent code signals which represent the saw command information. That is, as was shown in FIGURES 16–18, code switch CSWW comprises six pairs of upwardly extending contact springs CS0–CS5, there being one of these pair of contact springs for each of the six code bars 0–5. Simultaneous with the operation of the selector mechanism SM to move the blocking bar to the "command" position, a depending position arm 249 on blocking bar X is moved against arm 248 on panel 238 to thereby move the code contacts CS0–CS5 into operative position relative to the tape reader TR.

As noted previously, a bit switch BSW (FIGURES 46, 47) is provided to effect transfer of the signals which are set in the code switches CS0–CS5 by the taper reader TR to a matrix 806. Bit switch BSW and a bit switch gate 804 limit the reading cycle of the code switches to a portion of the total time during which the TTS code bar extensions C0'–C5' (FIGURE 16) are at rest. During the portion of the cycle in which the bit switch BSW (FIG- URE 46) closes, which is approximately forty percent of the rotation cycle of the selection shaft SS, the code registered on the code switches CS0–CS5 is fed to the diode matrix 806. The bit switch BSW insures that the signals on the contacts are read only during a portion of the time that the code bar extensions C0′–C5′ are at rest.

With the letter "*s*" registered on the code switches CS0–CS5 (the code UR, UR having shifted the equipment to the command position as described), matrix 806 transmits a reset signal to an S circuit 822 which removes the set signal from the circuit including command position register 818 preparatory to a saw positioning cycle in a manner to be more fully described hereinafter. Command position register 818 comprises a register circuit operative to store the "command" pica tens and pica units digits and the "command" point tens and point units digits as recorded on the tape member.

At the same time that the S circuit is energized matrix 806 also transmits an enabling signal to a counter 812 to advance the step counter to its first position.

As the tens digit of the pica count (1 in the present example) is read out by the code switch CSW, and as the bit switch BSW and bit switch gate 804 close in the next cycle of selector shaft SS, the code signals are extended to matrix 806. The matrix 806 converts the signal into a four bit information code, the counter 812 advances one step, and a set of converted signals which appear at the output of matrix amplifier 808 are directed by steering circuit 810 to the pica tens section of the command register 818.

As the tape advances, the second digit (4 in the present example) of the pica count is read out by code switch CSW and in the next cycling of the bit switch BSW matrix 806 advances counter 812 one step and with steering circuit 810 causes the pica units digit 6 in the converted code to be transmitted over matrix amplifiers 808 to the pica units section of the register 818.

With further advance of the tape the separator letter *p* is next transmitted to matrix 806, which in turn advances counter 812 a further step and transmits an enabling signal to the P circuit 813 and the counter circuit 812.

Thereafter, the point tens and point units digit (03 in the present example) are read out by the code switch CSW and matrix 806 controls the counter 812 and steering circuit 810 to effect the registration of the indicated value of the point "tens" and point "units" digit on the point-tens portion and the point-units portion respectively in the register circuit 818.

The "LR" signal which follows on the tape returns the equipment to the typesetting condition (i.e., the blocking bar "unblocks" and the advancing tape effects further typesetting operation even as the saw positioning is occurring).

It will be recalled that the system includes a novel encoder or converter mechanism EN including a pair of encoder dials POD and PID which are operative respectively with associated photoelectric cells 668 and 669 and a light source 650 to continually provide an indication of the actual saw position to a saw position register 820 in pica tens, pica units, and point tens and units representations.

As will be shown in more detail hereinafter, if the pica tens, pica units, point tens, and point units values on register 820 (which represent the actual position of the saw) correspond to the pica tens, pica units, point tens, and point units values respectively, on register 818 (which represent the command position for the saw) there will be zero output from the registers. An increase null amplifier 824 and a decrease null amplifier 826 connected to the register output control relay driver circuits 828 which in turn control increase relays 1470, 1440 and decrease relays 1450, 1455, respectively.

With zero output from register 818, 820 by reason of agreement of the command and actual positions for the saw, null amplifiers 824, 826 are in balance, and the relay drivers 828 will not enable the increase or decrease relays 1470, 1440 and 1450, 1455. Alternately, if the actual saw positions, as indicated on saw position register 820, is pica 10 point 01 and the command position marked on register 818 is pica 12 point 02, a signal will be transmitted to the increase null amplifier 824 and relay driver circuit 828 to increase relay 1470. After registration of the command, matrix 806 and steering circuit 810 to turn on the 4R control circuit 1479 and 4R relay 1480. If 4R relay 1480 is operated and if cycle relay 1475 is energized (i.e., the line casting operation is in the "at rest" position in which contacts 1495 are closed) increase relay 1440 operates and with H relay 1425 advances the motor in an increase direction to the desired position and continues in an "overshoot" operation. As will be shown in more detail hereinafter, the register circuitry 818, 820 then calls for a decrease, and null circuits 826, 828 operate decrease relays 1450, 1455 to operate the motor 530 in a decreasing direction. A slight overrun is now effected in the decreasing direction and the circuitry operates to effect an increase requirement. During the decrease cycle NR relay 1435 operates and prepares H relay 1425 for release during the subsequent increase operation. As the increase operation occurs and H relay 1425 restores, the motor is operated at a reduced speed to the requested measure, and is braked to a stop precisely at the command position.

If the original command marked on the registers had indicated the need for a decrease, the equipment would have driven the motor in a decreasing direction with an overrun, and the equipment would have operated as described above to operate the motor at a slow speed in an increase direction to the requested measure.

As will be shown, the 4R relay circuitry in addition to insuring that the saw positioning is effected only after the entire command has been transmitted to registers 818, 820, is also operative to inhibit the bit switch gate 804 to prevent further signals from being fed to diode matrix 806 during the positioning of the saw.

In the event that the saw positioning motor is operated beyond predetermined limits by the increase or decrease relays 1440, 1455, an increase limit switch 846 (ULS) or decrease limit switch 848 (LLS) will energize overrun relay 1420 which will deenergize the increase or decrease relays as the case may be. The OR relay will then energize the opposite relay to automatically restore the saw within its operating limits. At this tme the OR relay also energizes the cut-out relay. Also if, incorrect information exists on the tape (such as 12 pica 22 points), or the unit is out of adjustment, or if repeated hunting occurs, cutout relay 1490 will be operated to interrupt the power to the saw motor 530, and also interrupt power from transformer 1499 to further prevent operation of the TTS reader. Additionally, an associated visual or audio alarm is energized and further operation of the typesetting machine is terminated.

As noted above, as the saw is moved to the command position, registers 818, 820 are brought into balance, and the null detectors 824 and 826 effect deenergization of the increase and dercease relays for a period of time greater than that preset for nulling switchover, the 4R relay 1480 will be deenergized to open the power circuit to the motor. Simultaneously, the 4R relay closes a circuit to elevate solenoid ESO if the elevate switch is closed, and S circuit 822 resets to transmit a reset signal to the register 818, counter 812 and P circuit 814, if the reset switch on the TTS unit is closed (as for example, if the unit is out of the normal position and not blocked).

At this time it is necessary for three events to occur before the circuitry effects further operation. The first condition, as described above, comprises the operation of the 4R relay to close one circuit to the elevate solenoid ESO to indicate to the system that a null condition has been detected, and in addition, the TTS reader must have detected the elevate signal on the tape and closed the contacts to the elevate switch (ESW). The delivery slide rod 290 and split fork assembly SF must have moved to the right hand position, as noted heretofore and shown in FIGURE 31D before elevate will be accomplished.

At such time as the three conditions have occurred, the elevate solenoid switch ESO mounted on the split fork mechanism is energized. An elevate solenoid ESO operates, the line of matrices to be cast and sawed to the new length are elevated and delivered, and line casting will continue until the measure of line length is changed by the insertion of new line length information in the perforated tape.

Digressing slightly, since perforator operators have been producing tape for typesetting in a particular pattern for many years on units which did not include the novel saw positioner of the present disclosure, it is necessary that the present unit work in a manner consistent with such patterns. By way of example, it has previously been the practice to obtain the desired upper rail by punching the UR key once, and, in the event the next line was also upper rail, the operator frequently did not bother to place the signal LR on the tape. Assuming there is no LR signal on the tape, as noted heretofore, the operating unit would seek to shift from the typesetting to the command position without warning to the operator. Since such condition could exist for some time before discovery, considerable unusable type matter would be produced. To avoid such mishap, a reject solenoid is provided which unblocks the machine any time the elevate solenoid is energized, and the split fork switch is closed. Since such operation ocurs at the end of the signals for each line the machine, if blocked, will always be unblocked after one line, and only one line of matrices would be unusable.

Also, as a matter of practice, perforator operators have for years been coding the desired upper rail by punching the UR key once or twice. That is, occasionally, if an operator is interrupted, even though only one UR punch was required, the operator to make sure, will simply punch the UR key a second time. Again, should a double UR be punched for such a reason, without suitable protection, the operating unit would be shifted from typesetting to the command position without warning to the operator. In the present arrangement, as the elevate signal effects operation of the elevate solenoid, and the split fork contact is closed during the elevate operation, the reject solenoid will operate to unblank the equipment. Again, only the one line of type is lost.

As noted above, the signal LR which normally appears after the set of signals for a line will control the machine to return to the typesetting position. However, if the operator inadvertently failed to place the signal LR on the tape, the equipment would remain in the "blocked" condition, and the equipment would not be able to respond to the subsequent typesetting information which appears on the tape. Again, by reason of the operation of the reject solenoid as the next elevation occurs, the machine is unblocked for response to the subsequent code signals on the tape, and only one line of type will be lost.

In a similar manner, if the machine is in the blocked condition, whenever the tape breaks or is out, and the tape information which next appears in the readout position is for typesetting purposes, the equipment will be prevented from providing the desired type selection. Accordingly, in the present ararngement whenever the tape breaks, or is out, the tapeout switch TOSW closes a circuit to the reject solenoid, and the machine will be unblocked at the end of the line and only one line will be lost.

SPECIFIC DESCRIPTION OF CONTROL CIRCUITRY

*Code switches, bit switch and bit switch gate (FIGURES 49, 50)*

It will be initially recalled that as the first two codes UR, UR of the tape data relating to the saw command information are received, the blocking bar X is operated to block out the keyboard of the tape reader TR (FIG. 1). As the tape advances, subsequent characters of the command information on the tape are read out by contacts CS0–CS5 (FIG. 49) and transferred to matrix 806 by the bit switch GSW and bit switch gate 804, it being recalled that the bit switch BSW is operated once during each revolution of the selector shaft and is closed for only a portion of the total time during which the code bar extensions are at rest. The specific manner in which the signals are transferred from the tape to the matrix 806 is now set forth hereat.

Figure 49:
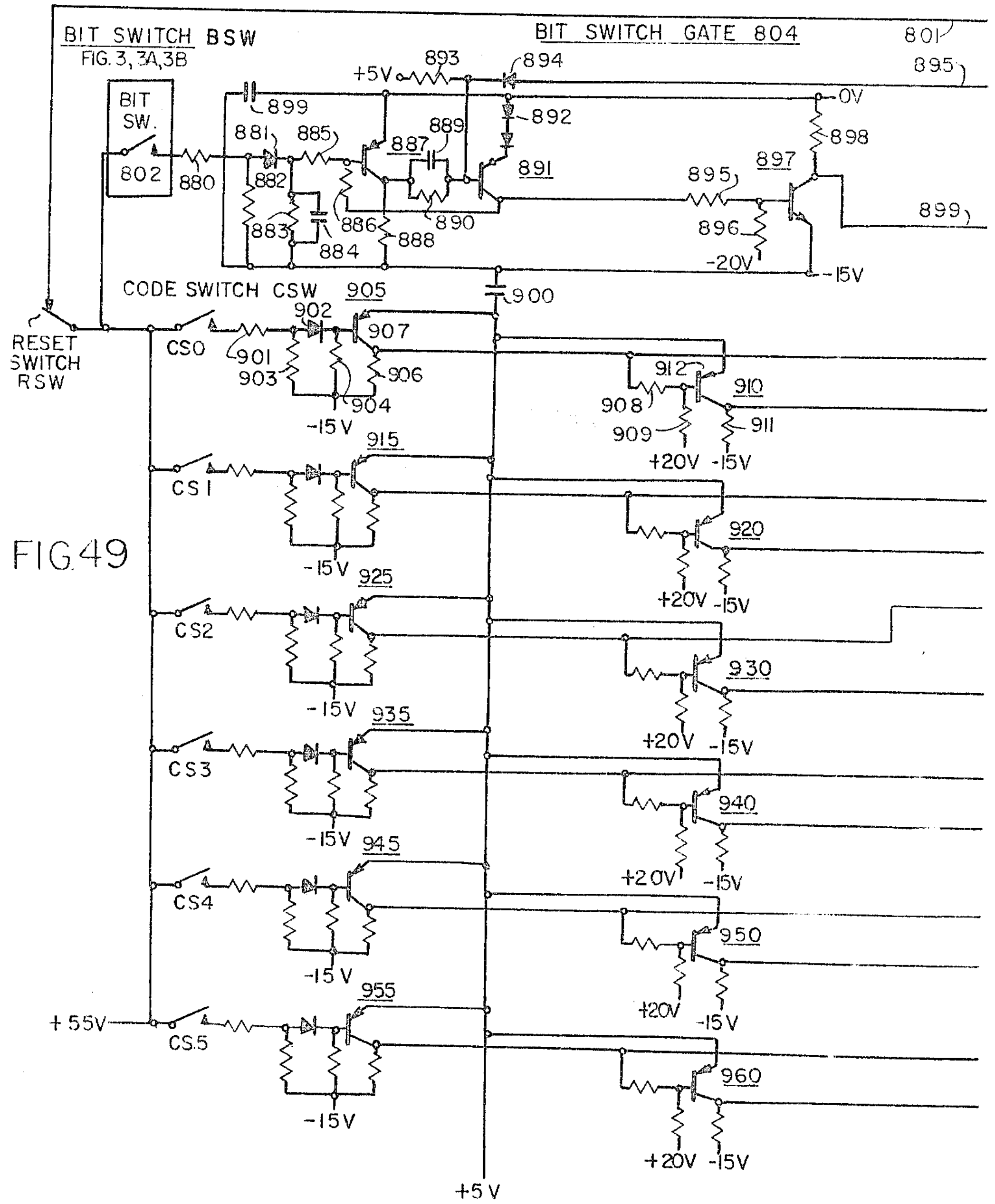

With reference first to FIGURES 49 and 50, the circuitry there shown includes a reset switch RSW, a bit switch BSW, a bit switch gate 804, a code switch CSW including contact springs CS0–CS5 and associated code switch amplifiers 905–955, which control the signal input from the contacts CS0–CS5 to matrix 806.

Reset switch RSW comprises a normally closed switch which prepares a reset circuit by connecting positive 55 volt potential over reset conductor 801, reset off switch 1478 (FIGURE 51), contacts 1484 (FIGURE 52), a conductor 1245 (FIGURES 57, 56) to S circuit 822 which, as will be shown in more detail hereinafter, responsively resets the register 818, control circuit 812, S circuit 822, and P circuit 813. For testing purposes, reset off switch 1478 may be operated to the open position to hold the information on the register 818, counter 812, S circuit 822 and P circuit 813 even though the relay 4R restores to initiate a reset action.

Code switches CSW include contact springs CS0–CS5 which are operative, as enabled, to transmit the particular code which is provided by the apertures in the tape on the tape reader to amplifiers 905–955. Enabling of the springs is effected, as described above, whenever blocking bar X is shifted into its blocking position by the selector mechanism SM. Each of the contact springs, such as CS0, for example, is connected over an amplifier circuit, such as 905, 910 to two associated conductors 0, $\overline{\mathbf{0}}$ in the matrix 806. Each of the other contact springs CS1–CS5 are connected over similar amplifier circuits 915, 920, etc.

With reference to the transistor 907 (FIGURE 49) in the first stage 905 for spring CS0, it is apparent that the emitter of transistor 907 is connected to +5 volt potential, the base is connected over diode 902 and a divider network including resistors 901, 903 to contact spring CS0, and also over resistor 904 to −15 volt potential, and the collector element is connected over resistor 906 to −15 volt potential. Transistor 907 is thus normally on and the potential on the 0 conductor which is coupled over conductor 0 to the matrix will be approximately +5 volts. With the closure of the associated contact springs, such as CS0, plus 55 volt potential is couplied to the circuit for transistor 907, transistor 907 is switched off, whereby conductor 0 is marked with −15 volts.

With reference to the second amplifier stage 910, it will be apparent that such circuit includes a transistor 912 having an emitter connected to +5 volt potential, a base connected over resistor 908 to the collector of transistor 907 and over resistor 909 to +20 volts, and a collector element connected over resistor 911 to −15 volt potential and also over $\overline{\mathbf{0}}$ conductor to the matrix 806. Transistor 912 is normally non-conducting, and as a result, the potential marking on the $\overline{\mathbf{0}}$ conductor to the matrix will normally be in the order of −15 volts, it being understood that the term "normal" refers to the condition in which the associated contact springs, such as CS0, are open.

With closure of contact sring CS0 and the coupling of a 55 volt positive potential pulse to the switching circuits 905, 910, transistor 907 will be cut off, whereby the potential on conductor 0 will become −15 volts, and transistor 912 in the second amplifier stage 910 will be turned on, whereby the marking on the $\overline{0}$ conductor will be changed to approximately +5 volts.

The manner in which the other contact springs CS1–CS5 are operative with their associated amplifier circuits 915, 920 . . . 955, 960 to mark the matrix conductors 1, $\overline{1}$ . . . 5, $\overline{5}$ in accordance with the open or closed condition of the contact springs CS0–CS5 will be apparent therefrom.

The contact springs CS0–CS5 respond to the information on the tape as it moves through the tape reader, and the bit switch closes for only forty degrees of each revolution of selector shaft SS. Bit switch BSW during such period closes a circuit to bit switch gate 804 which enables matrix 806 to recognize the markings which are registered on the contact springs CS0–CS5. Such operation is subject to the absence of an input inhibit signal on conductor 895, which as will be shown, is operative as energized to prevent receipt of further information by the matrix 806 until the previously registered information has been erased therefrom.

Bit switch gate 804 basically comprises a wave-shaping circuit including resistors 880, 882 (which is connected to −15 volt potential), a diode 881, a filter network 883, 884 and an input resistor 885 which is connected to the base of switching transistor 887.

Transistor 887 includes an emitter element connected to a zero volt potential conductor, a base element connected over the above described input circuit to bit switch 802 and also to the collector of transistor 891 through resistor 886, and a collector connected over resistor 888 to −15 volt potential. Transistor 887 as thus connected is normally conducting, and thereby effects the provision of a more positive signal over capacitor resistance network 889, 890 to the base element of a second switching transistor 891.

Transistor 891 includes an emitter element connected over a pair of diodes 892 to the zero volt conductor, a base element connected to the output circuit of transistor 887, and also over resistor 893 to +5 volt potential source, and over diode 894 to the input inhibit lead 895, and a collector element connected over resistor 886 to the base of the switching transistor 887. In the normal condition, that is, with the bit switch BSW open, transistor 891 is turned off.

The collector of transistor 891 is also connected over resistor 895 to the base of a third switching transistor 897 which is connected over bias resistor 896 to a −20 volt potential source. Emitter element of transistor 897 is connected to −15 volt potential and the collector element is connected over resistor 898 to zero volt potential. With the bit switch open, the transistor 897 is off and a 0 volt potential is extended over conductor 899 to the control or enabling lead for matrix 806.

Summarily, with the bit switch BSW open, transistor 887 is on and transistors 897 and 891 are turned off and the vertical conductors are marked with zero volts. When the bit switch BSW closes during the preassigned forty degree segment of a cycle of selector shaft SS, the resultant pulse which is coupled over the input circuit turns off the first transistor 887 which in turn controls transistors 891 and 897 to turn on. As transistor 897 turns on, the potential on the control lead 899 for the matrix 806 is changed to approximately −15 volts, and as will be shown, the signal outputs provided by the code switch CSW and associated amplifiers 905, 910 . . . 955, 960 will effect marking of the one of the vertical conductors which is associated with the digit represented by the code on the tape.

As will now be shown, matrix 806 (a) converts the six-bit incoming signals which represent the digits on the tape, (b) advances the counter 812 one step for each received digit to control sequencing of the circuitry, and (c) feed the signals representing the characters S and P into the S and P bistable circuits 822 and 813 to assist in the circuitry sequencing.

With specific reference to FIGURE 50, matrix 806 as there shown comprises a plurality of vertical conductors, each of which is assigned to represent a predetermined number or character of the group 1–0, P and S. If additional secondary functions such as automatic adjustment of the mold discs or automatic adjustment of the knife block etc., are to be represented in the device, additional vertical conductors M, K would be included in the matrix, each of which would have its own preassigned code and corresponding connections.

The upper ends of the vertical conductors are connected to the output of bit switch gate 804 which as noted above is the enabling conductor for the matrix 806. Above each of the vertical conductors appears a legend which identifies the markings which are applied to the code switch contacts CS0–CS5 whenever the digit represented by the vertical conductor occurs on the tape. As will be seen with bit switch open, zero potential on the enabling conductor 899 and the vertical conductors of matrix 806, the cathode element of each matrix diode is at zero volts, and the anode of diodes connected to horizontal conductors 0, 1, 2, 3, 4, 5 are at +5 volts, and the diodes, such as 977, conduct. As long as any one diode, such as 977 connected to a vertical conductor in the matrix conducts (+5 volts on the anode), the lower end of the vertical conductor will also be at approximately +5 volts. If all the diodes connected to a vertical conductor are cut off in a manner to be described, and bit switch 802 is closed, the lower end of the vertical conductor will be marked with approximately −15 volts. It will be noted that except for the description of the power supply, all references to −15 volt potential values hereafter are approximate. The actual voltage varies from about −12 to −15 volts, depending on the loading effect of each circuit.

Figure 54:
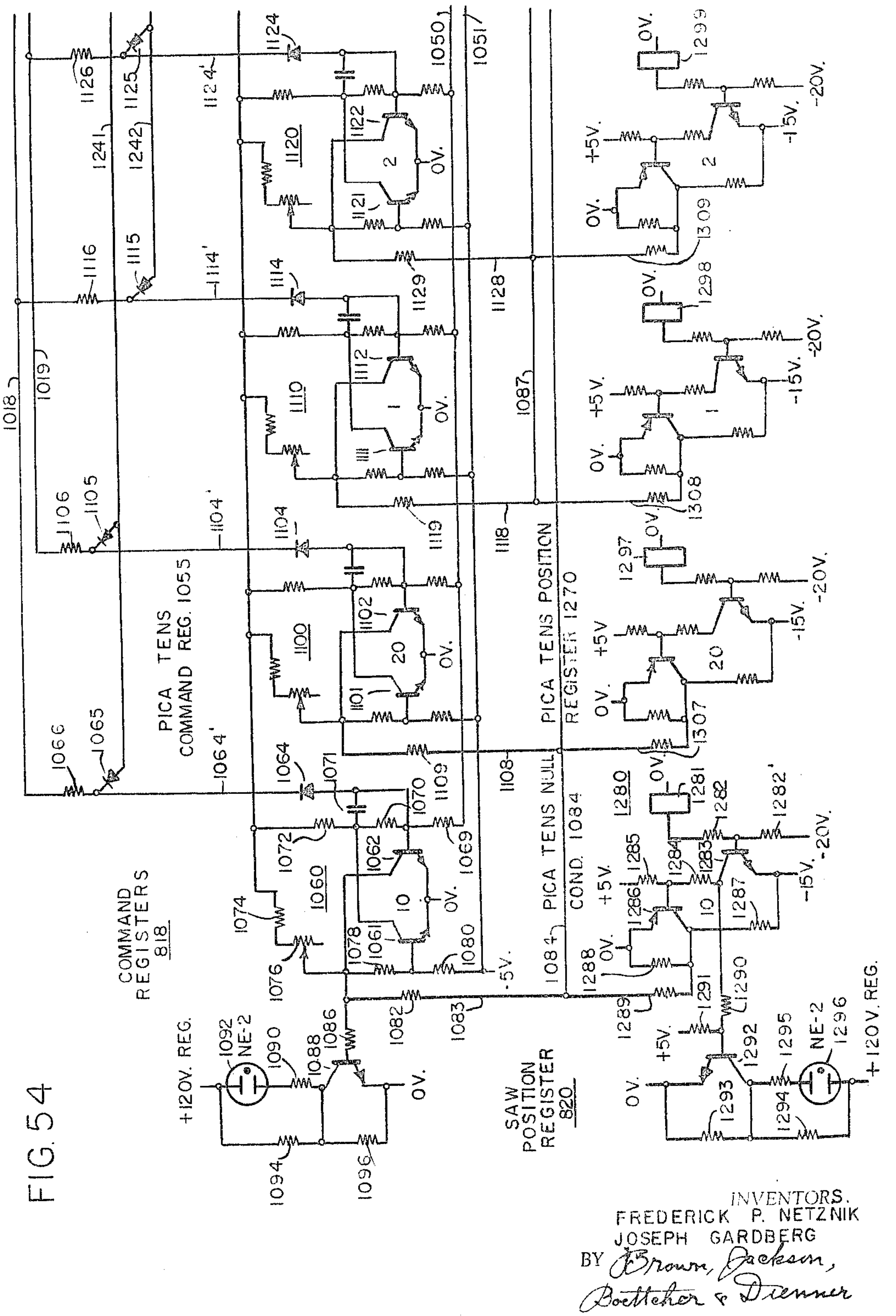
Figure 55:
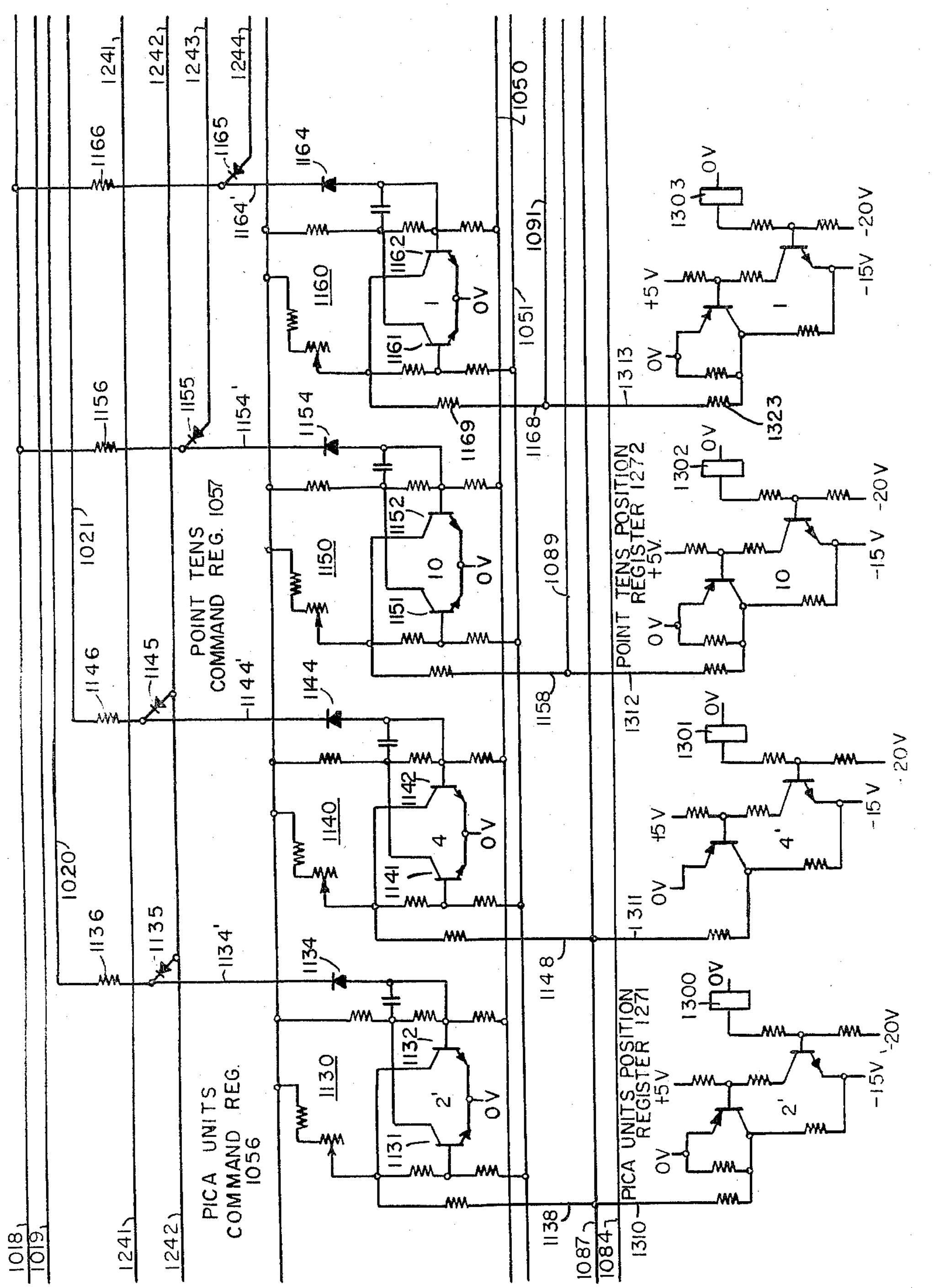
Figure 56:
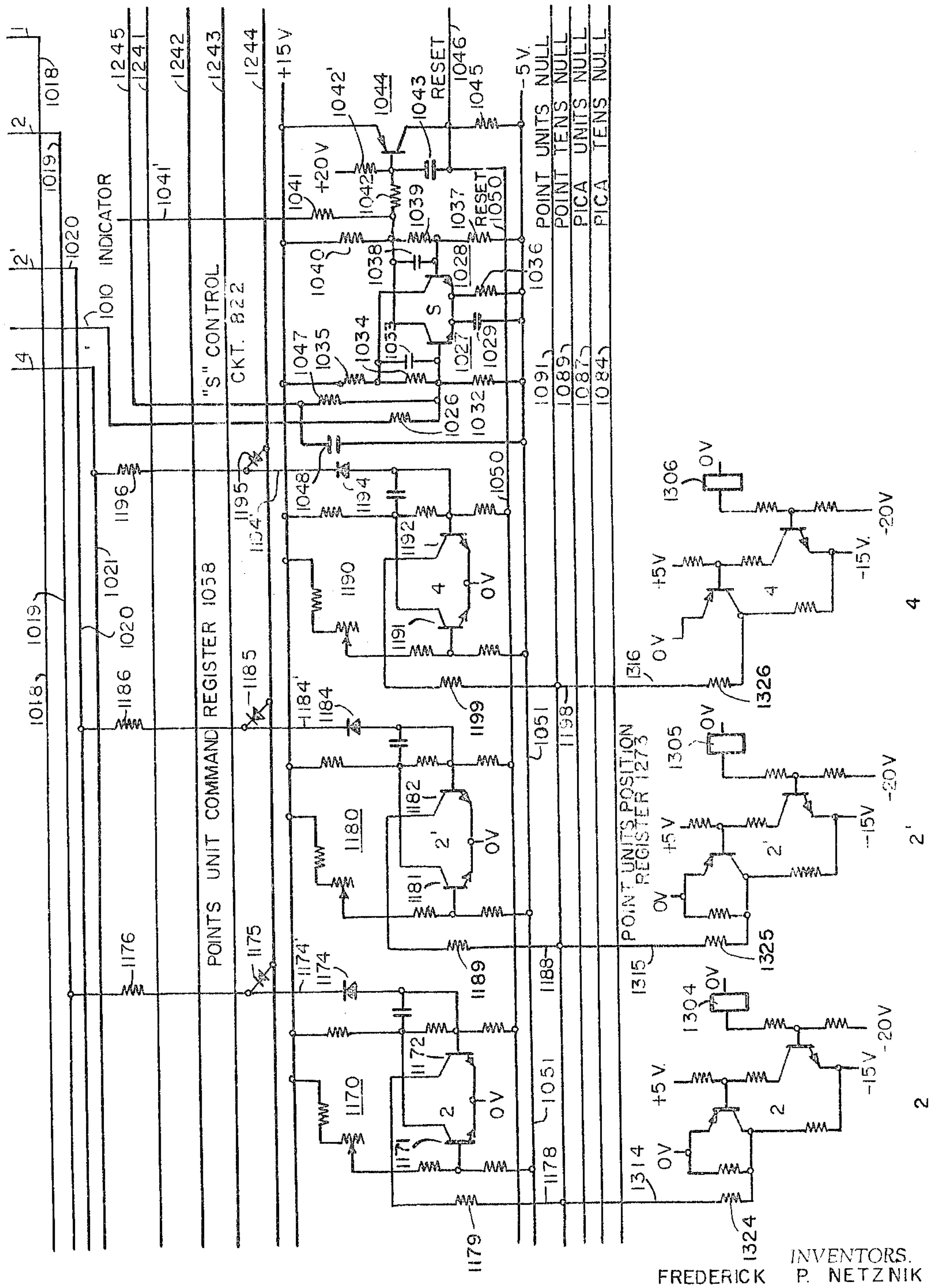

The lower ends of the matrix vertical conductor 1–0 are connected over a diode network 983–998 to a matrix amplifier 808 in such manner as to provide markings in a four bit code which identify the decimal marking of the coded signal received. Briefly, matrix amplifier 808 comprises four transistors 1000, 1002, 1004 and 1006 connected as emitter followers over network 983–999 to the output end of the vertical conductors of matrix 806. Each transistor controls energization of an associated conductor 1018, 1019, 1020 and 1021 respectively. As shown in FIGURE 48, marking of conductor 1018 represents the value 1, marking of conductor 1019 represents the value 2, marking of conductor 1020 represents the value 2′, and the marking of conductor 1021 represents the value 4. The specific conductors marked with receipt of the various digits is shown in the chart below, it being apparent that the sum of the values represented by the marked conductors equals the value of the digit read out from the tape. The marking conductors 1018–1021 are connected in various combinations to the inputs of each of the four registers 1055–1058 in command register 818 (FIGURES 54–56).

A specific example of the operation of the code switch CSW and bit switch BSW in marking the matrix 806 with the detection of digit 1 on the tape is now set forth.

As shown in FIGURE 7, digit 1 is represented by apertures on the tape at levels 0, 1, 3, 4, 5. Accordingly, with movement of the coded apertures on the tape which represent digit 1 automatic readout position contacts CS0, CS1, CS3, CS4, CS5 are closed, and transistors 907, 915, 935, 945, 955 are cut off to apply −15 volts potential to the anodes of diodes 977, 978, 980, 981, 982 cutting the diodes off.

With the closure of bit switch 802 and the transmission of a −15 volt enabling signal over matrix enabling conductor 899 and resistor 965 to the vertical conductor 1, approximately −15 volt appears at the cathodes of diodes 977, 978, 980, 981 982. As none of the diodes 977, 978, 980, 981, 982 have a positive potential on the anode the vertical line 1 is permitted to go negative. Additionally, with contact springs CS2 open, the 2 conductor will also be energized with −15 volts, and diode 979 will also be cut off. With the cut off of each of the diodes connected to a vertical conductor, such as 1 (and only with the cut off of all of the diodes connected thereto) a −15 volt signal will appear at the lower end of such vertical conductor. In the present example, the −15 volt (approximate) marking signal appears at conductor 1 and diode 983 conducts to mark conductor 1013 (1) with an approximate −15 volt potential to thereby cause transistor 1000 to in turn mark its associated conductor 1018 with −15 volts.

Summarily, with the application of a signal in the six bit code by code switch CSW over the input conductors 0, $\bar{\mathbf{0}}$ . . . 5, $\bar{\mathbf{5}}$ and the enablement of the matrix 806 by bit switch BSW, a corresponding one of the vertical conductors 1–0 will be marked and the network 983–998 marks the code conductors input to matrix amplifier 808 in a four bit code to represent such digit. Since the manner of operation of the matrix responsive to receipt of other digits or characters will be apparent from the foregoing description, the further disclosure of such operation is accomplished by reference to the following table which identifies the effective matrix components with the read out of the signals for the different digits and characters.

TABLE 1

| Digit | Diodes Energized | Marking Transistor Enabled | Output Conductor Marked |
|---|---|---|---|
| 1 | Horizontal Matrix Inputs 0, 1, $\bar{2}$, 3, 4, 5 are marked with −15 volt diodes connected to Vertical Conductor "1" and diode 983 conducts. | 1000 | Cond. 1 (1018). |
| 2 | Horizontal Matrix Inputs 0, 1, 2, $\bar{3}$, $\bar{4}$, 5, are marked with −15 volt diodes connected to Vertical Conductor "2" and diode 984 conducts. | 1002 | Cond. 2 (1019). |
| 3 | Horizontal Matrix Inputs 0, 1, $\bar{2}$, $\bar{3}$, $\bar{4}$, $\bar{5}$ are marked with −15 volt diodes connected to Vertical Conductor "3" and diodes 985, 986 conduct. | 1000, 1002 | Cond. 1 (1018).<br>2 (1019). |
| 4 | Horizontal Matrix Inputs 0, $\bar{1}$, 2, $\bar{3}$, 4, $\bar{5}$ are marked with −15 volt diodes connected to Vertical Conductor "4", and diode 993 conducts. | 1006 | Cond. 4 (1021). |
| 5 | Horizontal Matrix Inputs 0, $\bar{1}$, $\bar{2}$, $\bar{3}$, $\bar{4}$, 5 are marked with −15 volt diodes connected to Vertical Conductor "5" and diodes 987, 992 conduct. | 1000, 1006 | Cond. 1 (1018).<br>4 (1021). |
| 6 | Horizontal Matrix Inputs 0, 1, 2, 3, 4, 5 are marked with −15 volt diodes connected to Vertical Conductor "6" and diodes 994, 998, 999 conduct. | 1002, 1006 | Cond. 2 (1019).<br>4 (1021). |
| 7 | Horizontal Matrix Inputs 0, 1, 2, 3, $\bar{4}$, $\bar{5}$ are marked with −15 volt diodes connected to Vertical Conductor "7" and diodes 988, 995, 998, 999 conduct. | 1000, 1002, 1006 | Cond. 1 (1018).<br>2 (1019).<br>4 (1021). |
| 8 | Horizontal Matrix Inputs 0, $\bar{1}$, 2, 3, $\bar{4}$, $\bar{5}$ are marked with −15 volt diodes connected to Vertical Conductor "8" and diodes 991, 996, 998, 999 conduct. | 1004, 1002, 1006 | Cond. 2′ (1020).<br>2 (1019).<br>4 (1021). |
| 9 | Horizontal Matrix Inputs 0, $\bar{1}$, 2, $\bar{3}$, 4, 5 are marked with −15-volt diodes connected to Vertical Conductor "9" and diodes 989, 990, 997, 998, 999 conduct. | 1000, 1002, 1004, 1006 | Cond. 1 (1018).<br>2′ (1020).<br>2 (1019).<br>4 (1021). |
| O | O | | Cond. 1012. |
| P | Inputs $\bar{0}$, $\bar{1}$, 2, 3, $\bar{4}$, 5 are marked with −15 volt | P circuit 814 (Fig. 57)<br>Counter Circuit 812 (Fig. 57) | Cond. 1011. |
| S | Inputs $\bar{0}$, 1, $\bar{2}$, 3, $\bar{4}$, $\bar{5}$ are marked with −15 volt | "S" Circuit 822 (Fig. 56) | Cond. 1010. |

The "zero" vertical conductor is energized whenever any one of the digits 1–0 is read out, and is effective over counter conductor 1012 to advance the counter circuit 812 for sequencing purposes to be described.

The matrix is also operative with receipt of the code signals representing the letter P and the letter S to mark conductors P conductor 1011 and S conductor 1010 respectively with a −15 volt potential signal to enable P and S circuits 814, 822 as will be shown.

OPERATION RESPONSIVE TO REGISTRATION OF A COMMAND CODE

It is once more recalled that a set of command instructions for positioning the saw at a desired position will include the letter S followed by the tens and units digit of the desired picas (14 in the example shown in FIGURE 7), an arbitrary divider comprising the letter P, the tens and units digit of the desired points (03 in such example) an additional command LR returns the operating unit to the type-setting condition.

The command information set for such example reads UR–UR–S–16–P–03–LR. For simplicity of description, the information is now considered as comprising eight discrete sets of commands. The identification of the commands and their function are now set forth briefly. For this general description, reference is best made to FIGURES 46–47.

*First command UR–UR.*—Converts the operating unit from the "typesetting" to the Command position.

*Second command—S.*—The character S as registered on the matrix 806 controls the S bistable circuit 822 to prepare the register 818 to receive and store the third and fourth command which are next received. The S circuit 822 also prepares the 4R relay to respond to a start signal after the first seven commands have been received and also removes the reset hold on the counter 812.

*Third command—1.*—The first numeral (1 in the present example) comprises the tens digit of the command pica measure. The pica tens digit as thus registered on matrix 806 results in the operation of the counter circuit 812 which in turn controls steering circuit 810 in the gating of the matrix output information in the four bit code matrix from matrix amplifiers 808 to the pica tens section of the register 818 for storage therein.

*Fourth command—4.*—The second digit ("4" in the present example) consists of the pica units digit. With the registration of pica units digit 4 on the matrix 806, a signal is transmitted to the counter circuit 812 which controls steering circuit 810 to gate the output information of the matrix 806 in the four bit code from matrix amplifier 808 into the units pica section of register 818 for storage therein.

*Fifth command—P.*—The character P as coupled to the matrix 806 results in the transmission of a signal by the matrix 806 to the P circuit 813 which automatically controls the steering circuit 810 to prepare the system for registration of the point information to be subsequently received. The P circuit also advances the counter circuit 812 to effect gating of the next command into the point tens section of register 818.

*Sixth command—0.*—The next digit (0 in the present example) is the point tens digit which as coupled to the matrix 806 results in advancing of counter 812 which controls steering circuit 810 to direct the matrix output information in the four bit code from matrix amplifiers 808 to the point tens section of register 818.

*Seventh command (3).*—The next digit (3 in the present example) comprises the point units digit which as coupled to the matrix 806 results in advance of the counter 812, and thereby the operation of steering circuit 810 to transmit the point units section of register 818 from matrix amplifier 808 to register 818. The seventh command also effects transmission of a signal via a time delay circuit to turn on 4R control circuit 1479 which in turn operates the 4R relay 1480. The time delay is introduced to permit proper registry of the received digit in the point units section of register 818 before operation of the 4R relay. As 4R relay operates, a signal is transmitted over input inhibit lead back to the BS gate 804 to inhibit the transmission of further information to the matrix 806 during the subsequent period of saw position adjustment.

*Eighth command—LR.*—Returns the operating unit from command to typesetting position in the manner described hereinbefore.

The specific operation of the circuitry in response to such commands is now set forth in detail with reference to the detailed circuitry of FIGURES 48–57.

*First command—UR–UR*

The manner in which the system is operative to convert the operating unit from the typesetting to the command position has been set forth in detail hereinabove and reference is made to such description. The command signals UR–UR are not transmitted over the code switches, and accordingly no further action of the circuitry set forth in FIGURES 48–57 will occur.

*Second command—Operation of S control circuit*

The second command, which comprises the letter S is read out by the code switch contacts CS1, CS3, and as the switch BSW operates, the associated diodes connected to horizontal conductors 1 and 3 will be cut off with diodes $\bar{0}$, $\bar{2}$, $\bar{4}$, $\bar{5}$, and the −15 volt signal on vertical conductor S is transmitted over conductor 1010 (FIGURE 50) to the S control circuit 822 (FIGURE 56). In response to such signal, the S control circuit 822 turns off a reset voltage (which was applied to the circuitry at the end of the previous saw position cycle, as will be described in more detail hereinafter) whereby the register 818 is enabled to receive and store the following two commands (commands three and four).

Briefly, the S control circuit 822 comprises a bistable circuit including transistors 1027, 1028, which at the end of each saw positioning operation are reset with transistor 1027 conductive and transistor 1028 cut off. With reference to the S control circuit 1025, transistor 1027 includes an emitter element coupled over resistor 1036 and capacitor 1029 to −5 volt source, a base element, which in addition to being connected to the output of the S conductor of the matrix 806, is also connected over resistor 1047 and conductor 1245 to a reset circuit which is controlled by the reset switch RSW (FIGURE 49). A manual control reset switch 1478 (FIGURE 51) is also connected in such reset circuit to prevent reset at the end of a positioning operation, so that the received and registered commands may be inspected, if desired.

The base of transistor 1027 is also coupled over resistor 1034 and capacitor 1033 to the collector of transistor 1028. The collector of transistor 1027 is connected (*a*) over resistor 1041 to an indicator which indicates the ready condition of the system, (*b*) over resistor 1039 and capacitor 1038 to the base of the second transistor 1028 and (*c*) over resistor 1042 to the base of the reset transistor 1044, and (*d*) over resistor 1042′ to a +20 volt source. The second transistor 1028 includes a collector element connected over the base of the first transistor 1027, and a base element connected to the collector of transistor 1027 as noted above. The collector of transistor 1028 is also connected over resistor 1035 to +15 volt source. The emitter element of transistor 1028 is connected to the emitter of transistor 1027 and through resistor 1036 to a −5 volt potential.

Transistor 1044 includes an emitter element connected to +15 volts, a base element connected over resistor 1042′ to +20 volts, and over resistor 1042 to the output of the bistable circuit 1027, 1028, and a collector element connected over resistor 1045 to −5 volt source, and also to reset conductors 1046 and 1050 respectively, and over capacitor 1043 to the base element.

As indicated above, in the absence of an enabling signal on matrix S conductor 1010 (i.e., in the set "on" conductor) transistor 1027 conducts and transistor 1028 is cut off. The resultant signal coupled over resistor 1042 turns on transistor 1044. The positive 15 volt signal output which appears at the collector of transistor 1044 is coupled over reset conductor 1046 (FIGURES 57, 51) to the reset circuit 1052 to turn off transistor 1053 (which provides a −15 volt reset signal to the counter circuit 812 and P circuit 813 as will be shown) and over conductor 1050 to the register 818 to thereby reset the bistable circuit in the register 818.

With the receipt of a signal from matrix 806 over S conductor 1010 as the result of the read out of signal S on the tape, transistor 1027 of the flip-flop is turned off, transistor 1028 is turned on, and transistor 1044 is turned off. As transistor 1044 turns off a more negative signal (approximately −5 volts) is coupled over reset conductor 1050 to each of the flip-flops in the registers 818 to prepare same for registration of any markings which may be received over conductors 1018–1021 from the matrix amplifier 808. The same signal is transmitted over reset conductor 1046 to reset circuit 1052 (FIGURE 51) to control transistor 1053 therein to conduct and thereby provide a +5 volt signal to the counter circuit 812 and P circuit 813 to set the circuitry thereat, as will be shown in more detail hereinafter.

The signal over reset conductor 1046 is also effective to effect cut off of transistor 1054 (FIGURE 51) (which with 1954′ comprises a bistable circuit for the 4R control circuit 1479) to place a −20 volt signal on inhibit lead 895, whereby the bit switch gate will be effective in its enablement of the matrix during the readout of the subsequent commands. Transistor 1054 also provides a cut off signal for transistor 1054′ to prevent energization of the 4R relay. Conduction of transistor 1054 is delayed until steering circuit 810 determines that the seven commands have been received, and then only subject to a delay introduced by time delay circuit 1530. The character "S" has thus prepared the circuitry to receive and register the tens pica digit.

*Third command—Pica tens digit 1*

As the tape member advances to move the pica tens digit into readout position (1 in the present example) and the code switch contact springs CS0, CS1, CS3, CS4, CS5 and operated, and the bit switch BSW is subsequently closed, the vertical conductor for the tens digit of the pica number of the command is marked on matrix 806. In the present example, it has been assumed that the pica number in the command information is 14 (tens digit 1) and accordingly the first vertical conductor 1 on the matrix 806 is energized, and an approximate −15 volt signal is extended over conductor 1013 to transistor 1000 which turns on, and energizes marking conductor 1018 (FIGURES 54, 56 and 55) with a −15 volt signal.

At this time, it is briefly noted that command register circuit 818 (FIGURES 54–56) is divided into four discrete registers including pica tens command register 1055 (FIGURE 54), pica units command register 1056 (FIGURE 55), point tens command register 1057, and point units command register 1058 (FIGURE 56), each of which is operative to register an associated digit of the command. Counter circuit 812 (FIGURE 57) and P circuit control 813 and steering circuit 810 (FIGURE 57) cooperate to enable register selector conductors 1241–1244 in succession which in turn steer the markings on conductors 1018–1021 (FIGURES 54–56) for the successive digits applied to the matrix to successive ones of the registers 1055–1058. That is, as the first digit in the command code (pica tens digit) is received, steering circuit 810 (FIGURE 57) enables conductor 1241 to go negative, and the markings on conductors 1018–1019 are steered to pica tens command register 1055.

Stated in another manner, if conductor 1241 is positive a 1 register on 1018 will not set register 1060. If conductor 1241 is negative, signals on 1018, 1019 will set the appropriate register. As the second digit in the command code (pica units digit) is received, conductor 1242 is enabled to go negative to control steering of the markings on conductors 1018–1021 to the pica units command register 1056, as the third digit (point tens digit) is received, the third conductor 1243 is enabled to go negative to steer the markings on conductor 1018 to point tens command register 1057, and as the fourth digit (point units digit) is received, the fourth conductor 1244 is enabled to go negative to steer the markings on conductors 1018–1021 to the point units command register 1058.

With reference now to the counter circuit 812 and P circuit 813 (FIGURE 57) the manner in which such circuits effect selective control of steering circuit 810 will now be described.

Figure 57:
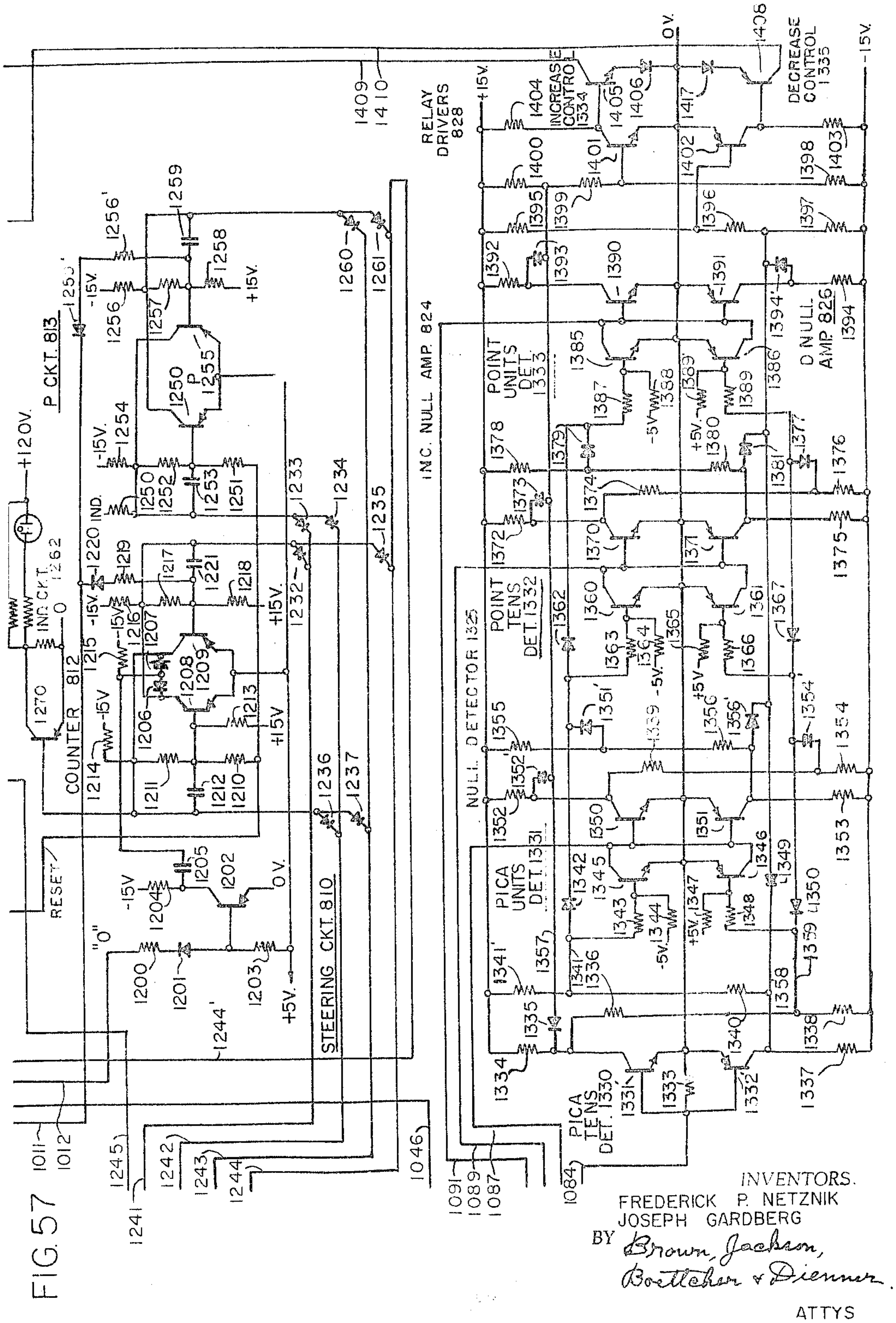

A. *Counting circuit 812* (*FIGURE 57*)

With reference to FIGURE 57, counter circuit 812 basically comprises an input circuit connected to matrix 806 over conductor 1012, which circuit includes resistor 1200, diode 1201 and resistor 1203 connected to the input of a first switching transistor 1202, and a bistable circuit including transistors 1208, 1209 connected to the output of switching transistor 1202.

Transistor 1202 includes an emitter element connected to source of zero volt potential, a base element connected over resistor 1203 to plus five volt potential, and over diode 1201 and resistor 1200 to the 0 vertical conductor in matrix 806, and a collector element connected over resistor 1204 to −15 volt potential, and over capacitor 1205 to the control circuit for the bistable circuit including transistors 1208, 1209.

Transistor 1208 includes an emitter element connected common with the emitter element of transistor 1209 to a +5 volt source, a base element connected over resistor 1213 to a +15 volt source, and also over resistor 1210 to the "reset" conductor and over resistor 1211, capacitor 1212 to the collector of transistor 1209, and a collector element connected (*a*) over diode 1206, and resistor 1215 to −15 volt potential, and over diode 1206 to the output circuit of switching transistor 1202, (*b*) to a control conductor for diodes 1232, 1235 in steering circuit 810 and (*c*) to resistor 1217 and capacitor 1221 to the base of transistor 1209.

Transistor 1209 includes an emitter element connected common with the emitter of transistor 1208 to +5 volt potential, and a collector connected over diode 1207 to the output circuit of switching transistor 1202 and over a control conductor to diodes 1236, 1237 in steering circuit 810. The collector is connected to indicator circuit 1262 through transistor 1270 and is also connected over resistor 1214 to −15 volt potential, and to the base of transistor 1028 as described above. The base element of transistor 1209 is also connected over resistor 1218 to +15 volt and over resistor 1219 and diode 1220 to the control conductor 1011 for the P circuit 813.

As a result of the illustrated connections, transistor 1202 is normally off and as a result of the reset signal applied to transistor 1208 and 1250 in the previous cycle, transistors 1208 and 1250 are on, and transistors 1209 and 1255 are off. With the readout of the S character, and the resultant operation of S circuit 822 (transistor 1027 turned off, transistor 1044 turned off) transistor 1053 in reset circuit 1052 (FIGURE 51) turns on, and a +5 volt signal is applied to the base of transistor 1208, 1250 (FIGURE 57). However, transistors 1208, 1250 remain on. With the receipt of the first digit after set on the matrix 806 (pica tens digit), and the resultant energization of vertical conductor 0, transistor 1202 turns on and produces a current surge across capacitor 1205 which (because of the collector element of transistor 1209 being at −15 volt) forward biases diode 1207 and thereby increases the voltage at the base of transistor 1208. Transistor 1208 then turns off, whereby a −15 volt signal is extended by transistor 1208 to diodes 1232 and 1235. At this time, as will be shown, transistor 1255 is off and −15 volt is coupled to diodes 1233, 1234. While the tape is advancing to the second command position (and during each interval after a digit command), vertical conductor 0 is deenergized and transistor 1202 turns off. The voltage across capacitor 1205 decays to zero and diodes 1206 and 1207 remain reverse biased. Transistors 1208, 1209 therefore remain in the state to which they were operated by the received pulse.

With transistors 1209 and 1250 on, a +5 volt signal is provided to diodes 1236, 1237, 1260 and 1261. As a result, only steering conductor 1241 has both diodes (1232, 1233) energized by a −15 volt signal, and as will be shown, the marking signals provided by matrix 806 will only be applied to pica tens command register 1055 at this time.

B. *"P" control circuit 813* (*FIGURE 57*)

With brief reference now to "P" circuit 813, it is noted that the circuitry thereat comprises a bistable circuit including a pair of transistors 1250, 1255. Transistor 1250 includes an emitter element connected to +5 volts, a base element connected over resistor 1251 to the reset conductor and over resistor 1252 and capacitor 1253 to the collector of the second transistor 1255, and a collector element connected (*a*) over resistor 1257 and capacitor 1259, to the base of the second transistor, (*b*) over resistor 1256 to −15 volt potential, and (*c*) the control conductor to diodes 1260 and 1261 in the steering circuit 810.

The second transistor 1255 includes an emitter connected common with the emitter of transistor 1250 to +5 volt potential, a base element connected as indicated above to the collector of transistor 1250, and also over resistor 1258 to +15 volt potential and over resistor 1256′ and diode 1259′ to the P conductor 1011 which is energized by the matrix 806 with each readout of the letter character P. Transistor 1255 also includes a collector element connected as indicated heretofore to the base of transistor 1250 and also over resistance 1254 to −15 volt potential, and over a control conductor to the diodes 1233 and 1234 in the steering circuit 810. The collector element of transistor 1255 is also connected over resistor 1250 to an indicator (not shown) to indicate the condition of the P circuit 813. In the reset condition (Reset) transistor 1250 is on and transistor 1255 is off. As a result, −15 volts is provided by transistor 1255 to diodes 1233 and 1234. With transistor 1250 conducting, the potential coupled to diodes 1260, 1261 may be in the order of +5 volts. With the marking of the vertical conductor S in matrix 806 as the result of the read out of the letter S, the S circuit 822 controls the reset circuit 1052 to provide a +5 volt signal to transistors 1208, 1250. However, transistors 1208, 1250 remain on. As the vertical conductor P in the matrix 806 is marked responsive to read out of the character P in the tape (after the third and fourth commands) transistor 1250 is turned off to provide −15 volt potential to diodes 1260, 1261 and transistor 1255 is turned on to provide +5 volt potential to diodes 1233, 1234.

It will be apparent from the foregoing description that the counter circuit 812 is reset in response to the reset signal and is advanced responsive to readout of each digit 1–0. The P circuit 813 is set in response to reset and shifts in response to the registration of the P character on the matrix 806. The following chart serves to indicate the negative voltages provided for the diodes in the steering circuit 810 by the counter circuit 812 and P circuit 813 in response to readout of the S, P characters and pica points digits.

TABLE 2

| | | 1232 | 1233 | 1234 | 1235 | 1236 | 1237 | 1260 | 1261 | Effective Steering Conductor |
|---|---|---|---|---|---|---|---|---|---|---|
| Reset | 1209 off 1255 off | +5 | −15 | −15 | +5 | −15 | −15 | +5 | +5 | 1242 |
| Second / Command S | 1209 off 1255 off | | | | | No change | | | | |
| Third / Command 1 | 1208 off 1255 off | −15 | −15 | −15 | −15 | +5 | +5 | +5 | +5 | 1241 |
| Fourth / Command 4 | 1209 off 1255 off | +5 | −15 | −15 | +5 | −15 | −15 | +5 | +5 | 1242 |
| Fifth / Command P | 1208 off 1250 off | −15 | +5 | +5 | −15 | +5 | +5 | −15 | −15 | 1244 |
| Sixth / Command O | 1209 off 1250 off | +5 | +5 | +5 | +5 | −15 | −15 | −15 | −15 | 1243 |
| Seventh / Command 3 | 1208 off 1250 off | −15 | +5 | +5 | −15 | +5 | +5 | −15 | −15 | 1244 |
| Reset | 1209 off 1255 off | +5 | −15 | −15 | +5 | −15 | −15 | +5 | +5 | 1242 |

The manner in which operation of the steering circuit 810 to successively energize conductors 1241–1244 in such manner effects selective steering of the output of the information on the matrix to the appropriate ones of the four registers 1055–1058 in register 818 (FIGURES 54-56) is now set forth in detail.

C. *Command register 818* (*FIGURES 54-56*)

As indicated heretofore, command register 818 comprises four discrete registers including pica tens command register 1055, pica units command register 1056, point tens command register 1057 and point units command register 1058, each of which is selectively enabled independently of each other by the steering conductors 1241-1244 to receive the signal output of the matrix amplifier 808.

Pica tens command register 1055 (FIGURE 54) comprises two bistable circuits designated pica 10 circuit and pica 20 circuit. Pica units command register 1056 comprises four bistable circuits designated pica 1 circuit, pica 2 circuit, pica 2′ circuit and pica 4 circuit respectively. Point tens command register 1057 (FIGURE 55) comprises one bistable circuit designated the point 10 circuit. Point units command register 1058 (FIGURE 56) comprises four bistable circuits designated point 1 circuit, point 2 circuit, point 2′ circuit and point 4 circuit, respectively.

Pica tens command register 1055 includes two input circuits 1064′ and 1104′ connected to the output conductors 1018, 1019 of matrix amplifier 808, a pair of diodes 1065 and 1105 being selectively controlled over register selector conductor 1241 by steering circuit 810 to permit the signals on conductors 1018, 1019 to be extended to the bistable circuits 1060, 1100. That is, if the −15 volt signal is coupled to both diodes 1232, 1233, and a marking (−15 v.) is applied over conductors 1018, 1019, the diodes 1065, 1105 will be cut off and the marking signals will be extended to the input circuits for register circuits 1060, 1100. However, if either diode 1232, 1233 connected to conductor 1241 has +5 volt applied thereto, the diodes 1065, 1105 will conduct and any signal markings on conductors 1018, 1019 will be effectively shunted or by-passed relative to the input circuits for register circuits 1060, 1100.

In a similar manner, pica units command register 1056 includes four input circuits 1114′, 1124′, 1134′ and 1144′ connected to the four matrix output conductors 1018–1021 of the matrix amplifier 808 and four diodes 1115, 1125, 1135, 1145, selectively controlled by the register selector conductor 1242 to effect extension of the signals on conductors 1018–1021 to the bistable circuits 1110–1140. Point tens command register 1057 includes a single input circuit 1154′ which is connected to the output conductor 1018 of the matrix amplifier 808, and a diode 1155 which is selectively controlled to effect extension of the signals on conductor 1018 to bistable circuit 1150 by register selector conductor 1243. Point units command register 1058 includes four input circuits 1164′, 1174′, 1184′ and 1194′ which are connected to the output conductors 1018–1021 of the matrix amplifiers 808, and diodes 1165, 1175, 1185, 1195 are selectively enabled by the register-selector-conductor 1244 to effect extension of the output of conductors 1018–1021 to bistable circuits 1160, 1170, 1180, 1190.

Each of the bistable circuits in the registers 1055–1058 includes a discrete output circuit. By way of example, the output circuit for the pica tens bistable circuit 1060 is resistor 1082 and conductor 1083, the output circuit for pica twenty bistable circuit 1100 is resistor 1109 and conductor 1108, the output circuit for pica one bistable circuit 1110 is resistor 1119 and conductor 1118, the output circuit for pica two bistable circuit 1120 is resistor 1129 and conductor 1128, etc. As will be shown, an output conductor such as 1083 for bistable circuit 1060, is marked with a positive potential or zero potential.

The output conductors for each discrete register are connected common to an output conductor for such register. Thus, in pica tens register 1055 the output conductors 1083, 1108 of the two bistable units pica ten, pica twenty, are both connected to pica tens null conductor 1084. In a similar manner, the four output conductors 1118, 1128, 1138, 1148 of the pica units command register 1056 are connected to the common pica units null conductor 1087, the output circuit conductor 1158 for the point tens command register 1057 is connected to point tens null conductor 1089, and the four output conductors 1168, 1178, 1188, and 1198 for the point units command register 1058 are connected to a common point units null conductor 1091.

In that each of the bistable circuits, such as 1060, 1100–1190, in the four command registers 1055–1058 are similarly constituted, a brief description of the bistable circuit 1060 in the pica tens register will clearly indicate the manner of connection of the remaining bistable circuits. With brief reference thereto, bistable circuit 1060 includes a first transistor 1062 including an emitter connected to zero volt potential, a base connected (a) over register 1069 to enabling conductor 1050, (b) over parallel resistor 1070, capacitor 1071 to the collector of the second transistor 1061, and also over diode 1064 to the input circuit 1064′ which is connected over resistor 1066 to the output conductor 1018 of the matrix amplifier 808, and over diode 1065 to selector conductor 1241. Transistor 1062 also includes a collector element connected over adjustable resistors 1076 and resistor 1074 to a +15 volt source, and over resistor 1078 to the base of resistor 1061 and over resistor 1086 to an indicator circuit comprising transistor 1088 and lamp 1092 which is used to indicate the operative condition of the command registers, and over resistor 1082 to the output conductor 1083 and the pica tens null conductor 1084.

The second transistor 1061 in bistable circuit 1060 includes an emitter element connected to zero volt potential, a base element connected over resistor 1080 to a =5 volt potential source, and over resistor 1061 to the collector of the transistor 1062, and a collector element connected over resistor 1072 to the +15 volt source, and over resistor 1070 and capacitor 1071 to the base of transistor 1062.

With such connections, the following conditions of operation will occur for the two transistor, such as 1061 1062 in each of the bistable circuits, such as 1060, in the registers 1055–1058.

With the receipt of a reset signal by the S circuitry 822 after the previous saw positioning operation, transistor 1027 is turned on, transistor 1044 is turned on and each transistor, such as 1062, in the bistable circuits is turned on by the +15 volt signal applied to reset conductor 1050. As the S signal on the tape is now advanced to the read out position, and the S character is registered on matrix 806, a negative 15 volt signal is transmitted over conductor 1010 to turn off transistor 1027 which turns off transistor 1044. A negative five volt signal is extended over conductor 1050, and resistors, such as 1069, to the right hand transistor, such as transistor 1062, in each of the bistable circuits, such as 1060, in each of the registers 1055–1058. However, since the base of the left hand transistors, such as 1061, in each of the bistable circuits are bised by negative five volt potential on conductor 1051, the transistor, such as 1062, stays on and each of the left hand transistors, such as 1061, remains in the off condition.

As a result, the output signal extended over resistors, such as 1082, to the output conductor, such as 1083, will comprise a signal of approximately zero volts. Thus, prior to marking of the registers 1055–1058 with the pica, point command information, the output to each of the null conductors 1084, 1087, 1089, 1091 by the command registers will be a signal of approximately zero volts.

As will be shown, if the input circuit for a register, such as 1060, is marked, transistor 1062 will be turned off and a positive signal will be extended over resistors 1074, 1076, 1082 to the output conductor 1083 and the pica tens null conductor 1084. In a similar manner all of the circuits in the registers 1055–1058 provide either a zero potential or positive potential output signal over their associated output conductors. As will be shown, the voltage output to each null conductor varies with the particular digits recorded in command register 818.

As will be shown, the actual position of the saw is continually registered upon the saw position register 820, and the actual position as represented by the markings thereon are compared with the markings placed on the command register 818 to determine the action necessary to adjust the saw to the position desired. Before proceeding further therefore a brief description is now set forth of the saw position register 820, and the particular manner in which the actual position of the saw is provided thereon.

*Saw position register 820 (FIGURES 54, 55, 56)*

The saw position register 820 is similar in structure to the command register 818, and basically includes four discrete registers including a pica tens position register 1270, pica units position register 1271, point tens position register 1272 and point units position register 1273.

The saw position registers 1270–1273 include a number of bistable circuits which correspond to the number of circuits in the related ones of the command registers 818. Thus register 1270 includes two bistable circuits, register 1271 includes four bistable circuits, register 1272 includes one bistable circuit, and register 1273 includes four bistable circuits.

Each bistable circuit, such as 1270, includes an input circuit which is marked by the code disks POD, PID in accordance with the actual position of the saw motor, and an output circuit which is connected to corresponding ones of the null conductors 1084, 1087, 1089, 1091. When a bistable circuit is marked to register a digit, the output circuit is marked with a negative signal, and when the bistable is reset (no marking) the output circuit has zero potential thereon. As a result, whenever the corresponding bistable circuit, such as 1060, 1280, in the corresponding register, such as 1055, 1270, are in the same position, a zero volt output signal is placed on the associated null conductor, such as 1084.

The manner in which the saw position register 820 is operative with the command register 818 is now set forth. It will be recalled that the voltage conducted to the null detector varies with the particular digits recorded in register 818 and 820. The output of each bistable circuit in both registers is connected to its associated null conductor by a resistor which determines the amount of voltage appearing on the null conductor if the bistable circuit is marked. Each of the corresponding bistable circuits in the command and saw position registers have output resistors with identical values. For instance, the pica 10 circuits are connected to null conductor 1084 by resistor 1082 in the command register and resistor 1289' in the position register. Since both resistors 1082, 1289' have the same value (100,000 ohms in this embodiment), an equal but opposite voltage is conducted to null conductor 1084 if both the command and position pica 10 circuits are marked and as a result, an approximate zero voltage appears on the null conductor.

In a similar manner, the pica 20 circuits in the command and position registers have identical output resistors 1109 and 1317 respectively. However, the value of these resistors is only half (50,000 ohms) the value of resistors 1082, 1289' in the pica 10 circuits. Consequently, the output voltage from each of these bistable circuits has a larger positive or negative value than the voltage from the pica 10 circuits which have a 100,000 ohms resistor connecting them to the null conductor.

It is apparent that if the pica 10 circuit from one register, and the pica 20 circuit from the other register, are marked, the voltages at the output of each circuit are not equal and opposite, and as a result, a positive or negative voltage will appear on null conductor 1084. If, for instance, the pica 20 circuit in the command register and the pica 10 circuit in the position register are marked simultaneously, the magnitude of the positive voltage from the pica 20 circuit is larger than the negative voltage from the pica 10 circuit, and the resulting voltage on null conductor 1084 is positive.

In the pica units and point units registers which comprise four bistable circuits, three different resistor values are used to connect the output of the bistable circuits to their associated null conductor. For instance, in the pica units command register, the pica 1, 2, 2', and 4 circuits are connected to null conductor 1087 by resistors 1119, 1129, 1139, and 1149 respectively. The corresponding position register circuits pica 1, 2, 2', 4 are connected to conductor 1087 by resistors 1318, 1319, 1320, and 1321 respectively. As in the pica tens register, the corresponding pica units circuits in the command and position registers have resistors with identical values connecting them to the null conductor. More specifically, in the pica 1 circuits, resistors 1119 and 1318 are 100,000 ohms; in the pica 2 circuits resistors 1129 and 1319 are 50,000 ohms; in the pica 2' circuits resistors 1139 and 1320 are 50,000 ohms; and in the pica 4 circuits resistors 1149 and 1321 are 25,000 ohms.

It will be remembered that as the value of the resistor which connects the bistable circuits to the null conductor decreases, the magnitude of the positive or negative voltage putout by the circuits increases. For instance, if the command pica unit's value is 04 and the position pica unit's value is 06, the pica 4 circuit will be marked in the command register and the pica 2 and pica 4 circuits will be marked in the position register (refer to Table 1, column 47). Consequently, positive voltage from the command register is conducted to the null conductor through resistor 1149 and negative voltage from the position register is conducted through resistors 1319 and 1321. Since the value of command register resistor 1149 (25,000 ohms) is greater than the parallel sum of the position register resistors 1319 and 1321 (16,700 ohms), the magnitude of the negative voltage placed on the null conductor is greater than the positive and as a result, a negative voltage is conducted to the null detector to indicate that the actual pica unit saw position (06) is greater than the command position (03).

The point unit registers operate in the same manner to indicate any difference between the command and actual point unit saw positions. Since each point tens register comprises only one bistable circuit, each is connected to null conductor 1089 by only one resistor and consequently only one magnitude of positive or negative voltage appears on the null conductor.

As indicated above, the markings placed on the saw position register 820 to indicate the actual position of the saw are obtained from the novel encoder or converter unit EN which is operative to provide a decimal representation of the pica and points position of the saw at all times. Thus, if the saw is at a position where the pica dial reads 13 and the point dial reads 06, the encoder EN will register the decimal values on a set of photocells 1281, 1297–1306 (FIGURES 54–56) which are connected to the circuits for the bistable circuits in the saw position register 820. Each photocell represents a given digit value, and as a photocell is darkened by the encoder disk, such as PID, a corresponding decimal value is registered. Thus, the summated value of a set of darkened photocells provide the decimal value for a digit.

Assuming for purposes of example, that the saw is at the pica 16 point 06 position at this time, it is apparent that the photocell 1281 (pica ten) associated with the register for the first tens digit in the pica tens position register 1270 will be darkened along with photocells 1299, 1301 (pica two and pica four) in the pica units position register 1271, whereby the value of pica 16 position is registered in the position registers 820. Assuming the point value is 06, the photocell cells 1304, 1306 (point units two and four) in the points unit position register 1273 will be darkened. The manner in which the photoelectric cells associated with each of the position registers 820 will be controlled to thus indicate the decimal value of other pica and point positions of the saw will be apparent therefrom.

With reference now to the pica tens position register 1270, and specifically the pica tens register 1280 associated with the first "tens" group, it will be apparent that the photoelectric cell 1281 is connected via voltage divider 1282, 1282′ to the base of transistor 1283 which includes an emitter element connected to −15 volt potential, and a collector element connected over resistors 1284, 1285 to +5 volts.

The collector is further connected over resistor 1290 to an indicator circuit including transistor 1292 and lamp 1296 which is energized whenever the transistor 1283 in the pica tens register 1280 is off to indicate the registration of pica digit ten. Each of the other circuits in the register 820 are provided with similar indicator (not shown), whereby the actual position of the saw at any time may be read from the indicator lamps.

The tens register 1280 further includes a second transistor 1286 having an emitter element connected to zero volts potential, a base element connected to the junction of resistors 1284, 1285, in the output circuit to transistor 1283, and a collector connected (a) over resistor 1287 to −15 volts, (b) to zero volt potential and (c) over resistor 1289′ to the pica tens null conductor 1084.

In the absence of a signal (i.e., if for example the saw is at pica 09 position) the photocell 1281 will be illuminated by the encoder, and the resistance will be decreased to effect increased conductivity and a less negative signal at the base of transistor 1283, which turns on and at its collector provides a more negative voltage which controls transistor 1286 to turn on. As a result, a zero volt signal is extended over output conductor for the first pica tens register 1280, whenever the saw is not at a tens digit pica position. In a like manner, each of the other register circuits in the saw position register 820 will provide a zero volt signal over its associated output circuit whenever its associated input circuit is not marked.

Recalling now that the saw is assumed to be in the sixteen pica position (tens digit 1) the encoder EN darkens photoelectric cell 1281 which will conduct less current, and as a result thereof a more negative voltage is provided to turn off transistor 1283 which at its collector effects application of a +5 volt signal to the base of transistor 1286 to turn off transistor 1286 which at its collector effects the application of a −15 volt signal over resistor 1287, 1289 to the pica tens null conductor 1084.

Thus, with the saw actually in position 16 pica 06 points, it will be apparent that the first pica tens circuit 1280 will be operated to provide a negative signal over resistor 1289 to the pica tens null conductor 1084. In a similar manner, the pica units circuits 2 and 4 in the points units pica register 1271 will provide negative signals over their output circuits to pica units null conductor 1087, point tens position register 1272 will provide zero signal output to the point tens null conductor 1089, and points units circuits 2 and point units 4 circuits will provide negative output signal over conductors 1316 and 1314 to the point units null conductor 1091. Such signals are maintained on the saw position register 820 until the adjustment of the saw is initiated. As will be shown, at such time as the saw changes position, the markings on the saw position register 820 are correspondingly changed.

At this point, the command register 818 and saw register 820 may be briefly summarized as each comprising four discrete, corresponding registers (pica tens, pica units, point tens, point units), each of the corresponding registers having an output conductor or conductors connected to a common null conductor so that the outputs of corresponding register circuits in the command register 818 and saw position register 820 may be compared. If a circuit in the command register is marked to represent a digit value, the output signal provided to its null conductor thereby will be a positive voltage—if it is not marked, the output will be zero volts. If a circuit in the saw position register is marked to represent a digit value, the output signal provided to its associated null conductor will be a negative voltage; if it is not marked, its output will be zero.

With these basic considerations summarized, reference is now made to the markings on the register with the receipt of the command of 14 pica 03 points when the saw is in position 16 pica 06 points.

*Third command—Registration of pica tens digit 1 on register 1055*

The manner in which the third command is now registered on command register 818 will now be described, specific reference being made to the assumed command of 14 pica 03 points.

As the tape advances the pica tens digit (1 in the present example) to the readout position, and the code switch CSW and bit switch BSW (FIGURE 49) extends the markings provided by contacts CS0, CS1, CS3, CS4, CS5 to the matrix 806 (FIGURES 49 and 50), the marking conductor 1013 (FIGURE 50) will be marked by −15 volts to turn on transistor 1000, which in turn places −15 volt signal on marking conductor 1018. Simultaneously matrix 806 marks counter conductor 1012 with a −15 volt signal to control the counter 812 to advance one step and, as indicated by the chart set forth hereinbefore, marks diodes 1232 and 1233 which are connected to conductor 1241 with —15 volt potential (FIGURES 57, 56, 55, 54), and to the diodes 1065, 1105 connected to the input circuits for the register circuits 1060 and 1100 in the pica tens command register 1055.

As a result thereof, with the coupling of a marking signal over either conductor 1018, 1019, the corresponding diodes 1065, 1105 (FIGURE 54) are turned off, and the markings on conductors 1018, 1019 are extended to the input circuits for the register circuits 1060 and 1100. In that the tens digit is 1 in the present example, only conductor 1018 is marked, and only the tens register circuit 1060 is marked by the —15 volt signal. Transistor 1062 turns off and transistor 1061 turns on to provide a +15 volt signal over output conductor 1083 to the pica tens null conductor 1084.

In that conductor 1019 was not marked, the 20 pica tens register circuit 1100 remains in its reset state, (transistor 1102 on and transistor 1101 off) and the output signal extended over conductor 1108 by circuit 1100 will be a zero volt signal.

At this time, as a result of the pica command digit being of the value 1, the circuits 1060 and 1100 in the command register 818 have placed a positive potential on the pica tens null conductor 1084. With the saw in the 16 pica position the pica tens circuit 1280 in the pica tens position register 1270 places a negative signal on pica tens null conductor 1084 and the output of the pica twenty circuit is zero volts.

With equal positive and negative signals on the pica tens null conductor 1084, a zero output exists on such conductor to indicate that the pica tens command digit and the position tens command digit have the same value.

Digressing slightly, it will also be apparent that at this time, the visual indicators 1092 and 1296 associated with the pica tens circuits in the command and saw registers, respectively, will be energized, whereas the indicators assoicated with the pica twenty circuits in the respective registers will not be energized.

*Fourth command.—Registration of pica units command digit on register 1056*

As the tape advances, and the pica units digit (4 in the present example) on the tape is moved into readout position, contact springs CS0, CS2 and CS4 (FIGURE 49) are closed, and the vertical conductor 4 in matrix 806 (FIGURE 50) is energized to effect conduction of diode 993 and transistor 1006 to mark matrix amplifier output conductor 1021 with a —15 volt signal.

Additionally, with the closure of contact spring CS0 (FIGURE 49), diode 974' (FIGURE 50) is cut off to mark the vertical 0 conductor in matrix 806 with a —15 volt signal, which is transmitted over counter conductor 1012 to the counter circuit 812 (FIGURE 57) which operates the steering circuit 810 in the transfer of the output of the matrix amplifier 808 to the pica units command register 1056.

Briefly, as a result of the receipt of the third command (pica tens digit), transistor 1208 in the counter circuit 812 was turned off and transistor 1209 was turned on. In the P circuit 813 at this time, transistor 1250 is on, and transistor 1255 is off. As the counter input conductor 1012 is now marked as a result of the readout of the pica units digit 4, transistor 1202 turns transistor 1208 on, and transistor 1209 off. In the P circuit 813, the transistor 1250 remains on and transistor 1255 remains off. Accordingly, diodes 1236, 1237 and diodes 1233, 1234 are marked by —15 volt potential and +5 volts appears at each of the other diodes connected to selector conductors 1241, 1243, 1244. In that each of the conductors 1241, 1243, 1244 associated with steering circuit 810 will have at least one diode connected thereto which is marked by +5 volts, only negative selector conductor 1242 will be in a condition to effect extension of the digit which is marked on the matrix 806 to its associated register. (In the present example, pica units digit 4 is to be extended to the pica units command register 1056.)

It will be recalled that with the transmission of digit 4 to matrix 806 (FIGURE 50) transistor 1006 in the matrix amplifier 808 (FIGURE 50) was energized, and accordingly only the 4 conductor 1021 of the group will be marked with —15 volt potential (refer to Table 1 above). With reference to the pica units command register 1056 (FIGURE 55), it will be further apparent that the —15 volt potential signal received from matrix amplifier 806 over conductor 1021 is extended over resistor 1146, and since diode 1145 will be cut off as a result of the diode markings in steering circuit 810, the signal is extended over diode 1144 to the bistable circuit 1140 to thereby turn transistor 1142 off and transistor 1141 on, with the end result that a positive potential is extended over conductor 1148 to the pica units null conductor 1087. In that no signal appeared on marking conductors 1018, 1019, 1020, register circuits 1110, 1120, 1130, 1140 remain in their reset condition, and zero output signals are provided by such circuits to pica null conductor 1087.

As noted above, with the saw at pica position 16 (units digit 6) pica units circuits 2 and 4 in the saw register provides a negative signal over conductors 1309 and 1311 to the pica units null conductor 1087.

Thus, since the output of the pica units 4 circuits in command register 820 and saw position register 818 balance out by providing equal positive and negative voltages, and the pica 1, 3, circuits in registers 818 and 820 have zero outputs, the signal on pica units null conductor 1087 will be determined by the signal outputs which are provided by the pica 2 circuits. With the saw at position pica 16, the pica 2 circuit provides a negative signal. However, since the command position is pica 14 the corresponding circuit 1120 in the command register 818 is not so marked, and an approximate zero output is extended over conductor 1128 by circuit 1120 to the pica units null conductor 1087. Accordingly, the pica units null conductor 1087 is marked with a negative signal.

As will become apparent, the system searches in sequency for the presence of a signal (other than zero) on each of the four conductors 1084, 1087, 1089, 1091 and any difference will be detected by the null detector 1325 which responsively initiates repositioning of the saw.

In the present example, the negative signal on the pica units null conductor 1087 indicates that the saw is at a position (16 pica) which is higher than the command setting (14 pica), and accordingly, the saw motor will have to be moved in the downward direction. It will be apparent therefrom that in the event that the reverse condition had occurred, that is, the command was for a 16 pica 06 point setting and the saw was at a 14 pica 03 point position, the signal which would be applied to the pica units null conductor 1087 would be a positive potential, and accordingly the null detector would effect movement of the same in the opposite or advancing direction.

*Fifth command.—Registration of digit P on matrix 806*

As the tape is advanced to move the character P into the readout position, contacts CS2, CS3 are operated to effect the marking of the vertical P conductor in matrix 806, and the transmission of a —15 volt signal over P conductor 1011 to the P control circuit 813 (FIGURE 57) to effect operation of transistor 1250 to the off condition and simultaneously to turn on transistor 1255. As the result thereof, diodes 1260, 1261 are biassed by a —15 volt signal and diodes 1233 and 1234 are biassed by a +5 volt signal. The signal which is extended over the P conductor 1011 to the P circuit 813 is also extended to the counter circuit 812 over diodes 1220 and resistor 1219 to thus turn off transistor 1208, and turn on transistor 1209. As a result, diodes 1232, 1235 are marked by a —15 volt signal, diodes 1236, 1237 are marked by +5 volts, and conductor 1244 is prepared for a register selecting operation.

*Sixth command.—Registration of point tens digit on command register 1057*

As the tape is further advanced to move the point tens digit (0 in the present example) to the readout position, the contact springs CS0 are closed and vertical conductor 0 is energized with a −15 volt signal. In that the vertical conductor 0 is not connected to the matrix amplifier 808, none of the matrix amplifier transistors 1000, 1002, 1004, 1006 will be energized, and accordingly none of the marking conductors 1018–1021 will have a −15 volt marking potential thereon.

However, the signal on output conductor 0 is extended over counter conductor 1012 and transistor 1202 turns on which turns transistor 1208 on and transistor 1209 off to provide a −15 volt signal for diodes 1236, 1237. The P circuit, as in the previous command, marks diodes 1260, 1261 with a −15 volt potential. With diodes 1237, 1260 thus marked, register selector conductor 1243 is effective to prevent conduction of diode 1155 (FIGURE 55) and the output of the matrix amplifier 808 on conductor 1018 is extended to the input circuit for the point ten command register 1057. Since there is no marking as a result of the 0 digit for the point tens digit, the bistable circuit 1150 will remain in its normal condition (transistor 1152 on, and transistor 1151 off), and zero potential is extended over conductor 1158 to the point tens null conductor 1089.

In that the position of the saw is assumed to be 16 pica and 06, an output signal of zero volts will also be extended over conductor 1312 by the point tens position register 1272 to the point tens null conductor 1089. Since the output of the point tens circuit in both registers 818, 820 is zero, the marking on point tens null conductor 1089 is zero volts.

*Seventh command.—Registration of point units digit on register 1058 (FIG. 56)*

As the tape advances and the point units digit (3 in the present example) on the tape is advanced to the readout position, the contact springs CS0 and CS1 are closed, and the vertical conductor 3 in matrix 806 is energized by a −15 volt signal to effect conduction of diodes 985, 986, and the marking of conductors 1013, 1014 with −15 volt signal to effect energization of the matrix amplifier transistors 1000 and 1002, whereby 1 and 2 output conductors 1018, 1019 of matrix amplifier 808 are marked with −15 volt potential to represent the digit three.

The simultaneous energization of vertical conductor 0 in the matrix 806, and the transmission of the −15 volt signal over counter conductor 1012 to the counter circuit 812, turns off transistor 1208 and turns on transistor 1209 to provide −15 volt potential to diodes 1232 and 1235. In that the transistor 1250 in the P circuit 813 is off and transistor 1255 is on, diodes 1260 and 1261 are marked by −15 volt potential. At this time, therefore, only the fourth conductor 1244 in the steering circuit 810 has each of its associated diodes (1235, 1261) marked by −15 volt, and accordingly only conductor 1244 will maintain associated diodes 1165, 1175, 1185, 1195 (FIGURES 55, 56) cut off with the coupling of the signals appearing at the output of matrix amplifier 808 to the input circuits of the point unit command register 1058.

In the present example, the points unit digit is 3 and accordingly output conductors 1 and 2 (1018 and 1019) were marked, whereby registers 1160, 1170 (point units 1 and 2 circuits) in the points unit command register 1058 are operated by such signals. In circuit 1160, the −15 volt signal on conductor 1018 extended over resistor 1166 and diode 1164 causes transistor 1162 to turn off and transistor 1161 to turn on, whereby a positive potential is extended over conductor 1168 to the point units null conductor 1091. Simultaneously the −15 volt signal on marking conductor 1019 is extended over resistor 1176 and diode 1174 to bistable circuit 1170 to turn off transistor 1172 and to turn on transistor 1171, whereby a second larger positive signal is extended over output conductor 1178 to the point units null conductor 1091.

Assuming that the saw is at point position 06, a negative potential signal is extended over conductors 1314 and 1316 to the point units null conductor 1091. It will be remembered that the point unit's register uses three different output resistor values to couple its four bistable circuits to null conductor 1091. More specifically, in corresponding resistor pairs 1169, 1323; 1179, 1324; 1189, 1325; and 1119, 1326, the resistors have values of 100,000, 50,000, 50,000, and 25,000 ohms respectively. In the command register, since the point 1 and 2 circuits are marked, a positive voltage is extended to the null conductor through the parallel combination of resistors 1169 and 1179 having a value of 33,400 ohms. In the position register, since the point 2 and 4 circuits are marked, a negative voltage is extended to the null conductor through the parallel combination of resistors 1324 and 1326 having a value of 16,700 ohms. Since the negative voltage is extended through a smaller resistor value than the positive voltage, a negative voltage appears on conductor 1091 and is conducted to the null detector.

It will be apparent from the foregoing description that whenever there is a discrepancy in the pica tens and units position and point tens and units position on command register 818 and the actual position of the saw as expressed in pica tens and units and point tens and units on saw position register 820, an unbalance signal will occur on one or more of the null conductors 1084, 1087, 1091. As will be shown, null detector 1325 includes sequence means for sensing the existence of such signals and effects adjustment of the saw to the position registered on the command register 818. At such time as the actual position registered on the saw position register 820 corresponds to the command position, there will be a zero output signal on null conductors 1084, 1087, 1089 and 1091.

*Null detector 1325 (FIGURE 57)*

With reference first to FIGURE 57, it will be apparent that the null detector basically comprises a pica tens detector circuit 1330, a pica units detector circuit 1331, a point tens detector circuit 1332, a point units detector circuit 1333, each of which is controlled by the signals placed on null conductors 1084, 1087, 1089, 1091, respectively, as a result of the comparison of the command position and actual position markings in registers 818 and 820.

Each of the detectors 1330–1333 is connected to control an increase control circuit 1334 which, as will be shown, controls operation of the saw to move to a higher pica and point position, and a decrease control circuit 1335, which controls operation of the saw to a decreasing direction to points and pica positions of smaller values. The null detector circuitry 1325 is also automatically operative to sequence the operations of detector 1330–1333 so that the pica tens detector will automatically adjust the saw to balance the pica tens readings on register 818 and 820. As a null is detected, the null detector equipment 1325 next effects enablement of the pica units detector which in turn seeks a null, and thereupon effects enablement of the point tens detector which in turn seeks a null, and thereupon effects enablement of the points unit detector, which seeks a null to thereby move the saw to the command position.

With reference to the pica tens detector circuit 1330, the arrangement there shown comprises a first tarnsistor 1331′ associated with the increase portion of the circuitry, and a second transistor 1332′ which is associated with the decrease portion of the circuitry, both of which are connected to the input pica tens null conductor 1084 for control thereby. The upper transistor 1331′ in the pica tens detector 1330 is effective to provide an output signal over diode 1335 and control conductor 1357 to control energization of increase cntrol circuit 1334 whenever the input signal on the pica tens null conductor 1084 is of a positive value, and the lower transistor 1332′ is operative to provide an output signal over conductor 1358 and diode 1349 to control the decrease control circuit 1335 whenever the signal on the pica tens null conductor 1084 is of a negative value. The transistors 1331′, 1332′ are also connected to the detector sequence control conductors 1341 and 1359, whereby with the energization of either transistor 1331′ or 1332′ in the pica tens detector 1330 as a result of a condition other than a null condition, the conductor 1359 or 1341 will be energized to prevent response of the pica units detectors 1331, point ten detector 1332 and the point units detector 1333 to any signals as may occur on conductors 1087, 1089 and 1091 at such time.

More specifically, pica tens detector 1330 includes a transistor 1331′ having a collector connected over resistance 1334 to +15 volt potential and over diode 1335 to the control conductor 1357 for the increase control circuit 1334 and over resistor 1336 to the sequence control conductor 1359; a base element connected to null conductor 1084, and also over common resistor 1333 to a zero volt source, and an emitter element which is connected to the zero volt potential. Transistor 1332′ includes a collector element connected over resistor 1337 to −15 volt potential and over conductor 1358 and diode 1349 to decrease control circuit 1335 and over resistor 1340 to sequence control conductor 1341, a base connected to the null conductor 1084, and an emitter element conected to the zero volt potential conductor.

The pica units detector 1331 includes a first pair of transistors 1345, 1346 and a second pair of transistors 1350 and 1351. Transistor 1345 includes a collector element connected to conductor 1087, a base element connected over resistors 1343 to the sequence control conductor 1341, and over resistance 1344 to the −5 volt supply. Transistor 1346 includes a collector element connected to the pica units null conductor 1087, a base element connected over resistance 1347 to a +5 volt bias source, and over resistance 1348 to the lower sequence control conductor 1359, and an emitter element connected to zero potential.

The second pair of transistors in the pica units detector 1331 includes a transistor 1350 having a collector element connected (a) over resistor 1352 to +15 volt potential, (b) over diode 1352′ to increase control conductor 1357, (c) over resistors 1354 and 1339 to the −15 volt supply, and (d) over diode 1354′ to the lower sequence control conductor 1359; a base connected to the pica units null conductor 1087; and an emitter connected to zero volt source. Transistor 1351 of such pair includes a collector connected over resistor 1353 to a −15 volt source, and also over resistors 1356, 1355 to +15 volt source, over diode 1351′ to the upper sequence control conductor and over diode 1356′ to the decrease control conductor 1358, a base connected to the pica units null conductor 1087, and an emitter connected to a zero volt potential source.

It will be apparent that the circuitry of the point tens detector 1332 and the point units detector 1333 are identical to that of the pica units detector 1331 and the further description thereof is not believed to be necessary.

The increase control circuit 1334 includes a transistor 1401 having an emitter connected to zero volt source, a base connected to a voltage divider including resistors 1400, 1399 and 1398 connected between +15 volts and −15 volt source, the increase control conductor 1357 (which is connected to the outputs of each of the detector units 1330, 1331, 1332, and 1333) being connected to the base of transistor 1401 via junction of resistances 1399 and 1400.

The collector element is connected over resistor 1404 to +15 volt potential, and to the input circuit for a second transistor 1405.

The second transistor 1405 includes a collector element connected over conductor 1409 to an increase relay 1470 (FIGURE 52) in parallel with diode 1479 and +15 volt potential, a base element connected to the collector of transistor 1401, and an emitter connected over diode 1406 to zero volt potential.

The decrease control circuit 1335 is similarly constructed, and more briefly includes a pair of transistors 1402 and 1408 connected for operation by the decrease control conductor 1358. The output of decrease control circuit 1335 is extended over conductor 1410 to decrease relay 1450 in parallel with diode 1452 (FIGURE 52) and −15 volt potential.

Preliminary to the description of the manner in which operation of the null detector is effected, it is initially noted that with zero potential on each of the conductors 1084, 1087, 1089 and 1091, transistor 1331′, 1332′, 1345, 1346, 1350, 1351, 1360, 1361, 1370, 1371, 1385, 1386, 1390, 1391 are turned off, transistors 1401 and 1402 are turned on, and transistors 1405 and 1408 are turned off.

It will be recalled that in the assumed example, the command position set on register 818 is pica 14 point 03 and the actual position of the saw is 16 pica and 06. As a result of such markings on the command and actual positions, the pica tens null conductor 1084 had a null condition (the units digit on the command and actual register was 1 in each case).

As a result, transistors 1331′, 1332′ remain off and there is no signal output over either increase conductor 1357 or decrease conductor 1358. Further there is no control or hold signal on sequence control conductors 1341 and 1359. As a result, the pica units detector 1331 will be able to respond to the unbalance signals which do appear on pica units null conductor 1087.

Before describing such response, it is noted that if a positive signal had existed on pica tens null conductors 1084 (indicating an increase requirement), transistor 1331′ would be conductive and a signal over conductor 1357 would have controlled transistors 1401 and 1405 to energize increase relay 1470. At the same time, a signal over resistor 1336 to sequence control conductor 1359 turns on transistors 1346, 1361 and 1386 to inhibit the detectors 1331, 1332 and 1333 from responding to the signals on their associated null conductors in a manner to be set forth hereinafter.

Conversely if a negative signal existed on pica tens null conductor 1084, transistor 1332′ would be conducting and a signal over resistor 1340 to sequence control conductor 1341 would turn on transistor 1345, 1360, 1385 to prevent detectors 1331, 1332, 1333 from responding to the signals on their associated null conductors.

As the position of the saw is adjusted to bring correspondence between the command and actual saw positions, the signal on null conductor 1084 becomes zero, and both transistors 1331′, 1332′ become nonconductive to terminate the increase or decrease operation, and further to remove the inhibit signal from sequence conductors 1341, 1359. In the present example, the pica units digit on the command register is 4 and the pica units digit on the position register is 6, and as a result, a negative signal appears on pica units null conductor 1087. It is apparent therefrom that the saw is in a position above the desired command position, and accordingly it will be necessary to decrease the position of the saw in the direction of 14 pica 03 points.

With the negative signal on the pica units detector conductor 1087 (indicating the system is calling for a decrease operation of the motor, and with the inhibit signals removed from conductors 1341 and 1359 by the pica tens detectors 1330 so that transistors 1345 and 1346 are off) transistor 1350 will remain off and transistor 1351 will conduct. The resultant output signal provided by transistor 1351 is transmitted over conductor 1358 to the base of transistor 1402 to turn off transistor 1402 which in turn turns on transistor 1408 to complete an operating circuit for decrease relay 1450 (FIGURE 52) to effect operation of the saw motor in a decreasing direction as will be described hereinafter.

With transistor 1351 in the on condition, the collector voltage goes to zero and causes a positive voltage at the junction of resistors 1356 and 1355 to turn on diode 1351', and thereby establish an enabling circuit for transistor 1360 which conducts, whereby any positive signal which appears on the point tens null conductor 1089 is shunted to prevent operation of transistors 1370 and 1371. In like manner, the enabling circuit causes the transistor 1385 to conduct to shunt any positive signal on null conductor 1091 from operating transistors 1390, 1391.

As the saw is driven in the downward direction to the point where the position 14 pica 12 points is reached, the pica units detector 1331 will detect a null condition (in that the actual pica position 14 and the command pica position 14 are the same). As a result thereof, transistors 1350 and 1351 will be turned off, and diode 1351' will no longer conduct and in turn transistor 1360 in the point tens detector circuit 1332 is turned off so that signals on the point tens null conductor 1089 will be extended to the base of transistors 1370 and 1371.

At this time the point tens digit is 1 (it being recalled that the saw has been operated in a decreasing manner) to move the saw down from 16 pica 06 points to 14 pica 12 points when the balance of pica tens, pica units was detected. (As previously explained, the 14 pica 12 points marking is synonymous with the 15 pica 00 point marking.)

Since the command points tens digit is 0, a negative signal will exist on the point tens null conductor 1089 indicating that a further decrease is required. Transistor 1371 in the point tens detector 1332 turns on, and turns off the transistor 1402 which turns on transistor 1408 to complete a circuit for decrease relay 1450. Additionally transistor 1371, by reason of its being turned on effects conduction of diode 1379 to establish an enabling circuit for transistor 1385 which conducts to thereby prevent positive signals on the point units null conductor 1091 from operating transistors 1390, 1391.

As the saw decreases to the position 14 pica 09 points, the point tens digit on the command register will be 0 and the point tens digit on the saw position register 820 will be 0, and accordingly transistors 1370 and 1371 will be turned off, in turn shunting transistor 1385 in the point units detector circuit 1333 will be turned off.

At this time, the point units digit representing the actual saw position is 9 and the point units command digit is 3, and accordingly a negative signal will appear on the point units null conductor 1091, whereby transistor 1391 is energized which over diode 1394' turns off transistor 1402 which in turn turns on transistor 1408 to complete the circuit to the decrease relay 1450. The saw movement in a decreasing direction is therefore continued until such time as a null condition occurs on the point units.

It is apparent from the foregoing description that with the occurrence of any discrepancy between the value of the pica and points representing the command position for the saw, and the value of the pica and points representing the actual saw position, resultant signals over the null conductors 1084, 1087, 1089, 1091 will control the null detector 1325 in the operation of the decrease and increase relays 1450, 1470 in such manner as to provide output signals over conductor 1409, 1410 which move the saw in the direction of the command position. The circuitry for effecting control of the saw movement in response to such relay operations will now be set forth in detail.

*Saw positioning control circuitry*

Preliminary to describing the detailed circuitry, a brief description of the manner of operation of the motor control equipment is set forth hereat. Briefly, whenever a signal is received from the null detector 1325, the motor circuitry is operative to reposition the saw blade in an increase or decrease direction as required, such change being effected until the saw position register 820 and command register 818 indicate to the null detector circuitry 824, 826 that the saw blade has reached the command position. At such time, the circuitry stops movement of the motor.

As will be shown, when an increase measure is requested, the motor is operated to move the saw in an increasing direction. As the requested measure is reached, the circuitry causes the motor to overrun the requested measure in an upward direction. As a result thereof, the null detector detects a discrepancy in the command position and the actual saw position, and causes the circuitry to operate the motor in the movement of the saw back down to the requested measure. During this downward movement, the motor overruns again, and the circuitry thereupon shifts the motor to a slow speed. As a result of this last overrun, the null detector once more detects the difference, and causes the circuitry to energize the motor to move the saw in an increasing direction at a slower rate to the requested measure. As the requested measure is reached, capacitor-braking action is provided to effect immediate stopping of the saw at the desired position.

In the event that the initial request is for a decrease measure, the motor is initially energized to cause the saw to move in a decrease direction. As the requested measure is reached, a slight overrun occurs, and as a result thereof the null detector circuitry controls the saw positioning circuitry to operate the motor at a low speed, and accordingly the saw is moved in an increasing direction towards the requested measure at the slow rate. As the saw moves into position, capacitor-braking action takes place, and the saw is stopped precisely at the desired position.

After the requested measure is reached, a control pulse returns the motor control circuitry to the off position, and transmits a reset pulse to the registers to reset the register circuit 818, counter circuit 812 and P circuit 813.

As will be shown, the saw positioning circuitry also includes a novel cutoff circuit including a cutout relay 1490 which de-energizes the motor control circuit in the event of repeated hunting of the motor because of an improper instruction, such as for example, a request for too low or too high a measure (i.e., a 13 point count).

As an aid to understanding the details of the saw positioning circuitry, the components which are used and the function thereof in the control operation are first briefly described.

With reference first to FIGURES 46 and 47, it will be apparent that the output signals of the null detector 1325 are coupled alternatively over increase conductor 1409 or decrease conductor 1410 to increase relay 1470 or decrease relay 1450 respectively. Decrease relay 1450 in turn controls a decrease control relay 1455 which is also dependent in its operation upon (a) the de-energized condition of the increase control relay 1440 (contacts 1445 closed), and (b) the closed condition of decrease limit switch 1454.

In a similar manner, the increase relay 1470 at its contacts 1471 controls an increase control relay 1440, which is further dependent in its operation upon (a) the de-energized condition of the decrease control relay 1454 (contacts 1464 closed), and (b) the closed condition of increased limit switch 1541. As will be shown, decreased control relay 1455 in turn controls operation of an NR relay 1435 which holds itself after the D.C. relay drops out.

The control circuit further includes an H relay 1425 which is normally energized by the automatic contacts 1585, 1586 of an automatic-manual switch, the energizing circuits extending from 0 volts over the winding of H relay 1425, contacts 1437, automatic contacts 1585, 1586 of the automatic-manual switch to +140 volts. The automatic-manual switch is in the illustrated position whenever the system is to be operated in the automatic mode. The H relay remains energized until an NR relay 1435 is later operated. As will be shown, the motor is operated at high speed when the H relay is energized (contacts 1426, 1428, 1431 closed), and is operated at low speeds when the H relay is deenergized (contacts 1427, 1429, 1430 closed). Also when H relay 1425 is deenergized, and both the increase control and decrease control relays 1440 and 1455 are deenergized, a circuit (conductor M5, contacts 1456, 1445, 1429, capacitor 1469 an conductor M2) is completed to the capacitor braking circuit for the motor. As will be shown, H relay 1425 will normally remain energized until both the NR relay 1435 and IC relay 1440 are energized in the last increasing operation of a saw position adjustment.

More specifically, the operating circuit to the motor for high speed operation is completed to motor conductors M4, M2; M1, 5, 6; (FIGURE 51), the circuit for M4, M2 extending from line conductors 1580 and 1581 (FIGURE 52) respectively. The first path extends from line conductor 1580 including fuse 1495, over contacts 1491, 1481, 1476, contacts 1457 for decrease operation or contacts 1441 for an increase operation, contacts 1426 to motor conductor M2. A second path extends from line conductor 1581 over contacts 1431 to motor conductor M4. As will be shown, in addition to requiring the operation of the increase relays 1470, 1440 (or the decrease relays 1450, 1455), such circuits further require that the 4R relay 1480 be energized to close contacts 1481, the cycle relay 1475 be energized to close contacts 1476, and the H relay 1425 be energized to close contacts 1426.

The cycle relay 1475 is operated by the cycle switch whenever the line casting position is in the normal position. Assuming this to be the case, contacts 1495′ will be closed, and cycle relays 1475 will be operated and its contacts 1476 will prepare one of the points in the circuit for the motor .

Override relay OR (1420) operates when either the increase or decrease limit contacts 846, 847 are closed, and as operated controls either the increase relay 1440 or decrease control relay 1455, as the case may be, to drive the motor back from the overriding direction of travel.

Further by moving the automatic-manual switch to the manual position contacts 1586, 1587 (FIGURE 51) close and contacts 1504 (FIGURE 52) are closed, and contacts 1586 are opened. In such position, push button contacts 1493, 1494 may be closed, alternatively, to energize either the increase relay 1440 or the decrease relay 1455. With such arrangement the attendant may selectively control movement of the saw to any desired position without operating any other equipment.

Opening of contacts 1585 prevents automatic operation of the equipment during such period.

The manner in which relays cooperate to control operation of the saw motor will now be described in detail.

*Operation of motor control circuitry*

As noted above, one point in the motor energizing circuit is completed by the 4R relay 1480 at its contacts 1481 and until such contacts are closed the saw positioning motor cannot be operated. It will be recalled that as the seventh commande on the tape (points units) is being read out and the counter circuit 812 is advanced by the pulse transmitted over conductor 1012, diode 1526 (FIGURE 51) is reverse biased. As the counter advances to apply −15 volts to diodes 1235, 1261, diode 1527 is also cut off.

Previous to this time, a +5 volt signal was applied to either diode 1235 or 1261 and transistor 1525 was turned on. However, as the counter advances to apply −15 volts to diode 1235, 1261 as a result of the seventh command (the last information to be registered) diodes 1527 and 1526 are cut off and transistor 1525 is cut off. The resultant negative signal over the time delay circuit 1530 forward biases diode 1533 and causes transistor 1054 to turn on. Reisistor 1576 serves to hold 1054 on which in turn holds 1054′ on (a bistable control element).

The conduction of transistor 1054 raises the base voltage of transistor 1054′ which also turns on and completes an obvious circuit to 4R relay 1480. Relay 1480 operates and at its contacts 1481 closes a point in the motor energizing circuit. It is apparent that operation of the 4R relay indicates to the motor control circuitry that the entire set of command information has been registered on the command register, and that saw positioning can be initiated.

The 4R relay at its contacts 1482 also interrupts a point in the energizing circuit for the reject solenoid 1502, and a point in the energizing circuit for elevate solenoid 1503 during the period of saw motor energization, and at its contacts 1484 interrupts the reset signal circuit for the S control circuit 822.

As noted above, it is also necessary that the cycle switch 1495 and the cycle relay 1475 also be energized before saw positioning may be effected in response to operation of the increase or decrease control relays 1440, 1455. That is, it will be recalled that the elevate signal at the end of the command information stops the TTS reader, and completion of the elevate cycle automatically causes the selector shaft clutch to engage, which causes the reader to again begin reading the tape code. Since the elevate cycle starts the casting cycle in motion, and the elevate cycle can be completed before the casting cycle is completed and the slug ejected, and since the next signal read the tape may be a command to reposition the saw, the saw positioner must be kept at rest until the line casting operation is completed.

It is also recalled that when the line casting cycle begins the casting of a given line, the cam shaft of the line caster makes one full revolution. An activating pin is added to the cam shaft at a position which will close cam shaft switch when the cam shaft is in its rest position, and such pin closes contacts 1495′ to operate the cycle relay 1475 (FIGURE 52) when the equipment is at rest. Thus, although command information may be sent to the positioner as soon as the reader is started at the completion of the elevate cycle, any time the line caster is actually in the process of casting a line, the cam shaft will rotate the actuating pin out of contact with the cycle switch, the cycle relay 1475 will be restored and contacts of relay 1475 will maintain the energizing circuit for the saw motor interrupted. The cycle relay at its contacts 1477 also restores the slug detector circuit. In much manner, operation of the saw positioner motor is prevented during the line casting operation.

Assuming now that the cycle switch 1495′ is closed and that cycle relay 1475 is operated, contacts 1476 prepare a further point in the circuit for the saw positioning motor.

With reference next to the override relay 1420, it is noted at this time that with the relay de-energized as a result of the increased limit switch 846 and decrease limit switch 847 being open, the contacts 1421, 1422 on override relay 1420 will be open. As will be shown hereinafter, if the override relay 1420 is operated as a result of the increase or decrease limit switches 846 or 847 being closed, the appropriate one of the control relays 1440, 1455 will be energized to pull the motor back from the overriding direction of travel.

In the event that the motor is not hunting, cutout relay 1490 will not be operated and contacts 1491 will be closed to prepare a further point in the energized circuit for the saw positioning motor. The manner of operation of the cutout relay will likewise be described in more detail hereinafter.

Finally, it is noted that the H relay 1425 is energized whenever manual switch 1585 is closed over a circuit which extends from +140 volts over contacts 1586, 1437 and the winding of relay H to zero potential. Relay H at its contacts 1426, 1428, 1431 completes a further point in the energizing circuit to motor conductors M2, M1, and M4, and at its contacts 1427, 1430 interrupts the circuit which operates the motor at slow speeds.

With the H relay 1425, 4R relay 1480, cycle relay 1475, OR relay 1420, cutout relay 1490 in the positions indicated above, the completion of an energizing circuit for the increase control relay 1440 or decrease control relay 1455 will result in the operation of the saw positioning motor in a manner which will now be set forth.

(*a*) *Decrease control.*—In the example set forth hereinbefore, it will be recalled that it was assumed that the actual setting of the saw was 16 pica, 06 points, and that the command position on the tape as fed to the command register was 14 pica 03 points. As a result thereof, the signals extended over the null conductors to the null detector 1325 resulted in the energization of the decrease relay 1450 to move the saw in a decreasing direction from the position 16 pica, 06 points toward the command position 14 pica 03 points.

Figure 52:
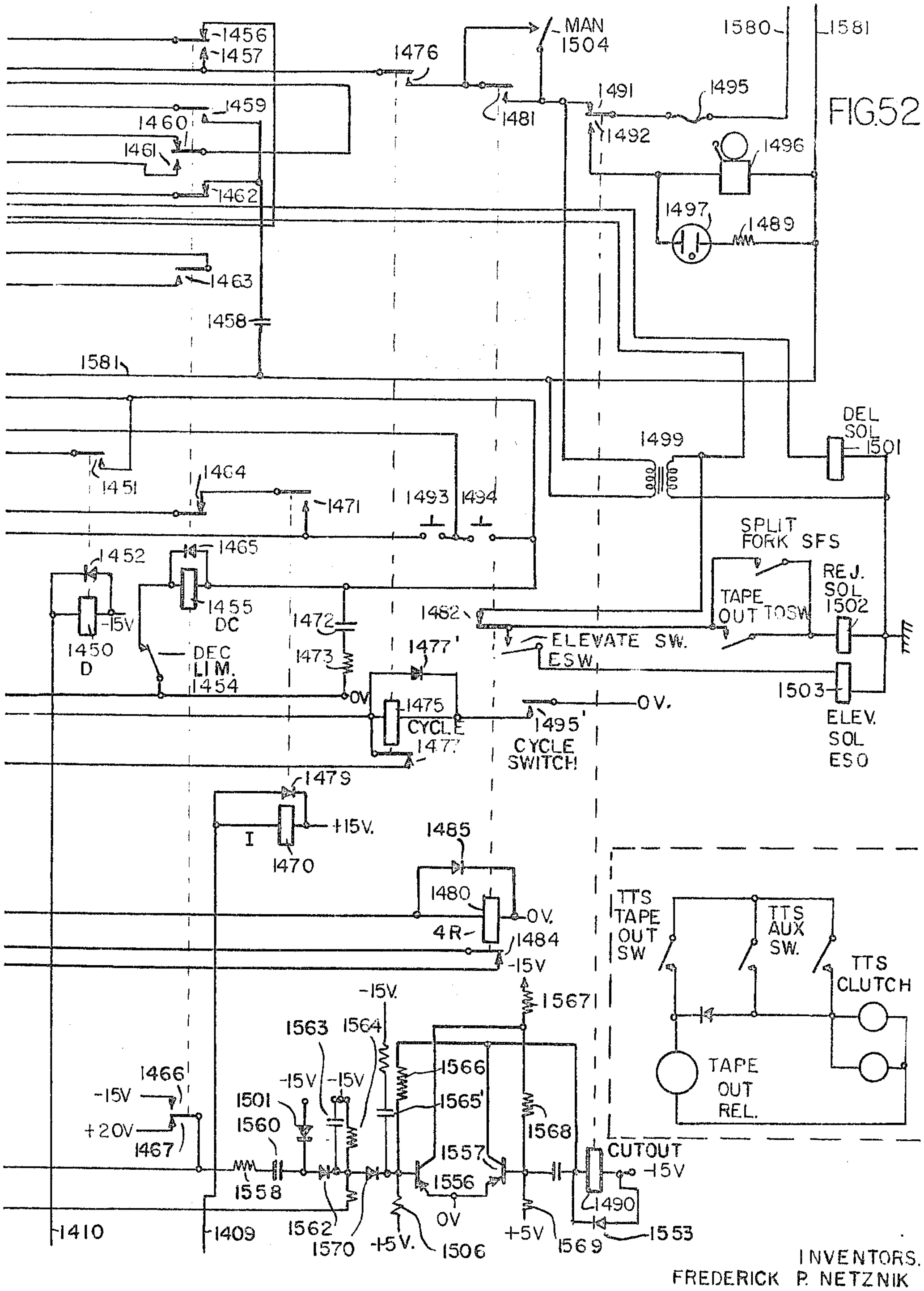

With reference now to FIGURE 52, with the operation of decrease relay 1450, it is effective at its contacts 1451 to complete an energizing circuit for the decrease control relay 1455, the circuit specifically extending from the zero volt conductor over decrease limit switch 1454, decrease control relay 1455, contacts 1451, 1446, manual switch contacts 1586 to +140 volt potential.

Decrease control relay 145 operates, and at its contacts 1457 completes an operating circuit to the saw position motor 530, as will be shown; at its contacts 1459 connects motor conductor M6 over capacitor 1458 to the line conductor 1581; at its contacts 1461 extends power to the motor in the decrease direction; at its contacts 1463 completes an energizing circuit for the NR relay 1435; at its contacts 1466 completes a discharge circuit for capacitor 1560, and further extends a −15 volt potential over contacts 1449, resistor 1535′ and diode 1570 to further maintain transistors 1054 and 1054′ in the on condition during the positioning operation, and at its contacts 1467 interrupts the charging circuit for capacitor 1560. The manner in which capacitors 1560, 1565′ control operation of the cutout relay is set forth in a separate section hereinafter.

The energizing circuits for the saw position motor thus completed by decrease relay 1455 at its contacts 1457 extend from the first line conductor 1580 and over fuse 1495, contacts 1491, 1481, 1476 and (a) over contacts 1457 to conductor M5, (b) over contacts 1426 to conductor M2, (c) over contacts 1461 and 1428 to conductor M1. The second side of the line 1581 is connected over contacts 1431 to conductor M4. The motor now operates in a decreasing direction.

As such circuit is maintained to the saw positioning motor by the null detector 1325 and the decrease control relay 1455, the motor effects movement of the saw downwardly in the direction of the command position (14 pica 03 points), and the null detector 1325 maintains such energizing circuit in the manner described above.

As noted above, as the decrease control relay 1455 operated, it was effective at its contacts 1457, 1463, to complete an operating circuit to NR relay 1435 which extends from the L1 conductor (1580) over fuse 1495, contacts 1491, 1481, 1476, 1457, resistor 1448, diode 1449, contacts 1463, the winding of relay 1435, resistor 1468 to the second line conductor 1581.

NR relay 1435 operates, and at its contacts 1436 locks directly to the energizing circuit independent of contacts 1463 on decrease control relay 1455, and at contacts 1437 interrupts one holding circuit for relay H, and at contacts 1438 interrupts the "slow-to-release" circuit for increase relay 1440. As a result of relay NR operating, H relay 1425 now is held by a circuit extending over contacts 1432 and contacts 1446 on the increase relay 1440. The purpose of such circuit preparation will become more obvious hereinafter.

The motor 530 effects continued movement of the saw downwardly and as the command position (14 pica 03 points in the present example) is reached by the saw, the null detector 1325 detects a null condition, and interrupts the energizing circuit for the decrease relay 1450 which restores, and at its contacts 1451 interrupts the energizing circuit for decrease relay 1455.

However, the delay circuit including capacitor 1472 and resistor 1473 causes decrease control relay 1455 to release slowly, and accordingly the saw is driven past the requested measure in the downward direction before decrease control relay 1455 restores. (Thus in the present instance, the saw, by way of example, may overrun to the position 14 pica 01 points.)

As decrease relay 1455 restores, it is effective at contacts 1456 to prepare the D.C. braking circuit, at its contacts 1457 interrupts the energizing circuit for conductor M5 and at its contacts 1459 interrupts the connections of conductor M6 to capacitor 1458, at its contacts 1461 interrupts the energizing circuit to motor conductor M1, at its contacts 1463 interrrupts the original energizing circuit for NR relay 1463 (which holds, as noted above), at its contacts 1464 prepares the operating circuit for increase control relay 1440 and at its contacts 1466 interrupts the discharge circuit for capacitor 1560, and at its contacts 1467 recompletes the charging circuit for capacitor 1560, for a purpose to be set forth in more detail hereinafter.

As a result of the overrun which was effected by the delayed release of decrease relay 1455, the readings on the command and position registers will differ and null detector will detect the overrun in the decrease direction to provide an operating potential over conductor 1409 to the increase relay 1470 which operates and at its contacts 1471 completes an operating circuit for increase control relay 1440.

Increase control relay 1440 operates and at its contacts 1441 completes an energizing circuit to the motor conductor M5; at its contacts 1442 disconnects motor conductor M6 from capacitor 1458; at its contacts 1443 completes a path from power conductor 1580, over fuse 1495, contacts 1491, 1481, 1476, 1441, 1460, 1443 to motor conductor M6; at its contacts 1444 prepares to connect motor conductor M3 to capacitor 1458 (as relay H subsequently restores).

Increase control relay 1440 at its contacts 1444 connects motor conductor M3 to capacitor 1458 over a path extending over contacts 1427, 1444, 1462, and capacitor 1458 to path 1581; and at its contact 1449′ interrupts the +20 volt potential to diode 1570 and at its contacts 1448 connects a −15 volt potential to diode 1570 to further maintain transistors 1054 and 1054′ turned on; and at its contacts 1446 interrupts a point in the holding circuit for the H relay 1425. In that the NR relay 1435 is operated and contacts 1437 are open, both holding circuits for the H relay 1425 are now interrupted.

As H relay 1425 restores it is effective at its contacts 1426 to interrupt the energizing circuit to motor conductor M2; at its contacts 1427 connects motor conductor M3 to capacitor 1458 over contacts 1427, 1444 and 1462; at its contacts 1428 further interrupts the energizing circuit to motor conductor M1; at its contacts 1431 interrupts the energizing circuit to motor conductor M4; at its contacts 1430 connects the second side of the power line to motor conductor M2. In brief summary, at this time motor conductors M5 and M6 are connected to path 1580, conductor M3 is connected through capacitor 1458 to path 1581, and conductor M2 is connected to path 1581.

As a result of such manner of connection of the motor by the restored H relay 1425, the motor operates in the increase direction at a reduced speed in the direction of the requested measure. As a balance is detected on the null conductors, the null detector circuitry 1325 interrupts the energizing circuit for relay 1470 which restores and at its contacts 1471 interrupts the energizing circuit for increase relay 1440. In that the NR relay is operated, contacts 1438 are open and the delay circuit which would otherwise effect a delayed release of relay 1440 is disabled. Accordingly relay 1440 releases instantaneously. Relay 1440 restores and at its contacts 1445 connects capacitor 1469 across motor conductors M2, M5 to cause a braking action to take place, the circuit extending from conductor M5 over contacts 1456, 1445, 1429 over capacitor 1469, and contacts 1430 to conductor M2.

As increase relay 1440 restores to interrupt the energizing circuit for motor 530, the energizing circuit for the NR relay was also opened at contacts 1441, and the NR relay released. As NR relay restores, contacts 1437 close to complete an energizing circuit for H relay 1425 which extends from 0 volts over the winding of H relay 1425, contacts 1437 and 1586 to +140 volts potential, and H relay 1425 operates. At this time, therefore, the H relay 1425 is energized and the NR, IC, I, DC, D relays are restored and the relays are prepared for the receipt of a further positioning signal.

In that the requested measure has now been reached, the null detector circuitry has interrupted the circuit for the increase relay 1440 and the decrease control relay 1455, and as a result thereof, contacts 1449' and 1467 respectively are closed to connect +20 volt potential over resistor 1535' and diode 1570 to the base of transistor 1054 which is turned off to provide a negative signal to the base of transistor 1054' which turns off to interrupt the energizing circuit for the 4R relay 1480.

As will be shown hereinafter, with the restoration of the 4R relay the registers and associated circuitry are reset and a circuit is prepared or completed to effect the operation of the elevate solenoid in the consequent completion of the cycle. However, at this point the description digresses slightly to set forth the operation of the motor control circuitry in the event that the initial signal transmitted to the null detector indicates that an increasing operation of the saw is required to advance the saw from a first position to a second position of a higher value.

(*b*) *Increase control*.—Assuming now that the command position on the tape was 16 pica 06 points and that the actual setting of the saw was 14 pica 03 points, the manner in which the equipment is operative to effect the saw positioning will now be set forth.

With such condition existing, it will be apparent that the output of the registers over null conductors 1084, 1087, 1089, 1091 (FIGURE 56) to the null detector 1325 will comprise a zero output on the pica tens null conductor (both the saw position and command digits are 1), a positive signal on the pica units null conductor 1087 (the pica units digit for the actual position is 4 and the units digit for the command is 6), a zero output on the point tens null conductor 1089 (both command and actual position point tens digit being 0) and a positive signal on the point units null conductor 1091 (the point units digit for the actual position of the saw being 3 and the point units digit for the command being 6). As a result thereof, transistors 1331',1332' in the pica tens detector 1330 will remain off and no further control adjustment is effected by the pica tens detector 1330. However, by reason of the imbalance on pica units null conductor 1087, and specifically the positive value signal which appears theron, transistor 1350 will conduct to transmit a signal over diode 1352' to the increase control circuit 1334, whereby transistor 1401 is turned off, and transistor 1405 is turned on to provide a signal over conductor 1409 to the increase relay 1470 in the motor control circuit (FIGURE 52).

Assuming that the H relay 1425, 4R relay 1480, cycle relay 1475 are operated, and that the cutout relay 1490 and the overrun relay 1420 are deenergized, as the increase relay 1470 now operates, at its contacts 1471 an operating circuit is completed to the associated increase control relay 1440, which extends from +140 volts over contacts 1586, 1464, 1471, the winding of relay 1440 and the increase limit switch 1451' to the zero volt potential.

Increase relay 1440 operates and at its contacts 1441 completes the energizing circuit to motor conductor M5 and M2 (contacts 1426 being in the closed position by reason of the operated condition of H relay 1425) the circuit extending from line conductor 1580 over fuse 1495, contacts 1491, 1481, 1476, 1441 and 1426 to connect the one side of the line to conductors M2 and M5; and from the second line conductor 1581 over contacts 1431 to motor conductor M4; at its contacts 1443 extends an energizing circuit to motor conductor M6, the circuit extending from conductor 1580 over fuse 1495, contacts 1491, 1481, 1476, 1441, 1460, 1443 to the conductor M6. Additionally, increase relay 1440 at its contacts 1444 connects motor conductor M1 over contacts 1428, 1444, and 1462, to capacitor 1458, at its contacts 1446 opens one of the holding circuits for the H relay 1425, and at its contacts 1449' disconnects the +20 volt potential from the 4R buffer circuitry, and at its contacts 1448 connects −15 volt potential to diode 1570 which keeps transistors 1054 and 1054' turned on to maintain the 4R relay energized during the saw positioning.

With conductors M5, M2, M6, M1, M4 on the motor thus connected, the motor operates to move the saw in an increasing direction from the actual position 14 pica 03 points in the direction of the command position 16 pica 06 points. As the saw advances to position 16 pica, the signal on the pica units detector conductor 1087 will balance out, and with zero potential on such conductor the pica units detector 1331 terminates transmission of a signal to the increase control circuit 1334. As indicated above, the point tens detector also detects a null condition on conductor 1089 and accordingly effects no further control of the motor circuitry.

However, the point units detector 1333, by reason of the differential between the 00 point reading indicating the saw position, and units digit 06 on the command register, will have a positive value signal thereon, and accordingly transistor 1390 will be energized to maintain transistor 1401 cut off and transistor 1405 turned on to thereby complete a circuit to increase relay 1470 to cause the motor control circuitry to continue to adjust the motor in an upward direction.

As the requested measure is reached (16 pica 06 points), the increase control circuitry 1334 effects deenergization of the increase relay 1470 which restores, and at its contacts 1471 interrupts the energizing circuit for the increase relay 1440. However, by reason of the capacitor 1439 connected in parallel with relay 1440, the relay 1440 is held energized for a brief period causing the motor to overrun the requested measure in an upward direction (as for example, to 16 pica 08 points) before increase control relay 1440 restores.

As the increase control relay 1440 restores it is effective at its contacts 1441 to interrupt power to the saw position motor 530, which stops; at its contacts 1443 interrupts the power to conductor M6; at its contacts 1444 interrupts the connection between conductor M1 and capacitor 1458; at its contacts 1446 completes a further holding circuit for H relay 1425 independent of relay NR, and at its contacts 1448, 1449' disconnects −15 volt potential and connects +20 volt potential to the diode 1570 in the 4R buffer circuit 1479 as noted heretofore.

As a result of the over-travel in the increase direction the command register 818 and saw position register 820 effect the transmission of a negative signal over point units null detector 1091 and transistor 1391 is turned on, transistor 1402 is turned off, and transistor 1408 is turned on to provide a signal over conductor 1410 to the decrease relay 1450.

Decrease relay 1450 at its contacts 1451 completes the energizing circuit for decrease control relay 1455 in the manner heretofore described, and relay 1455 operates as before to move the motor downwardly towards the requested measure, it being recalled that the decrease control relay 1455 at its contacts 1463 also completes an energizing circuit for the NR relay 1435.

At this time, with reference to the H relay 1425, it is noted that the normal holding circuit is extended over contacts 1432 and contacts 1446 on the increase relay or alternatively over contacts 1437 on the NR relay. With the NR relay operated, the holding circuit for the H relay 1425 is maintained over contacts 1437 until the contacts 1446 on increase relay 1440 (which has restored) are once more opened (at which time the H relay 1425 restores). Thus, during the decrease operation, the NR relay 1435 and the H relay 1425 are operated.

During the decrease operation, the connections are established as heretofore described for motor conductors M5, M2. Motor conductor M6 is connected over contacts 1442, 1459 and capacitor 1458 to path 1581.

The energizing circuit for NR relay 1435 as noted above, extends over control contacts 1463 on decrease control relay 1455, diode 1449′, resistor 1448′ and contacts 1457. NR relay 1435 operates and at its contacts 1436 completes a holding circuit independent of the contacts 1463 on decrease control relay 1455. NR relay at its contacts 1437 opens one of the holding circuits for H relay 1425 which holds operated over contacts 1432, 1446, 1586 to +140 volt potential.

It will be recalled that the decrease relay 1455 also includes a delay circuit including capacitor 1472 and resistor 1473, whereby an overrun of the requested measure in the decrease direction is also affected (in the present instance, the saw may overrun to 16 pica 04 point position). The null detector detects the overrun in the decrease direction, restores the decrease relay, and provides an operating potential over conductor 1409 to the increase relay 1470 which in turn at its contacts 1471 completes an operating circuit for increase relay 1440. As previously discussed, the increase control relay 1440 is effective at its contacts 1446 to interrupt a path in the holding circuit for the H relay. Since the NR relay is also energized at this time, contacts 1437 are open and the alternate holding path for the H relay is also interrupted. With both contacts 1446 and 1437 open, the H relay 1425 restores and at its contacts prepares the motor for slow operation to the increase direction.

More specifically, the H relay at its contacts 1426 effects interruption of the energizing circuit to motor conductor M2; at its contacts 1428 interrupts the energizing circuit to motor conductor M1; at its contacts 1431 interrupts the energizing circuit to motor conductor M4; and at its contacts 1430 connects the second side of the power line to motor conductor M2, and at its contacts 1429 prepares the braking circuit for the motor.

The increase control relay operates and at its contacts 1441 completes a path to motor conductor M5; at its contacts 1443 completes a path from power conductor 1580 to motor conductor M6; at its contacts 1444 completes a path to conductor M3 extending over contacts 1427, 1444, 1462, and capacitor 1458 to path 1581; and at its contacts 1448 connects a −15 volt potential to diode 1570 to further maintain transistors 1054 and 1054′ turned on. In summary, conductors M5 and M6 are connected to voltage path 1580, conductor M3 is connected through capacitor 1458 to path 1581, and conductor M2 is connected to path 1581.

By reason of the energization of such motor conductors, the motor operates at a slow speed to increase the saw position in the direction of the requested measure. As a value is read in, the null detector circuitry detects the balance, and causes the relay 1470 to restore which in turn restores relay 1440. As soon as the relay 1440 restores, a circuit is completed to cause capacitor braking to take place as previously described.

After the requested measure is reached, the increase relay control 1440 and decrease control relay 1455 are restored, and at their contacts 1449′ and 1467 respectively connect +20 volt potential to the 4R buffer circuit 1479 which turns off transistors 1054 and 1054′ to effect the release of 4R relay 1480. It will be apparent that by reason of contacts 1449 and 1467 the 4R relay will be maintained operated whereas either the increase relay 1440 or decrease relay 1450 are energized.

(*c*) *Reset by 4R relay.*—As noted above, when the null condition occurs to indicate the desired position has been reached after either the decreasing control as set forth in (a) above, or an increasing control as set forth in (b) above, the 4R relay 1480 is restored.

As relay 1480 restores, it is effective at its contacts 1484 to extent +55 volt potential (FIGURE 49) over reset switch RSW, conductor 801 (FIGURES 49, 50 and 51), reset off switch 1478, contacts 1484 (FIGURE 52), conductor 1245 (FIGURES 51 and 57), to the input circuit for the S control circuit 822 (FIGURE 56). Transistor 1027 turns on, and transistor 1028 turns off. With transistor 1027 turned on, transistor 1044 is also turned on and a +15 volt signal is transmitted over reset conductor 1050 to the bistable circuits, such as 1060, 1100, etc., in the command register 818 whereby each of the right hand transistors, such as 1062, in circuit 1060 is turned on and the left hand transistor, such as 1061, is turned off. The +15 volt signal is also extended over reset conductor 1046 to reset circuit 1052 (FIGURE 51) whereby transistor 1053 is turned off and a −15 volt pulse is extended over the reset conductor to the inputs for the counter circuit 812 and the P circuit 813 to return such circuits to the reset condition (transistor 1208, 1250 turned on). Finally, the +15 volt signal over reset conductor 1046 (FIGURE 51), resistor 1577 and diode 1571 further turns off transistor 1054, which further disables transistor 1054′ along with the +20 volt supply from contact 1467.

The circuitry is now reset and prepared to receive a further command from the tape. The 4R relay 1480 in restoring is also effective at its contacts 1482 to prepare a point in the circuit for the elevate solenoid 1503 (i.e., to indicate the saw has been moved to the command position). With reference to FIGURE 52, it will be noted that in the event that the TTS elevate mechanism has closed the elevate switch ESW and the 4R relay 1480 has restored, and the circuit will now be completed for the elevate solenoid 1503 which operates to effect the elevation and delivery of the line of matrices which will be cast and sawed to the new length.

With the energization of elevate solenoid ESO 1503, split fork switch SFW (FIGURE 52) is closed, and a circuit is completed to the reject solenoid 1502 as noted earlier herein.

Figure 51:
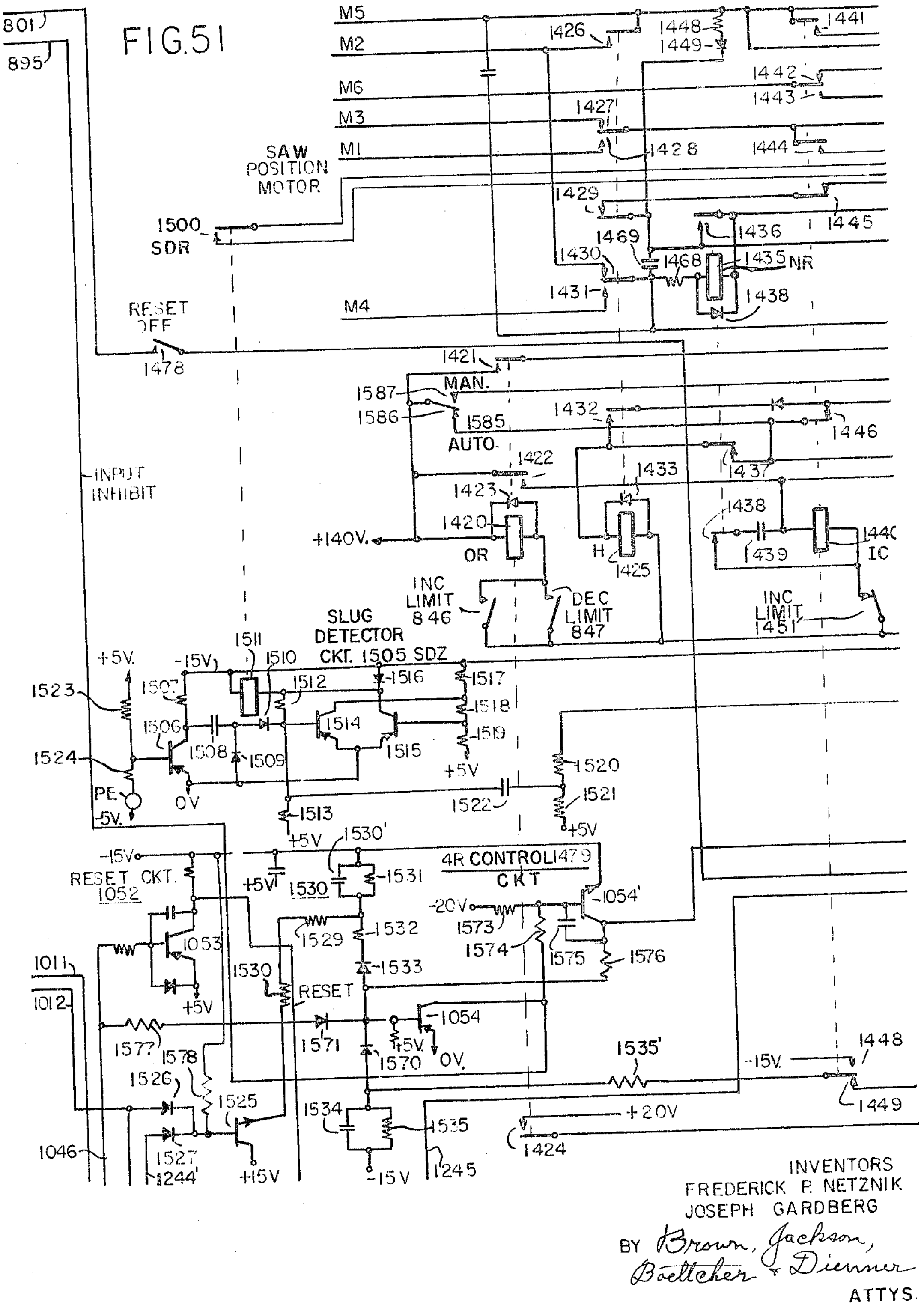

It will be recalled from the preceding description that the so-called elevate cycle, that is, the first phase of the operation wherein the first matrices are first dropped into the assembly mechanism, and then elevated up into the elevated position where it is picked up by, or stands in readiness to be picked up by the horizontally moving delivery slide DS (FIGURE 1) and that the so-called casting cycle covers the second phase of the operation wherein the delivery slide DS picks up this line of matrices and moves it over into sensing relation to the delivery regulator DR (FIGURES 1 and 47). If the regulator is in the proper clearing position (with the solenoid DRSO energized) the line of matrices will be permitted to be moved down into casting relation to the mold wheel following which the cast slug is ejected by the ejector slide down the discharge chute past the photosensing apparatus SDZ (FIGURE 47). Such manner of operation is controlled by a slug detector circuit 1505 (FIGURE 51).

As there shown the slug detector circuit 1505 basically comprises a photoelectric cell PE which is responsive to the passage of a slug thereby to control operation on an associated slug detector relay 1511 which at its contacts 1500 controls operation of the delivery solenoid 1501 (FIGURE 52). Thus, as will be shown, if a slug is cast but not ejected or alternatively not delivered normally to the galley, further casting is immediately halted so that the cause of the malfunction may be located and eliminated. Delivery solenoid is located at the left hand of the delivery slide to stop every line of matrices before entering the vice jaws of the line caster for casting unless energized by the slug detector circuit 1505 which has determined that the previous slug has been delivered.

More specifically, the photoelectric cell PE in slug detector circuit 1505 is connected to control a first transistor 1506 which at its output controls a bistable circuit including transistors 1514, 1515, in the selective energization of the associated slug delivery relay 1511.

Transistor 1506 includes a collector connected over resistor 1507 to —15 volt potential, a base connected to a voltage divider including resistors 1523, 1524 which are connected in series with photoelectric cell PE across the +5 volt and —5 volt sources, an emitter connected to zero volt potential.

The collector of transistor 1506 is also connected over capacitor 1508 and diode network 1509, 1510 and voltage divider 1512, 1513 to the bistable circuit 1514, 1515.

The bistable circuit includes a first transistor 1514 having an emitter connected to zero volt potential, a base connected to the output of the first transistor 1506 and a collector connected to a point on voltage divider 1517, 1518, 1519, which is connected between —15 volt and a +5 volt source. The second transistor 1515 in the bistable circuit includes an emitter connected to zero volt potential, a base connected to a second point on the voltage divider 1517–1519, and a collector connected over diode 1516 to —15 volt potential and over relay 1511 to —15 volt potential and to a voltage divider comprising resistors 1512 and 1513 in the base circuit of transistor 1514.

With such manner of connection the transistor 1506 is normally turned on and transistor 1514 is normally turned on and transistor 1515 is normally off.

With the ejection of a slug to move past photoelectric cell PE a momentary passage interrupts the light source to the photoelectric cell PE and the resistance resulting in a more positive voltage to the base of transistor 1506 which turns off. As the light is restored transistor 1506 turns on and at its collector effects the transmission of a positive pulse signal to the base of transistor 1514 which turns off and controls transistor 1515 to conduct whereby a circuit is completed for the slug detector relay 1511 which extends from —15 volt potential over relay 1511, transistor 1515 to zero volt potential. Slug detector relay 1511 at its contacts 1500 completes an energizing circuit for the delivery solenoid 1501 which operates to release the delivery regulator DR 860 and thereby permits normal line casting with the slug which has now been provided.

At such time as the line casting cycle begins the casting of a line, the cycle switch contacts 1495 open and cycle relay 1475 restores, as described above, and at its contacts 1477 connects —15 volt potential to one end of voltage dividers 1520, 1521, whereby a pulse is transmitted over capacitor 1522 to the base of transistor 1514, which turns on and in turn by reason of the changing potential on the base of transistor 1515 causes the same to turn off and restore delivery relay 1511. The slug detector circuit 1505 is then reset for use in detecting a subsequent slug.

*Cutout relay*

As noted hereinbefore, the novel circuitry also includes a cutout circuit which detects repeated hunting of the motor which may occur, for example, if the improper instructions, such as a 13 point count have been received by the system, and have resulted in the request for a measure which is too high or too low. In such event the repeated hunting of the motor effects repeated operation of the increase and decrease control relays 1455 or 1440 in the manner set forth above. As a result thereof, the repeated connection at contacts 1467 and 1466 respectively is +20 volts and —15 volts potential over resistor 1558 to capacitor 1560 which will result in the eventual accumulation of a charge on capacitor 1563 which is of a sufficiently large value to effect the operation of the bistable circuit including transistors 1556, 1557, and thereby the operation of the cutout relay 1490.

If, for instance, contact 1467 is connected to the +20 volt supply for a sufficient period of time, capacitor 1563 is discharged to —15 volts, diode 1570 is reverse biassed, capacitor 1565' is charged to approximately zero volts as determined by resistors 1506, 1564, 1566, and the consequent base emitter drop turns on transistor 1556. One side of capacitor 1560 is at the same voltage as capacitor 1563 (—15 volts) and the other is at +20 volts.

When the decrease control relay 1455 is operated, contact 1467 is opened and contact 1466 is connected to the —15 volt supply. Since one side of capacitor 1560 is abruptly decreased by 35 volts (from +20 to —15 volts), the other side likewise tends to decrease. Thus, after contacts 1466 are connected to the —15 volt source, capacitor 1560 discharges over diode 1501 and has no voltage across it since both its sides are at —15 volts.

When the decrease control delay is deenergized, contact 1466 opens and contact 1467 is connected to the +20 volt supply. Since the voltage on one side of capacitor 1560 increases 35 volts (from —15 to +20 volts) the other side also tends to increase by a large amount and a surge of current flows from the +20 volt supply through capacitor 1560 and charges capacitor 1563 to a slightly higher voltage. During the current surge diode 1501 is reverse biassed and diode 1562 is forward biassed.

If decrease control relay 1455 is immediately operated again due to some malfunction in the system, contact 1467 opens and contact 1466 closes to the —15 volt supply.

One side of capacitor 1560 decreases 35 volts (from +20 to —15 volts), but as soon as the other side starts to become negative, diode 1562 becomes reverse biassed and the charge placed on capacitor 1563 is preserved. This charge slowly decays through resistor 1564.

If decrease control relay 1455 is again operated to connect contact 1467 to the +20 volt supply before the charge has decayed completely, another surge of current charges capacitor 1563 to a still higher voltage. Diode 1501 is reverse biassed and diode 1562 is then forward biassed as during the previous current surge.

It is apparent that if decrease control relay 1455 is operated frequently enough, a charge builds up on capacitor 1563 faster than it decays through resistor 1564, and the voltage at the anode of diode 1570 increases. When the anode voltage exceeds the bias voltage at the base of transistor 1556, diode 1570 is forward biassed and the voltage accumulated on capacitor 1563 is conducted to the base of transistor 1556. Transistor 1556 then turns off and transistor 1557 turns on to complete a circuit from the zero potential to cutout relay 1490.

The cutout relay 1490 at its contacts 1491 interrupts the energizing circuit for the saw positioning motor and at its contacts 1492 completes an energizing circuit for the audio alarm 1496 and an energizing circuit for the visual alarm 1497.

*Overrun relay*

It was noted above that in the vent that the motor drives the saw beyond a preset position in the increase or decrease direction, the limit switches 846 or 847 will close and operate overrun relay 1420 through an obvious circuit. Relay 1420 operates and at its contacts 1424 extends +20 volt potential to the input of the transistor 1556 to turn off transistor 1556 and turn on transistor 1557 to complete an obvious energizing circuit for the cutout relay 1490.

Cutout relay 1490 operates and at its contacts 1491 interrupts the energizing circuit for the saw positioning motor, and at its contacts 1492 completes an energizing circuit for a bell alarm 1496 and a parallel circuit for a lamp 1497 to provide a visual indication of a cutout condition to the attendant.

The overrun relay at its contacts 1421, 1422 also completes paths from the +140 volt supply to alternatively the decrease and increase control relays 1455 and 1440. Assuming first that the saw has exceeded its predetermined limit in the decrease direction, decrease limit switch 1454 is opened to restore relay 1455 and thereby terminate further operation of the saw motor in the decrease direction. Simultaneously, decrease limit switch 847 closes to operate OR relay 1420 which at its contacts 1422 completes a circuit to increase control relay 1440 which extends over increase limit switch contact 1451′, the winding of relay 1440, contacts 1422 to +140 volt potential. Relay 1440 operates to complete motor connections as previously described to operate the saw in the increase direction, and after the motor has moved the saw back within its proper limits, decrease limit switch 847 opens, and decrease limit switch 1454 closes. The OR relay 1420 is then deenergized and normal operation is automatically restored.

In a similar manner, if the saw overruns in the increase direction the OR relay 1420 at its contact 1421 also completes a path from the +140 volt supply to decrease control relay 1455. Assuming the saw has exceeded its predetermined limit in the increase direction, increase limit switch 1451′ is opened to restore increase control relay 1440, and increase limit switch 846 is closed to complete an operating circuit for OR relay 1420. As OR relay operates, it is effective at its contacts 1421 to energize relay 1455 over an obvious circuit. As decrease control relay 1455 is operated, motor connections are completed as previously described to operate the saw in the decrease direction, and after operation has proceeded far enough to restore the saw within its proper limits, switch 846 opens. The OR relay is then deenergized and normal operation is restored.

The operation of the cutout relay 1490 and the opening of contacts 1491 also interrupts the power to the delivery solenoid, reject solenoid and elevate solenoid, each of which is normally prepared for operation over a circuit including transformer 1499 which is connected across the power conductors 1580, 1581 in the manner indicated.

*Power supply*

Figure 53:
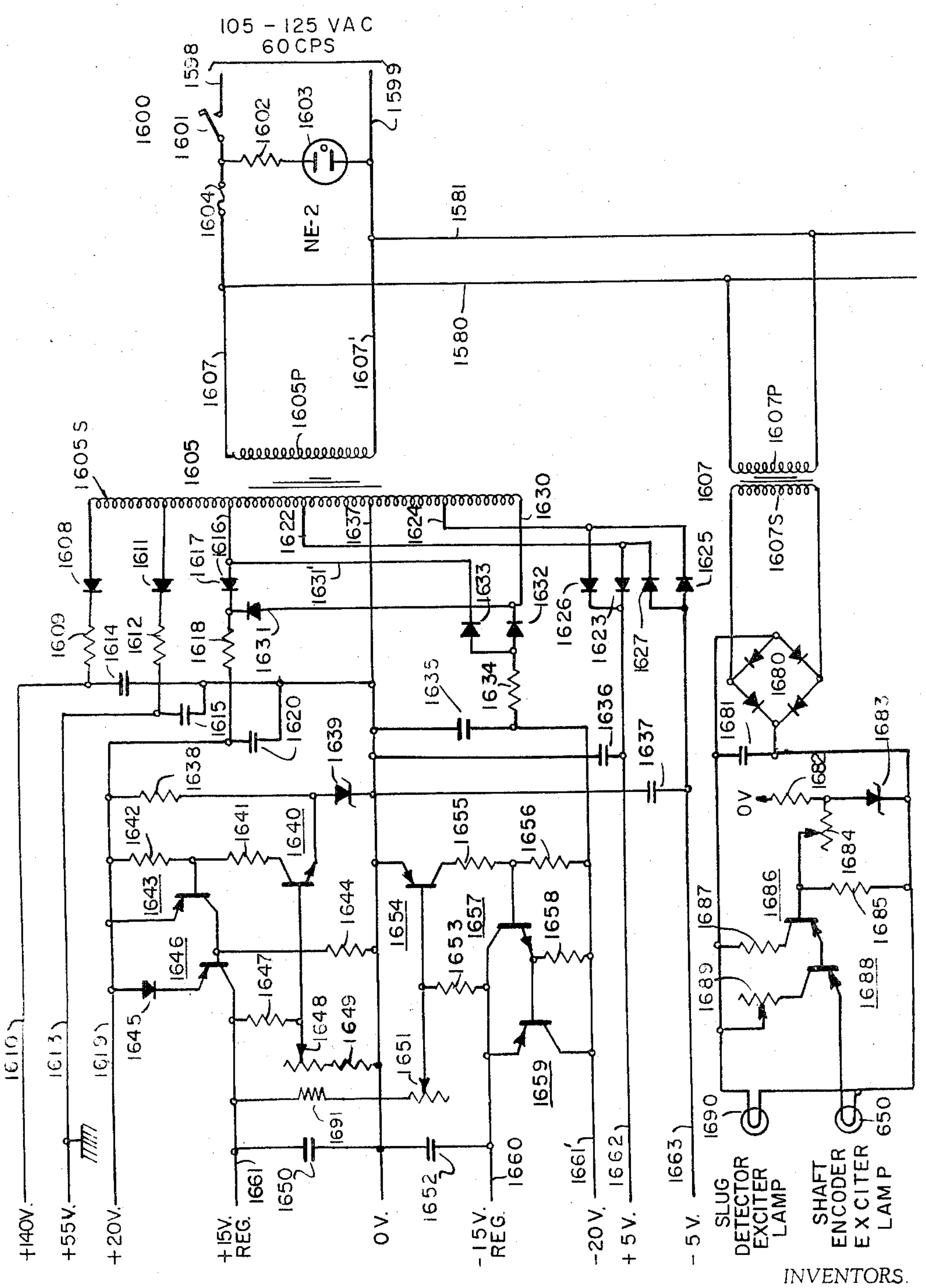

With reference to FIGURE 53, the power supply for the novel control circuit is set forth thereat, and as there shown basically comprises a pair of conductors 1598, 1599 which are adapted to be connected to a standard 105–125 volt A.C. sixty cycle source, an on-off switch 1601 for connecting said conductors to the circuitry, an indicator circuit including resistors 1602 and lamp 1603 to indicate to the attendant that power is being supplied to the system, fuse 1604 and a pair of conductors 1607 and 1607′ for extending the power source to the primary winding 1605*p* of the first transformer 1605. A second pair of conductors 1580, 1581 extends the power source to a primary winding 1607*p* of a second transformer 1607 and also to the energizing circuit for the saw position motor as set forth hereinbefore. The secondary winding 1605*s* of the transformer 1605 includes a first tap which is connected over diode 1608, resistor 1609 and conductor 1610 to provide +140 volt potential for the system. A second tap on transformer 1605*s* extends over diode 1611, resistance 1612, and conductor 1613 to +55 volt supply conductor for the system. A third tap 1616 extends over diode 1617 and resistor 1618 and conductor 1619 to provide +20 volt potential for the system. Filter capacitors 1614, 1615 and 1620 are connected between the respective output conductors in a conventional filtering manner. A further conductor 1637 is positioned to provide zero volt poential conductor for the system. Conductors 1622 and 1624 are connected over diodes 1623, 1626 and 1625, 1527 to provide plus and minus five volt potential over conductors 1662, 1663, respectively. Filter capacitors 1636 and 1637 are connected between conductors 1662, 1663 and zero volt conductor 1637 respectively. Further taps are connected over conductors 1616 and 1630 and diodes 1633 and 1632 and resistor 1634 to provide —20 volt potential over conductor 1661′. Filter capacitor 1635 is connected between —20 volt conductor 1661 and zero volt conductor 1637. The power supply circuit also includes means for provding a +15 volt and a —15 volt regulated D.C. output over conductors 1661, 1660 respectively, such circuit being connected between the +20 volt and —20 volt conductors 1619 and 1661′. More specifically, the +15 volt regulated supply includes resistor 1638, zener diode 1639 for providing a fixed reference voltage to a voltage amplifier 1640. Transistor 1640 includes a base element connected to a voltage divider including adjustable resistor 1648, resistor 1647, and resistor 1649 connected between +15 volt output conductor 1661 and zero volt conductor 1637; and a collector element connected over voltage divider 1641, 1642 to +20 volt potential. A second transistor 1643 includes a base element connected to the junction of resistors 1641, 1642; an emitter connected to the +20 volt source; and a collector connected to the base of a third transistor 1646 and also over resistor 1644 to a zero volt potential.

Transistor 1646 includes an emitter connected over diode 1645 to +20 volt potential, a base connected to the collector of transistor 1643, and the collector connected over the voltage divider 1647, 1648, 1649, and also to the +15 volt regulated output conductor 1661 and a zero volt conductor 1637.

In operation, transistor 1640 is used to detect an error between the actual voltage on conductor 1661 and the desired voltage selected by adjustment of arm 1648. Transistor 1640 puts out an error signal which is amplified in transistor 1643 and applied to the base of transistor 1646 which is connected in series between conductor 1661 and the +20 volt supply. In response to the amplified error signal transistor 1646 changes the resistance between its emitter and collector elements to either increase or decrease the amount of voltage drop between the elements, and thereby to restore the voltage on conductor 1661 to its original selected value.

Assuming that resistor 1648 is adjusted to provide an exact +15 volt potential on conductor 1661, and further assuming that this voltage momentarily increases, the voltage on the base of transistor 1640 also momentarily increases above the value set at its emitter by zener diode 1639. Transistor 1640 then conducts more current which results in a more negative signal at the base of transistor 1643. Transistor 1643 amplifies the signal and applies it as a more positive signal to the base of transistor 1646. In response to the positive signal at its base, transistor 1646 conducts less current from the +20 volt supply to conductor 1661. Since less current flows through the load attached to conductor 1661, the voltage across it decreases and the conductor 1661 is restored to its preselected +15 volt potential. In a like manner, if the voltage on conductor 1661 momentarily decreases, a negative error signal is supplied to transistor 1646 which allows more current to flow and raises the voltage on conductor 1661 to its preselected +15 volt value.

A regulating circuit similar to the one just described is used to insure that the —15 and +15 volt supplies remain at a constant potential difference of 30 volts. The input to such circuit comprises a voltage divider 1691, 1651, 1653 connected between the +15 and —15 volt supplies. A first transistor 1654 has an emitter connected to zero potential, a base connected through adjusting resistor 1651 to resistor 1691, and a collector connected to the —20 volt supply through resistors 1655, 1656. A second amplifying transistor 1657 has a base connected between resistors 1655, 1656, an emitter connected to the —20 volt supply through resistor 1658 and a collector connected to the —15 volt supply. Supply transistor 1659 has a base connected to the emitter of transistor 1657, a collector connected to the —20 volt supply, and an emitter connected to the —15 volt supply.

Operation of the —15 volt regulating circuit is essentially the same as the +15 volt regulating circuit. That is, a preselected voltage level is set on conductor 1660 by moving adjusting arm 1651 and any error between the preselected and actual voltage is detected by transistor 1654 and amplified in transistor 1657. In response to the amplified error signal, transistor 1659 increases or decreases its emitter to collector resistance to adjust the voltage drop for conductor 1660 and thereby restores the preselected voltage between the —15 and +15 volt supplies. Assuming the voltage between conductors 1660 and 1661 is adjusted to exactly 30 volts, the voltage on conductor 1661 is —15 volts. If the voltage on conductor 1660 becomes more positive than —15 volts, the base voltage of transistor 1654 also increases and a negative error signal is conducted to transistor 1657. Transistor 1657 amplifies the current of the error signal and applies it to transistor 1659 which conducts more current in response to the negative signal and thereby lowers the voltage on conductor 1660 to —15 volts and restores the voltage between conductors 1660 and 1661 to 30 volts.

In a similar manner, if conductor 1660 becomes more negative than —15 volts, a positive error signal causes transistor 1659 to conduct less current. The voltage across the load connected from conductor 1661 to 1660 is thereby increased and the voltage on conductor 1660 is restored to —15 volts.

As indicated above, the power supply further includes a second transformer 1607 which has a primary 1607*p* connected across conductors 1580, 1581 and a secondary 1607*s* which is connected to a bridge rectifier 1680, the output of which is extended over a network including resistances 1682, 1684, 1685 and zener diode 1683 to a two-stage transistor amplifier having its output connected to energize the shaft encoder exciter lamp 650. A slug detector exciter lamp 1690 is connected directly across the output conductors of the bridge rectifier 1680 and adjustable resistor 1684 connected between the output of the bridge 1680 and the amplifier stages 1686, 1688 permits precise regulated adjustment of the light source which is provided for the encoder device EN (FIGURE 57). Slug detector exciter lamp 1690 is connected to provide a source of energization for the photoelectric cell PE in the slug detector 1505 (FIGURE 51).

Although only certain particular embodiments of the invention have been shown and described, it is apparent that modifications and alterations may be made therein, and it is intended in the appended claims to cover all such modifications and alterations as may fall within the true spirit and scope of the invention.

What is claimed is:

1. In a linecasting machine having assembling mechanism for assembling the matrices and having casting mechanism for casting type slugs therefrom, the combination therewith of a tape member having coded signals for any one of a plurality of different saw cutting positions required in the linecasting operations of the machine, and coded signals for any one of the matrices required for the desired slugs a tape reader adapted to read code signals from said coded tape, output means for said tape reader, a first actuated mechanism for providing automatic operation of said matrix selecting and assembling mechanism normally responsive to said output means, a second actuated mechanism for adjusting associated equipment to different positions to vary the characteristics of the slug to be produced normally non-responsive to said output means, and selector means for preventing selection of a matrix by said first actuated mechanism in response to readout of certain of said code signals, and for enabling said second actuated mechanism to effect adjustment of said equipment without effecting the selection of a matrix responsive to the same code signals normally used to effect a matrix selection.

2. In a tape controlled linecasting machine, the combination of tape reading apparatus adapted to read code signals embodied in the control tape, a plurality of substantially parallel longitudinally shiftable code bars adapted to be shifted to positions indicated by signals transmitted from said tape, a plurality of push bars extending transversely of said code bars and arranged to be subject to a control exercised by the shifting movements of said code bars for selecting the type matrices in response to code signals received from said tape, a series of electrical switches including a switch individual to each of said code bars each of which switches is arranged to be opened and closed by the shifting movements of a different one of said code bars, and selector mechanism for transposing the control exercised by the shifting movements of said code bars from operation of said push bars in various combinations to operation of said electrical switches in corresponding combinations, different codes on said tape thereby effecting operation of different combinations of said electrical switches.

3. In a linecasting machine, the combination of a tape reader adapted to read a coded tape, a plurality of substantially parallel longitudinally shiftable code bars adapted to be shifted in response to code signals transmitted from said tape, transversely extending push bars operative to move into matrix selecting positions in response to permutative selections transmitted from said tape to said code bars, electrical switch mechanism including an electric switch individual to each of said code bars and operative to be moved between open and closed positions by the shifting movement of said code bars, a blocking bar having a normal non-blocking position and also having a blocking position in which it is operative to block substantially all of said push bars from moving into said matrix selecting positions, means responsive to the movement of said blocking bar into blocking position for rendering said electrical switch mechanism responsive to the shifting movement of said code bars, selector mechanism for controlling the movement of said blocking bar between said blocking and non-blocking positions, a first operating mechanism, means responsive to the first operation of said first mechanism for placing said selector mechanism in an escape position, and responsive to the next succeeding operation of said first mechanism for placing said selector mechanism in a command position, such command position moving said blocking bar into its blocking position, a second operating mechanism, and means responsive to the operation of said second operating mechanism for restoring said blocking bar and said selector mechanism back to normal position.

4. In a tape controlled linecasting machine, the combination of a tape reader, a plurality of code bars responding to tape signals transmitted through said reader, a series of push bars governed by said code bars for controlling the dropping of matrices, a blocking bar moveable from a normal position into a command position in which it is operative to prevent a plurality of said push bars from controlling the dropping of said matrices, one of said push bars constituting a selector actuating push bar, an actuating lever responsive to said selector actuating push bar, selector mechanism responsive to said actuating lever for moving said blocking bar into said command position, said selector mechanism comprising a spring biased selector lever, a latch for normally holding said selector lever in a normal position against its spring bias, said actuating lever in its first operation pursuant to the first transmission of a predetermined signal from said perforated tape operating to trip said latch for releasing said spring biased selector lever for movement from said normal position into an escape position, a pusher surface on said selector lever adapted to be pushed by said actuating lever pursuant to the transmission of a second predetermined signal from said tape for moving said selector lever from said escape position into a command position, and transmission mechanism for transmitting such latter movement from said selector lever to said blocking bar for moving said blocking bar into its command position.

5. The combination defined in claim 4 wherein another of said push bars constitutes a restoring push bar, and including means responsive to said latter push bar for restoring said selector lever and blocking bar to normal positions.

6. In a tape controlled linecasting machine, the combination of a tape reader for reading the control tape, a plurality of shiftable code bars, means responsive to signals transmitted from said control tape for shifting said code bars, a plurality of push bars extending transversely of said code bars, said push bars in the normal operating condition of said machine being responsive to said code bars for controlling the dropping of matrices, a moveable blocking bar operative in a blocking position to prevent the majority of said push bars from responding to the shifting movement of said code bars, means responsive to said control tape for moving said blocking bar between its blocking and non-blocking positions, electrical switch mechanism moveable between operative and non-operative positions, said switch mechanism comprising a plurality of electrical switches each adapted to respond individually to the shifting movement of a particular one of said code bars when said switch mechanism is in its operative position, and means responsive to the movement of said blocking bar into its blocking position for moving said electrical switch mechanism into said operative position, whereby said electrical switches are made responsive to the shifting movement of said code bars when said majority of said push bars are made non-responsive to said code bars.

7. The combination defined in claim 6 wherein said electrical switch mechanism is mounted on a swinging panel, and means is provided for swinging said panel in response to the movement of said blocking bar from its non-blocking position into its blocking position.

8. In an automatically operating tape controlled linecasting machine, the combination of a tape reader adapted to read a coded tape, a slug cutting saw movable to different cutting positions for cutting off different portions of the type slug, saw position indicating means responsive to code signals transmitted from said tape for indicating the desired cutting position of the saw, and mechanism cooperating therewith for affording a continuous indication of the instantaneous position of the saw, said latter mechanism including an encoder comprising a first rotating disk rotating at one speed commensurate with the pica changes in the saw position, a second rotating disk rotating at a different speed commensurate with the point changes in the saw position, light means for projecting light rays through light transmitting areas in said disks, photosensitive means responsive to the light rays transmitted through said first and second disks, and means responsive to said photosensitive means and to said saw position indicating means for controlling the position of the saw.

9. In a tape controlled linecasting machine, the combination of a tape reader adapted to read the control tape means responsive to said coded tape for selecting and assembling the type matrices for making up the desired type slugs, means for casting the type slugs from the assembled lines of matrices in a casting cycle, a saw for cutting the type slugs to desired lengths, means responsive to said control tape for sensing a new position which it is desired to have the saw take, and means cooperating therewith for continuously sensing the position that the saw is then in, said latter means comprising an encoder including a pica dial and a point dial operatively geared to said saw, each of said dials having a predetermined sequence of arcuate opaque and light transmitting segments controlling the transmission of light rays from a light source to photo-electric cells, said point dial having its segments divided into twelve equal-length arcuate sectors representing the twelve points in a pica, and a thirteenth sector on said point dial extending beyond the twelfth sector and being of shorter length than the twelve equal-length sectors, whereby no ambiguity can result from mistiming of the two dials.

10. In a linecasting machine, a slug cutting saw, information bearing means for providing both coded signals for identifying the matrices to be selected for a line and also coded signals indicating a plurality of different desired pica and point position of the saw in a range in the order of twenty-six pica, means for providing electrical signals indicating the actual position of the saw, and means for providing electrical signals representative of the difference in the desired position and the actual position of the saw, and means controlled by said difference signals to adjust the saw to the one of the pica and point positions indicated in such range.

11. In a linecasting machine, a slug cutting saw, information bearing means for providing one signal set for effecting matrix selection and another set of signals indicating a desired position of the saw, saw control means including a first register means for registering the position of the saw indicated by said other set of signals, means for continually providing a further set of electrical signals indicating the actual position of the saw, a second register means for registering the electrical signals representing the actual position of the saw as provided by said further set of signals, means for providing signals representative of the difference in the positions registered on said first and second register, means controlled by said difference signals to adjust the saw to the desired position, matrix selecting means, and control means responsive to the one signal set to enable said matrix selecting means to select the matrices indicated on the information bearing means, and responsive to the other signal set to enable said saw control means in the adjustment of the saw to the desired position.

12. In a linecasting machine, a slug cutting saw, means for providing a first set of signals indicating a desired position of the saw, means for continually providing a second set of signals indicating the actual position of the saw, means for providing signals representative of the difference in the position indicated by said first and second signal sets and the initial direction of adjustment required, means controlled by said difference signals to adjust the saw to the desired position including an increase control means, a decrease control means, and circuit means for controlling the same one of said control means to operate in the final adjustment of said saw toward the desired position regardless of the direction of adjustment first indicated by said difference signals.

13. In a linecasting machine, a slug cutting saw, means for providing a first set of signals indicating a desired position of the saw, means for continually providing a second set of signals indicating the actual position of the saw, means for providing signals representative of the difference in the positions indicated by said first and second signal sets, and control means controlled by said difference signals to adjust the saw to the desired position in a plurality of steps including means for adjusting said saw toward and past the indicated position in at least one of said steps at a first speed, and means for decreasing said speed in the last of said steps.

14. In a linecasting machine, a slug cutting saw, means for providing a first set of signals indicating a desired position of the saw, means for continually providing a second set of signals indicating the actual position of the saw, means for providing signals having a value representative of the difference in the position indicated by said first and second signal sets, means controlled by the difference signals to adjust the saw to the desired position including limit means for establishing predetermined limits for movement of said saw, and means for automatically moving said saw back within said limits responsive to movement of the saw beyond said limits.

15. In a linecasting machine, a slug cutting saw, means for providing signals indicating a desired position of the saw, means for providing signals indicating the actual position of the saw, means for providing signals having a value representative of the difference in the positions indicated by said first and second sets, control means responsive to the difference signals to adjust the saw to the desired position, means for detecting hunting by said control means in the adjustment of said saw, and means for terminating the saw adjustment operation responsive to detection of hunting by said last means.

16. In a linecasting machine, the combination of a matrix selecting and assembling mechanism, elevate means for elevating the assembled type for casting, a slug cutting saw for cutting the lengths of cast type slugs adjustable to any one of a plurality of predetermined positions, signal means for providing sets of coded signals including in sequence, a first coded signal set indicating the position of the saw desired for cutting the slug, a second coded signal set thereafter indicating the matrix to be selected and assembled, and a third coded signal set thereafter for initiating a casting cycle, output means for providing indications of the information in the signal sets, in sequence, a first means responsive to the first signal set indications from said output means to adjust the saw to the position at which the slug is to be cut, means responsive to the second signal set indications from said output means to effect the operation of said matrix selecting and assembling mechanism in the selection and assembling of the line of type indicated at times during the period of saw adjustment by said first means from a previous one of said positions to the indicated position, and means responsive at least in part to said third signal set indication from said output means to effect casting of the assembled line and delivery of the cast slug for sawing at the desired length.

17. In a linecasting machine, the combination of a matrix selecting and assembling mechanism including elevate means for elevating the assembled type for casting, a slug cutting saw for cutting the lengths of cast type slugs, signal means which provide at least a first signal set indicating the position of the saw desired for cutting the slug, a second signal set indicating the matrix to be selected and assembled, and a third signal set for said line elevate means, output means for providing indications of the signals provided by said signal input means, means responsive to the output indication for said first signal set to adjust the saw to the position desired, means responsive to the output indication for said second signal set to effect the operation of said matrix selecting and assembling mechanism in the selection of the line of type desired, a first means operative with setting of said saw to the desired position to prepare said elevate means for operation, and a second means responsive to the output indication for said third signal set to further prepare said elevate means for operation.

18. In a linecasting machine, the combination of a matrix selecting and assembling mechanism, elevate means for elevating the assembled line for casting, a slug cutting saw for cutting the lengths of cast type slugs, signal input means which provide at least a first signal set indicating the position of the saw desired for cutting the slug, a second signal set indicating the matrix to be selected and assembled, and a third signal set for said elevate means, output means for providing indications of the signals provided by said signal input means, means responsive to the output indications for said first signal set to adjust the saw to the position desired, means responsive to the output indications for said second signal set to effect the operation of said matrix selecting and assembling mechanism in the selection of the line of type desired, means operative subsequent to the output indications for said third signal set and the setting of said saw to the desired position to effect operation of said elevate means, reject means for enabling said output means to provide indications of said second signal set, and circuit means for energizing said reject means after each operation of said elevate means.

19. In a linecasting machine, the combination of a matrix selecting and assembling mechanism, a slug cutting saw for cutting the lengths of cast type slugs, elevate means for elevating the assembled line for casting, signal input means which provide at least a first signal set indicating the position of the saw desired for cutting the slug, a second signal set indicating the matrix to be selected and assembled, and means responsive to said signal sets including saw positioner means including motor means, means responsive to the first signal set to adjust the saw to the position desired, means responsive to said second signal set to effect the operation of said matrix selecting and assembling mechanism in the selection of the line of type desired, slug detector means for detecting the delivery of a cast and cut slug, means including a cycle relay for interrupting the circuit to said motor means after setting of said saw to the position desired, and means controlled by said cycle relay to reset said slug detector means.

20. In a linecasting machine, a slug cutting saw, means for providing a first set of signals indicating a desired position of the saw, including a tape having coded signals thereon, a matrix, a set of code switches for transferring said signals on the tape to said matrix, circuitry for positioning said saw in accordance with said signals including a first register means for registering the position of the saw indicated by the signals provided by said matrix, means for continually providing a second set of signals indicating the actual position of the saw, a second register means for registering the actual position of the saw as provided by said second set of signals, means for providing signals having a value representative of the difference in the position registered on said first and second register, and means controlled by said difference signals to adjust the saw to the desired position.

21. A linecasting machine as set forth in claim 20 in which said first register means includes a plurality of sections and said first set of signals includes at least one character and a plurality of digits, and said matrix includes means for conditioning said circuitry for operation in response to said character, and steering means for steering the different digits on said matrix to correspondingly different sections of said first register means.

22. In a linecasting machine, a slug cutting saw, means for providing signals indicating a desired position of the saw, means for providing signals indicating the actual position of the saw including a plurality of digit-representing signals, saw positioning circuitry including a counter means for counting the digit reprsenting signals as received, multi-section register means for registering the position of the saw indicated by said digit-representing signals, and steering means controlled by said counter means to steer the signals representing successive digits to successive ones of said register sections.

23. In a linecasting machine, a slug cutting saw, means for providing a first set of signals indicating a desired position of the saw including at least one character and a plurality of digit-representing signals, saw positioning circuitry, a first selection circuit for conditioning said saw positioning circuitry for operation responsive to receipt of a predetermined character, a counter means for counting the digit-representing signals as received, a first multi-section register means for registering the position of the saw indicated by said digit-representing signals, and steering means controlled by said counter means to steer successive ones of said digit-representing signals to successive ones of said register sections, means for continually providing a second set of signals indicating the actual position of the saw, a second mutli-section register means for registering the actual position of the saw as provided by said second set of signals, means for providing signals having a value representative of the difference in the position registered on said first and second register means, and means controlled by said difference signals to adjust the saw to the desired position.

24. In a linecasting machine, a slug cutting saw, means for providing a first set of signals indicating a desired position of the saw, a first register means for registering the position of the saw indictaed by said first set of signals, means for continually providing a second set of signals indicating the actual position of the saw, a second register means for registering the actual position of the saw as provided by said second set of signals, means in each of said register means for providing signals representative of the value of the digit registered thereon, corresponding digits in each register being represented by signals of like value and opposite polarity, output means for providing at least one difference signal having a value and polarity related to the difference in value of the signals registered on said two registers, and means controlled by the difference signal to adjust the saw in the direction of the desired position.

25. In a linecasting machine, a slug cutting saw, means for providing a first set of signals indicating a desired position of the saw, a first register means for registering the position of the saw indicated by said signals, means for continually providing a second set of signals indicating the actual position of the saw, a second register means for registering the actual position of the saw as provided by said second set of signals, means in each of said register means for providing signals representative of the value of the digit registered thereon, corresponding digits in each register being represented by signals having like values of opposite polarity, output means for providing at least one different signal having a value and polarity related to the difference in value of the signals registered on said two registers, means controlled by the difference signal to adjust the saw in the direction of the desired position, including an increase switch means for controlling operation of said saw in one direction, a decrease switch means for controlling operation of said saw in the opposite direction, and detector means for controlling operation of said increase and decrease switch means in relation to the polarity and value of said difference signal.

26. In a linecasting machine for producing cast slugs, the combination of a readout means to read coded signals including character representing signals on an information-bearing means, matrix selecting and assembling mechanism, a first means including push bar members normally responsive to said readout means to effect the automatic operation of said matrix selecting and assembling mechanism in the selection of the matrices having the characters indicated by said character-representing signals a plurality of additional equipment means each of which is operative to effect a different automatic operation of said linecasting equipment means including said push bar members responsive to the readout of a predetermined code on said information-bearing means to prevent said first means from selecting matrices represented by said character representative signals, and means responsive thereafter to readout a further character representing code which is normally used to select matrices to enable the one of the additional means which is represented by the further character without selecting a matrix.

27. In a linecasting machine for producing cast slugs, the combination of a readout means to read coded character-representing signals on an information-bearing means, matrix selecting and assembling mechanism output means for said readout means, a first means normally operative to effect the automatic operation of said matrix selecting and assembling mechanism in the selection of the matrices having the character represented by the coded characters indications provided by said output means, at least one additional means for effecting a different automatic operation of equipment on said linecasting machine, means responsive to the indication of a predetermined code by said output means to disable said output means, function selection means for responding to coded characters provided by said reader which otherwise would operate said first means, means for transmitting the readout provided by said readout means after said disablement of said output means to said function selection means, and means in said function selection means for selecting the one of the additional means identified by one of said character-representing signals received thereafter from the readout means without selecting a matrix having such characters.

28. In apparatus of the class described, the combination of a movable element adapted to move to different positions along a predetermined path, mechanism for providing a continuous sensing of the position of said element along said path comprising a pair of rotatable light transmitting dials operatively connected with said movable element, means for causing said dials to have distinctive rotating movements concurrently with the movement of said element along said path, a light source for projecting light rays through said dials, light sensitive means responsive to the light rays transmitted through said dials, control means responsive to such light sensitive means, a first set of light blocking arcuate segments of substantially uniform length evenly distributed around the peripheral portion of one of said dials, a second set of light transmitting arcuate segments distributed around the peripheral portion of said latter dial in alternating sequence with said light blocking segments, and an additional light blocking segment of shorter length than said uniform length light blocking segments, extending from one of said latter segments into the arcuate span of an adjacent light transmitting segment, whereby the transmission of light rays is governed so as to avoid ambiguity or mismatching in the sensing function performed by said dials in the control of said control means.

29. In a linecasting machine having a mechanism including a plurality of pushbar members for selecting matrices, casting mechanism for casting type slugs therefrom in response to coded signals on an information-bearing means, and a slug cutting saw for controlling the lengths of the cast type slug, the improvement comprising saw positioning means for adjusting said saw to different positions, signal responsive means for providing electrical signals to said saw positioning means to said saw to the position indicated by coded signals on said information-bearing means, and selector means operative to a given position to enable said signal responsive means to respond to at least one signal which is the same signal on the information-bearing means used to control said mechanism in the selection of matrices for casting of a slug including means for simultaneously blocking operation of each of said push bars from selecting a matrix with occurrence of said one signal on said information-bearing means during operation of said selector means.

30. In a linecasting machine the combination of a slug cutting saw, saw adjusting means for shifting said saw to different cutting positions, information bearing means operative to provide coded signals for the digits which represent the value of the desired pica and point position of the saw to provide slugs of the various lengths required in the different operations of the linecasting machine, and coded signals indicating the desired matrices for the lines to be cast, switch means controlled by the coded signal output of said information-bearing means to provide electrical signals representative of the pica and point digital information on said information-bearing means, and signal responsive means responsive to said electrical signals to control said saw adjustment means in the shifting of the saw to the pica and point position indicated by said coded signals.

31. A linecasting machine as set forth in claim 17 which further includes slug responsive means including means for providing a delivery signal responsive to delivery of a previous slug, a a third means for preparing said elevate means for operation responsive to said delivery signal, and means for completing a circuit to said elevate means only after operation of said first, second and third means.

32. In a linecasting machine for providing cast slugs, matrix selecting and assembly mechanism for selecting matrices for use in casting a slug, means for effecting the automatic operation of said matrix selecting and assembly mechanism, a slug cutting saw on said linecasting machine movable to a plurality of different predetermined positions to vary the dimensions of the final slug, saw adjusting means for adjusting said saw to said different predetermined positions, saw control means for said saw adjusting means, a tape member for providing one set of coded signals indicating the desired position of the saw and another set of signals indicating the matrices to be selected, different coded signals being provided in said one set to indicate correspondingly different saw positions and converter means including a set of code switches responsive to certain of said coded signals on said tape for providing electrical enabling signals to said saw control means, said saw control means being operative to effect movement of said saw from its previous position in either direction to the next predetermined position without movement to a home position to the position indicated by the tape signals.

33. In a linecasting machine, the combination of a slug cutting saw, saw adjusting mechanism for shifting said slug cutting saw to each of a plurality of cutting positions required in the operation of a linecasting machine to provide slugs of various lengths, a coded tape having a plurality of coded signals for said plurality of cutting positions, different coded signals being provided for different ones of said saw positions, and coded signals being provided for selecting the matrices required to cast a line, a tape reader adapted to read said coded tape, converter means for converting the signals on said coded tape representative of said saw positions to electrical signals, different desired positions of the saw being represented by a different electrical output, marking means for electrically marking the position of the saw indicated by said electrical output, at least, until the saw is moved thereto, and control means connected to said marking means operative to control said saw adjusting mechanism in the movement of said saw to the one of the plurality of positions which is represented on said marking means.

34. A linecasting machine as set forth in claim 33 which includes a cycle switch for indicating a casting cycle by said machine, and means controlled by said gate switch during a casting cycle to disable said control means for said saw adjusting mechanism.

35. A linecasting machine as set forth in claim 33 which includes cycle means for effecting a cyclic operation of said linecasting machine responsive to a predetermined signal on said coded tape, indicator means for providing an indication of the period of operation of said saw adjustment means, and means controlled by said indicator means to inhibit operation of said cycling means for said linecasting machine during setting of said saw to an indicated position.

36. In a linecasting machine, the combination of a tape member having coded signals for representing a plurality of different cutting positions for a slug cutting saw required in the linecasting operations of the machine, coded signals for the matrices required for casting of the lines and an elevate signal for controlling line delivery, a tape reader means adapted to read said coded signals on said tape, matrix selecting and assembling mechanism, output means for said tape reader means, a first means controlled by said output means for causing the automatic operation of said matrix selecting and assembling mechanism in the selection of the matrices represented by the coded signals on said tape, a slug cutting saw for cutting the lengths of cast type slugs to the lengths indicated by the signals on said tape, saw adjusting means for adjusting said saw to said plurality of different positions, and a second means controlled by said output means to effect operation of said saw adjustment means to move the saw to the indicated one of the positions prior to operation of the linecasting machine in response to said elevate signal.

37. A linecasting machine as set forth in claim 36 in which said second means is operative only in response to receipt of a predetermined signal from said output means, and which includes reset means for resetting said second means responsive to operation of said linecasting machine by said elevate signal.

38. In a linecasting machine, matrix selection means for selecting matrices for use in casting a slug, at least one functional device operable to a plurality of different positions to vary the characteristic of the slug to be produced, circuit means for controlling adjustment of said functional device to said different positions, a tape member including one set of signals comprised of a predetermined command signal and at least one coded signal indicating the desired position of the functional device for the slug to be produced, and another set of signals indicating the matrices to be selected for the same slug, at least certain of the coded signals in the one set being the same as in the other set, readout means for said tape including output means for providing output signals to said matrix selection means in response to said other set of signals, a blocking means operable to a blocking position to prevent operation of said matrix selection means, and control means controlled by said output means responsive to readout of said command signal to enable said circuit means to respond to the subsequent readout of said one coded signal, and to concurrently operate said blocking means to prevent selection of a matrix by said matrix selection means in response to readout of said one coded signal.

39. A linecasting machine as set forth in claim 38 in which said command signal comprises a predetermined code signal appearing twice in succession on said tape.

40. A method of automatically setting the type for use in casting a slug in cutting the slugs to different lengths in a linecasting machine provided with a tape controlled operating unit and a slug-cutting saw, which comprises the steps of first effecting readout of the signals which indicate the desired position of the saw for cutting of the next slug to the desired measure which is registered on the tape, reading out the signals on the tape which indicate the matrices which are used to make up the next line of type for use in casting the next slug, and effecting positioning of the saw before and, at times, during the period of readout of the signals for the matrices, and inhibiting delivery of the next line for casting until the saw positioning is complete.

41. In a linecasting machine, a slug cutting saw, tape means having coded signals indicating the matrices to be selected for a slug and the desired position of the saw for cutting of the slug including a first set of signals comprising a plurality of coded signals which represent the digital value of the desired pica setting of the saw, a spacer signal, and a second set of signals which represent the digital value of the desired point setting of the saw, delay means for preventing tape advance for a predetermined period in response to a pair of the same signals in succession on said tape, register means for registering said first and second sets of signals for use in adjusting of the saw to the desired pica and point position, and means responsive to said spacer signal to prevent registration of an erroneous point signal on said register means whenever the first and second digits of the pica signal are identical in value.

42. A linecasting machine, the combination of a matrix selecting assembling means for selecting matrices for use in casting a slug, a slug cutting saw for cutting the cast type slugs to the desired lengths, saw positioning means for adjusting said saw to each of a plurality of different cutting positions, information bearing means for providing one set of signals indicating the matrices to be selected, and another set of signals to indicate the desired one of the different possible positions of the saw, a plurality of the signals in the one set being the same on said information-bearing means as the signals in the other set, output means for providing indications of said signals on the information-bearing means, a first means responsive to certain of the indications provided by said output means for said one set of coded signals to enable said matrix selecting assembling means in the provision of the requested matrices, and a second means responsive to said second indications provided by said output means for said other set of signals to enable said saw positioning means to adjust the saw to the desired position represented by at least one signal in said other signal set which is identical on said information-bearing means to a signal thereon which is also used to select a matrix.

43. In a linecasting machine operable in a cyclic manner to cast slugs from assembled matrices, a device movable to a plurality of different positions to vary the dimensions of a cast slug, tape means for providing coded signals indicating the matrices to be selected for a line, a signal for controlling line delivery and signals for indicating the desired position of the device, each different position of the device being indicated by a different coded signal, switch means for converting the coded signals for the position indicated on the tape to electrical signals, means controlled by said switch means to provide a different signal output for the different coded signals, circuitry means for controlling adjustment of said device to the desired position of said plurality in accordance with the different signal outputs, means for providing an indication of movement of the device to the desired position, means for controlling said circuitry to terminate further movement of the device responsive to said indication, and means for inhibiting operation of the linecasting machine in response to a line delivery signal during the period of adjustment of the device to the desired position.

44. A linecasting machine as set forth in claim 43 which includes an elevate switch for controlling elevation of a line of assembled matrices in response to receipt of a line delivery signal, a delivery mechanism for delivering the line of matrices comprising a delivery slide rod, a split fork carried by said slide rod, and a solenoid for closing said split fork, and in which said means for inhibiting operation of said linecasting means by said line delivery signal includes control means responsive to either of said delivery slide rod and said split fork device being in a predetermined condition.

45. A linecasting machine as set forth in claim 44 in which said linecasting machine also comprises a cam shaft, a cam shaft clutch operative to control the shifting of said delivery slide rod, a delivery regulator responsive to the line of matrices for controlling tripping of said clutch, a solenoid governing said delivery regulator, and slug detecting apparatus responsive to the discharge of a previously cut slug from said saw for governing the energization of said latter solenoid.

46. In a linecasting machine, a plurality of devices for controlling the characteristics of the output slug including a slug cutting saw, a tape having coded signals thereon for providing a first set of signals indicating the desired condition thereof, tape reader means including a selector shaft which is operative in a cyclic manner to effect readout of successive signals on the tape, conversion means for converting said signals to electrical signals, marking means for marking the desired position of the saw indicated by the electrical signals, a bit switch for effecting transfer of the electrical signals from the conversion means to the marking means during only a portion of the total time of each cycle of the selector shaft, and control circuitry for positioning said saw in accordance with the information on said marker means which indicates the desired position.

47. In a linecasting machine, matrix selection means for selecting matrices for use in casting a slug, a functional device which is operable to different positions to vary the characteristic of a slug to be produced, adjusting means for selectively adjusting said functional device to said plurality of different positions, information-bearing means including one set of signals having a command signal, at least one coded signal for selecting the functional device from a group of functional devices and at least a second coded signal indicating the desired one of said plurality of positions for the selected functional device, and another set of signals indicating the matrices to be selected by said matrix selecting means for the same slug, at least certain of said first and second coded signals being the same as in said other set, readout means for said information-bearing means including output means for providing output signals to said matrix selection means responsive to readout of said other signal set, and control means controlled by said output means responsive to readout of said command signal and thereafter by said first coded signal to condition said adjustment means for the indicated functional device for operation, and responsive to readout of said second coded signal to effect operation of said adjustment means in the adjustment of the functional device.

48. In a linecasting machine, the combination of associated functional means movable to a plurality of different positions to vary certain characteristics of the final slug, adjusting means for adjusting said associated means to each of said different positions, information-bearing means having a plurality of coded position signals for said plurality of different positions, different coded signals being provided for different ones of said positions, and coded matrix signals being provided for selecting the matrices required for a line, readout means adapted to read the signals on said information-bearing means, converter means for converting the position signals on said information-bearing means to an electrical signal output representative of the indicated position, different desired positions of the associated means being represented by a different signal output, marking means for electrically marking the position of the associated means indicated by said electrical signal output, at least, until the associated means is moved thereto, and control means connected to said marking means operative to control said adjusting means in the movement of said associated means to the one of the plurality of positions which is represented on said marking means.

References Cited by the Examiner

UNITED STATES PATENTS

| | | | |
|---|---|---|---|
| 2,057,652 | 10/1936 | Potts | 199—18 |
| 2,091,286 | 8/1937 | Krum et al. | 199—18 |
| 2,095,004 | 10/1937 | Morrison et al. | 199—59 |
| 2,101,113 | 12/1937 | Walden | 199—18 |

(Other references on following page)

UNITED STATES PATENTS

| | | | |
|---|---|---|---|
| 2,152,641 | 4/1939 | Goetz | 199—18 |
| 2,701,051 | 2/1955 | Lindberg | 199—18 |
| 2,763,363 | 9/1956 | Swan | 199—18 |
| 2,786,567 | 3/1957 | Goetz | 199—18 |
| 2,788,886 | 4/1957 | Paulding et al. | 199—18 |
| 2,801,734 | 8/1957 | Schuba | 199—61 |
| 2,872,025 | 2/1959 | Thienemann | 199—18 |
| 2,872,026 | 2/1959 | Larson | 199—61 |
| 2,987,171 | 6/1961 | Hilpman et al. | 83—71 |
| 3,094,028 | 6/1963 | Ausenda et al. | 83—71 |
| 3,165,952 | 1/1965 | Thomson et al. | 83—71 |
| 3,174,370 | 3/1965 | Thumim | 83—71 |

ROBERT E. PULFREY, *Primary Examiner.*

E. S. BURR, *Assistant Examiner.*